(12) United States Patent
Bartz

(10) Patent No.: US 7,833,158 B2
(45) Date of Patent: Nov. 16, 2010

(54) METHODS AND APPARATUS FOR BEAMFORMING APPLICATIONS

(76) Inventor: James C. Bartz, 279 Aikane Pl., Kailua, HI (US) 96734-1601

( * ) Notice: Subject to any disclaimer, the term of this patent is extended or adjusted under 35 U.S.C. 154(b) by 1027 days.

(21) Appl. No.: 11/354,318

(22) Filed: Feb. 13, 2006

(65) Prior Publication Data

US 2006/0181457 A1 Aug. 17, 2006

Related U.S. Application Data

(60) Provisional application No. 60/652,659, filed on Feb. 14, 2005.

(51) Int. Cl.
*A61B 8/00* (2006.01)
*G01S 15/00* (2006.01)
*H04B 1/02* (2006.01)

(52) U.S. Cl. .................. 600/437; 367/103; 367/138

(58) Field of Classification Search .................. 600/437, 600/443, 447; 367/103, 111, 123; 342/368–375, 342/378–379; 73/625–628
See application file for complete search history.

(56) References Cited

U.S. PATENT DOCUMENTS

| 2,977,570 | A | * | 3/1961 | Leigh et al. | ................. 367/122 |
| 3,090,030 | A | * | 5/1963 | Schuck | ........................ 367/103 |
| 3,170,135 | A | * | 2/1965 | Yagelowich | ................ 367/126 |
| 3,500,303 | A | * | 3/1970 | Johnson | ..................... 367/123 |
| 3,824,531 | A | * | 7/1974 | Walsh | .......................... 367/92 |
| 3,914,731 | A | * | 10/1975 | Warner et al. | ................ 367/121 |
| 4,045,800 | A | * | 8/1977 | Tang et al. | .................. 342/372 |
| 4,140,022 | A | | 2/1979 | Maslak | ......................... 73/626 |
| 4,228,436 | A | * | 10/1980 | DuFort | ........................ 342/371 |
| 4,460,987 | A | * | 7/1984 | Stokes et al. | ................ 367/103 |
| 4,611,494 | A | * | 9/1986 | Uchiyama | ..................... 73/626 |
| 5,115,416 | A | | 5/1992 | Gehlbach | ..................... 367/138 |
| 5,142,505 | A | * | 8/1992 | Peynaud | ..................... 367/103 |
| 5,303,204 | A | * | 4/1994 | Wertsberger | .................. 367/99 |
| 5,313,834 | A | | 5/1994 | Lagace | ......................... 73/290 |
| 5,322,068 | A | * | 6/1994 | Thiele et al. | ................. 600/447 |
| 5,526,325 | A | * | 6/1996 | Sullivan et al. | ............. 367/138 |

(Continued)

OTHER PUBLICATIONS

Michael Simoneau, Dr. Jun Lan, and Stephen G. Boucher Airmar Technology Corp., "Marine Electronics", the Official Journal of the NMEA, May/Jun. 1992 vol. 3, No. 3, pp. 28-33, "Phased-Array Tranducers and Echo Sounders".

Chester D. Loggins, "A Comparison of Forward-Looking Sonar Design Alternatives", this paper appears in: Oceans, 2001. MTS/IEEE Conference and Exhibition, 2001, vol. 3, pp. 1536-1545 vol. 3, Meeting Date: Nov. 5, 2001-Nov. 8, 2001, location Honolulu, HI, USA.

(Continued)

*Primary Examiner*—Long V Le
*Assistant Examiner*—Salieu M Abraham
(74) *Attorney, Agent, or Firm*—Chapin IP Law, LLC; Paul P. Kriz, Esq.

(57) ABSTRACT

A beamforming system includes an array of transducers that detects echo signals in a scanned region. The array of transducers produces respective electronic signals based on receipt of echo signals. The beamforming system further includes an array of multipliers (e.g., mixers) to receive the respective electronic signals (e.g., echo signals converted to an electronic form of echo signals by the transducers) from the array of transducers. A generator device of the beamforming system generates multiple oscillator signals (e.g., square wave, sine waves, pulses, etc.) based on a relatively low frequency reference signal to simulate frequencies not capable of being precisely derived from the reference signal and continuously steer a directional beam through a scanned region.

29 Claims, 9 Drawing Sheets

U.S. PATENT DOCUMENTS

| | | | | |
|---|---|---|---|---|
| 5,530,680 | A | * | 6/1996 | Whitehurst ................... 367/99 |
| 5,675,552 | A | * | 10/1997 | Hicks et al. ................. 367/103 |
| 5,924,993 | A | * | 7/1999 | Hadjicostis et al. ......... 600/462 |
| 6,595,315 | B1 | * | 7/2003 | Fujimoto et al. ............ 181/124 |
| 6,661,739 | B1 | * | 12/2003 | Benjamin et al. ............. 367/92 |
| 6,666,823 | B2 | * | 12/2003 | Yao ........................... 600/443 |
| 7,006,406 | B2 | * | 2/2006 | Fujimoto et al. ............ 367/112 |
| 2003/0163046 | A1 | * | 8/2003 | Nohara et al. ............... 600/443 |
| 2004/0019277 | A1 | * | 1/2004 | Bae ........................... 600/437 |
| 2004/0147841 | A1 | * | 7/2004 | McLaughlin et al. ........ 600/437 |

OTHER PUBLICATIONS

Richard G. Lyons, "Understanding Digital Signal Processing", ISBN 0-201-63467-8, Apr. 2001, Chapter Two, "Periodic Sampling", pp. 23 to 47, Copyright 2001 by Prentice Hall PTR, Eighth Printing.

* cited by examiner

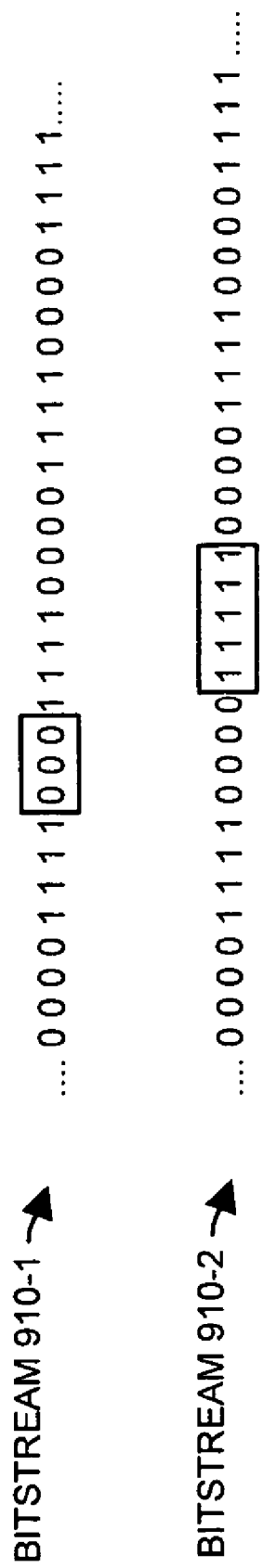

METHODS AND APPARATUS FOR BEAMFORMING APPLICATIONS

RELATED APPLICATIONS

This application is related to and claims the benefit of earlier filed U.S. Provisional Patent Application Ser. No. 60/652,659 entitled "Methods and Apparatus for Beamforming Applications," filed on Feb. 14, 2005, the entire teachings of which are incorporated herein by this reference.

BACKGROUND

Conventional beamformers typically include an array of linearly disposed transducers that simultaneously receive signals from multiple angular directions depending on the sensitivity of the transducers. To identify the presence of a signal received from a particular direction in a region monitored by the array of transducers, the beamformer device delays signals received on the array of transducers via use of time delay circuits coupled to corresponding transducers in the array. A magnitude of the time delays associated with the time delay circuits dictates the angle of a directional beam being monitored by the beamformer device.

Typically, the time-delayed electronic signals outputted by respective time delay circuits are summed to produce an output signal that is sampled by a processor circuit. Based on sampling the output signal of a respective summer circuit, the processor circuit identifies whether a signal is received at a particular angle (as dictated by the time delay circuits) in a region monitored by the array of transducers. Thus, in SONAR (Sound Navigation Ranging) imaging applications, a conventional beamformer device can be deployed to detect echo signals and identify a presence of objects in a monitored region. That is, a transmitter in a vicinity of the array of transducers transmits a pulse in the monitored region. Prior to generation of the pulse, the beamformer device steers its directional beam associated with the array of transducers to detect reflections of the pulse that occur as a result of a presence of an object in the monitored region.

SUMMARY

Conventional beamformer devices can suffer from a number of deficiencies. For example, providing accurate phase delays to signals received on an array of transducers to steer a directional beam in a monitored region typically requires use of costly, high frequency electronic circuitry. Even if the electronic circuitry associated with a beamformer is capable of producing highly accurate phase delays to aim a directional beam in a specific direction, the electronic equipment may not to be able to change the phase delays associated with respective phase delay circuits fast enough (with appropriate precision) to continuously steer the directional beam at a rate that a processor circuit can quickly collect echo data from a scanned region and reproduce an image of detected objects. Certain applications require near real-time detection of objects in a scanned range and display of respective "echo" images to a user.

Certain conventional sonar equipment operates at lengths over 1000 feet. Medical ultrasound operates at lengths of around one foot. The speed of sound in water is roughly 4800 feet per second. Therefore, to travel 240 feet or 240 feet out and 240 feet back from a transducer array requires 1/10 of a second. In other words, sonar applications in water typically result in relatively long delays for a transmit "ping" to travel to and reflect off an object in a monitored region. To form a sonar image over 90 degrees of scanned area, conventional sonar equipment may require many transmit pings because such beamformers typically transmits a ping in a given direction and thereafter monitors for echo signals in the given direction without moving the beam. This process must be repeated for each discrete angular beam setting. Thus, conventional methods require a long time to generate an image based on echo signals.

Various techniques discussed in this disclosure provide novel deviations with respect to conventional beamforming applications such as those discussed above as well as additional beamforming techniques known in the prior art. In particular, embodiments herein include mechanisms and techniques for utilizing a relatively low frequency reference signal to generate a set of signals that are used to simulate time delays to steer (e.g., continuously sweep) a directional beam in a scanned region.

For example, in one embodiment, a beamforming system includes an array of transducers that produces respective electronic signals based on receipt of echo signals. In addition to the array of transducer, the beamforming system further includes an array of multipliers to receive the respective electronic signals (e.g., echo signals converted to electronic signals by the transducers) from the array of transducers. A generator device of the beamforming system generates multiple oscillator signals (e.g., square wave, sine waves, pulses, etc.) to drive the array of multiplier devices and steer a directional beam formed by the array of transducers. At least one oscillator signal of the multiple oscillator signals has associated phase adjustments to support sweeping of the directional beam through the scanned region. For example, in one embodiment, the generator device adjusts a timing of transitions or phases in one or more of the oscillator signals to modulate a frequency of the one or more oscillator signals. Accordingly, as a result of the adjustments, the generator device 160 can simulate higher frequency clocks than an actual frequency of the reference frequency used to generate the multiple oscillator signals. The generator device thus can utilize a relatively low frequency reference signal to simulate (non-harmonic) frequencies (e.g., frequencies not capable of being precisely generated by the reference clock) and continuously steer a directional beam through a scanned region. The simulated frequencies approximate corresponding signals that would otherwise be generated using a higher frequency clock. In other words, embodiments herein include a technique of using a low frequency clock to simulate higher frequency signals that are greater than the low frequency clock for purposes of steering a directional beam associated with a transducer array.

Although the beamformer device can be used in different types of wave applications, one application is directed towards detecting sonar-based echo signals. For example, the system of the present application can include a transmitter that generates a pulse (e.g., a multi-directional or omni-directional pulse) in a scanned or monitored region. Echo signals are produced as a result of at least a portion of the pulse reflecting off objects in the scanned region back to the array of transducers. As discussed above, a generator device in the beamformer phase modulates the multiple oscillator signals to simulate desired frequencies for purposes of continuously sweeping the directional beam formed by the array of transducers in the scanned region. One or more processor devices associated with the beamformer processes the echo signals to: i) identify an angular and radial position of objects in the scanned region producing the echo signals, and ii) display a representation of the objects on a display screen to a viewer.

In other words, the beamformer device keeps track of a specific time when reflections are detected by the directional beam in the monitored region. Based on the tracked time, the processor device identifies distances of respective objects from the array or transducers as well as precise angular positions of the respective objects in the scanned region. Conventional techniques of discretely steering or hopping the directional beam do not allow as precise detection of an angular position of an object as does continuous sweeping of the directional beam according to certain embodiments herein.

The generator device can produce a set of multiple oscillator signals that supports a relatively fast scan rate of the directional beam through a monitored region. For example, when detecting sound-based (e.g., ultrasonic) echo signals, the generator device can set a frequency of the oscillator signals such that the directional beam of the array of transducers repeatedly sweeps the scanned region at a faster rate than a transmit pulse is able to substantially propagate in the scanned region during a sweep cycle in which the directional beam sweeps through a full angular range of the scanned region. In other words, the generator device controls the array of transducers to sweep the directional beam at a fast enough rate for the array of transducers to collect echo data for objects located on an arc at a substantially fixed radius with respect to a center of the array of transducers. For each successive sweep of the directional beam in the scanned region, the beamformer device and, more specifically, the array of transducers detect objects on successively larger "arcs" (as a result of the transmit pulse propagating radially outward from the array) in the scanned region. Consequently, the beamformer device can be used to generate an image based on a single transmit ping in the scanned region. More particularly, as a result of fast scanning of the directional beam and proper sampling, the beamformer can detect a presence of multiple objects at the same distance from the transducer array but at different respective angles in the scanned region. Thus, in one application, a beamformer system generates single transmit ping, quickly scans a region for echo signals, and produces an image based on the echo signals in the monitored region. Additional scans can be used to filter out anomalies such as falsely detected objects occurring in a single ping and scan cycle.

Embodiments of the present application can be extended to monitor a three-dimensional volume region rather than just objects located in a planar volume region. For example, a modified beamformer of the present application can scan in a similar fashion as a raster on a television screen in which the directional beam sweeps in a series of horizontal lines from top to bottom. After reaching the bottom of a scanned region when scanning in a raster-like fashion, the beamformer then returns the directional beam to the top during a vertical flyback interval. In another application, the beamformer cycles through a process of repeatedly scanning the directional beam on each of multiple different planes for respective transmit pulses and reconstructing an image based on detected echo signals.

Another general embodiment of the present application is directed to a technique of performing at least some of the following steps: i) receiving a reference frequency; ii) generating oscillator signals based on use of the reference frequency, the oscillator signals including phase adjustments to continuously sweep the directional beam through different angles in a scanned region; iii) wherein generating the oscillator signals includes adjusting phases of the oscillator signals to modulate corresponding frequencies of the oscillator signals; and/or iv) utilizing undersampling techniques to determine the phase adjustments.

Yet another general embodiment of the present application is directed to a beamformer system, including: i) an array of transducers; ii) an array of multiplier devices coupled to the array of transducers; and iii) a generator device that generates multiple oscillator signals to drive the array of multipliers and continuously sweep a directional beam (potentially at a linear or non-linear rate) formed by the array of transducers. At least one oscillator signal of the multiple oscillator signals include occasional phase adjustments to simulate and approximate a higher frequency spectral component than can be provided by a relatively low frequency clock utilized by the generator device to generate the at least one oscillator signal.

Techniques of the present application are well suited for use in beamforming applications in which an array of transducers detects echo signals from objects in a scanned region. Based on implementation of minor circuit modifications, the techniques also enable the beamformer to transmit signals in a particular direction. However, it should be noted that embodiments of the present application are not limited to use in such applications and are well suited for other applications as well.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

FIG. 9 is a graph illustrating bit streams including occasional phase adjustments (e.g., insertion and removal of bits) to simulate different frequencies according to embodiments herein.

DETAILED DESCRIPTION

According to one implementation herein, a beamforming system includes an array of transducers that detects echo signals in a scanned region. The array of transducers produces respective electronic signals based on receipt of echo signals. In addition to including one or more transducers, the beamforming system further includes an array of multipliers (e.g., mixers) to receive the respective electronic signals (e.g., echo signals converted to electronic signals by the transducers) from the array of transducers. A generator device of the beamforming system generates multiple oscillator signals (e.g., signals such as square waves, sine waves, pulses, etc.) to drive the array of multiplier devices and steer a directional beam formed by the array of transducers. At least one oscillator signal of the multiple oscillator signals has associated phase adjustments to support sweeping of the directional beam through the scanned region. For example, in one embodiment, the generator device adjusts a timing of transitions or phases of one or more oscillator signals (e.g., local oscillator signals driving corresponding multipliers) to modulate a frequency of the one or more oscillator signals. Consequently, the generator device can utilize a relatively low frequency reference signal to simulate certain frequencies (e.g., frequencies not capable of being precisely generated by the reference clock) and continuously steer a directional beam through a scanned region.

Figure 1:
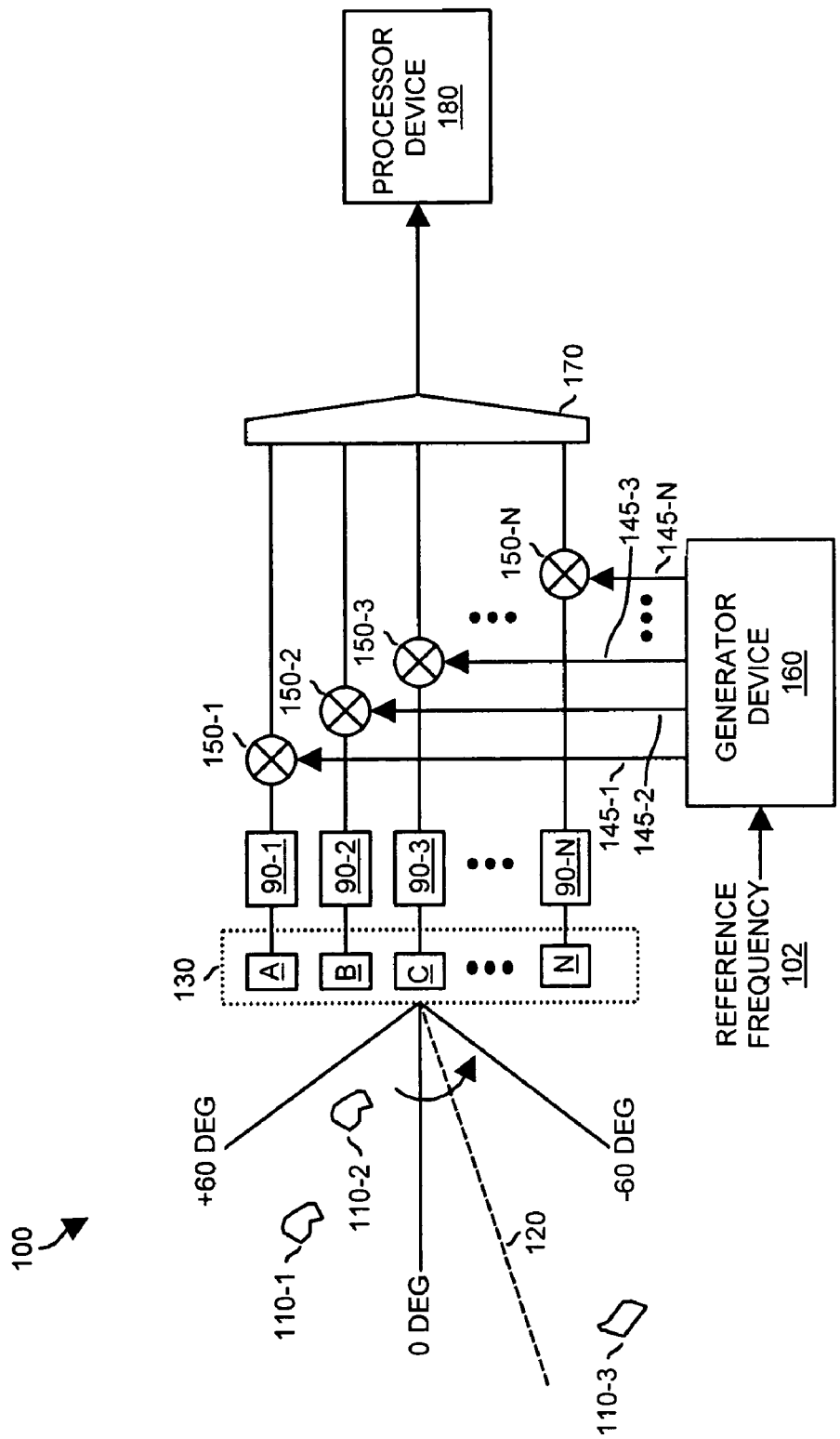
FIG. 1 is a block diagram of a beamformer system according to embodiments herein.

FIG. 1 is a block diagram illustrating a beamformer system 100 according to embodiments herein. As shown, beamformer system 100 includes detected objects 110 (e.g., object 110-1, object 110-2, object 110-3), array 130 including transducers A, B, C, . . . , N, bandpass filters 90-1, 90-2, 90-3, . . . , 90-N, multipliers 150-1, 150-2, 150-3, . . . , 150-N, directional beam 120, reference frequency 102, generator device 160, and processor device 180.

In general, in the context of an echo scanner, array 130 generates directional beam 120 to detect objects 110 in scanned region between +60 degrees and −60 degrees. Upon detecting echo signals as a result of transmitting a ping (e.g., an ultrasonic signal of limited duration in scanned region) in the scanned region, the array 130 of transducers produces electronic signals fed to respective bandpass filters 90. Filtered signals outputted by bandpass filters 90 feed respective inputs of multipliers 150. Based on reference frequency (e.g., a relatively low reference frequency such as a 12 Megahertz clock signal), generator device 160 generates oscillator signals 145 (e.g., frequency modulated oscillator signals) that drive respective inputs of multipliers 150. In one application, the oscillator signals 145 simulate one or more frequencies that cannot be accurately generated based on use of reference frequency 102. For example, reference frequency 102 is a 12.000 MHz clock and oscillator signal 145-1 simulates a 1.425 MHz frequency, oscillator signal 145-2 simulates a 1.435 MHz frequency, oscillator signal 145-3 simulates a 1.445 MHz frequency, . . . , oscillator signal 145-N simulates a 1.575 MHz frequency. Generator device 160 uses frequency modulation techniques (e.g., adjusts a phase of oscillator signals 145) to produce these simulated frequency values. For example, the generator device 160 generates bitstreams as defined in Appendix A (supporting a non-linear sweep rate of the directional beam 120 between −90 and +90 degrees) and Appendix B (supporting a linear sweep rate of the directional beam between −60 and +60 degrees) according to embodiments herein.

Appendix A has a −90 degree to +90 degree non-linear with time beam angle steering that was produced with local oscillators that are equally spaced in frequency.

Appendix B produces a linear sweep rate over −60 degrees to +60 degrees. This was produced by changes in frequency local oscillators to scan the beam angle linearly. With respect to Appendix B, the beam steered angle was reduce to +/−60 degrees since the last 30 degrees can be degraded with strong sidelobes. Note that each of the bitstreams in Appendix B do not merely simulate a single frequency value but are instead frequency modulated in order to linearly sweep the directional beam 120.

The labels LO−7.5, LO−6.5, LO−5.5, . . . are naming indices for each respective transducer A, B, C, D of array 130.

They are originally labeled 0 through 15 but if the 10 KHz spacing of the local oscillators is applied, the base local oscillator will be the lowest frequency. By re-labeling the transducers, the base local oscillator can be centered in the array allowing easy addition and removal of transducers to change the size of the array. Because the number of transducers is even in the present example of FIG. 1, the value 0.5 is added and this would not be needed for an odd numbered array. This 0.5 implies that no transducer has the exact local oscillator frequency of 12 MHz/8 or 1.5 MHz. In other words, transducer F and G are 1.495 MHz and 1.505 MHz respectively. The indices are handy ways for referring to the transducer array elements for mathematical purposes. This is similar to the "i" or "n" indices of a summation sign.

As shown in FIG. 9, instead of generating a constant stream of four logic ones and four logic zeroes in a row or an exact 1.5 MHz signal, the generator device 160 occasionally adds or removes a logic one or zero from a respective bitstream. For example, generator device 160 removes a logic zero from bitstream 910-1 to create 3 logic zeros in a row in lieu of creating four logic zeros in a row. Generator device 160 adds a logic one to bitstream 910-2 to create 5 logic ones in a row in lieu of creating only four logic ones in a row. In this way, generator device 160 adjusts a phase of oscillator signals 145 and modulates their associated frequencies. As discussed above, Appendix A and Appendix B illustrate modification of each of multiple bitstreams to produce respective signals 145 that scan directional beam 120. Insertion or removal of bits simulates non-harmonic frequencies that cannot be produced by a reference clock. For example, if a reference clock is 12 MHz, embodiments herein include adding or removing bits in a respective bitstream in order to simulate frequencies such as 1.495 MHz, 1.485 MHz, etc.

As previously discussed, one purpose of simulating the above frequencies is to avoid the need to employ a higher frequency clock to produce the exact local oscillator frequency values. Based on generation of the spaced frequencies (e.g., approximated frequency values for oscillator signals 145) as discussed above, array 130 generates a directional beam 120 that rapidly and smoothly scans directional beam 120 through a monitored region for identifying a presence of objects 110. Output signals of multipliers 150 feed summer circuit 170. Processor device 180 receives the output of summer circuit 170. Based on a time of detecting or receiving an echo signal at summer circuit 170, processor device 180 identifies an angular position as well as radial distance of a corresponding object 110 from the array 130. A magnitude of a received signal at a respective sweep time indicates whether array 130 receives a good reflection from objects 110.

More particularly, according to a particular embodiment, beamformer system 100 includes an array 130 of N=16 ultrasonic transducers A, B, C, . . . N (e.g., R−7.5, R−6.5, R−5.5, . . . to R+7.5, respectively) that are equally spaced by a distance d, which in this example is one-half wavelength of sound propagation in the wave medium of water at the frequency of operation, f=12 MHz. In one application, the array 130 of transducers are spaced linearly with respect to each other. Linearity, equal one-half wavelength spacing, a number, and ultrasonic operation of the transducers as well as other attributes are not critical for every embodiment herein. As is the case for other portions of this detailed description, the example embodiments are chosen for simplicity sake and are included for illustrative purposes. Thus, actual implementations of beamformer system 100 in the field can vary depending on the application.

In one embodiment, each transducer A, B, C, . . . is sensitive over an angular sector at least as great as the desired scan range. Based on receipt of echo signals, transducers generate electronic signals that are filtered by bandpass filters 90 having a center frequency at the frequency of operation f. This narrowband operation enables heterodyning, mixing, or multiplying phase-shifting, etc. that simulates time delaying the electronic signals. The bandwidth of the bandpass filters 90 is set to a minimum received length or 1/k. The pulse length of the signal transmitted in the scanned region is long enough to allow the majority of the received signal from all transducers to overlap in time, especially for large beam steering angles of the directional beam 120.

A source for transmitting the pulse in the scanned region can be generated based on a number of commonly utilized techniques, including using transducer array 130 to send an omni-directional or multi-directional burst in the scanned region that is re-turned as echoes off objects in the scanned region. A separate transducer assembly can also generate the ping that produces echo signals off objects 110.

In one embodiment, the phase-shift beamformer 100 is capable of receiving and processing echoes from multiple beam angles simultaneously. The aperture (e.g., length from transducer A to transducer N) of the array 130, D, is typically small compared to the wavelength, placing the near field close to the array 130 and allowing the incident received echo signal from the objects 110 to be treated as a collimated or plane wave. in one embodiment, the transducer array 130 is on the order of inches in size while objects are located tens or hundreds of feet away.

After a respective bandpass filter 90, each transducer channel is connected to a multiplier device 150 (e.g., a mixer). Multiplier devices 150 or circuits can be realized with many circuit methods that range from the ideal to the approximate. For example, analog multipliers, simple switches, circuit non-linearities, etc. can be used to provide the multiply function and differ in the harmonic content of the product. Note that multiplier devices 150 can be replaced with other delay type circuits known in the art. For example, one embodiment of the invention involves providing crude or approximated phase delay values to received transducer signals via use of delay circuits (in place of multiplier devices 150) that feed summer circuit 170.

As discussed above, generator device 160 simulates providing a suitable time delay to each transducer channel (e.g., transducer A, transducer B, transducer C, . . . ) via generation of the local oscillator bit streams designated LO−7.5 to LO+7.5 as in Appendix A and Appendix B. In other words, bitstream LO−7.5 represents signal 145-1, LO−6.5 represents signal 145-2, LO−5.5 represents signal 145-3, and so on. The local oscillator bit streams of length S bits (e.g., 1200 bits) in each of Appendix A and B are clocked at a rate of f, (e.g., 12 MHz) with a phase or quantization error of one sample time, or q=8, or 360°/8, or 45° for a base local oscillator of $f_{LO}=f_S/q$. The bit streams may be preloaded in a memory or generated via an algorithm. Other digital means may well be utilized in the implementation of the bit stream table. In one embodiment, such as shown in Appendix A, generator device 160 generates bitstream 910-1 to be signal 145-1 (e.g., LO−7.5), bitstream 910-2 to be signal 145-2 (e.g., LO−6.5), bitstream 910-3 to be signal 145-3 (e.g., LO−5.5), and so on. LO equals 1.5 MHz Meagahertz). As shown in Appendix A, each of signals is spaced by 10 KHz such that signal 145-1 (e.g., LO−7.5) simulates a 1.425 MHz value, signal 145-2 (LO−6.5) simulates a 1.435 MHz value, signal 145-3 simulates a 1.445 MHz value, signal 145-4 simulates a 1.455 MHz value, signal 145-5 simulates a 1.465 MHz value, signal 145-6 simulates a 1.475 MHz value, signal 145-7 simulates a 1.485 MHz value, signal 145-8 simulates a 1.495 MHz value, signal 145-9 simulates a 1.505 MHz value, signal 145-10 simulates a 1.515 MHz value, signal 145-11 simulates a 1.525 MHz value, signal 145-12 simulates a 1.535 MHz value, signal 145-13 simulates a 1.545 MHz value, signal 145-14 simulates a 1.555 MHz value, signal 145-15 simulates a 1.565 MHz value, signal 145-16 simulates a 1.575 MHz value. These values cause directional beam 120 to sweep at a non-linear rate.

Further efficiencies may be possible by reorganization and /or the introduction of carefully chosen errors and approximations, or the inclusion of naturally occurring and/ or imposed symmetries. Appendix B identifies a beam steering function and bit pattern that supports scanning the region (e.g., −60 to +60 degrees) at a linear rate through all beam angles even though the oscillator signals 145 are approximations of desired frequencies. Other steering functions (such as a hopping) may be used for special purposes, simplifications, or to adapt to the hardware limitations of the system. The beam steering function and therefore, bit streams of S bits (e.g., 1200 bits) can be sequenced via use of modulo counters having a cycle of 1/k and latched before level shifting to accommodate the multipliers 150.

In one application, modulo counter S of the generator device 160 generates a synchronizing signal to mark the beginning of a scan and aid in the decoding of the output signal of summer 170. To compensate for timing delays in the system 100, the synchronizing signal may be delayed.

As mentioned, outputs of the multipliers 150 are summed via summer circuit 170 and may be individually weighted before summing to achieve sidelobe reduction in the receive beam pattern by shading. The bandwidth of interest in the summer circuit 170 output is $f_{BW}=(N-1)\cdot k$. The frequency spectrum of the summer circuit 170 output is created by the local oscillator signals 145 and multipliers 150, since the transducer signals have been "narrowbanded" by a respective bandpass filter 90 in each transducer channel. The local oscillator signals 145 (e.g., bit streams as identified in Appendix A and Appendix B) are square waves of frequency $f_{LO}$ that have been phase modulated as discussed for continuous steering of directional beam 120 depending on the physical location of a respective transducer to an axis of the directional beam 120. Square waves can be composed of amplitude decreasing odd harmonics. The harmonics may be further complicated by the increased frequency spacing between the local oscillator signals 145 frequencies of adjacent transducers, while moving from harmonic to harmonic upward in the frequency spectrum. The square wave local oscillators are derived from a sample clock fs (e.g., a 12 MHz reference frequency 102). Although the above techniques discuss modifying a square wave to simulate different frequencies, the same techniques can be implemented to apply phase adjustments to other types of oscillating signals such as sine-like waves, etc.

Figure 2:
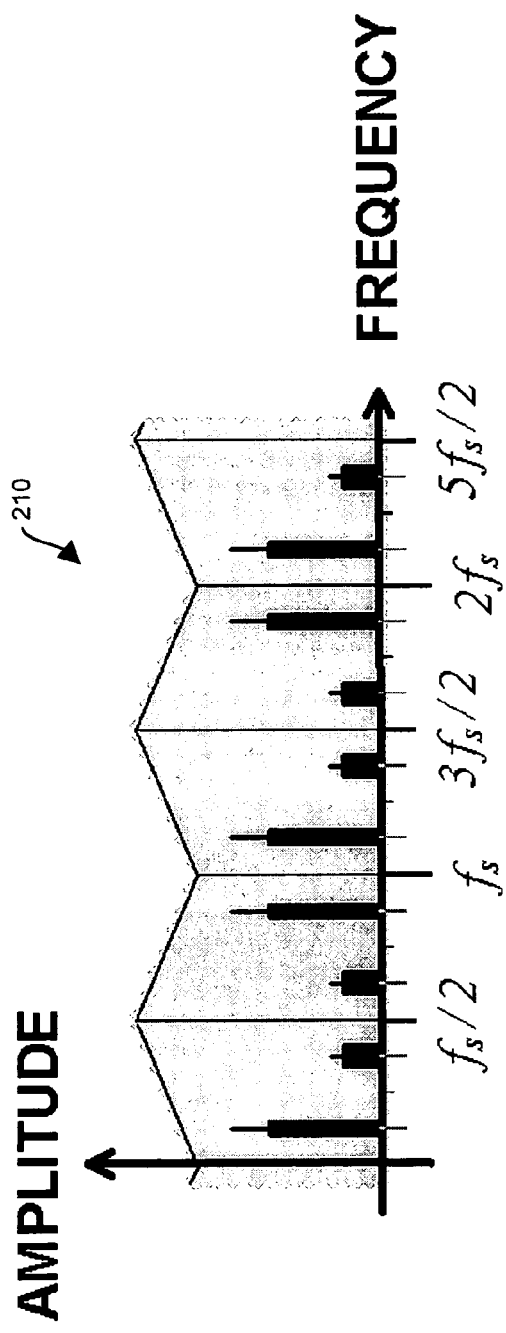
FIG. 2 is a graph illustrating replications and inversions of frequencies of the beamformer system according to embodiments herein.
Figure 2:
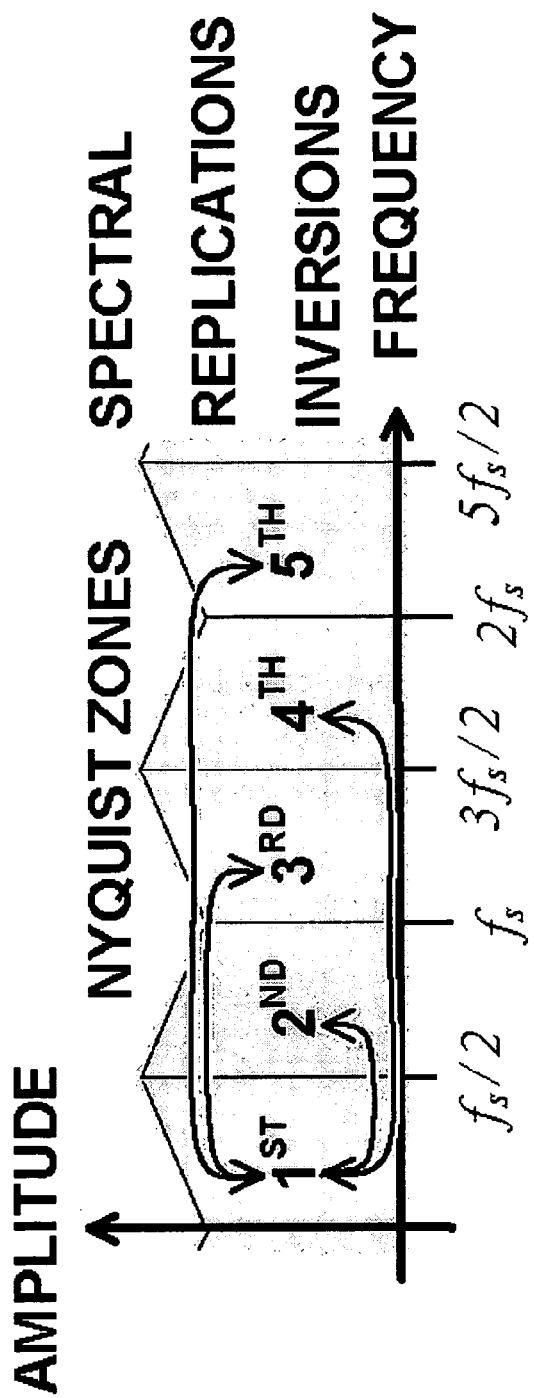

In one embodiment as illustrated in FIG. 2, only the harmonics less than the Nyquist frequency of $f_S/2$ are present in the spectrum 210. Above this frequency, the spectrum found in the First Nyquist Zone is alternately inverted and replicated upward throughout the other Nyquist zones. The first harmonic sidebands of the summer output in the First Nyquist Zone appears by spectral replication and inversion throughout the other Nyquist zones and has the proper frequency spacing between the local oscillators of adjacent transducers.

The sidebands differ in the order of frequency components. Use of a relatively low sample clock $f_S$ (e.g., reference frequency 102 such as 12 MHz as opposed to a value such as 100 MHz) is possible as a result of the relatively large acceptable phase error (e.g., as much as 45°, but preferably less than 25 degrees) of the phase-shift beamformer. It allows the Nyquist sampling bandwidth limit criterion to be constructively used to generate simulated higher frequency local oscillator spectral components that are replications of the first harmonic. With a sampling frequency $f_S$=12 MHz and q=8, then $f_{LO}$=1.5 MHz from $f_{LO}=f_S/q$. The first harmonic is frequency translated to $f_S-f_{LO}$=12 MHz-1.5 MHz, or 10.5 MHz. The lower sideband of the first harmonic is inverted and replicated to $f_S-(f_{LO}-f)$=12 MHz-(1.5 MHz-200 KHz), or 10.7 MHz. Without the benefit of spectral inversion and replication according to certain embodiments herein, a sample clock for q=8 of 8×10.5 MHz or 84 MHz would be necessary. Furthermore, for a scan time of 1/k=100 microseconds, and $S=f_S/k$ or 8400 bits would be needed in lieu of only 1200 bits discussed above. The signal processing of the summer circuit 170 output can include a gain control circuit and logarithmic amplifier circuit that compresses the amplitude range and produces the demodulation envelope of the received signal. Finally, the resulting amplitude signal is converted to a digital signal via an A/D converter.

This continuously steered beamformer has the ability to rapidly scan the sector while accurately receiving echo signals. That is, even though the oscillator signals 145 are approximations of desired higher frequencies, the processor device 180 is able to accurately produce an image based on receipt of the echo signals. One may note that generator device 160 adjusts the phases (e.g., adds or removes an occasional logic high or low) of the oscillator signals 145 at different sampling times so they do not all occur at the same time as shown in Appendix A and Appendix B.

As discussed, the present application can be extended to scan a three-dimensional region via additional circuitry that steers the directional beam 120 in raster-like directions relative to the array 130 via additional circuitry.

Figure 3:
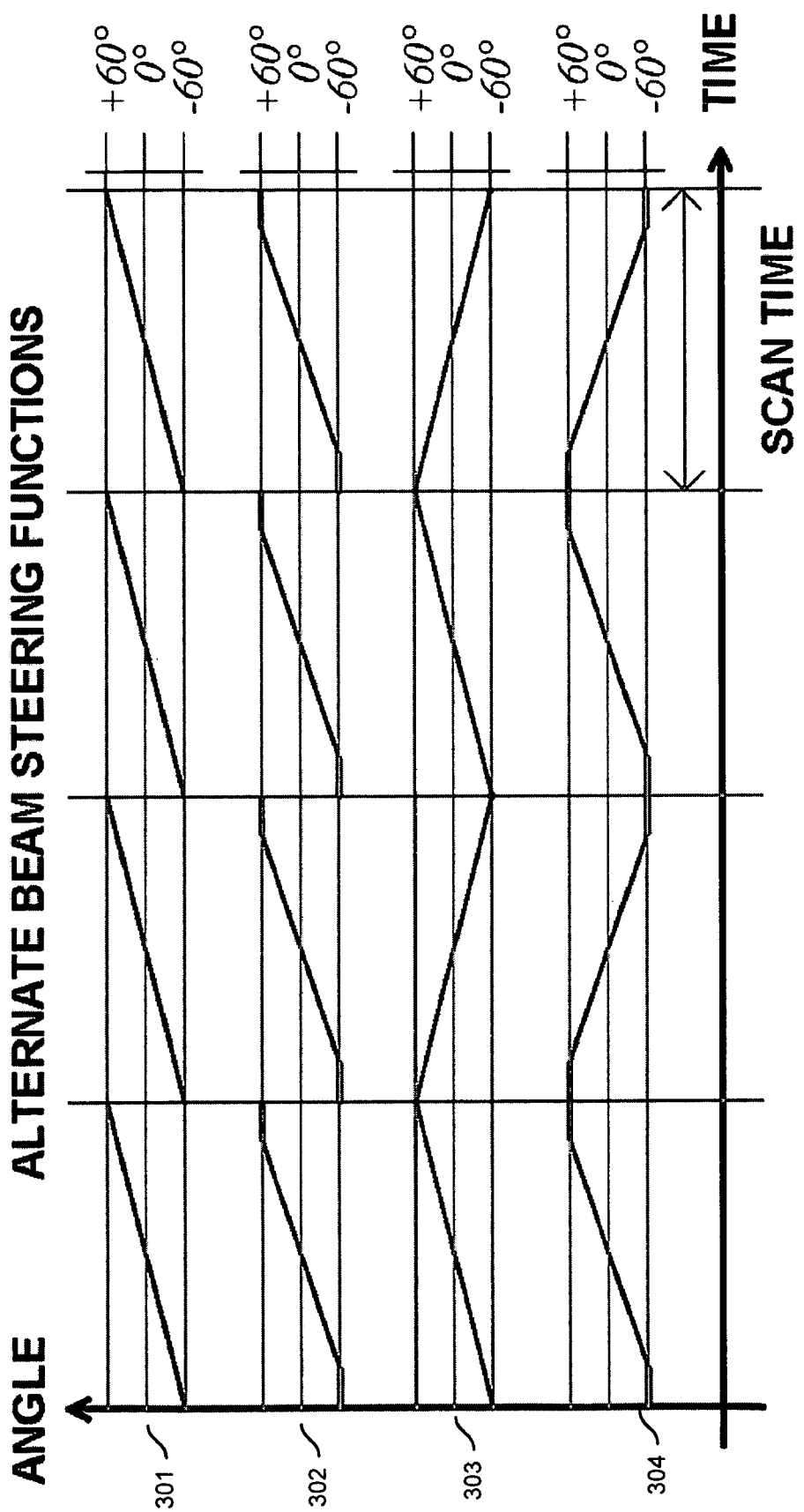
FIG. 3 is a graph illustrating beam steering functions according to embodiments herein.

FIG. 3 is a graph illustrating different beam steering patterns according to embodiments herein. Beamformer system 100 generates steering function 301 based on generation of oscillator signals 145 as indicated as bitstreams of Appendix B. The oscillator signals 145 generated by generator device 160 can be modified to produce steering functions 302, 303, and 304 as well.

Figure 4:
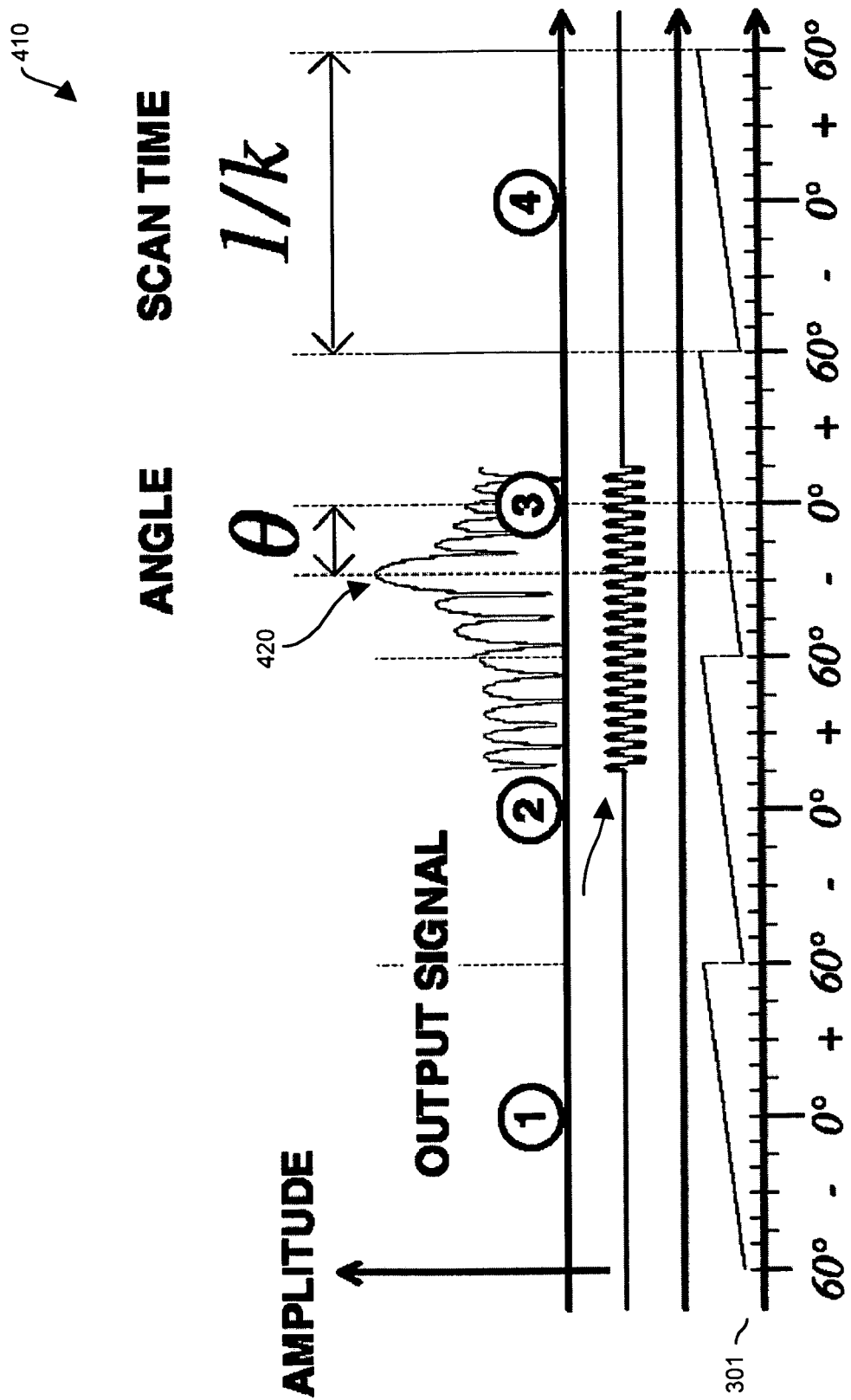
FIG. 4 is a graph illustrating detection of an echo signal in a scanned region according to embodiments herein.

FIG. 4 is a graph illustrating a sample echo signal 410 (as detected at the output of summer circuit 170) produced as a result of reflections off of an object 110 in a region monitored by array 130 via beamsteering function 301. The main lobe 420 of multiple lobes associated with the echo signal 410 indicates a position of the directional beam 120 and, thus, an angular position (e.g., angle theta) of an object 110 producing the echo signal in the scanned region.

Figure 5:
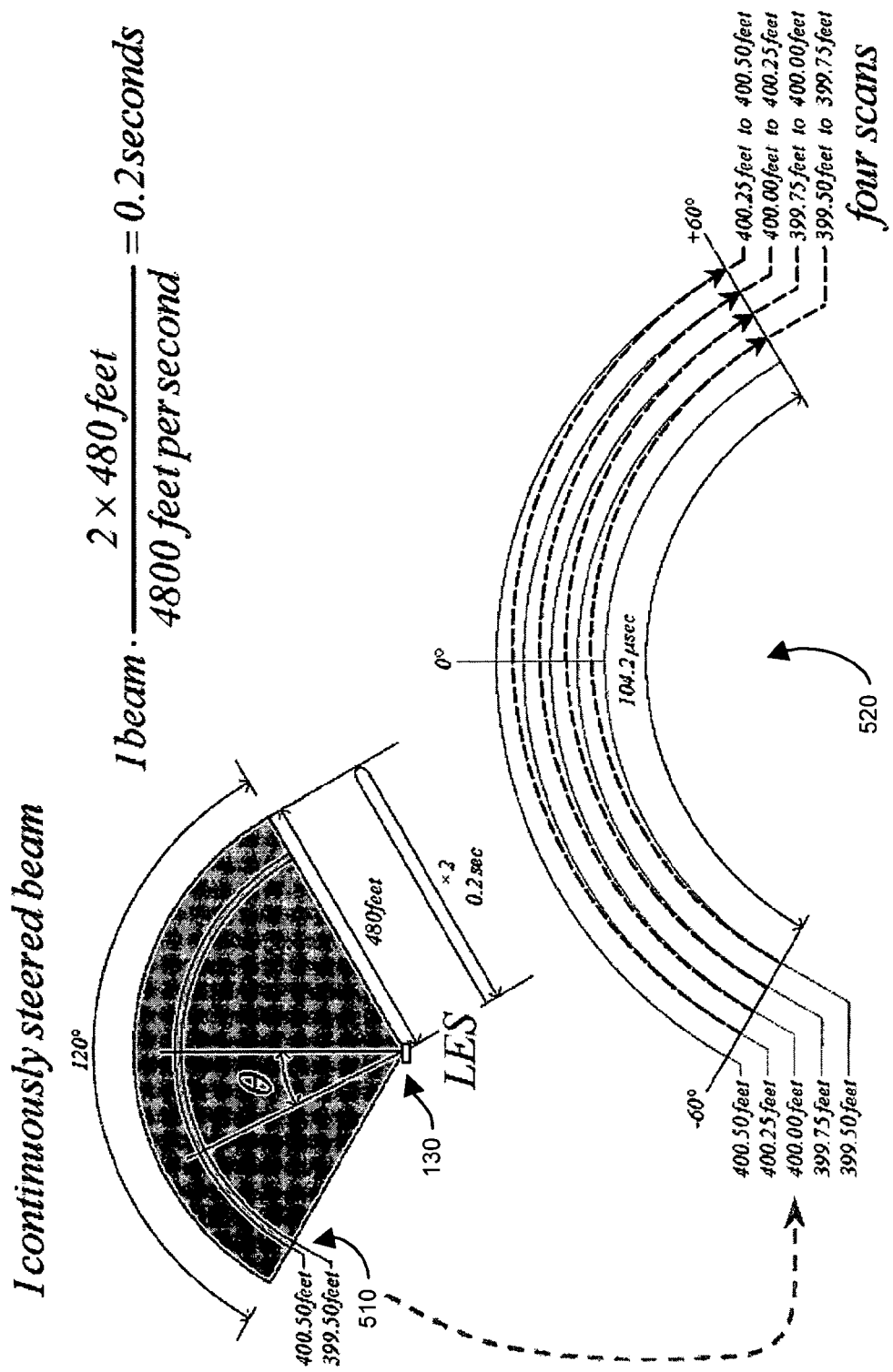
FIG. 5 is a diagram of a scanned region according to embodiments herein.
Figure 6:
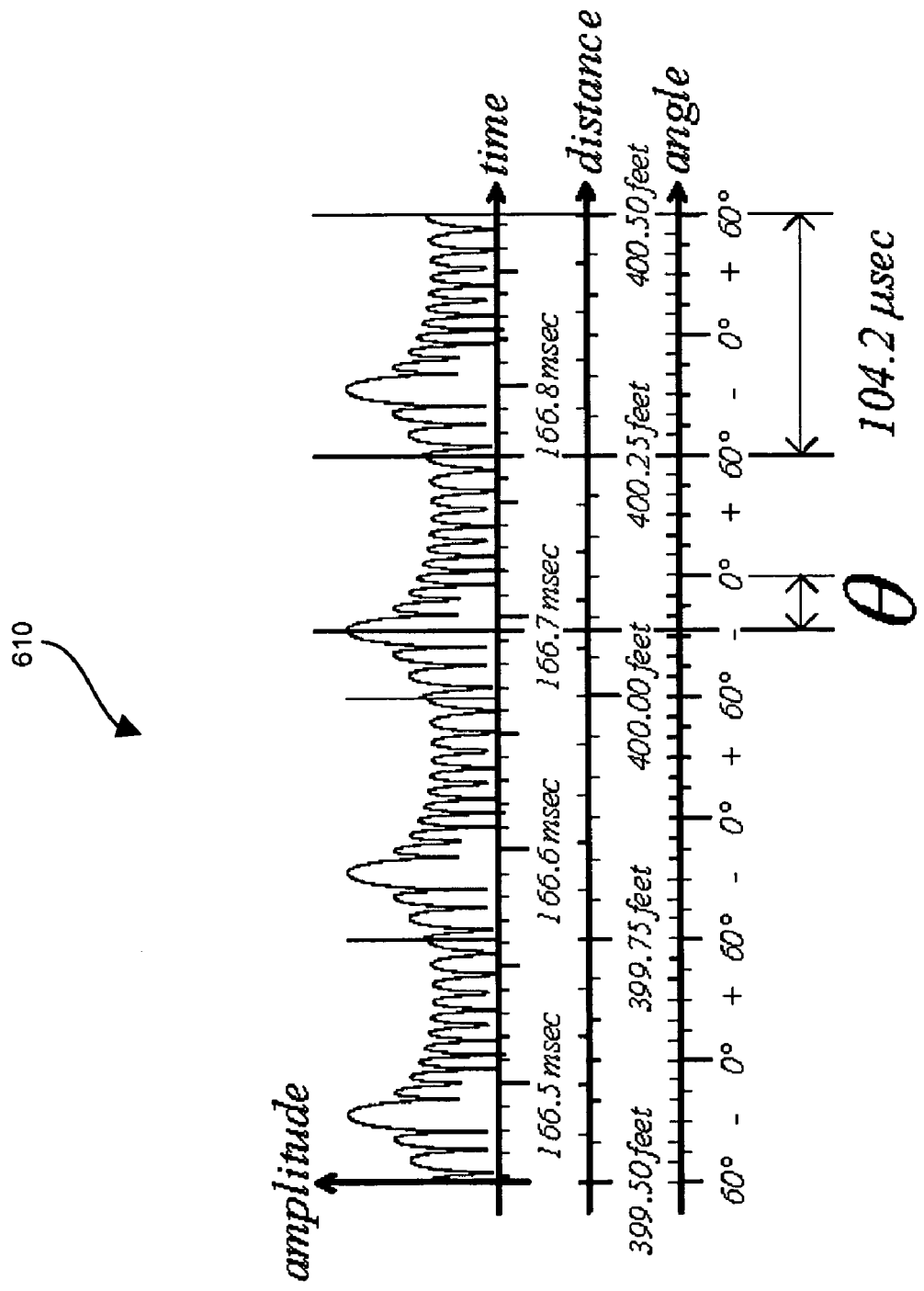
FIG. 6 is a graph illustrating repeated detection of an echo signal in a scanned region at a particular angle according to embodiments herein.

FIGS. 5 and 6 are diagrams illustrating rapid scanning of a directional beam 120 produced by array 130 according to embodiments herein. In FIG. 5, array 130 detects objects 110 or echoes in slice 510 which is more particularly shown as expanded radial view 520. FIG. 6 includes an illustration of a sample output 610 produced by summer 170 indicating detection of an object 110 at −32 degrees.

In one application of beamformer system 100, the capability of acquiring data (e.g., echo signals) from multiple spatial directions with respect to the array during a single transmit burst is a desirable beamformer feature. The local oscillator signals of a phase-shift beamformer are represented by the function $\sin(2\,\text{pi}\cdot f_{LO}\cdot t+j_n)$, where pi is approximately equal to 22/7. The unique phase ($j_n$) of each transducer channel is stepped as the array's spatial directional beam 120 is steered. Continuously varying the phase with time establishes $j_n$ as a function of time $j_n(t)=2\,\text{pi}\cdot k_n\cdot t$. The local oscillator expression becomes $\sin(2\,\text{pi}\cdot f_{LO}\cdot t+j_n(t))$, or $\sin(2\,\text{pi}\cdot f_{LO}\cdot t+2\,\text{p}\,k_n\cdot t)$, or $\sin((2\,\text{p}(f_{LO}+k_n))\cdot t)$, by substitution. Continuously changing the phase continuously is equivalent to changing the frequency of the local oscillator signals 145 from transducer to transducer in the array 130 by $k=k_n-k_{n-1}$.

Two different local oscillator signals 145 of slightly different frequencies have a beat, or amplitude periodicity, when they are heterodyned products or when and corresponding transducer signals are summed by superposition in the beamformer. The amplitude periodicity, resulting from the relative phases, has a frequency at the difference of the two local oscillator frequencies $k_n-k_{n-1}=k$. Taking the difference frequency as k, the amplitude periodicity is 1/k.

It may be desirable to complete the continuous spatial steering of the array 130 in the time for one transmit burst, ensuring return echoes are not missed. For a 100 microsecond transmit burst, the local oscillator signals of adjacent transducers are frequency spaced by 1/100 microseconds, or 10 KHz, or k=10 KHz. The frequency of the local oscillators are fixed at $f_{LO}+n\cdot k$. For an array of N=16 transducers in the present example, the local oscillators have a range of at least $(f_{LO}+15\,k)-(f_{LO}+0\,k)$, or 15 k, or $k_{15-0}$=150 KHz. Heterodyning produces an upper and lower sideband, one of which is removed, along with any local oscillator and signal input feed-through. A local oscillator frequency of at least $10\,k_{15-0}$, or $f_{LO}$=1.5 MHz, enables minimal frequency selectivity.

Figure 7:
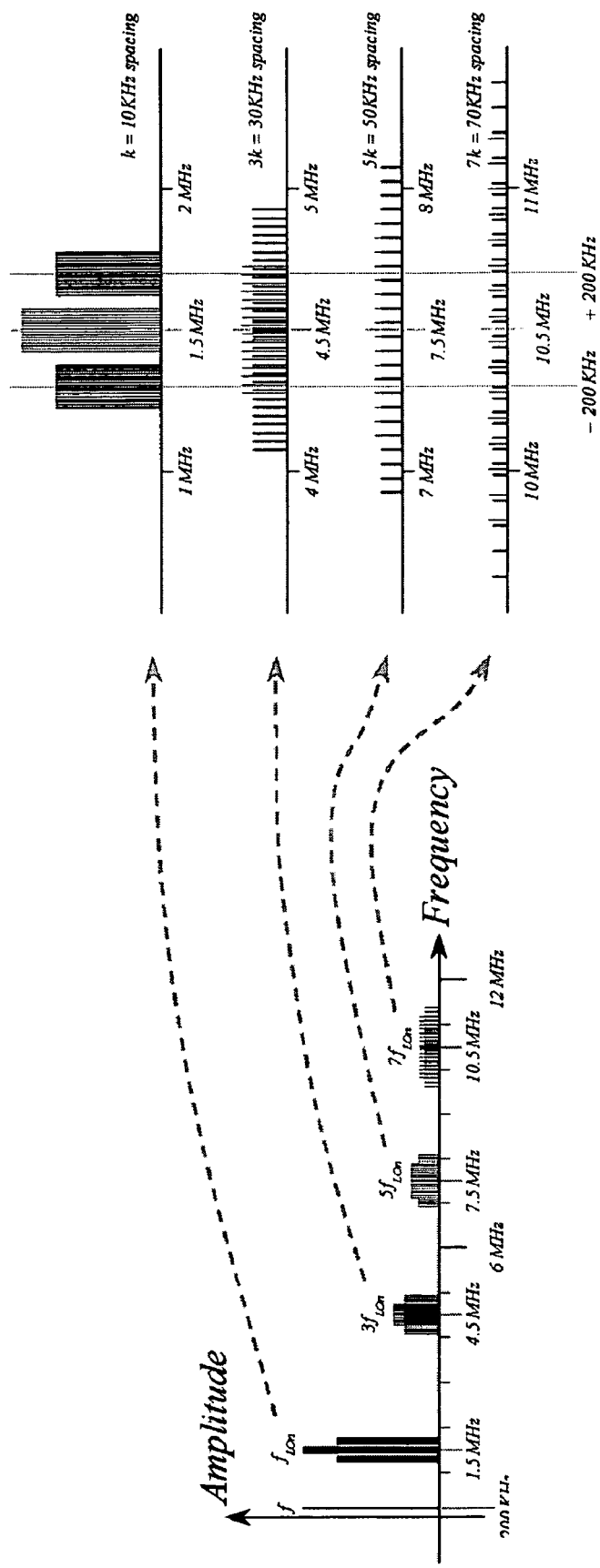
FIG. 7 is a graph of narrowband frequency signals of a transducer array according to embodiments herein.

FIG. 7 is a graph of narrowband frequency signals of the transducer array f=200 KHz and the N=16 local oscillator signals $f_{LOn}$, equally spaced at k=10 KHz, around $f_{LO}$=1.5 MHz according to embodiments herein. The sidebands, positioned at f=200 KHz above and below $f_{LO}$=1.5 MHz, resulting from heterodyning, are shown for each transducer and are each composed of N=16 local oscillator signal frequencies, spaced at k=10 KHz. Efficient digital circuitry methods may be used to generate and control the set of local oscillator signals 145 as previously discussed. The third 3 $f_{LO}$=4.5 MHz, fifth 5 $f_{LO}$=7.5 MHz, and seventh 7 $f_{LO}$=10.5 MHz harmonics are plotted for square wave local oscillators. The frequency spacing within the harmonic is unlike the $f_{LO}$=1.5 MHz fundamental frequency spacing of k=10 KHz. The third, fifth, and seventh harmonic frequency spacings are 3 k=30 KHz, 5 k=50 KHz, and 7 k=70 KHz, respectively. The increased frequency spacing causes the upper and lower sidebands to overlap, mixing the informational content and making recovery of the return echo signals unlikely.

Providing a system of N=16 exact local oscillator signals, centered at 1.5 MHz and spaced at k=10 KHz apart, and additionally controlling their relative phases requires complex and costly circuitry. As discussed, techniques herein alleviate this requirement based on simulation of desired higher frequencies, which can be met by an eight times sampling of the local oscillators or q=8. The sample rate would be eight times the local oscillator of 1.5 MHz or fs=12 MHz. In one application, a maximum allowable phase error is at most one sample time or 360°/8 or 45°.

Figure 8:
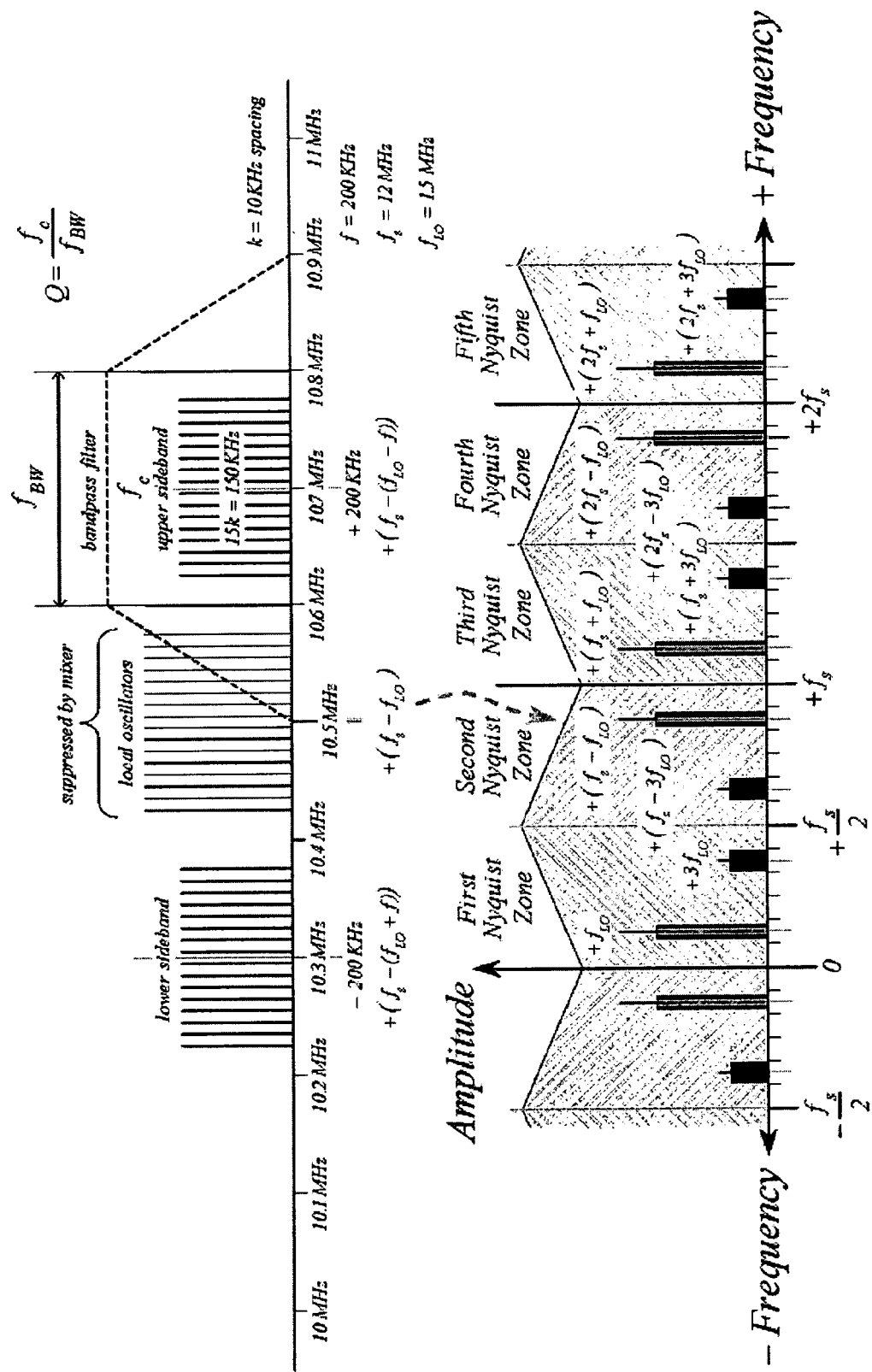
FIG. 8 is a graph illustrating a frequency spectrum associated with an output of a beamformer system according to embodiments herein.

FIG. 8 is a graph illustrating a frequency spectrum associated with an output of the beamformer system 100 according to embodiments herein. The local oscillator $f_{LO}$=1.5 MHz is shown, although it would normally be suppressed. The upper and lower sidebands of the local oscillator at 1.5 MHz are centered at $f_{LO}$+f=1.5 MHz+200 KHz, or 1.7 MHz, and $f_{LO}$−f=1.5 MHz−200 KHz, or 1.3 MHz, respectively. Each sideband is further composed of N=16 frequencies, spaced at k=10 KHz. The third harmonic of the local oscillator, positioned at 3 $f_{LO}$=4.5 MHz, results from one bit sampling of the local oscillators; and, as previously shown, is not useful due to the increased frequency spacing and the resulting overlap of the upper and lower sidebands. The periodic sampling of the local oscillator has a First Nyquist Zone, extending from the origin at 0 MHz to $f_S/2=6$ MHz, as a consequence of the periodic sampling of the local oscillators and the resultant aliasing effects. This zone is replicated in the Second Nyquist Zone by spectral inversion of the First Nyquist Zone. These replications continue throughout the frequency spectrum. There is a benefit to the spectral inversion and replication. The spectra located around $+f_{LO}=1.5$ MHz has been frequency translated to $f_S-f_{LO}=12$ MHz$-1.5$ MHz, or 10.5 MHz. The upper sideband of the local oscillator first harmonic is frequency translated upward to $f_S-(f_{LO}+f)=12$ MHz$-(1.5$ MHz$+200$ KHz$)$, or 10.3 MHz, and the lower sideband $f_S-(f_{LO}-f)=12$ MHz$-(1.5$ MHz$-200$ KHz$)$, or 10.7 MHz. The sidebands have bandwidths of $k_{15-0}=150$ KHz. The electronics industry has developed inexpensive and efficient filtering circuitry solutions for commonly used intermediate frequencies (e.g., IF). Example frequencies are 455 KHz, 4.5 MHz, 10.7 MHz, and 22.5 MHz, with Q's in the region of 50, or $Q=f_c/f_{BW}$. The 10.7 MHz intermediate frequency used by Frequency Modulated (FM) radios, with bandwidths on the order of 150 KHz, is well suited to bandpass filter the beamformer output of the local oscillator's first harmonic lower sideband, located in the First Nyquist Zone, and replicated by spectral inversion about $f_S/2=6$ MHz, the Nyquist sampling bandwidth limit criterion frequency (e.g., from 1.3 MHz to 10.7 MHz) with a bandwidth of 150 KHz.

As discussed above, techniques of the present application are well suited for use in beamforming applications in which an array of transducers detects echo signals from objects in a scanned region. Based on implementation of minor circuit modifications, the techniques also enable the beamformer to transmit signals in a particular direction. However, it should be noted that embodiments of the present application are not limited to use in such applications and are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

| Samples | Angle of d.b. 120 | 145-1 | 145-2 | 145-3 | 145-4 | 145-5 | 145-6 | 145-7 | 145-8 |
|---|---|---|---|---|---|---|---|---|---|
| −599.5 | −90.00° | 0 | 1 | 0 | 1 | 0 | 1 | 0 | 1 |
| −598.5 | −86.69° | 0 | 1 | 0 | 1 | 0 | 1 | 0 | 1 |
| −597.5 | −85.32° | 1 | 0 | 1 | 0 | 1 | 0 | 1 | 0 |
| −596.5 | −84.27° | 1 | 0 | 1 | 0 | 1 | 0 | 1 | 0 |
| −595.5 | −83.38° | 1 | 0 | 1 | 0 | 1 | 0 | 1 | 0 |
| −594.5 | −82.59° | 1 | 0 | 1 | 0 | 1 | 0 | 1 | 0 |
| −593.5 | −81.89° | 0 | 1 | 0 | 1 | 0 | 1 | 0 | 1 |
| −592.5 | −81.24° | 0 | 1 | 0 | 1 | 0 | 1 | 0 | 1 |
| −591.5 | −80.63° | 0 | 1 | 0 | 1 | 0 | 1 | 0 | 1 |
| −590.5 | −80.06° | 0 | 1 | 0 | 1 | 0 | 1 | 0 | 1 |
| −589.5 | −79.52° | 0 | 0 | 1 | 0 | 1 | 0 | 1 | 0 |
| −588.5 | −79.01° | 1 | 0 | 1 | 0 | 1 | 0 | 1 | 0 |
| −587.5 | −78.52° | 1 | 0 | 1 | 0 | 1 | 0 | 1 | 0 |
| −586.5 | −78.05° | 1 | 0 | 1 | 0 | 1 | 0 | 1 | 0 |
| −585.5 | −77.59° | 1 | 0 | 1 | 1 | 0 | 1 | 0 | 1 |
| −584.5 | −77.16° | 0 | 1 | 0 | 1 | 0 | 1 | 0 | 1 |
| −583.5 | −76.73° | 0 | 1 | 0 | 1 | 0 | 1 | 0 | 1 |
| −582.5 | −76.32° | 0 | 1 | 0 | 1 | 0 | 1 | 0 | 1 |
| −581.5 | −75.92° | 0 | 1 | 0 | 1 | 1 | 0 | 1 | 0 |
| −580.5 | −75.54° | 1 | 0 | 1 | 0 | 1 | 0 | 1 | 0 |
| −579.5 | −75.16° | 1 | 0 | 1 | 0 | 1 | 0 | 1 | 0 |
| −578.5 | −74.79° | 1 | 0 | 1 | 0 | 1 | 0 | 1 | 0 |
| −577.5 | −74.43° | 1 | 0 | 1 | 0 | 1 | 1 | 0 | 1 |
| −576.5 | −74.08° | 0 | 1 | 0 | 1 | 0 | 1 | 0 | 1 |
| −575.5 | −73.73° | 0 | 1 | 0 | 1 | 0 | 1 | 0 | 1 |
| −574.5 | −73.40° | 0 | 1 | 0 | 1 | 0 | 1 | 0 | 1 |
| −573.5 | −73.06° | 0 | 1 | 0 | 1 | 0 | 0 | 1 | 0 |
| −572.5 | −72.74° | 1 | 0 | 1 | 0 | 1 | 0 | 1 | 0 |
| −571.5 | −72.42° | 1 | 0 | 1 | 0 | 1 | 0 | 1 | 0 |
| −570.5 | −72.11° | 1 | 0 | 1 | 0 | 1 | 0 | 1 | 0 |
| −569.5 | −71.80° | 1 | 0 | 1 | 0 | 1 | 0 | 0 | 1 |
| −568.5 | −71.49° | 1 | 1 | 0 | 1 | 0 | 1 | 0 | 1 |
| −567.5 | −71.20° | 0 | 1 | 0 | 1 | 0 | 1 | 0 | 1 |
| −566.5 | −70.90° | 0 | 1 | 0 | 1 | 0 | 1 | 0 | 1 |
| −565.5 | −70.61° | 0 | 1 | 0 | 1 | 0 | 1 | 1 | 0 |
| −564.5 | −70.33° | 0 | 1 | 1 | 0 | 1 | 0 | 1 | 0 |
| −563.5 | −70.04° | 1 | 0 | 1 | 0 | 1 | 0 | 1 | 0 |
| −562.5 | −69.76° | 1 | 0 | 1 | 0 | 1 | 0 | 1 | 0 |

-continued

| Samples | Angle of d.b. 120 | 145-9 | 145-10 | 145-11 | 145-12 | 145-13 | 145-14 | 145-15 | 145-16 |
|---|---|---|---|---|---|---|---|---|---|
| −561.5 | −69.49° | 1 | 0 | 1 | 0 | 1 | 0 | 0 | 1 |
| −560.5 | −69.22° | 1 | 0 | 0 | 1 | 0 | 1 | 0 | 1 |
| −599.5 | −90.00° | 0 | 1 | 0 | 1 | 0 | 1 | 0 | 1 |
| −598.5 | −86.69° | 0 | 1 | 0 | 1 | 0 | 1 | 0 | 1 |
| −597.5 | −85.32° | 1 | 0 | 1 | 0 | 1 | 0 | 1 | 0 |
| −596.5 | −84.27° | 1 | 0 | 1 | 0 | 1 | 0 | 1 | 0 |
| −595.5 | −83.38° | 1 | 0 | 1 | 0 | 1 | 0 | 1 | 0 |
| −594.5 | −82.59° | 1 | 0 | 1 | 0 | 1 | 0 | 1 | 0 |
| −593.5 | −81.89° | 0 | 1 | 0 | 1 | 0 | 1 | 0 | 1 |
| −592.5 | −81.24° | 0 | 1 | 0 | 1 | 0 | 1 | 0 | 1 |
| −591.5 | −80.63° | 0 | 1 | 0 | 1 | 0 | 1 | 0 | 1 |
| −590.5 | −80.06° | 0 | 1 | 0 | 1 | 0 | 1 | 0 | 1 |
| −589.5 | −79.52° | 1 | 0 | 1 | 0 | 1 | 0 | 1 | 0 |
| −588.5 | −79.01° | 1 | 0 | 1 | 0 | 1 | 0 | 1 | 0 |
| −587.5 | −78.52° | 1 | 0 | 1 | 0 | 1 | 0 | 1 | 0 |
| −586.5 | −78.05° | 1 | 0 | 1 | 0 | 1 | 0 | 0 | 1 |
| −585.5 | −77.59° | 0 | 1 | 0 | 1 | 0 | 1 | 0 | 1 |
| −584.5 | −77.16° | 0 | 1 | 0 | 1 | 0 | 1 | 0 | 1 |
| −583.5 | −76.73° | 0 | 1 | 0 | 1 | 0 | 1 | 0 | 1 |
| −582.5 | −76.32° | 0 | 1 | 0 | 1 | 1 | 0 | 1 | 0 |
| −581.5 | −75.92° | 1 | 0 | 1 | 0 | 1 | 0 | 1 | 0 |
| −580.5 | −75.54° | 1 | 0 | 1 | 0 | 1 | 0 | 1 | 0 |
| −579.5 | −75.16° | 1 | 0 | 1 | 0 | 1 | 0 | 1 | 0 |
| −578.5 | −74.79° | 1 | 0 | 1 | 1 | 0 | 1 | 0 | 1 |
| −577.5 | −74.43° | 0 | 1 | 0 | 1 | 0 | 1 | 0 | 1 |
| −576.5 | −74.08° | 0 | 1 | 0 | 1 | 0 | 1 | 0 | 1 |
| −575.5 | −73.73° | 0 | 1 | 0 | 1 | 0 | 1 | 0 | 1 |
| −574.5 | −73.40° | 0 | 1 | 0 | 0 | 1 | 0 | 1 | 0 |
| −573.5 | −73.06° | 1 | 0 | 1 | 0 | 1 | 0 | 1 | 0 |
| −572.5 | −72.74° | 1 | 0 | 1 | 0 | 1 | 0 | 1 | 0 |
| −571.5 | −72.42° | 1 | 0 | 1 | 0 | 1 | 0 | 1 | 0 |
| −570.5 | −72.11° | 1 | 0 | 1 | 1 | 0 | 1 | 0 | 1 |
| −569.5 | −71.80° | 0 | 1 | 0 | 1 | 0 | 1 | 0 | 1 |
| −568.5 | −71.49° | 0 | 1 | 0 | 1 | 0 | 1 | 0 | 1 |
| −567.5 | −71.20° | 0 | 1 | 0 | 1 | 0 | 1 | 0 | 0 |
| −566.5 | −70.90° | 0 | 1 | 1 | 0 | 1 | 0 | 1 | 0 |
| −565.5 | −70.61° | 1 | 0 | 1 | 0 | 1 | 0 | 1 | 0 |
| −564.5 | −70.33° | 1 | 0 | 1 | 0 | 1 | 0 | 1 | 0 |
| −563.5 | −70.04° | 1 | 0 | 1 | 0 | 1 | 0 | 0 | 1 |
| −562.5 | −69.76° | 1 | 0 | 0 | 1 | 0 | 1 | 0 | 1 |
| −561.5 | −69.49° | 0 | 1 | 0 | 1 | 0 | 1 | 0 | 1 |
| −560.5 | −69.22° | 0 | 1 | 0 | 1 | 0 | 1 | 0 | 1 |

| Samples | Steer Angle | $f_{LO-7.5}$ | $f_{LO-6.5}$ | $f_{LO-5.5}$ | $f_{LO-4.5}$ | $f_{LO-3.5}$ | $f_{LO-2.5}$ | $f_{LO-1.5}$ | $f_{LO-0.5}$ |
|---|---|---|---|---|---|---|---|---|---|
| −559.5 | −68.95° | 0 | 1 | 0 | 1 | 0 | 1 | 0 | 1 |
| −558.5 | −68.69° | 0 | 1 | 0 | 1 | 0 | 1 | 0 | 1 |
| −557.5 | −68.43° | 0 | 1 | 0 | 1 | 0 | 1 | 1 | 0 |
| −556.5 | −68.17° | 0 | 1 | 0 | 0 | 1 | 0 | 1 | 0 |
| −555.5 | −67.91° | 1 | 0 | 1 | 0 | 1 | 0 | 1 | 0 |
| −554.5 | −67.66° | 1 | 0 | 1 | 0 | 1 | 0 | 1 | 0 |
| −553.5 | −67.41° | 1 | 0 | 1 | 0 | 1 | 0 | 0 | 1 |
| −552.5 | −67.16° | 1 | 0 | 1 | 1 | 0 | 1 | 0 | 1 |
| −551.5 | −66.92° | 0 | 1 | 0 | 1 | 0 | 1 | 0 | 1 |
| −550.5 | −66.67° | 0 | 1 | 0 | 1 | 0 | 1 | 0 | 1 |
| −549.5 | −66.43° | 0 | 1 | 0 | 1 | 0 | 1 | 0 | 0 |
| −548.5 | −66.20° | 0 | 1 | 0 | 1 | 1 | 0 | 1 | 0 |
| −547.5 | −65.96° | 0 | 0 | 1 | 0 | 1 | 0 | 1 | 0 |
| −546.5 | −65.73° | 1 | 0 | 1 | 0 | 1 | 0 | 1 | 0 |
| −545.5 | −65.49° | 1 | 0 | 1 | 0 | 1 | 0 | 1 | 1 |
| −544.5 | −65.27° | 1 | 0 | 1 | 0 | 0 | 1 | 0 | 1 |
| −543.5 | −65.04° | 1 | 1 | 0 | 1 | 0 | 1 | 0 | 1 |
| −542.5 | −64.81° | 0 | 1 | 0 | 1 | 0 | 1 | 0 | 1 |
| −541.5 | −64.59° | 0 | 1 | 0 | 1 | 0 | 1 | 0 | 0 |
| −540.5 | −64.37° | 0 | 1 | 0 | 1 | 1 | 0 | 1 | 0 |
| −539.5 | −64.15° | 0 | 1 | 1 | 0 | 1 | 0 | 1 | 0 |
| −538.5 | −63.93° | 1 | 0 | 1 | 0 | 1 | 0 | 1 | 0 |
| −537.5 | −63.71° | 1 | 0 | 1 | 0 | 1 | 0 | 1 | 1 |
| −536.5 | −63.50° | 1 | 0 | 1 | 0 | 0 | 1 | 0 | 1 |
| −535.5 | −63.28° | 1 | 0 | 0 | 1 | 0 | 1 | 0 | 1 |
| −534.5 | −63.07° | 0 | 1 | 0 | 1 | 0 | 1 | 0 | 1 |
| −533.5 | −62.86° | 0 | 1 | 0 | 1 | 0 | 1 | 0 | 0 |
| −532.5 | −62.65° | 0 | 1 | 0 | 1 | 0 | 0 | 1 | 0 |

-continued

| | | | | | | | | | |
|---|---|---|---|---|---|---|---|---|---|
| −531.5 | −62.45° | 0 | 1 | 0 | 0 | 1 | 0 | 1 | 0 |
| −530.5 | −62.24° | 1 | 0 | 1 | 0 | 1 | 0 | 1 | 0 |
| −529.5 | −62.04° | 1 | 0 | 1 | 0 | 1 | 0 | 1 | 1 |
| −528.5 | −61.83° | 1 | 0 | 1 | 0 | 1 | 1 | 0 | 1 |
| −527.5 | −61.63° | 1 | 0 | 1 | 1 | 0 | 1 | 0 | 1 |
| −526.5 | −61.43° | 1 | 1 | 0 | 1 | 0 | 1 | 0 | 1 |
| −525.5 | −61.23° | 0 | 1 | 0 | 1 | 0 | 1 | 0 | 0 |
| −524.5 | −61.03° | 0 | 1 | 0 | 1 | 0 | 0 | 1 | 0 |
| −523.5 | −60.84° | 0 | 1 | 0 | 0 | 1 | 0 | 1 | 0 |
| −522.5 | −60.64° | 0 | 0 | 1 | 0 | 1 | 0 | 1 | 0 |
| −521.5 | −60.45° | 1 | 0 | 1 | 0 | 1 | 0 | 1 | 1 |
| −520.5 | −60.25° | 1 | 0 | 1 | 0 | 1 | 1 | 0 | 1 |
| −519.5 | −60.06° | 1 | 0 | 1 | 1 | 0 | 1 | 0 | 1 |
| −518.5 | −59.87° | 1 | 0 | 0 | 1 | 0 | 1 | 0 | 1 |
| −517.5 | −59.68° | 0 | 1 | 0 | 1 | 0 | 1 | 0 | 0 |
| −516.5 | −59.49° | 0 | 1 | 0 | 1 | 0 | 0 | 1 | 0 |
| −515.5 | −59.30° | 0 | 1 | 0 | 1 | 1 | 0 | 1 | 0 |
| −514.5 | −59.12° | 0 | 1 | 1 | 0 | 1 | 0 | 1 | 0 |
| −513.5 | −58.93° | 1 | 0 | 1 | 0 | 1 | 0 | 1 | 1 |
| −512.5 | −58.75° | 1 | 0 | 1 | 0 | 1 | 1 | 0 | 1 |
| −511.5 | −58.56° | 1 | 0 | 1 | 0 | 0 | 1 | 0 | 1 |
| −510.5 | −58.38° | 1 | 0 | 0 | 1 | 0 | 1 | 0 | 1 |
| −509.5 | −58.20° | 1 | 1 | 0 | 1 | 0 | 1 | 0 | 0 |
| −508.5 | −58.02° | 0 | 1 | 0 | 1 | 0 | 1 | 1 | 0 |
| −507.5 | −57.84° | 0 | 1 | 0 | 1 | 1 | 0 | 1 | 0 |
| −506.5 | −57.66° | 0 | 1 | 1 | 0 | 1 | 0 | 1 | 0 |
| −505.5 | −57.48° | 0 | 0 | 1 | 0 | 1 | 0 | 1 | 1 |
| −504.5 | −57.30° | 1 | 0 | 1 | 0 | 1 | 0 | 0 | 1 |
| −503.5 | −57.13° | 1 | 0 | 1 | 0 | 0 | 1 | 0 | 1 |
| −502.5 | −56.95° | 1 | 0 | 1 | 1 | 0 | 1 | 0 | 1 |
| −501.5 | −56.78° | 1 | 1 | 0 | 1 | 0 | 1 | 0 | 0 |
| −500.5 | −56.60° | 0 | 1 | 0 | 1 | 0 | 1 | 1 | 0 |
| −499.5 | −56.43° | 0 | 1 | 0 | 1 | 1 | 0 | 1 | 0 |
| −498.5 | −56.26° | 0 | 1 | 0 | 0 | 1 | 0 | 1 | 0 |
| −497.5 | −56.08° | 0 | 0 | 1 | 0 | 1 | 0 | 1 | 1 |
| −496.5 | −55.91° | 1 | 0 | 1 | 0 | 1 | 0 | 0 | 1 |
| −495.5 | −55.74° | 1 | 0 | 1 | 0 | 0 | 1 | 0 | 1 |
| −494.5 | −55.57° | 1 | 0 | 1 | 1 | 0 | 1 | 0 | 1 |
| −493.5 | −55.41° | 1 | 0 | 0 | 1 | 0 | 1 | 0 | 0 |
| −492.5 | −55.24° | 0 | 1 | 0 | 1 | 0 | 1 | 1 | 0 |
| −491.5 | −55.07° | 0 | 1 | 0 | 1 | 0 | 0 | 1 | 0 |
| −490.5 | −54.90° | 0 | 1 | 0 | 0 | 1 | 0 | 1 | 0 |
| −489.5 | −54.74° | 0 | 1 | 1 | 0 | 1 | 0 | 1 | 1 |
| −488.5 | −54.57° | 0 | 0 | 1 | 0 | 1 | 0 | 0 | 1 |
| −487.5 | −54.41° | 1 | 0 | 1 | 0 | 1 | 1 | 0 | 1 |
| −486.5 | −54.24° | 1 | 0 | 1 | 1 | 0 | 1 | 0 | 1 |
| −485.5 | −54.08° | 1 | 0 | 0 | 1 | 0 | 1 | 0 | 0 |
| −484.5 | −53.92° | 1 | 1 | 0 | 1 | 0 | 1 | 1 | 0 |
| −483.5 | −53.76° | 0 | 1 | 0 | 1 | 0 | 0 | 1 | 0 |
| −482.5 | −53.59° | 0 | 1 | 0 | 1 | 1 | 0 | 1 | 0 |
| −481.5 | −53.43° | 0 | 1 | 1 | 0 | 1 | 0 | 1 | 1 |
| −480.5 | −53.27° | 0 | 0 | 1 | 0 | 1 | 0 | 0 | 1 |
| −479.5 | −53.11° | 1 | 0 | 1 | 0 | 1 | 1 | 0 | 1 |
| −478.5 | −52.96° | 1 | 0 | 1 | 0 | 0 | 1 | 0 | 1 |
| −477.5 | −52.80° | 1 | 0 | 0 | 1 | 0 | 1 | 0 | 0 |
| −476.5 | −52.64° | 1 | 1 | 0 | 1 | 0 | 1 | 1 | 0 |
| −475.5 | −52.48° | 0 | 1 | 0 | 1 | 0 | 0 | 1 | 0 |
| −474.5 | −52.33° | 0 | 1 | 0 | 1 | 1 | 0 | 1 | 0 |
| −473.5 | −52.17° | 0 | 1 | 0 | 0 | 1 | 0 | 1 | 1 |
| −472.5 | −52.01° | 0 | 1 | 1 | 0 | 1 | 0 | 0 | 1 |
| −471.5 | −51.86° | 1 | 0 | 1 | 0 | 1 | 1 | 0 | 1 |
| −470.5 | −51.70° | 1 | 0 | 1 | 0 | 0 | 1 | 0 | 1 |
| −469.5 | −51.55° | 1 | 0 | 1 | 1 | 0 | 1 | 0 | 0 |
| −468.5 | −51.40° | 1 | 0 | 0 | 1 | 0 | 1 | 1 | 0 |
| −467.5 | −51.24° | 1 | 1 | 0 | 1 | 0 | 0 | 1 | 0 |
| −466.5 | −51.09° | 0 | 1 | 0 | 1 | 1 | 0 | 1 | 0 |
| −465.5 | −50.94° | 0 | 1 | 0 | 0 | 1 | 0 | 1 | 1 |
| −464.5 | −50.79° | 0 | 1 | 1 | 0 | 1 | 0 | 0 | 1 |
| −463.5 | −50.64° | 0 | 0 | 1 | 0 | 1 | 1 | 0 | 1 |
| −462.5 | −50.49° | 1 | 0 | 1 | 0 | 0 | 1 | 0 | 1 |
| −461.5 | −50.34° | 1 | 0 | 1 | 1 | 0 | 1 | 0 | 0 |
| −460.5 | −50.19° | 1 | 0 | 0 | 1 | 0 | 1 | 1 | 0 |
| −459.5 | −50.04° | 1 | 1 | 0 | 1 | 0 | 0 | 1 | 0 |
| −458.5 | −49.89° | 0 | 1 | 0 | 1 | 1 | 0 | 1 | 0 |
| −457.5 | −49.74° | 0 | 1 | 0 | 0 | 1 | 0 | 1 | 1 |
| −456.5 | −49.59° | 0 | 1 | 1 | 0 | 1 | 0 | 0 | 1 |
| −455.5 | −49.45° | 0 | 0 | 1 | 0 | 1 | 1 | 0 | 1 |
| −454.5 | −49.30° | 1 | 0 | 1 | 0 | 0 | 1 | 0 | 1 |
| −453.5 | −49.15° | 1 | 0 | 1 | 1 | 0 | 1 | 0 | 0 |

-continued

| | | | | | | | | | |
|---|---|---|---|---|---|---|---|---|---|
| −452.5 | −49.01° | 1 | 0 | 0 | 1 | 0 | 1 | 1 | 0 |
| −451.5 | −48.86° | 1 | 1 | 0 | 1 | 0 | 0 | 1 | 0 |
| −450.5 | −48.72° | 0 | 1 | 0 | 1 | 1 | 0 | 1 | 0 |
| −449.5 | −48.57° | 0 | 1 | 0 | 1 | 1 | 0 | 1 | 0 |
| −448.5 | −48.43° | 0 | 1 | 0 | 0 | 1 | 0 | 1 | 1 |
| −447.5 | −48.28° | 0 | 1 | 1 | 0 | 1 | 0 | 0 | 1 |
| −446.5 | −48.14° | 0 | 0 | 1 | 0 | 1 | 1 | 0 | 1 |
| −445.5 | −48.00° | 1 | 0 | 1 | 0 | 0 | 1 | 0 | 1 |
| −444.5 | −47.86° | 1 | 0 | 1 | 1 | 0 | 1 | 0 | 0 |
| −443.5 | −47.71° | 1 | 0 | 0 | 1 | 0 | 1 | 1 | 0 |
| −442.5 | −47.57° | 1 | 1 | 0 | 1 | 0 | 0 | 1 | 0 |
| −441.5 | −47.43° | 0 | 1 | 0 | 1 | 1 | 0 | 1 | 0 |
| −440.5 | −47.29° | 0 | 1 | 0 | 0 | 1 | 0 | 1 | 1 |
| −439.5 | −47.15° | 0 | 1 | 1 | 0 | 1 | 0 | 0 | 1 |
| −438.5 | −47.01° | 0 | 0 | 1 | 0 | 1 | 1 | 0 | 1 |
| −437.5 | −46.87° | 1 | 0 | 1 | 0 | 0 | 1 | 0 | 1 |
| −436.5 | −46.73° | 1 | 0 | 1 | 1 | 0 | 1 | 0 | 0 |
| −435.5 | −46.59° | 1 | 0 | 0 | 1 | 0 | 1 | 1 | 0 |
| −434.5 | −46.45° | 1 | 1 | 0 | 1 | 0 | 0 | 1 | 0 |
| −433.5 | −46.31° | 0 | 1 | 0 | 1 | 1 | 0 | 1 | 0 |
| −432.5 | −46.17° | 0 | 1 | 0 | 0 | 1 | 0 | 1 | 1 |
| −431.5 | −46.04° | 0 | 1 | 1 | 0 | 1 | 0 | 0 | 1 |
| −430.5 | −45.90° | 0 | 0 | 1 | 0 | 1 | 1 | 0 | 1 |
| −429.5 | −45.76° | 0 | 0 | 1 | 0 | 0 | 1 | 0 | 1 |
| −428.5 | −45.62° | 1 | 0 | 1 | 1 | 0 | 1 | 0 | 0 |
| −427.5 | −45.49° | 1 | 0 | 0 | 1 | 0 | 1 | 1 | 0 |
| −426.5 | −45.35° | 1 | 0 | 0 | 1 | 0 | 0 | 1 | 0 |
| −425.5 | −45.22° | 1 | 1 | 0 | 1 | 1 | 0 | 1 | 0 |
| −424.5 | −45.08° | 0 | 1 | 0 | 0 | 1 | 0 | 1 | 1 |
| −423.5 | −44.94° | 0 | 1 | 1 | 0 | 1 | 0 | 0 | 1 |
| −422.5 | −44.81° | 0 | 1 | 1 | 0 | 1 | 1 | 0 | 1 |
| −421.5 | −44.68° | 0 | 0 | 1 | 0 | 0 | 1 | 0 | 1 |
| −420.5 | −44.54° | 1 | 0 | 1 | 1 | 0 | 1 | 0 | 0 |
| −419.5 | −44.41° | 1 | 0 | 1 | 1 | 0 | 1 | 1 | 0 |
| −418.5 | −44.27° | 1 | 0 | 0 | 1 | 0 | 0 | 1 | 0 |
| −417.5 | −44.14° | 1 | 1 | 0 | 1 | 1 | 0 | 1 | 0 |
| −416.5 | −44.01° | 0 | 1 | 0 | 1 | 1 | 0 | 1 | 1 |
| −415.5 | −43.87° | 0 | 1 | 0 | 0 | 1 | 0 | 0 | 1 |
| −414.5 | −43.74° | 0 | 1 | 1 | 0 | 1 | 1 | 0 | 1 |
| −413.5 | −43.61° | 0 | 0 | 1 | 0 | 0 | 1 | 0 | 1 |
| −412.5 | −43.48° | 1 | 0 | 1 | 0 | 0 | 1 | 0 | 0 |
| −411.5 | −43.35° | 1 | 0 | 1 | 1 | 0 | 1 | 1 | 0 |
| −410.5 | −43.21° | 1 | 0 | 0 | 1 | 0 | 0 | 1 | 0 |
| −409.5 | −43.08° | 1 | 1 | 0 | 1 | 1 | 0 | 1 | 0 |
| −408.5 | −42.95° | 1 | 1 | 0 | 1 | 1 | 0 | 1 | 1 |
| −407.5 | −42.82° | 0 | 1 | 0 | 0 | 1 | 0 | 0 | 1 |
| −406.5 | −42.69° | 0 | 1 | 1 | 0 | 1 | 1 | 0 | 1 |
| −405.5 | −42.56° | 0 | 0 | 1 | 0 | 1 | 1 | 0 | 1 |
| −404.5 | −42.43° | 0 | 0 | 1 | 0 | 0 | 1 | 0 | 0 |
| −403.5 | −42.30° | 1 | 0 | 1 | 1 | 0 | 1 | 1 | 0 |
| −402.5 | −42.17° | 1 | 0 | 0 | 1 | 0 | 0 | 1 | 0 |
| −401.5 | −42.05° | 1 | 0 | 0 | 1 | 0 | 0 | 1 | 0 |
| −400.5 | −41.92° | 1 | 1 | 0 | 1 | 1 | 0 | 1 | 1 |
| −399.5 | −41.79° | 0 | 1 | 0 | 0 | 1 | 0 | 0 | 1 |
| −398.5 | −41.66° | 0 | 1 | 1 | 0 | 1 | 1 | 0 | 1 |
| −397.5 | −41.53° | 0 | 1 | 1 | 0 | 1 | 1 | 0 | 1 |
| −396.5 | −41.41° | 0 | 0 | 1 | 0 | 0 | 1 | 0 | 0 |
| −395.5 | −41.28° | 1 | 0 | 1 | 1 | 0 | 1 | 1 | 0 |
| −394.5 | −41.15° | 1 | 0 | 1 | 1 | 0 | 0 | 1 | 0 |
| −393.5 | −41.02° | 1 | 0 | 0 | 1 | 0 | 0 | 1 | 0 |
| −392.5 | −40.90° | 1 | 1 | 0 | 1 | 1 | 0 | 1 | 1 |
| −391.5 | −40.77° | 0 | 1 | 0 | 0 | 1 | 0 | 0 | 1 |
| −390.5 | −40.65° | 0 | 1 | 0 | 0 | 1 | 1 | 0 | 1 |
| −389.5 | −40.52° | 0 | 1 | 1 | 0 | 1 | 1 | 0 | 1 |
| −388.5 | −40.39° | 0 | 0 | 1 | 0 | 0 | 1 | 0 | 0 |
| −387.5 | −40.27° | 0 | 0 | 1 | 1 | 0 | 1 | 1 | 0 |
| −386.5 | −40.14° | 1 | 0 | 1 | 1 | 0 | 1 | 1 | 0 |
| −385.5 | −40.02° | 1 | 0 | 0 | 1 | 0 | 0 | 1 | 0 |
| −384.5 | −39.89° | 1 | 1 | 0 | 1 | 1 | 0 | 1 | 1 |
| −383.5 | −39.77° | 1 | 1 | 0 | 0 | 1 | 0 | 0 | 1 |
| −382.5 | −39.65° | 0 | 1 | 0 | 0 | 1 | 0 | 0 | 1 |
| −381.5 | −39.52° | 0 | 1 | 1 | 0 | 1 | 1 | 0 | 1 |
| −380.5 | −39.40° | 0 | 1 | 1 | 0 | 0 | 1 | 0 | 0 |
| −379.5 | −39.27° | 0 | 0 | 1 | 0 | 0 | 1 | 1 | 0 |
| −378.5 | −39.15° | 1 | 0 | 0 | 1 | 0 | 1 | 1 | 0 |
| −377.5 | −39.03° | 1 | 0 | 0 | 1 | 0 | 0 | 1 | 0 |
| −376.5 | −38.90° | 1 | 0 | 0 | 1 | 1 | 0 | 1 | 1 |
| −375.5 | −38.78° | 1 | 1 | 0 | 1 | 1 | 0 | 0 | 1 |
| −374.5 | −38.66° | 0 | 1 | 0 | 0 | 1 | 0 | 0 | 1 |

-continued

| | | | | | | | | | |
|---|---|---|---|---|---|---|---|---|---|
| −373.5 | −38.54° | 0 | 1 | 1 | 0 | 1 | 1 | 0 | 1 |
| −372.5 | −38.41° | 0 | 1 | 1 | 0 | 0 | 1 | 0 | 0 |
| −371.5 | −38.29° | 0 | 0 | 1 | 0 | 0 | 1 | 1 | 0 |
| −370.5 | −38.17° | 1 | 0 | 1 | 1 | 0 | 1 | 1 | 0 |
| −369.5 | −38.05° | 1 | 0 | 0 | 1 | 0 | 0 | 1 | 0 |
| −368.5 | −37.93° | 1 | 0 | 0 | 1 | 1 | 0 | 1 | 1 |
| −367.5 | −37.81° | 1 | 1 | 0 | 1 | 1 | 0 | 0 | 1 |
| −366.5 | −37.69° | 1 | 1 | 0 | 0 | 1 | 0 | 0 | 1 |
| −365.5 | −37.57° | 0 | 1 | 0 | 0 | 1 | 1 | 0 | 1 |
| −364.5 | −37.45° | 0 | 1 | 1 | 0 | 0 | 1 | 0 | 0 |
| −363.5 | −37.33° | 0 | 0 | 1 | 0 | 0 | 1 | 1 | 0 |
| −362.5 | −37.21° | 0 | 0 | 1 | 1 | 0 | 1 | 1 | 0 |
| −361.5 | −37.09° | 1 | 0 | 1 | 1 | 0 | 0 | 1 | 0 |
| −360.5 | −36.97° | 1 | 0 | 0 | 1 | 0 | 0 | 1 | 1 |
| −359.5 | −36.85° | 1 | 1 | 0 | 1 | 1 | 0 | 0 | 1 |
| −358.5 | −36.73° | 1 | 1 | 0 | 0 | 1 | 0 | 0 | 1 |
| −357.5 | −36.61° | 0 | 1 | 0 | 0 | 1 | 1 | 0 | 1 |
| −356.5 | −36.49° | 0 | 1 | 1 | 0 | 1 | 1 | 0 | 0 |
| −355.5 | −36.37° | 0 | 1 | 1 | 0 | 0 | 1 | 1 | 0 |
| −354.5 | −36.25° | 0 | 0 | 1 | 1 | 0 | 1 | 1 | 0 |
| −353.5 | −36.13° | 1 | 0 | 1 | 1 | 0 | 0 | 1 | 0 |
| −352.5 | −36.01° | 1 | 0 | 0 | 1 | 0 | 0 | 1 | 1 |
| −351.5 | −35.90° | 1 | 0 | 0 | 1 | 1 | 0 | 0 | 1 |
| −350.5 | −35.78° | 1 | 1 | 0 | 0 | 1 | 0 | 0 | 1 |
| −349.5 | −35.66° | 1 | 1 | 0 | 0 | 1 | 1 | 0 | 1 |
| −348.5 | −35.54° | 0 | 1 | 1 | 0 | 1 | 1 | 0 | 0 |
| −347.5 | −35.43° | 0 | 1 | 1 | 0 | 0 | 1 | 0 | 0 |
| −346.5 | −35.31° | 0 | 0 | 1 | 0 | 0 | 1 | 1 | 0 |
| −345.5 | −35.19° | 0 | 0 | 1 | 1 | 0 | 0 | 1 | 0 |
| −344.5 | −35.07° | 1 | 0 | 0 | 1 | 0 | 0 | 1 | 1 |
| −343.5 | −34.96° | 1 | 0 | 0 | 1 | 1 | 0 | 1 | 1 |
| −342.5 | −34.84° | 1 | 1 | 0 | 1 | 1 | 0 | 0 | 1 |
| −341.5 | −34.73° | 1 | 1 | 0 | 0 | 1 | 1 | 0 | 1 |
| −340.5 | −34.61° | 0 | 1 | 0 | 0 | 1 | 1 | 0 | 0 |
| −339.5 | −34.49° | 0 | 1 | 1 | 0 | 0 | 1 | 0 | 0 |
| −338.5 | −34.38° | 0 | 0 | 1 | 0 | 0 | 1 | 1 | 0 |
| −337.5 | −34.26° | 0 | 0 | 1 | 1 | 0 | 0 | 1 | 0 |
| −336.5 | −34.15° | 1 | 0 | 1 | 1 | 0 | 0 | 1 | 1 |
| −335.5 | −34.03° | 1 | 0 | 0 | 1 | 1 | 0 | 1 | 1 |
| −334.5 | −33.92° | 1 | 0 | 0 | 1 | 1 | 0 | 0 | 1 |
| −333.5 | −33.80° | 1 | 1 | 0 | 0 | 1 | 1 | 0 | 1 |
| −332.5 | −33.69° | 0 | 1 | 0 | 0 | 1 | 1 | 0 | 0 |
| −331.5 | −33.57° | 0 | 1 | 1 | 0 | 0 | 1 | 0 | 0 |
| −330.5 | −33.46° | 0 | 1 | 1 | 0 | 0 | 1 | 1 | 0 |
| −329.5 | −33.34° | 0 | 0 | 1 | 1 | 0 | 1 | 1 | 0 |
| −328.5 | −33.23° | 0 | 0 | 1 | 1 | 0 | 0 | 1 | 1 |
| −327.5 | −33.11° | 1 | 0 | 0 | 1 | 1 | 0 | 1 | 1 |
| −326.5 | −33.00° | 1 | 0 | 0 | 1 | 1 | 0 | 0 | 1 |
| −325.5 | −32.88° | 1 | 1 | 0 | 0 | 1 | 0 | 0 | 1 |
| −324.5 | −32.77° | 1 | 1 | 0 | 0 | 1 | 1 | 0 | 0 |
| −323.5 | −32.66° | 0 | 1 | 1 | 0 | 0 | 1 | 0 | 0 |
| −322.5 | −32.54° | 0 | 1 | 1 | 0 | 0 | 1 | 1 | 0 |
| −321.5 | −32.43° | 0 | 0 | 1 | 1 | 0 | 1 | 1 | 0 |
| −320.5 | −32.32° | 0 | 0 | 1 | 1 | 0 | 0 | 1 | 1 |
| −319.5 | −32.20° | 1 | 0 | 0 | 1 | 0 | 0 | 1 | 1 |
| −318.5 | −32.09° | 1 | 0 | 0 | 1 | 1 | 0 | 0 | 1 |
| −317.5 | −31.98° | 1 | 1 | 0 | 0 | 1 | 0 | 0 | 1 |
| −316.5 | −31.87° | 1 | 1 | 0 | 0 | 1 | 1 | 0 | 0 |
| −315.5 | −31.75° | 0 | 1 | 1 | 0 | 1 | 1 | 0 | 0 |
| −314.5 | −31.64° | 0 | 1 | 1 | 0 | 0 | 1 | 1 | 0 |
| −313.5 | −31.53° | 0 | 0 | 1 | 0 | 0 | 1 | 1 | 0 |
| −312.5 | −31.42° | 0 | 0 | 1 | 1 | 0 | 0 | 1 | 1 |
| −311.5 | −31.31° | 1 | 0 | 1 | 1 | 0 | 0 | 1 | 1 |
| −310.5 | −31.19° | 1 | 0 | 0 | 1 | 1 | 0 | 0 | 1 |
| −309.5 | −31.08° | 1 | 0 | 0 | 1 | 1 | 0 | 0 | 1 |
| −308.5 | −30.97° | 1 | 1 | 0 | 0 | 1 | 1 | 0 | 0 |
| −307.5 | −30.86° | 1 | 1 | 0 | 0 | 1 | 1 | 0 | 0 |
| −306.5 | −30.75° | 0 | 1 | 1 | 0 | 0 | 1 | 1 | 0 |
| −305.5 | −30.64° | 0 | 1 | 1 | 0 | 0 | 1 | 1 | 0 |
| −304.5 | −30.53° | 0 | 0 | 1 | 1 | 0 | 0 | 1 | 1 |
| −303.5 | −30.41° | 0 | 0 | 1 | 1 | 0 | 0 | 1 | 1 |
| −302.5 | −30.30° | 1 | 0 | 0 | 1 | 1 | 0 | 0 | 1 |
| −301.5 | −30.19° | 1 | 0 | 0 | 1 | 1 | 0 | 0 | 1 |
| −300.5 | −30.08° | 1 | 1 | 0 | 0 | 1 | 1 | 0 | 0 |
| −299.5 | −29.97° | 1 | 1 | 0 | 0 | 1 | 1 | 0 | 0 |
| −298.5 | −29.86° | 0 | 1 | 1 | 0 | 0 | 1 | 1 | 0 |
| −297.5 | −29.75° | 0 | 1 | 1 | 0 | 0 | 1 | 1 | 0 |
| −296.5 | −29.64° | 0 | 0 | 1 | 1 | 0 | 0 | 1 | 1 |
| −295.5 | −29.53° | 0 | 0 | 1 | 1 | 0 | 0 | 1 | 1 |

-continued

| | | | | | | | | | |
|---|---|---|---|---|---|---|---|---|---|
| −294.5 | −29.42° | 1 | 0 | 0 | 1 | 1 | 0 | 0 | 1 |
| −293.5 | −29.31° | 1 | 0 | 0 | 1 | 1 | 0 | 0 | 1 |
| −292.5 | −29.20° | 1 | 1 | 0 | 0 | 1 | 1 | 0 | 0 |
| −291.5 | −29.09° | 1 | 1 | 0 | 0 | 1 | 1 | 0 | 0 |
| −290.5 | −28.98° | 0 | 1 | 1 | 0 | 0 | 1 | 1 | 0 |
| −289.5 | −28.88° | 0 | 1 | 1 | 0 | 0 | 1 | 1 | 0 |
| −288.5 | −28.77° | 0 | 0 | 1 | 1 | 0 | 0 | 1 | 1 |
| −287.5 | −28.66° | 0 | 0 | 1 | 1 | 0 | 0 | 1 | 1 |
| −286.5 | −28.55° | 0 | 0 | 0 | 1 | 1 | 0 | 0 | 1 |
| −285.5 | −28.44° | 1 | 0 | 0 | 1 | 1 | 0 | 0 | 1 |
| −284.5 | −28.33° | 1 | 0 | 0 | 0 | 1 | 1 | 0 | 0 |
| −283.5 | −28.22° | 1 | 1 | 0 | 0 | 1 | 1 | 0 | 0 |
| −282.5 | −28.11° | 1 | 1 | 0 | 0 | 0 | 1 | 1 | 0 |
| −281.5 | −28.01° | 0 | 1 | 1 | 0 | 0 | 1 | 1 | 0 |
| −280.5 | −27.90° | 0 | 1 | 1 | 0 | 0 | 0 | 1 | 1 |
| −279.5 | −27.79° | 0 | 0 | 1 | 1 | 0 | 0 | 1 | 1 |
| −278.5 | −27.68° | 0 | 0 | 1 | 1 | 0 | 0 | 0 | 1 |
| −277.5 | −27.57° | 1 | 0 | 0 | 1 | 1 | 0 | 0 | 1 |
| −276.5 | −27.47° | 1 | 0 | 0 | 1 | 1 | 1 | 0 | 0 |
| −275.5 | −27.36° | 1 | 1 | 0 | 0 | 1 | 1 | 0 | 0 |
| −274.5 | −27.25° | 1 | 1 | 0 | 0 | 1 | 1 | 1 | 0 |
| −273.5 | −27.14° | 0 | 1 | 1 | 0 | 0 | 1 | 1 | 0 |
| −272.5 | −27.04° | 0 | 1 | 1 | 0 | 0 | 0 | 1 | 1 |
| −271.5 | −26.93° | 0 | 0 | 1 | 1 | 0 | 0 | 1 | 1 |
| −270.5 | −26.82° | 0 | 0 | 1 | 1 | 0 | 0 | 0 | 1 |
| −269.5 | −26.71° | 0 | 0 | 0 | 1 | 1 | 0 | 0 | 1 |
| −268.5 | −26.61° | 1 | 0 | 0 | 1 | 1 | 0 | 0 | 0 |
| −267.5 | −26.50° | 1 | 1 | 0 | 0 | 1 | 1 | 0 | 0 |
| −266.5 | −26.39° | 1 | 1 | 0 | 0 | 1 | 1 | 1 | 0 |
| −265.5 | −26.29° | 1 | 1 | 1 | 0 | 0 | 1 | 1 | 0 |
| −264.5 | −26.18° | 0 | 1 | 1 | 0 | 0 | 1 | 1 | 1 |
| −263.5 | −26.07° | 0 | 1 | 1 | 1 | 0 | 0 | 1 | 1 |
| −262.5 | −25.97° | 0 | 0 | 1 | 1 | 0 | 0 | 0 | 1 |
| −261.5 | −25.86° | 0 | 0 | 0 | 1 | 1 | 0 | 0 | 1 |
| −260.5 | −25.76° | 1 | 0 | 0 | 1 | 1 | 0 | 0 | 0 |
| −259.5 | −25.65° | 1 | 0 | 0 | 0 | 1 | 1 | 0 | 0 |
| −258.5 | −25.54° | 1 | 1 | 0 | 0 | 1 | 1 | 1 | 0 |
| −257.5 | −25.44° | 1 | 1 | 0 | 0 | 0 | 1 | 1 | 0 |
| −256.5 | −25.33° | 0 | 1 | 1 | 0 | 0 | 1 | 1 | 1 |
| −255.5 | −25.23° | 0 | 1 | 1 | 1 | 0 | 0 | 1 | 1 |
| −254.5 | −25.12° | 0 | 0 | 1 | 1 | 0 | 0 | 0 | 1 |
| −253.5 | −25.01° | 0 | 0 | 1 | 1 | 1 | 0 | 0 | 1 |
| −252.5 | −24.91° | 1 | 0 | 0 | 1 | 1 | 0 | 0 | 0 |
| −251.5 | −24.80° | 1 | 0 | 0 | 0 | 1 | 1 | 0 | 0 |
| −250.5 | −24.70° | 1 | 1 | 0 | 0 | 1 | 1 | 1 | 0 |
| −249.5 | −24.59° | 1 | 1 | 0 | 0 | 0 | 1 | 1 | 0 |
| −248.5 | −24.49° | 1 | 1 | 1 | 0 | 0 | 1 | 1 | 1 |
| −247.5 | −24.38° | 0 | 1 | 1 | 0 | 0 | 0 | 1 | 1 |
| −246.5 | −24.28° | 0 | 0 | 1 | 1 | 0 | 0 | 1 | 1 |
| −245.5 | −24.17° | 0 | 0 | 1 | 1 | 1 | 0 | 0 | 1 |
| −244.5 | −24.07° | 0 | 0 | 0 | 1 | 1 | 0 | 0 | 0 |
| −243.5 | −23.96° | 1 | 0 | 0 | 1 | 1 | 1 | 0 | 0 |
| −242.5 | −23.86° | 1 | 1 | 0 | 0 | 1 | 1 | 0 | 0 |
| −241.5 | −23.76° | 1 | 1 | 0 | 0 | 0 | 1 | 1 | 0 |
| −240.5 | −23.65° | 1 | 1 | 1 | 0 | 0 | 1 | 1 | 1 |
| −239.5 | −23.55° | 0 | 1 | 1 | 0 | 0 | 0 | 1 | 1 |
| −238.5 | −23.44° | 0 | 1 | 1 | 1 | 0 | 0 | 1 | 1 |
| −237.5 | −23.34° | 0 | 0 | 1 | 1 | 1 | 0 | 0 | 1 |
| −236.5 | −23.23° | 0 | 0 | 0 | 1 | 1 | 0 | 0 | 0 |
| −235.5 | −23.13° | 1 | 0 | 0 | 1 | 1 | 1 | 0 | 0 |
| −234.5 | −23.03° | 1 | 0 | 0 | 0 | 1 | 1 | 0 | 0 |
| −233.5 | −22.92° | 1 | 1 | 0 | 0 | 1 | 1 | 1 | 0 |
| −232.5 | −22.82° | 1 | 1 | 1 | 0 | 0 | 1 | 1 | 1 |
| −231.5 | −22.72° | 0 | 1 | 1 | 0 | 0 | 0 | 1 | 1 |
| −230.5 | −22.61° | 0 | 1 | 1 | 1 | 0 | 0 | 1 | 1 |
| −229.5 | −22.51° | 0 | 0 | 1 | 1 | 0 | 0 | 0 | 1 |
| −228.5 | −22.40° | 0 | 0 | 1 | 1 | 1 | 0 | 0 | 0 |
| −227.5 | −22.30° | 0 | 0 | 0 | 1 | 1 | 1 | 0 | 0 |
| −226.5 | −22.20° | 1 | 0 | 0 | 0 | 1 | 1 | 0 | 0 |
| −225.5 | −22.10° | 1 | 1 | 0 | 0 | 1 | 1 | 1 | 0 |
| −224.5 | −21.99° | 1 | 1 | 0 | 0 | 0 | 1 | 1 | 1 |
| −223.5 | −21.89° | 1 | 1 | 1 | 0 | 0 | 0 | 1 | 1 |
| −222.5 | −21.79° | 0 | 1 | 1 | 1 | 0 | 0 | 1 | 1 |
| −221.5 | −21.68° | 0 | 0 | 1 | 1 | 0 | 0 | 0 | 1 |
| −220.5 | −21.58° | 0 | 0 | 1 | 1 | 1 | 0 | 0 | 0 |
| −219.5 | −21.48° | 0 | 0 | 0 | 1 | 1 | 1 | 0 | 0 |
| −218.5 | −21.37° | 1 | 0 | 0 | 0 | 1 | 1 | 0 | 0 |
| −217.5 | −21.27° | 1 | 0 | 0 | 0 | 1 | 1 | 1 | 0 |
| −216.5 | −21.17° | 1 | 1 | 0 | 0 | 0 | 1 | 1 | 1 |

-continued

| | | | | | | | | | |
|---|---|---|---|---|---|---|---|---|---|
| −215.5 | −21.07° | 1 | 1 | 1 | 0 | 0 | 0 | 1 | 1 |
| −214.5 | −20.97° | 0 | 1 | 1 | 0 | 0 | 0 | 1 | 1 |
| −213.5 | −20.86° | 0 | 1 | 1 | 1 | 0 | 0 | 0 | 1 |
| −212.5 | −20.76° | 0 | 0 | 1 | 1 | 1 | 0 | 0 | 0 |
| −211.5 | −20.66° | 0 | 0 | 0 | 1 | 1 | 1 | 0 | 0 |
| −210.5 | −20.56° | 1 | 0 | 0 | 1 | 1 | 1 | 0 | 0 |
| −209.5 | −20.45° | 1 | 0 | 0 | 0 | 1 | 1 | 1 | 0 |
| −208.5 | −20.35° | 1 | 1 | 0 | 0 | 0 | 1 | 1 | 1 |
| −207.5 | −20.25° | 1 | 1 | 1 | 0 | 0 | 1 | 1 | 1 |
| −206.5 | −20.15° | 1 | 1 | 1 | 0 | 0 | 0 | 1 | 1 |
| −205.5 | −20.05° | 0 | 1 | 1 | 1 | 0 | 0 | 0 | 1 |
| −204.5 | −19.94° | 0 | 0 | 1 | 1 | 1 | 0 | 0 | 0 |
| −203.5 | −19.84° | 0 | 0 | 1 | 1 | 1 | 0 | 0 | 0 |
| −202.5 | −19.74° | 0 | 0 | 0 | 1 | 1 | 1 | 0 | 0 |
| −201.5 | −19.64° | 1 | 0 | 0 | 0 | 1 | 1 | 1 | 0 |
| −200.5 | −19.54° | 1 | 1 | 0 | 0 | 0 | 1 | 1 | 1 |
| −199.5 | −19.44° | 1 | 1 | 0 | 0 | 0 | 1 | 1 | 1 |
| −198.5 | −19.34° | 1 | 1 | 1 | 0 | 0 | 0 | 1 | 1 |
| −197.5 | −19.23° | 0 | 1 | 1 | 1 | 0 | 0 | 0 | 1 |
| −196.5 | −19.13° | 0 | 0 | 1 | 1 | 1 | 0 | 0 | 0 |
| −195.5 | −19.03° | 0 | 0 | 1 | 1 | 1 | 0 | 0 | 0 |
| −194.5 | −18.93° | 0 | 0 | 0 | 1 | 1 | 1 | 0 | 0 |
| −193.5 | −18.83° | 1 | 0 | 0 | 0 | 1 | 1 | 1 | 0 |
| −192.5 | −18.73° | 1 | 0 | 0 | 0 | 1 | 1 | 1 | 1 |
| −191.5 | −18.63° | 1 | 1 | 0 | 0 | 0 | 1 | 1 | 1 |
| −190.5 | −18.53° | 1 | 1 | 1 | 0 | 0 | 0 | 1 | 1 |
| −189.5 | −18.43° | 1 | 1 | 1 | 1 | 0 | 0 | 0 | 1 |
| −188.5 | −18.33° | 0 | 1 | 1 | 1 | 0 | 0 | 0 | 0 |
| −187.5 | −18.23° | 0 | 0 | 1 | 1 | 1 | 0 | 0 | 0 |
| −186.5 | −18.13° | 0 | 0 | 0 | 1 | 1 | 1 | 0 | 0 |
| −185.5 | −18.02° | 0 | 0 | 0 | 0 | 1 | 1 | 1 | 0 |
| −184.5 | −17.92° | 1 | 0 | 0 | 0 | 1 | 1 | 1 | 1 |
| −183.5 | −17.82° | 1 | 1 | 0 | 0 | 0 | 1 | 1 | 1 |
| −182.5 | −17.72° | 1 | 1 | 1 | 0 | 0 | 0 | 1 | 1 |
| −181.5 | −17.62° | 1 | 1 | 1 | 0 | 0 | 0 | 0 | 1 |
| −180.5 | −17.52° | 0 | 1 | 1 | 1 | 0 | 0 | 0 | 0 |
| −179.5 | −17.42° | 0 | 0 | 1 | 1 | 1 | 0 | 0 | 0 |
| −178.5 | −17.32° | 0 | 0 | 0 | 1 | 1 | 1 | 0 | 0 |
| −177.5 | −17.22° | 0 | 0 | 0 | 1 | 1 | 1 | 1 | 0 |
| −176.5 | −17.12° | 1 | 0 | 0 | 0 | 1 | 1 | 1 | 1 |
| −175.5 | −17.02° | 1 | 1 | 0 | 0 | 0 | 1 | 1 | 1 |
| −174.5 | −16.92° | 1 | 1 | 0 | 0 | 0 | 0 | 1 | 1 |
| −173.5 | −16.82° | 1 | 1 | 1 | 0 | 0 | 0 | 0 | 1 |
| −172.5 | −16.72° | 0 | 1 | 1 | 1 | 0 | 0 | 0 | 0 |
| −171.5 | −16.62° | 0 | 1 | 1 | 1 | 1 | 0 | 0 | 0 |
| −170.5 | −16.52° | 0 | 0 | 1 | 1 | 1 | 1 | 0 | 0 |
| −169.5 | −16.42° | 0 | 0 | 0 | 1 | 1 | 1 | 1 | 0 |
| −168.5 | −16.32° | 0 | 0 | 0 | 0 | 1 | 1 | 1 | 1 |
| −167.5 | −16.22° | 1 | 0 | 0 | 0 | 0 | 1 | 1 | 1 |
| −166.5 | −16.12° | 1 | 1 | 0 | 0 | 0 | 0 | 1 | 1 |
| −165.5 | −16.03° | 1 | 1 | 1 | 0 | 0 | 0 | 0 | 1 |
| −164.5 | −15.93° | 1 | 1 | 1 | 1 | 0 | 0 | 0 | 0 |
| −163.5 | −15.83° | 0 | 1 | 1 | 1 | 1 | 0 | 0 | 0 |
| −162.5 | −15.73° | 0 | 0 | 1 | 1 | 1 | 1 | 0 | 0 |
| −161.5 | −15.63° | 0 | 0 | 0 | 1 | 1 | 1 | 1 | 0 |
| −160.5 | −15.53° | 0 | 0 | 0 | 0 | 1 | 1 | 1 | 1 |
| −159.5 | −15.43° | 1 | 0 | 0 | 0 | 0 | 1 | 1 | 1 |
| −158.5 | −15.33° | 1 | 1 | 0 | 0 | 0 | 0 | 1 | 1 |
| −157.5 | −15.23° | 1 | 1 | 1 | 0 | 0 | 0 | 0 | 1 |
| −156.5 | −15.13° | 1 | 1 | 1 | 1 | 0 | 0 | 0 | 0 |
| −155.5 | −15.03° | 0 | 1 | 1 | 1 | 1 | 0 | 0 | 0 |
| −154.5 | −14.93° | 0 | 0 | 1 | 1 | 1 | 1 | 0 | 0 |
| −153.5 | −14.84° | 0 | 0 | 0 | 1 | 1 | 1 | 1 | 0 |
| −152.5 | −14.74° | 0 | 0 | 0 | 0 | 1 | 1 | 1 | 1 |
| −151.5 | −14.64° | 1 | 0 | 0 | 0 | 0 | 1 | 1 | 1 |
| −150.5 | −14.54° | 1 | 1 | 0 | 0 | 0 | 0 | 1 | 1 |
| −149.5 | −14.44° | 1 | 1 | 0 | 0 | 0 | 0 | 1 | 1 |
| −148.5 | −14.34° | 1 | 1 | 1 | 0 | 0 | 0 | 0 | 1 |
| −147.5 | −14.24° | 1 | 1 | 1 | 1 | 0 | 0 | 0 | 0 |
| −146.5 | −14.14° | 0 | 1 | 1 | 1 | 1 | 0 | 0 | 0 |
| −145.5 | −14.05° | 0 | 0 | 1 | 1 | 1 | 1 | 0 | 0 |
| −144.5 | −13.95° | 0 | 0 | 0 | 1 | 1 | 1 | 1 | 0 |
| −143.5 | −13.85° | 0 | 0 | 0 | 0 | 1 | 1 | 1 | 1 |
| −142.5 | −13.75° | 1 | 0 | 0 | 0 | 0 | 1 | 1 | 1 |
| −141.5 | −13.65° | 1 | 1 | 0 | 0 | 0 | 0 | 1 | 1 |
| −140.5 | −13.55° | 1 | 1 | 1 | 0 | 0 | 0 | 0 | 1 |
| −139.5 | −13.46° | 1 | 1 | 1 | 1 | 0 | 0 | 0 | 0 |
| −138.5 | −13.36° | 0 | 1 | 1 | 1 | 1 | 0 | 0 | 0 |
| −137.5 | −13.26° | 0 | 0 | 1 | 1 | 1 | 1 | 0 | 0 |

-continued

| | | | | | | | | | |
|---|---|---|---|---|---|---|---|---|---|
| −136.5 | −13.16° | 0 | 0 | 0 | 1 | 1 | 1 | 1 | 0 |
| −135.5 | −13.06° | 0 | 0 | 0 | 0 | 1 | 1 | 1 | 1 |
| −134.5 | −12.96° | 1 | 0 | 0 | 0 | 0 | 1 | 1 | 1 |
| −133.5 | −12.87° | 1 | 1 | 0 | 0 | 0 | 0 | 1 | 1 |
| −132.5 | −12.77° | 1 | 1 | 1 | 0 | 0 | 0 | 0 | 1 |
| −131.5 | −12.67° | 1 | 1 | 1 | 1 | 0 | 0 | 0 | 0 |
| −130.5 | −12.57° | 0 | 1 | 1 | 1 | 1 | 0 | 0 | 0 |
| −129.5 | −12.47° | 0 | 0 | 1 | 1 | 1 | 1 | 0 | 0 |
| −128.5 | −12.38° | 0 | 0 | 0 | 1 | 1 | 1 | 1 | 0 |
| −127.5 | −12.28° | 0 | 0 | 0 | 0 | 1 | 1 | 1 | 1 |
| −126.5 | −12.18° | 0 | 0 | 0 | 0 | 0 | 1 | 1 | 1 |
| −125.5 | −12.08° | 1 | 0 | 0 | 0 | 0 | 0 | 1 | 1 |
| −124.5 | −11.99° | 1 | 1 | 1 | 0 | 0 | 0 | 0 | 1 |
| −123.5 | −11.89° | 1 | 1 | 1 | 1 | 0 | 0 | 0 | 0 |
| −122.5 | −11.79° | 1 | 1 | 1 | 1 | 1 | 0 | 0 | 0 |
| −121.5 | −11.69° | 0 | 1 | 1 | 1 | 1 | 1 | 0 | 0 |
| −120.5 | −11.60° | 0 | 0 | 1 | 1 | 1 | 1 | 1 | 0 |
| −119.5 | −11.50° | 0 | 0 | 0 | 0 | 1 | 1 | 1 | 1 |
| −118.5 | −11.40° | 0 | 0 | 0 | 0 | 0 | 1 | 1 | 1 |
| −117.5 | −11.30° | 1 | 0 | 0 | 0 | 0 | 0 | 1 | 1 |
| −116.5 | −11.21° | 1 | 1 | 0 | 0 | 0 | 0 | 0 | 1 |
| −115.5 | −11.11° | 1 | 1 | 1 | 0 | 0 | 0 | 0 | 0 |
| −114.5 | −11.01° | 1 | 1 | 1 | 1 | 1 | 0 | 0 | 0 |
| −113.5 | −10.91° | 0 | 1 | 1 | 1 | 1 | 1 | 0 | 0 |
| −112.5 | −10.82° | 0 | 0 | 1 | 1 | 1 | 1 | 1 | 0 |
| −111.5 | −10.72° | 0 | 0 | 0 | 1 | 1 | 1 | 1 | 1 |
| −110.5 | −10.62° | 0 | 0 | 0 | 0 | 0 | 1 | 1 | 1 |
| −109.5 | −10.52° | 0 | 0 | 0 | 0 | 0 | 0 | 1 | 1 |
| −108.5 | −10.43° | 1 | 1 | 0 | 0 | 0 | 0 | 0 | 1 |
| −107.5 | −10.33° | 1 | 1 | 1 | 0 | 0 | 0 | 0 | 0 |
| −106.5 | −10.23° | 1 | 1 | 1 | 1 | 0 | 0 | 0 | 0 |
| −105.5 | −10.14° | 1 | 1 | 1 | 1 | 1 | 1 | 0 | 0 |
| −104.5 | −10.04° | 0 | 0 | 1 | 1 | 1 | 1 | 1 | 0 |
| −103.5 | −9.94° | 0 | 0 | 0 | 1 | 1 | 1 | 1 | 1 |
| −102.5 | −9.84° | 0 | 0 | 0 | 0 | 1 | 1 | 1 | 1 |
| −101.5 | −9.75° | 0 | 0 | 0 | 0 | 0 | 0 | 1 | 1 |
| −100.5 | −9.65° | 1 | 0 | 0 | 0 | 0 | 0 | 0 | 1 |
| −99.5 | −9.55° | 1 | 1 | 1 | 0 | 0 | 0 | 0 | 0 |
| −98.5 | −9.46° | 1 | 1 | 1 | 1 | 0 | 0 | 0 | 0 |
| −97.5 | −9.36° | 1 | 1 | 1 | 1 | 1 | 1 | 0 | 0 |
| −96.5 | −9.26° | 0 | 1 | 1 | 1 | 1 | 1 | 1 | 0 |
| −95.5 | −9.17° | 0 | 0 | 0 | 1 | 1 | 1 | 1 | 1 |
| −94.5 | −9.07° | 0 | 0 | 0 | 0 | 1 | 1 | 1 | 1 |
| −93.5 | −8.97° | 0 | 0 | 0 | 0 | 0 | 0 | 1 | 1 |
| −92.5 | −8.88° | 1 | 0 | 0 | 0 | 0 | 0 | 0 | 1 |
| −91.5 | −8.78° | 1 | 1 | 0 | 0 | 0 | 0 | 0 | 0 |
| −90.5 | −8.68° | 1 | 1 | 1 | 1 | 0 | 0 | 0 | 0 |
| −89.5 | −8.59° | 1 | 1 | 1 | 1 | 1 | 0 | 0 | 0 |
| −88.5 | −8.49° | 1 | 1 | 1 | 1 | 1 | 1 | 1 | 0 |
| −87.5 | −8.39° | 0 | 0 | 1 | 1 | 1 | 1 | 1 | 1 |
| −86.5 | −8.30° | 0 | 0 | 0 | 0 | 1 | 1 | 1 | 1 |
| −85.5 | −8.20° | 0 | 0 | 0 | 0 | 0 | 1 | 1 | 1 |
| −84.5 | −8.10° | 0 | 0 | 0 | 0 | 0 | 0 | 0 | 1 |
| −83.5 | −8.01° | 1 | 1 | 0 | 0 | 0 | 0 | 0 | 0 |
| −82.5 | −7.91° | 1 | 1 | 1 | 0 | 0 | 0 | 0 | 0 |
| −81.5 | −7.81° | 1 | 1 | 1 | 1 | 1 | 0 | 0 | 0 |
| −80.5 | −7.72° | 1 | 1 | 1 | 1 | 1 | 1 | 1 | 0 |
| −79.5 | −7.62° | 0 | 1 | 1 | 1 | 1 | 1 | 1 | 1 |
| −78.5 | −7.52° | 0 | 0 | 0 | 1 | 1 | 1 | 1 | 1 |
| −77.5 | −7.43° | 0 | 0 | 0 | 0 | 0 | 1 | 1 | 1 |
| −76.5 | −7.33° | 0 | 0 | 0 | 0 | 0 | 0 | 0 | 1 |
| −75.5 | −7.23° | 1 | 0 | 0 | 0 | 0 | 0 | 0 | 0 |
| −74.5 | −7.14° | 1 | 1 | 1 | 0 | 0 | 0 | 0 | 0 |
| −73.5 | −7.04° | 1 | 1 | 1 | 1 | 1 | 0 | 0 | 0 |
| −72.5 | −6.95° | 1 | 1 | 1 | 1 | 1 | 1 | 1 | 0 |
| −71.5 | −6.85° | 0 | 1 | 1 | 1 | 1 | 1 | 1 | 1 |
| −70.5 | −6.75° | 0 | 0 | 0 | 1 | 1 | 1 | 1 | 1 |
| −69.5 | −6.66° | 0 | 0 | 0 | 0 | 0 | 1 | 1 | 1 |
| −68.5 | −6.56° | 0 | 0 | 0 | 0 | 0 | 0 | 0 | 1 |
| −67.5 | −6.46° | 0 | 0 | 0 | 0 | 0 | 0 | 0 | 0 |
| −66.5 | −6.37° | 1 | 1 | 0 | 0 | 0 | 0 | 0 | 0 |
| −65.5 | −6.27° | 1 | 1 | 1 | 1 | 1 | 0 | 0 | 0 |
| −64.5 | −6.18° | 1 | 1 | 1 | 1 | 1 | 1 | 1 | 0 |
| −63.5 | −6.08° | 1 | 1 | 1 | 1 | 1 | 1 | 1 | 1 |
| −62.5 | −5.98° | 0 | 0 | 1 | 1 | 1 | 1 | 1 | 1 |
| −61.5 | −5.89° | 0 | 0 | 0 | 0 | 1 | 1 | 1 | 1 |
| −60.5 | −5.79° | 0 | 0 | 0 | 0 | 0 | 0 | 0 | 1 |
| −59.5 | −5.70° | 0 | 0 | 0 | 0 | 0 | 0 | 0 | 0 |
| −58.5 | −5.60° | 1 | 1 | 0 | 0 | 0 | 0 | 0 | 0 |

-continued

| | | | | | | | | | |
|---|---|---|---|---|---|---|---|---|---|
| −57.5 | −5.50° | 1 | 1 | 1 | 1 | 0 | 0 | 0 | 0 |
| −56.5 | −5.41° | 1 | 1 | 1 | 1 | 1 | 1 | 1 | 0 |
| −55.5 | −5.31° | 1 | 1 | 1 | 1 | 1 | 1 | 1 | 1 |
| −54.5 | −5.22° | 0 | 1 | 1 | 1 | 1 | 1 | 1 | 1 |
| −53.5 | −5.12° | 0 | 0 | 0 | 0 | 1 | 1 | 1 | 1 |
| −52.5 | −5.02° | 0 | 0 | 0 | 0 | 0 | 0 | 0 | 1 |
| −51.5 | −4.93° | 0 | 0 | 0 | 0 | 0 | 0 | 0 | 0 |
| −50.5 | −4.83° | 1 | 0 | 0 | 0 | 0 | 0 | 0 | 0 |
| −49.5 | −4.74° | 1 | 1 | 1 | 0 | 0 | 0 | 0 | 0 |
| −48.5 | −4.64° | 1 | 1 | 1 | 1 | 1 | 1 | 0 | 0 |
| −47.5 | −4.54° | 1 | 1 | 1 | 1 | 1 | 1 | 1 | 1 |
| −46.5 | −4.45° | 1 | 1 | 1 | 1 | 1 | 1 | 1 | 1 |
| −45.5 | −4.35° | 0 | 0 | 0 | 1 | 1 | 1 | 1 | 1 |
| −44.5 | −4.26° | 0 | 0 | 0 | 0 | 0 | 0 | 1 | 1 |
| −43.5 | −4.16° | 0 | 0 | 0 | 0 | 0 | 0 | 0 | 0 |
| −42.5 | −4.07° | 0 | 0 | 0 | 0 | 0 | 0 | 0 | 0 |
| −41.5 | −3.97° | 1 | 1 | 1 | 0 | 0 | 0 | 0 | 0 |
| −40.5 | −3.87° | 1 | 1 | 1 | 1 | 1 | 1 | 0 | 0 |
| −39.5 | −3.78° | 1 | 1 | 1 | 1 | 1 | 1 | 1 | 1 |
| −38.5 | −3.68° | 1 | 1 | 1 | 1 | 1 | 1 | 1 | 1 |
| −37.5 | −3.59° | 0 | 0 | 1 | 1 | 1 | 1 | 1 | 1 |
| −36.5 | −3.49° | 0 | 0 | 0 | 0 | 0 | 0 | 1 | 1 |
| −35.5 | −3.39° | 0 | 0 | 0 | 0 | 0 | 0 | 0 | 0 |
| −34.5 | −3.30° | 0 | 0 | 0 | 0 | 0 | 0 | 0 | 0 |
| −33.5 | −3.20° | 1 | 0 | 0 | 0 | 0 | 0 | 0 | 0 |
| −32.5 | −3.11° | 1 | 1 | 1 | 1 | 1 | 1 | 0 | 0 |
| −31.5 | −3.01° | 1 | 1 | 1 | 1 | 1 | 1 | 1 | 1 |
| −30.5 | −2.92° | 1 | 1 | 1 | 1 | 1 | 1 | 1 | 1 |
| −29.5 | −2.82° | 1 | 1 | 1 | 1 | 1 | 1 | 1 | 1 |
| −28.5 | −2.72° | 0 | 0 | 0 | 0 | 0 | 1 | 1 | 1 |
| −27.5 | −2.63° | 0 | 0 | 0 | 0 | 0 | 0 | 0 | 0 |
| −26.5 | −2.53° | 0 | 0 | 0 | 0 | 0 | 0 | 0 | 0 |
| −25.5 | −2.44° | 0 | 0 | 0 | 0 | 0 | 0 | 0 | 0 |
| −24.5 | −2.34° | 1 | 1 | 1 | 1 | 1 | 0 | 0 | 0 |
| −23.5 | −2.25° | 1 | 1 | 1 | 1 | 1 | 1 | 1 | 1 |
| −22.5 | −2.15° | 1 | 1 | 1 | 1 | 1 | 1 | 1 | 1 |
| −21.5 | −2.06° | 1 | 1 | 1 | 1 | 1 | 1 | 1 | 1 |
| −20.5 | −1.96° | 0 | 0 | 0 | 0 | 1 | 1 | 1 | 1 |
| −19.5 | −1.86° | 0 | 0 | 0 | 0 | 0 | 0 | 0 | 0 |
| −18.5 | −1.77° | 0 | 0 | 0 | 0 | 0 | 0 | 0 | 0 |
| −17.5 | −1.67° | 0 | 0 | 0 | 0 | 0 | 0 | 0 | 0 |
| −16.5 | −1.58° | 1 | 1 | 1 | 0 | 0 | 0 | 0 | 0 |
| −15.5 | −1.48° | 1 | 1 | 1 | 1 | 1 | 1 | 1 | 1 |
| −14.5 | −1.39° | 1 | 1 | 1 | 1 | 1 | 1 | 1 | 1 |
| −13.5 | −1.29° | 1 | 1 | 1 | 1 | 1 | 1 | 1 | 1 |
| −12.5 | −1.19° | 0 | 0 | 1 | 1 | 1 | 1 | 1 | 1 |
| −11.5 | −1.10° | 0 | 0 | 0 | 0 | 0 | 0 | 0 | 0 |
| −10.5 | −1.00° | 0 | 0 | 0 | 0 | 0 | 0 | 0 | 0 |
| −9.5 | −0.91° | 0 | 0 | 0 | 0 | 0 | 0 | 0 | 0 |
| −8.5 | −0.81° | 0 | 0 | 0 | 0 | 0 | 0 | 0 | 0 |
| −7.5 | −0.72° | 1 | 1 | 1 | 1 | 1 | 1 | 1 | 1 |
| −6.5 | −0.62° | 1 | 1 | 1 | 1 | 1 | 1 | 1 | 1 |
| −5.5 | −0.53° | 1 | 1 | 1 | 1 | 1 | 1 | 1 | 1 |
| −4.5 | −0.43° | 1 | 1 | 1 | 1 | 1 | 1 | 1 | 1 |
| −3.5 | −0.33° | 0 | 0 | 0 | 0 | 0 | 0 | 0 | 0 |
| −2.5 | −0.24° | 0 | 0 | 0 | 0 | 0 | 0 | 0 | 0 |
| −1.5 | −0.14° | 0 | 0 | 0 | 0 | 0 | 0 | 0 | 0 |
| −0.5 | −0.05° | 0 | 0 | 0 | 0 | 0 | 0 | 0 | 0 |
| +0.5 | +0.05° | 1 | 1 | 1 | 1 | 1 | 1 | 1 | 1 |
| +1.5 | +0.14° | 1 | 1 | 1 | 1 | 1 | 1 | 1 | 1 |
| +2.5 | +0.24° | 1 | 1 | 1 | 1 | 1 | 1 | 1 | 1 |
| +3.5 | +0.33° | 1 | 1 | 1 | 1 | 1 | 1 | 1 | 1 |
| +4.5 | +0.43° | 0 | 0 | 0 | 0 | 0 | 0 | 0 | 0 |
| +5.5 | +0.53° | 0 | 0 | 0 | 0 | 0 | 0 | 0 | 0 |
| +6.5 | +0.62° | 0 | 0 | 0 | 0 | 0 | 0 | 0 | 0 |
| +7.5 | +0.72° | 0 | 0 | 0 | 0 | 0 | 0 | 0 | 0 |
| +8.5 | +0.81° | 1 | 1 | 1 | 1 | 1 | 1 | 1 | 1 |
| +9.5 | +0.91° | 1 | 1 | 1 | 1 | 1 | 1 | 1 | 1 |
| +10.5 | +1.00° | 1 | 1 | 1 | 1 | 1 | 1 | 1 | 1 |
| +11.5 | +1.10° | 1 | 1 | 1 | 1 | 1 | 1 | 1 | 1 |
| +12.5 | +1.19° | 1 | 1 | 0 | 0 | 0 | 0 | 0 | 0 |
| +13.5 | +1.29° | 0 | 0 | 0 | 0 | 0 | 0 | 0 | 0 |
| +14.5 | +1.39° | 0 | 0 | 0 | 0 | 0 | 0 | 0 | 0 |
| +15.5 | +1.48° | 0 | 0 | 0 | 0 | 0 | 0 | 0 | 0 |
| +16.5 | +1.58° | 0 | 0 | 0 | 0 | 1 | 1 | 1 | 1 |
| +17.5 | +1.67° | 1 | 1 | 1 | 1 | 1 | 1 | 1 | 1 |
| +18.5 | +1.77° | 1 | 1 | 1 | 1 | 1 | 1 | 1 | 1 |
| +19.5 | +1.86° | 1 | 1 | 1 | 1 | 1 | 1 | 1 | 1 |
| +20.5 | +1.96° | 1 | 1 | 1 | 1 | 0 | 0 | 0 | 0 |

-continued

| | | | | | | | | | |
|---|---|---|---|---|---|---|---|---|---|
| +21.5 | +2.06° | 0 | 0 | 0 | 0 | 0 | 0 | 0 | 0 |
| +22.5 | +2.15° | 0 | 0 | 0 | 0 | 0 | 0 | 0 | 0 |
| +23.5 | +2.25° | 0 | 0 | 0 | 0 | 0 | 0 | 0 | 0 |
| +24.5 | +2.34° | 0 | 0 | 0 | 0 | 0 | 1 | 1 | 1 |
| +25.5 | +2.44° | 1 | 1 | 1 | 1 | 1 | 1 | 1 | 1 |
| +26.5 | +2.53° | 1 | 1 | 1 | 1 | 1 | 1 | 1 | 1 |
| +27.5 | +2.63° | 1 | 1 | 1 | 1 | 1 | 1 | 1 | 1 |
| +28.5 | +2.72° | 1 | 1 | 1 | 1 | 1 | 0 | 0 | 0 |
| +29.5 | +2.82° | 0 | 0 | 0 | 0 | 0 | 0 | 0 | 0 |
| +30.5 | +2.92° | 0 | 0 | 0 | 0 | 0 | 0 | 0 | 0 |
| +31.5 | +3.01° | 0 | 0 | 0 | 0 | 0 | 0 | 0 | 0 |
| +32.5 | +3.11° | 0 | 0 | 0 | 0 | 0 | 0 | 1 | 1 |
| +33.5 | +3.20° | 0 | 1 | 1 | 1 | 1 | 1 | 1 | 1 |
| +34.5 | +3.30° | 1 | 1 | 1 | 1 | 1 | 1 | 1 | 1 |
| +35.5 | +3.39° | 1 | 1 | 1 | 1 | 1 | 1 | 1 | 1 |
| +36.5 | +3.49° | 1 | 1 | 1 | 1 | 1 | 1 | 0 | 0 |
| +37.5 | +3.59° | 1 | 1 | 0 | 0 | 0 | 0 | 0 | 0 |
| +38.5 | +3.68° | 0 | 0 | 0 | 0 | 0 | 0 | 0 | 0 |
| +39.5 | +3.78° | 0 | 0 | 0 | 0 | 0 | 0 | 0 | 0 |
| +40.5 | +3.87° | 0 | 0 | 0 | 0 | 0 | 0 | 1 | 1 |
| +41.5 | +3.97° | 0 | 0 | 0 | 1 | 1 | 1 | 1 | 1 |
| +42.5 | +4.07° | 1 | 1 | 1 | 1 | 1 | 1 | 1 | 1 |
| +43.5 | +4.16° | 1 | 1 | 1 | 1 | 1 | 1 | 1 | 1 |
| +44.5 | +4.26° | 1 | 1 | 1 | 1 | 1 | 1 | 0 | 0 |
| +45.5 | +4.35° | 1 | 1 | 1 | 0 | 0 | 0 | 0 | 0 |
| +46.5 | +4.45° | 0 | 0 | 0 | 0 | 0 | 0 | 0 | 0 |
| +47.5 | +4.54° | 0 | 0 | 0 | 0 | 0 | 0 | 0 | 0 |
| +48.5 | +4.64° | 0 | 0 | 0 | 0 | 0 | 0 | 1 | 1 |
| +49.5 | +4.74° | 0 | 0 | 0 | 1 | 1 | 1 | 1 | 1 |
| +50.5 | +4.83° | 0 | 1 | 1 | 1 | 1 | 1 | 1 | 1 |
| +51.5 | +4.93° | 1 | 1 | 1 | 1 | 1 | 1 | 1 | 1 |
| +52.5 | +5.02° | 1 | 1 | 1 | 1 | 1 | 1 | 1 | 0 |
| +53.5 | +5.12° | 1 | 1 | 1 | 1 | 0 | 0 | 0 | 0 |
| +54.5 | +5.22° | 1 | 0 | 0 | 0 | 0 | 0 | 0 | 0 |
| +55.5 | +5.31° | 0 | 0 | 0 | 0 | 0 | 0 | 0 | 0 |
| +56.5 | +5.41° | 0 | 0 | 0 | 0 | 0 | 0 | 0 | 1 |
| +57.5 | +5.50° | 0 | 0 | 0 | 0 | 1 | 1 | 1 | 1 |
| +58.5 | +5.60° | 0 | 0 | 1 | 1 | 1 | 1 | 1 | 1 |
| +59.5 | +5.70° | 1 | 1 | 1 | 1 | 1 | 1 | 1 | 1 |
| +60.5 | +5.79° | 1 | 1 | 1 | 1 | 1 | 1 | 1 | 0 |
| +61.5 | +5.89° | 1 | 1 | 1 | 1 | 0 | 0 | 0 | 0 |
| +62.5 | +5.98° | 1 | 1 | 0 | 0 | 0 | 0 | 0 | 0 |
| +63.5 | +6.08° | 0 | 0 | 0 | 0 | 0 | 0 | 0 | 0 |
| +64.5 | +6.18° | 0 | 0 | 0 | 0 | 0 | 0 | 0 | 1 |
| +65.5 | +6.27° | 0 | 0 | 0 | 0 | 0 | 1 | 1 | 1 |
| +66.5 | +6.37° | 0 | 0 | 1 | 1 | 1 | 1 | 1 | 1 |
| +67.5 | +6.46° | 1 | 1 | 1 | 1 | 1 | 1 | 1 | 1 |
| +68.5 | +6.56° | 1 | 1 | 1 | 1 | 1 | 1 | 1 | 0 |
| +69.5 | +6.66° | 1 | 1 | 1 | 1 | 1 | 0 | 0 | 0 |
| +70.5 | +6.75° | 1 | 1 | 1 | 0 | 0 | 0 | 0 | 0 |
| +71.5 | +6.85° | 1 | 0 | 0 | 0 | 0 | 0 | 0 | 0 |
| +72.5 | +6.95° | 0 | 0 | 0 | 0 | 0 | 0 | 0 | 1 |
| +73.5 | +7.04° | 0 | 0 | 0 | 0 | 0 | 1 | 1 | 1 |
| +74.5 | +7.14° | 0 | 0 | 0 | 1 | 1 | 1 | 1 | 1 |
| +75.5 | +7.23° | 0 | 1 | 1 | 1 | 1 | 1 | 1 | 1 |
| +76.5 | +7.33° | 1 | 1 | 1 | 1 | 1 | 1 | 1 | 0 |
| +77.5 | +7.43° | 1 | 1 | 1 | 1 | 1 | 0 | 0 | 0 |
| +78.5 | +7.52° | 1 | 1 | 1 | 0 | 0 | 0 | 0 | 0 |
| +79.5 | +7.62° | 1 | 0 | 0 | 0 | 0 | 0 | 0 | 0 |
| +80.5 | +7.72° | 0 | 0 | 0 | 0 | 0 | 0 | 0 | 1 |
| +81.5 | +7.81° | 0 | 0 | 0 | 0 | 0 | 1 | 1 | 1 |
| +82.5 | +7.91° | 0 | 0 | 0 | 1 | 1 | 1 | 1 | 1 |
| +83.5 | +8.01° | 0 | 0 | 1 | 1 | 1 | 1 | 1 | 1 |
| +84.5 | +8.10° | 1 | 1 | 1 | 1 | 1 | 1 | 1 | 0 |
| +85.5 | +8.20° | 1 | 1 | 1 | 1 | 1 | 0 | 0 | 0 |
| +86.5 | +8.30° | 1 | 1 | 1 | 1 | 0 | 0 | 0 | 0 |
| +87.5 | +8.39° | 1 | 1 | 0 | 0 | 0 | 0 | 0 | 0 |
| +88.5 | +8.49° | 0 | 0 | 0 | 0 | 0 | 0 | 0 | 1 |
| +89.5 | +8.59° | 0 | 0 | 0 | 0 | 0 | 1 | 1 | 1 |
| +90.5 | +8.68° | 0 | 0 | 0 | 0 | 1 | 1 | 1 | 1 |
| +91.5 | +8.78° | 0 | 0 | 1 | 1 | 1 | 1 | 1 | 1 |
| +92.5 | +8.88° | 0 | 1 | 1 | 1 | 1 | 1 | 1 | 0 |
| +93.5 | +8.97° | 1 | 1 | 1 | 1 | 1 | 1 | 0 | 0 |
| +94.5 | +9.07° | 1 | 1 | 1 | 1 | 0 | 0 | 0 | 0 |
| +95.5 | +9.17° | 1 | 1 | 1 | 0 | 0 | 0 | 0 | 0 |
| +96.5 | +9.26° | 1 | 0 | 0 | 0 | 0 | 0 | 0 | 1 |
| +97.5 | +9.36° | 0 | 0 | 0 | 0 | 0 | 0 | 1 | 1 |
| +98.5 | +9.46° | 0 | 0 | 0 | 0 | 1 | 1 | 1 | 1 |
| +99.5 | +9.55° | 0 | 0 | 0 | 1 | 1 | 1 | 1 | 1 |

-continued

| | | | | | | | | | |
|---|---|---|---|---|---|---|---|---|---|
| +100.5 | +9.65° | 0 | 1 | 1 | 1 | 1 | 1 | 1 | 0 |
| +101.5 | +9.75° | 1 | 1 | 1 | 1 | 1 | 1 | 0 | 0 |
| +102.5 | +9.84° | 1 | 1 | 1 | 1 | 0 | 0 | 0 | 0 |
| +103.5 | +9.94° | 1 | 1 | 1 | 0 | 0 | 0 | 0 | 0 |
| +104.5 | +10.04° | 1 | 1 | 0 | 0 | 0 | 0 | 0 | 1 |
| +105.5 | +10.14° | 0 | 0 | 0 | 0 | 0 | 0 | 1 | 1 |
| +106.5 | +10.23° | 0 | 0 | 0 | 0 | 1 | 1 | 1 | 1 |
| +107.5 | +10.33° | 0 | 0 | 0 | 1 | 1 | 1 | 1 | 1 |
| +108.5 | +10.43° | 0 | 0 | 1 | 1 | 1 | 1 | 1 | 0 |
| +109.5 | +10.52° | 1 | 1 | 1 | 1 | 1 | 1 | 0 | 0 |
| +110.5 | +10.62° | 1 | 1 | 1 | 1 | 1 | 0 | 0 | 0 |
| +111.5 | +10.72° | 1 | 1 | 1 | 0 | 0 | 0 | 0 | 0 |
| +112.5 | +10.82° | 1 | 1 | 0 | 0 | 0 | 0 | 0 | 1 |
| +113.5 | +10.91° | 1 | 0 | 0 | 0 | 0 | 0 | 1 | 1 |
| +114.5 | +11.01° | 0 | 0 | 0 | 0 | 0 | 1 | 1 | 1 |
| +115.5 | +11.11° | 0 | 0 | 0 | 1 | 1 | 1 | 1 | 1 |
| +116.5 | +11.21° | 0 | 0 | 1 | 1 | 1 | 1 | 1 | 0 |
| +117.5 | +11.30° | 0 | 1 | 1 | 1 | 1 | 1 | 0 | 0 |
| +118.5 | +11.40° | 1 | 1 | 1 | 1 | 1 | 0 | 0 | 0 |
| +119.5 | +11.50° | 1 | 1 | 1 | 1 | 0 | 0 | 0 | 0 |
| +120.5 | +11.60° | 1 | 1 | 0 | 0 | 0 | 0 | 0 | 1 |
| +121.5 | +11.69° | 1 | 0 | 0 | 0 | 0 | 0 | 1 | 1 |
| +122.5 | +11.79° | 0 | 0 | 0 | 0 | 0 | 1 | 1 | 1 |
| +123.5 | +11.89° | 0 | 0 | 0 | 0 | 1 | 1 | 1 | 1 |
| +124.5 | +11.99° | 0 | 0 | 0 | 1 | 1 | 1 | 1 | 0 |
| +125.5 | +12.08° | 0 | 1 | 1 | 1 | 1 | 1 | 0 | 0 |
| +126.5 | +12.18° | 1 | 1 | 1 | 1 | 1 | 0 | 0 | 0 |
| +127.5 | +12.28° | 1 | 1 | 1 | 1 | 0 | 0 | 0 | 0 |
| +128.5 | +12.38° | 1 | 1 | 1 | 0 | 0 | 0 | 0 | 1 |
| +129.5 | +12.47° | 1 | 1 | 0 | 0 | 0 | 0 | 1 | 1 |
| +130.5 | +12.57° | 1 | 0 | 0 | 0 | 0 | 1 | 1 | 1 |
| +131.5 | +12.67° | 0 | 0 | 0 | 0 | 1 | 1 | 1 | 1 |
| +132.5 | +12.77° | 0 | 0 | 0 | 1 | 1 | 1 | 1 | 0 |
| +133.5 | +12.87° | 0 | 0 | 1 | 1 | 1 | 1 | 0 | 0 |
| +134.5 | +12.96° | 0 | 1 | 1 | 1 | 1 | 0 | 0 | 0 |
| +135.5 | +13.06° | 1 | 1 | 1 | 1 | 0 | 0 | 0 | 0 |
| +136.5 | +13.16° | 1 | 1 | 1 | 0 | 0 | 0 | 0 | 1 |
| +137.5 | +13.26° | 1 | 1 | 0 | 0 | 0 | 0 | 1 | 1 |
| +138.5 | +13.36° | 1 | 0 | 0 | 0 | 0 | 1 | 1 | 1 |
| +139.5 | +13.46° | 0 | 0 | 0 | 0 | 1 | 1 | 1 | 1 |
| +140.5 | +13.55° | 0 | 0 | 0 | 1 | 1 | 1 | 1 | 0 |
| +141.5 | +13.65° | 0 | 0 | 1 | 1 | 1 | 1 | 0 | 0 |
| +142.5 | +13.75° | 0 | 1 | 1 | 1 | 1 | 0 | 0 | 0 |
| +143.5 | +13.85° | 1 | 1 | 1 | 1 | 0 | 0 | 0 | 0 |
| +144.5 | +13.95° | 1 | 1 | 1 | 0 | 0 | 0 | 0 | 1 |
| +145.5 | +14.05° | 1 | 1 | 0 | 0 | 0 | 0 | 1 | 1 |
| +146.5 | +14.14° | 1 | 0 | 0 | 0 | 0 | 1 | 1 | 1 |
| +147.5 | +14.24° | 0 | 0 | 0 | 0 | 1 | 1 | 1 | 1 |
| +148.5 | +14.34° | 0 | 0 | 0 | 1 | 1 | 1 | 1 | 0 |
| +149.5 | +14.44° | 0 | 0 | 1 | 1 | 1 | 1 | 0 | 0 |
| +150.5 | +14.54° | 0 | 0 | 1 | 1 | 1 | 1 | 0 | 0 |
| +151.5 | +14.64° | 0 | 1 | 1 | 1 | 1 | 0 | 0 | 0 |
| +152.5 | +14.74° | 1 | 1 | 1 | 1 | 0 | 0 | 0 | 0 |
| +153.5 | +14.84° | 1 | 1 | 1 | 0 | 0 | 0 | 0 | 1 |
| +154.5 | +14.93° | 1 | 1 | 0 | 0 | 0 | 0 | 1 | 1 |
| +155.5 | +15.03° | 1 | 0 | 0 | 0 | 0 | 1 | 1 | 1 |
| +156.5 | +15.13° | 0 | 0 | 0 | 0 | 1 | 1 | 1 | 1 |
| +157.5 | +15.23° | 0 | 0 | 0 | 1 | 1 | 1 | 1 | 0 |
| +158.5 | +15.33° | 0 | 0 | 1 | 1 | 1 | 1 | 0 | 0 |
| +159.5 | +15.43° | 0 | 1 | 1 | 1 | 1 | 0 | 0 | 0 |
| +160.5 | +15.53° | 1 | 1 | 1 | 1 | 0 | 0 | 0 | 0 |
| +161.5 | +15.63° | 1 | 1 | 1 | 0 | 0 | 0 | 0 | 1 |
| +162.5 | +15.73° | 1 | 1 | 0 | 0 | 0 | 0 | 1 | 1 |
| +163.5 | +15.83° | 1 | 0 | 0 | 0 | 0 | 1 | 1 | 1 |
| +164.5 | +15.93° | 0 | 0 | 0 | 0 | 1 | 1 | 1 | 1 |
| +165.5 | +16.03° | 0 | 0 | 0 | 1 | 1 | 1 | 1 | 0 |
| +166.5 | +16.12° | 0 | 0 | 1 | 1 | 1 | 1 | 0 | 0 |
| +167.5 | +16.22° | 0 | 1 | 1 | 1 | 1 | 0 | 0 | 0 |
| +168.5 | +16.32° | 1 | 1 | 1 | 1 | 0 | 0 | 0 | 0 |
| +169.5 | +16.42° | 1 | 1 | 1 | 0 | 0 | 0 | 0 | 0 |
| +170.5 | +16.52° | 1 | 1 | 0 | 0 | 0 | 0 | 1 | 1 |
| +171.5 | +16.62° | 1 | 0 | 0 | 0 | 0 | 1 | 1 | 1 |
| +172.5 | +16.72° | 1 | 0 | 0 | 0 | 1 | 1 | 1 | 1 |
| +173.5 | +16.82° | 0 | 0 | 0 | 1 | 1 | 1 | 1 | 0 |
| +174.5 | +16.92° | 0 | 0 | 1 | 1 | 1 | 1 | 0 | 0 |
| +175.5 | +17.02° | 0 | 0 | 1 | 1 | 1 | 0 | 0 | 0 |
| +176.5 | +17.12° | 0 | 1 | 1 | 1 | 0 | 0 | 0 | 0 |
| +177.5 | +17.22° | 1 | 1 | 1 | 0 | 0 | 0 | 0 | 1 |
| +178.5 | +17.32° | 1 | 1 | 1 | 0 | 0 | 0 | 1 | 1 |

-continued

| | | | | | | | | | |
|---|---|---|---|---|---|---|---|---|---|
| +179.5 | +17.42° | 1 | 1 | 0 | 0 | 0 | 1 | 1 | 1 |
| +180.5 | +17.52° | 1 | 0 | 0 | 0 | 1 | 1 | 1 | 1 |
| +181.5 | +17.62° | 0 | 0 | 0 | 1 | 1 | 1 | 1 | 0 |
| +182.5 | +17.72° | 0 | 0 | 0 | 1 | 1 | 1 | 0 | 0 |
| +183.5 | +17.82° | 0 | 0 | 1 | 1 | 1 | 0 | 0 | 0 |
| +184.5 | +17.92° | 0 | 1 | 1 | 1 | 0 | 0 | 0 | 0 |
| +185.5 | +18.02° | 1 | 1 | 1 | 1 | 0 | 0 | 0 | 1 |
| +186.5 | +18.13° | 1 | 1 | 1 | 0 | 0 | 0 | 1 | 1 |
| +187.5 | +18.23° | 1 | 1 | 0 | 0 | 0 | 1 | 1 | 1 |
| +188.5 | +18.33° | 1 | 0 | 0 | 0 | 1 | 1 | 1 | 1 |
| +189.5 | +18.43° | 0 | 0 | 0 | 0 | 1 | 1 | 1 | 0 |
| +190.5 | +18.53° | 0 | 0 | 0 | 1 | 1 | 1 | 0 | 0 |
| +191.5 | +18.63° | 0 | 0 | 1 | 1 | 1 | 0 | 0 | 0 |
| +192.5 | +18.73° | 0 | 1 | 1 | 1 | 0 | 0 | 0 | 0 |
| +193.5 | +18.83° | 0 | 1 | 1 | 1 | 0 | 0 | 0 | 1 |
| +194.5 | +18.93° | 1 | 1 | 1 | 0 | 0 | 0 | 1 | 1 |
| +195.5 | +19.03° | 1 | 1 | 0 | 0 | 0 | 1 | 1 | 1 |
| +196.5 | +19.13° | 1 | 1 | 0 | 0 | 0 | 1 | 1 | 1 |
| +197.5 | +19.23° | 1 | 0 | 0 | 0 | 1 | 1 | 1 | 0 |
| +198.5 | +19.34° | 0 | 0 | 0 | 1 | 1 | 1 | 0 | 0 |
| +199.5 | +19.44° | 0 | 0 | 1 | 1 | 1 | 0 | 0 | 0 |
| +200.5 | +19.54° | 0 | 0 | 1 | 1 | 1 | 0 | 0 | 0 |
| +201.5 | +19.64° | 0 | 1 | 1 | 1 | 0 | 0 | 0 | 1 |
| +202.5 | +19.74° | 1 | 1 | 1 | 0 | 0 | 0 | 1 | 1 |
| +203.5 | +19.84° | 1 | 1 | 0 | 0 | 0 | 1 | 1 | 1 |
| +204.5 | +19.94° | 1 | 1 | 0 | 0 | 0 | 1 | 1 | 1 |
| +205.5 | +20.05° | 1 | 0 | 0 | 0 | 1 | 1 | 1 | 0 |
| +206.5 | +20.15° | 0 | 0 | 0 | 1 | 1 | 1 | 0 | 0 |
| +207.5 | +20.25° | 0 | 0 | 0 | 1 | 1 | 0 | 0 | 0 |
| +208.5 | +20.35° | 0 | 0 | 1 | 1 | 1 | 0 | 0 | 0 |
| +209.5 | +20.45° | 0 | 1 | 1 | 1 | 0 | 0 | 0 | 1 |
| +210.5 | +20.56° | 0 | 1 | 1 | 0 | 0 | 0 | 1 | 1 |
| +211.5 | +20.66° | 1 | 1 | 1 | 0 | 0 | 0 | 1 | 1 |
| +212.5 | +20.76° | 1 | 1 | 0 | 0 | 0 | 1 | 1 | 1 |
| +213.5 | +20.86° | 1 | 0 | 0 | 0 | 1 | 1 | 1 | 0 |
| +214.5 | +20.97° | 1 | 0 | 0 | 1 | 1 | 1 | 0 | 0 |
| +215.5 | +21.07° | 0 | 0 | 0 | 1 | 1 | 1 | 0 | 0 |
| +216.5 | +21.17° | 0 | 0 | 1 | 1 | 1 | 0 | 0 | 0 |
| +217.5 | +21.27° | 0 | 1 | 1 | 1 | 0 | 0 | 0 | 1 |
| +218.5 | +21.37° | 0 | 1 | 1 | 1 | 0 | 0 | 1 | 1 |
| +219.5 | +21.48° | 1 | 1 | 1 | 0 | 0 | 0 | 1 | 1 |
| +220.5 | +21.58° | 1 | 1 | 0 | 0 | 0 | 1 | 1 | 1 |
| +221.5 | +21.68° | 1 | 1 | 0 | 0 | 1 | 1 | 1 | 0 |
| +222.5 | +21.79° | 1 | 0 | 0 | 0 | 1 | 1 | 0 | 0 |
| +223.5 | +21.89° | 0 | 0 | 0 | 1 | 1 | 1 | 0 | 0 |
| +224.5 | +21.99° | 0 | 0 | 1 | 1 | 1 | 0 | 0 | 0 |
| +225.5 | +22.10° | 0 | 0 | 1 | 1 | 0 | 0 | 0 | 1 |
| +226.5 | +22.20° | 0 | 1 | 1 | 1 | 0 | 0 | 1 | 1 |
| +227.5 | +22.30° | 1 | 1 | 1 | 0 | 0 | 0 | 1 | 1 |
| +228.5 | +22.40° | 1 | 1 | 0 | 0 | 0 | 1 | 1 | 1 |
| +229.5 | +22.51° | 1 | 1 | 0 | 0 | 1 | 1 | 1 | 0 |
| +230.5 | +22.61° | 1 | 0 | 0 | 0 | 1 | 1 | 0 | 0 |
| +231.5 | +22.72° | 1 | 0 | 0 | 1 | 1 | 1 | 0 | 0 |
| +232.5 | +22.82° | 0 | 0 | 0 | 1 | 1 | 0 | 0 | 0 |
| +233.5 | +22.92° | 0 | 0 | 1 | 1 | 0 | 0 | 0 | 1 |
| +234.5 | +23.03° | 0 | 1 | 1 | 1 | 0 | 0 | 1 | 1 |
| +235.5 | +23.13° | 0 | 1 | 1 | 0 | 0 | 0 | 1 | 1 |
| +236.5 | +23.23° | 1 | 1 | 1 | 0 | 0 | 1 | 1 | 1 |
| +237.5 | +23.34° | 1 | 1 | 0 | 0 | 0 | 1 | 1 | 0 |
| +238.5 | +23.44° | 1 | 0 | 0 | 0 | 1 | 1 | 0 | 0 |
| +239.5 | +23.55° | 1 | 0 | 0 | 1 | 1 | 1 | 0 | 0 |
| +240.5 | +23.65° | 0 | 0 | 0 | 1 | 1 | 0 | 0 | 0 |
| +241.5 | +23.76° | 0 | 0 | 1 | 1 | 1 | 0 | 0 | 1 |
| +242.5 | +23.86° | 0 | 0 | 1 | 1 | 0 | 0 | 1 | 1 |
| +243.5 | +23.96° | 0 | 1 | 1 | 0 | 0 | 0 | 1 | 1 |
| +244.5 | +24.07° | 1 | 1 | 1 | 0 | 0 | 1 | 1 | 1 |
| +245.5 | +24.17° | 1 | 1 | 0 | 0 | 0 | 1 | 1 | 0 |
| +246.5 | +24.28° | 1 | 1 | 0 | 0 | 1 | 1 | 0 | 0 |
| +247.5 | +24.38° | 1 | 0 | 0 | 1 | 1 | 1 | 0 | 0 |
| +248.5 | +24.49° | 0 | 0 | 0 | 1 | 1 | 0 | 0 | 0 |
| +249.5 | +24.59° | 0 | 0 | 1 | 1 | 1 | 0 | 0 | 1 |
| +250.5 | +24.70° | 0 | 0 | 1 | 1 | 0 | 0 | 0 | 1 |
| +251.5 | +24.80° | 0 | 1 | 1 | 1 | 0 | 0 | 1 | 1 |
| +252.5 | +24.91° | 0 | 1 | 1 | 0 | 0 | 1 | 1 | 1 |
| +253.5 | +25.01° | 1 | 1 | 0 | 0 | 0 | 1 | 1 | 0 |
| +254.5 | +25.12° | 1 | 1 | 0 | 0 | 1 | 1 | 1 | 0 |
| +255.5 | +25.23° | 1 | 0 | 0 | 0 | 1 | 1 | 0 | 0 |
| +256.5 | +25.33° | 1 | 0 | 0 | 1 | 1 | 0 | 0 | 0 |
| +257.5 | +25.44° | 0 | 0 | 1 | 1 | 1 | 0 | 0 | 1 |

-continued

| | | | | | | | | | |
|---|---|---|---|---|---|---|---|---|---|
| +258.5 | +25.54° | 0 | 0 | 1 | 1 | 0 | 0 | 0 | 1 |
| +259.5 | +25.65° | 0 | 1 | 1 | 1 | 0 | 0 | 1 | 1 |
| +260.5 | +25.76° | 0 | 1 | 1 | 0 | 0 | 1 | 1 | 1 |
| +261.5 | +25.86° | 1 | 1 | 1 | 0 | 0 | 1 | 1 | 0 |
| +262.5 | +25.97° | 1 | 1 | 0 | 0 | 1 | 1 | 1 | 0 |
| +263.5 | +26.07° | 1 | 0 | 0 | 0 | 1 | 1 | 0 | 0 |
| +264.5 | +26.18° | 1 | 0 | 0 | 1 | 1 | 0 | 0 | 0 |
| +265.5 | +26.29° | 0 | 0 | 0 | 1 | 1 | 0 | 0 | 1 |
| +266.5 | +26.39° | 0 | 0 | 1 | 1 | 0 | 0 | 0 | 1 |
| +267.5 | +26.50° | 0 | 0 | 1 | 1 | 0 | 0 | 1 | 1 |
| +268.5 | +26.61° | 0 | 1 | 1 | 0 | 0 | 1 | 1 | 1 |
| +269.5 | +26.71° | 1 | 1 | 1 | 0 | 0 | 1 | 1 | 0 |
| +270.5 | +26.82° | 1 | 1 | 0 | 0 | 1 | 1 | 1 | 0 |
| +271.5 | +26.93° | 1 | 1 | 0 | 0 | 1 | 1 | 0 | 0 |
| +272.5 | +27.04° | 1 | 0 | 0 | 1 | 1 | 1 | 0 | 0 |
| +273.5 | +27.14° | 1 | 0 | 0 | 1 | 1 | 0 | 0 | 1 |
| +274.5 | +27.25° | 0 | 0 | 1 | 1 | 0 | 0 | 0 | 1 |
| +275.5 | +27.36° | 0 | 0 | 1 | 1 | 0 | 0 | 1 | 1 |
| +276.5 | +27.47° | 0 | 1 | 1 | 0 | 0 | 0 | 1 | 1 |
| +277.5 | +27.57° | 0 | 1 | 1 | 0 | 0 | 1 | 1 | 0 |
| +278.5 | +27.68° | 1 | 1 | 0 | 0 | 1 | 1 | 1 | 0 |
| +279.5 | +27.79° | 1 | 1 | 0 | 0 | 1 | 1 | 0 | 0 |
| +280.5 | +27.90° | 1 | 0 | 0 | 1 | 1 | 1 | 0 | 0 |
| +281.5 | +28.01° | 1 | 0 | 0 | 1 | 1 | 0 | 0 | 1 |
| +282.5 | +28.11° | 0 | 0 | 1 | 1 | 1 | 0 | 0 | 1 |
| +283.5 | +28.22° | 0 | 0 | 1 | 1 | 0 | 0 | 1 | 1 |
| +284.5 | +28.33° | 0 | 1 | 1 | 1 | 0 | 0 | 1 | 1 |
| +285.5 | +28.44° | 0 | 1 | 1 | 0 | 0 | 1 | 1 | 0 |
| +286.5 | +28.55° | 1 | 1 | 1 | 0 | 0 | 1 | 1 | 0 |
| +287.5 | +28.66° | 1 | 1 | 0 | 0 | 1 | 1 | 0 | 0 |
| +288.5 | +28.77° | 1 | 1 | 0 | 0 | 1 | 1 | 0 | 0 |
| +289.5 | +28.88° | 1 | 0 | 0 | 1 | 1 | 0 | 0 | 1 |
| +290.5 | +28.98° | 1 | 0 | 0 | 1 | 1 | 0 | 0 | 1 |
| +291.5 | +29.09° | 0 | 0 | 1 | 1 | 0 | 0 | 1 | 1 |
| +292.5 | +29.20° | 0 | 0 | 1 | 1 | 0 | 0 | 1 | 1 |
| +293.5 | +29.31° | 0 | 1 | 1 | 0 | 0 | 1 | 1 | 0 |
| +294.5 | +29.42° | 0 | 1 | 1 | 0 | 0 | 1 | 1 | 0 |
| +295.5 | +29.53° | 1 | 1 | 0 | 0 | 1 | 1 | 0 | 0 |
| +296.5 | +29.64° | 1 | 1 | 0 | 0 | 1 | 1 | 0 | 0 |
| +297.5 | +29.75° | 1 | 0 | 0 | 1 | 1 | 0 | 0 | 1 |
| +298.5 | +29.86° | 1 | 0 | 0 | 1 | 1 | 0 | 0 | 1 |
| +299.5 | +29.97° | 0 | 0 | 1 | 1 | 0 | 0 | 1 | 1 |
| +300.5 | +30.08° | 0 | 0 | 1 | 1 | 0 | 0 | 1 | 1 |
| +301.5 | +30.19° | 0 | 1 | 1 | 0 | 0 | 1 | 1 | 0 |
| +302.5 | +30.30° | 0 | 1 | 1 | 0 | 0 | 1 | 1 | 0 |
| +303.5 | +30.41° | 1 | 1 | 0 | 0 | 1 | 1 | 0 | 0 |
| +304.5 | +30.53° | 1 | 1 | 0 | 0 | 1 | 1 | 0 | 0 |
| +305.5 | +30.64° | 1 | 0 | 0 | 1 | 1 | 0 | 0 | 1 |
| +306.5 | +30.75° | 1 | 0 | 0 | 1 | 1 | 0 | 0 | 1 |
| +307.5 | +30.86° | 0 | 0 | 1 | 1 | 0 | 0 | 1 | 1 |
| +308.5 | +30.97° | 0 | 0 | 1 | 1 | 0 | 0 | 1 | 1 |
| +309.5 | +31.08° | 0 | 1 | 1 | 0 | 0 | 1 | 1 | 0 |
| +310.5 | +31.19° | 0 | 1 | 1 | 0 | 0 | 1 | 1 | 0 |
| +311.5 | +31.31° | 0 | 1 | 0 | 0 | 1 | 1 | 0 | 0 |
| +312.5 | +31.42° | 1 | 1 | 0 | 0 | 1 | 1 | 0 | 0 |
| +313.5 | +31.53° | 1 | 1 | 0 | 1 | 1 | 0 | 0 | 1 |
| +314.5 | +31.64° | 1 | 0 | 0 | 1 | 1 | 0 | 0 | 1 |
| +315.5 | +31.75° | 1 | 0 | 0 | 1 | 0 | 0 | 1 | 1 |
| +316.5 | +31.87° | 0 | 0 | 1 | 1 | 0 | 0 | 1 | 1 |
| +317.5 | +31.98° | 0 | 0 | 1 | 1 | 0 | 1 | 1 | 0 |
| +318.5 | +32.09° | 0 | 1 | 1 | 0 | 0 | 1 | 1 | 0 |
| +319.5 | +32.20° | 0 | 1 | 1 | 0 | 1 | 1 | 0 | 0 |
| +320.5 | +32.32° | 1 | 1 | 0 | 0 | 1 | 1 | 0 | 0 |
| +321.5 | +32.43° | 1 | 1 | 0 | 0 | 1 | 0 | 0 | 1 |
| +322.5 | +32.54° | 1 | 0 | 0 | 1 | 1 | 0 | 0 | 1 |
| +323.5 | +32.66° | 1 | 0 | 0 | 1 | 1 | 0 | 1 | 1 |
| +324.5 | +32.77° | 0 | 0 | 1 | 1 | 0 | 0 | 1 | 1 |
| +325.5 | +32.88° | 0 | 0 | 1 | 1 | 0 | 1 | 1 | 0 |
| +326.5 | +33.00° | 0 | 1 | 1 | 0 | 0 | 1 | 1 | 0 |
| +327.5 | +33.11° | 0 | 1 | 1 | 0 | 0 | 1 | 0 | 0 |
| +328.5 | +33.23° | 1 | 1 | 0 | 0 | 1 | 1 | 0 | 0 |
| +329.5 | +33.34° | 1 | 1 | 0 | 0 | 1 | 0 | 0 | 1 |
| +330.5 | +33.46° | 1 | 0 | 0 | 1 | 1 | 0 | 0 | 1 |
| +331.5 | +33.57° | 1 | 0 | 0 | 1 | 1 | 0 | 1 | 1 |
| +332.5 | +33.69° | 1 | 0 | 1 | 1 | 0 | 0 | 1 | 1 |
| +333.5 | +33.80° | 0 | 0 | 1 | 1 | 0 | 0 | 1 | 0 |
| +334.5 | +33.92° | 0 | 1 | 1 | 0 | 0 | 1 | 1 | 0 |
| +335.5 | +34.03° | 0 | 1 | 1 | 0 | 0 | 1 | 0 | 0 |
| +336.5 | +34.15° | 0 | 1 | 0 | 0 | 1 | 1 | 0 | 0 |

-continued

| | | | | | | | | | |
|---|---|---|---|---|---|---|---|---|---|
| +337.5 | +34.26° | 1 | 1 | 0 | 0 | 1 | 1 | 0 | 1 |
| +338.5 | +34.38° | 1 | 1 | 0 | 1 | 1 | 0 | 0 | 1 |
| +339.5 | +34.49° | 1 | 0 | 0 | 1 | 1 | 0 | 1 | 1 |
| +340.5 | +34.61° | 1 | 0 | 1 | 1 | 0 | 0 | 1 | 1 |
| +341.5 | +34.73° | 0 | 0 | 1 | 1 | 0 | 0 | 1 | 0 |
| +342.5 | +34.84° | 0 | 0 | 1 | 0 | 0 | 1 | 1 | 0 |
| +343.5 | +34.96° | 0 | 1 | 1 | 0 | 0 | 1 | 0 | 0 |
| +344.5 | +35.07° | 0 | 1 | 1 | 0 | 1 | 1 | 0 | 0 |
| +345.5 | +35.19° | 1 | 1 | 0 | 0 | 1 | 1 | 0 | 1 |
| +346.5 | +35.31° | 1 | 1 | 0 | 1 | 1 | 0 | 0 | 1 |
| +347.5 | +35.43° | 1 | 0 | 0 | 1 | 1 | 0 | 1 | 1 |
| +348.5 | +35.54° | 1 | 0 | 0 | 1 | 0 | 0 | 1 | 1 |
| +349.5 | +35.66° | 0 | 0 | 1 | 1 | 0 | 0 | 1 | 0 |
| +350.5 | +35.78° | 0 | 0 | 1 | 1 | 0 | 1 | 1 | 0 |
| +351.5 | +35.90° | 0 | 1 | 1 | 0 | 0 | 1 | 1 | 0 |
| +352.5 | +36.01° | 0 | 1 | 1 | 0 | 1 | 1 | 0 | 0 |
| +353.5 | +36.13° | 0 | 1 | 0 | 0 | 1 | 1 | 0 | 1 |
| +354.5 | +36.25° | 1 | 1 | 0 | 0 | 1 | 0 | 0 | 1 |
| +355.5 | +36.37° | 1 | 0 | 0 | 1 | 1 | 0 | 0 | 1 |
| +356.5 | +36.49° | 1 | 0 | 0 | 1 | 0 | 0 | 1 | 1 |
| +357.5 | +36.61° | 1 | 0 | 1 | 1 | 0 | 0 | 1 | 0 |
| +358.5 | +36.73° | 0 | 0 | 1 | 1 | 0 | 1 | 1 | 0 |
| +359.5 | +36.85° | 0 | 0 | 1 | 0 | 0 | 1 | 1 | 0 |
| +360.5 | +36.97° | 0 | 1 | 1 | 0 | 1 | 1 | 0 | 0 |
| +361.5 | +37.09° | 0 | 1 | 0 | 0 | 1 | 1 | 0 | 1 |
| +362.5 | +37.21° | 1 | 1 | 0 | 0 | 1 | 0 | 0 | 1 |
| +363.5 | +37.33° | 1 | 1 | 0 | 1 | 1 | 0 | 0 | 1 |
| +364.5 | +37.45° | 1 | 0 | 0 | 1 | 1 | 0 | 1 | 1 |
| +365.5 | +37.57° | 1 | 0 | 1 | 1 | 0 | 0 | 1 | 0 |
| +366.5 | +37.69° | 0 | 0 | 1 | 1 | 0 | 1 | 1 | 0 |
| +367.5 | +37.81° | 0 | 0 | 1 | 0 | 0 | 1 | 1 | 0 |
| +368.5 | +37.93° | 0 | 1 | 1 | 0 | 0 | 1 | 0 | 0 |
| +369.5 | +38.05° | 0 | 1 | 1 | 0 | 1 | 1 | 0 | 1 |
| +370.5 | +38.17° | 0 | 1 | 0 | 0 | 1 | 0 | 0 | 1 |
| +371.5 | +38.29° | 1 | 1 | 0 | 1 | 1 | 0 | 0 | 1 |
| +372.5 | +38.41° | 1 | 0 | 0 | 1 | 1 | 0 | 1 | 1 |
| +373.5 | +38.54° | 1 | 0 | 0 | 1 | 0 | 0 | 1 | 0 |
| +374.5 | +38.66° | 1 | 0 | 1 | 1 | 0 | 1 | 1 | 0 |
| +375.5 | +38.78° | 0 | 0 | 1 | 0 | 0 | 1 | 1 | 0 |
| +376.5 | +38.90° | 0 | 1 | 1 | 0 | 0 | 1 | 0 | 0 |
| +377.5 | +39.03° | 0 | 1 | 1 | 0 | 1 | 1 | 0 | 1 |
| +378.5 | +39.15° | 0 | 1 | 0 | 0 | 1 | 0 | 0 | 1 |
| +379.5 | +39.27° | 1 | 1 | 0 | 1 | 1 | 0 | 0 | 1 |
| +380.5 | +39.40° | 1 | 0 | 0 | 1 | 1 | 0 | 1 | 1 |
| +381.5 | +39.52° | 1 | 0 | 0 | 1 | 0 | 0 | 1 | 0 |
| +382.5 | +39.65° | 1 | 0 | 1 | 1 | 0 | 1 | 1 | 0 |
| +383.5 | +39.77° | 0 | 0 | 1 | 1 | 0 | 1 | 1 | 0 |
| +384.5 | +39.89° | 0 | 0 | 1 | 0 | 0 | 1 | 0 | 0 |
| +385.5 | +40.02° | 0 | 1 | 1 | 0 | 1 | 1 | 0 | 1 |
| +386.5 | +40.14° | 0 | 1 | 0 | 0 | 1 | 0 | 0 | 1 |
| +387.5 | +40.27° | 1 | 1 | 0 | 0 | 1 | 0 | 0 | 1 |
| +388.5 | +40.39° | 1 | 1 | 0 | 1 | 1 | 0 | 1 | 1 |
| +389.5 | +40.52° | 1 | 0 | 0 | 1 | 0 | 0 | 1 | 0 |
| +390.5 | +40.65° | 1 | 0 | 1 | 0 | 0 | 0 | 1 | 0 |
| +391.5 | +40.77° | 1 | 0 | 1 | 1 | 0 | 1 | 1 | 0 |
| +392.5 | +40.90° | 0 | 0 | 1 | 0 | 0 | 1 | 0 | 0 |
| +393.5 | +41.02° | 0 | 1 | 1 | 0 | 1 | 1 | 0 | 1 |
| +394.5 | +41.15° | 0 | 1 | 0 | 0 | 1 | 1 | 0 | 1 |
| +395.5 | +41.28° | 0 | 1 | 0 | 0 | 1 | 0 | 0 | 1 |
| +396.5 | +41.41° | 1 | 1 | 0 | 1 | 1 | 0 | 1 | 1 |
| +397.5 | +41.53° | 1 | 0 | 0 | 1 | 0 | 0 | 1 | 0 |
| +398.5 | +41.66° | 1 | 0 | 0 | 1 | 0 | 0 | 1 | 0 |
| +399.5 | +41.79° | 1 | 0 | 1 | 1 | 0 | 1 | 1 | 0 |
| +400.5 | +41.92° | 0 | 0 | 1 | 0 | 0 | 1 | 0 | 0 |
| +401.5 | +42.05° | 0 | 1 | 1 | 0 | 1 | 1 | 0 | 1 |
| +402.5 | +42.17° | 0 | 1 | 1 | 0 | 1 | 1 | 0 | 1 |
| +403.5 | +42.30° | 0 | 1 | 0 | 0 | 1 | 0 | 0 | 1 |
| +404.5 | +42.43° | 1 | 1 | 0 | 1 | 1 | 0 | 1 | 1 |
| +405.5 | +42.56° | 1 | 1 | 0 | 1 | 0 | 0 | 1 | 0 |
| +406.5 | +42.69° | 1 | 0 | 0 | 1 | 0 | 0 | 1 | 0 |
| +407.5 | +42.82° | 1 | 0 | 1 | 1 | 0 | 1 | 1 | 0 |
| +408.5 | +42.95° | 0 | 0 | 1 | 0 | 0 | 1 | 0 | 0 |
| +409.5 | +43.08° | 0 | 0 | 1 | 0 | 0 | 1 | 0 | 1 |
| +410.5 | +43.21° | 0 | 1 | 1 | 0 | 1 | 1 | 0 | 1 |
| +411.5 | +43.35° | 0 | 1 | 0 | 0 | 1 | 0 | 0 | 1 |
| +412.5 | +43.48° | 0 | 1 | 0 | 1 | 1 | 0 | 1 | 1 |
| +413.5 | +43.61° | 1 | 1 | 0 | 1 | 1 | 0 | 1 | 0 |
| +414.5 | +43.74° | 1 | 0 | 0 | 1 | 0 | 0 | 1 | 0 |
| +415.5 | +43.87° | 1 | 0 | 1 | 1 | 0 | 1 | 1 | 0 |

-continued

| | | | | | | | | | |
|---|---|---|---|---|---|---|---|---|---|
| +416.5 | +44.01° | 1 | 0 | 1 | 0 | 0 | 1 | 0 | 0 |
| +417.5 | +44.14° | 0 | 0 | 1 | 0 | 0 | 1 | 0 | 1 |
| +418.5 | +44.27° | 0 | 1 | 1 | 0 | 1 | 1 | 0 | 1 |
| +419.5 | +44.41° | 0 | 1 | 0 | 0 | 1 | 0 | 0 | 1 |
| +420.5 | +44.54° | 0 | 1 | 0 | 0 | 1 | 0 | 1 | 1 |
| +421.5 | +44.68° | 1 | 1 | 0 | 1 | 1 | 0 | 1 | 0 |
| +422.5 | +44.81° | 1 | 0 | 0 | 1 | 0 | 0 | 1 | 0 |
| +423.5 | +44.94° | 1 | 0 | 0 | 1 | 0 | 1 | 1 | 0 |
| +424.5 | +45.08° | 1 | 0 | 1 | 1 | 0 | 1 | 0 | 0 |
| +425.5 | +45.22° | 0 | 0 | 1 | 0 | 0 | 1 | 0 | 1 |
| +426.5 | +45.35° | 0 | 1 | 1 | 0 | 1 | 1 | 0 | 1 |
| +427.5 | +45.49° | 0 | 1 | 1 | 0 | 1 | 0 | 0 | 1 |
| +428.5 | +45.62° | 0 | 1 | 0 | 0 | 1 | 0 | 1 | 1 |
| +429.5 | +45.76° | 1 | 1 | 0 | 1 | 1 | 0 | 1 | 0 |
| +430.5 | +45.90° | 1 | 1 | 0 | 1 | 0 | 0 | 1 | 0 |
| +431.5 | +46.04° | 1 | 0 | 0 | 1 | 0 | 1 | 1 | 0 |
| +432.5 | +46.17° | 1 | 0 | 1 | 1 | 0 | 1 | 0 | 0 |
| +433.5 | +46.31° | 1 | 0 | 1 | 0 | 0 | 1 | 0 | 1 |
| +434.5 | +46.45° | 0 | 0 | 1 | 0 | 1 | 1 | 0 | 1 |
| +435.5 | +46.59° | 0 | 1 | 1 | 0 | 1 | 0 | 0 | 1 |
| +436.5 | +46.73° | 0 | 1 | 0 | 0 | 1 | 0 | 1 | 1 |
| +437.5 | +46.87° | 0 | 1 | 0 | 1 | 1 | 0 | 1 | 0 |
| +438.5 | +47.01° | 1 | 1 | 0 | 1 | 0 | 0 | 1 | 0 |
| +439.5 | +47.15° | 1 | 0 | 0 | 1 | 0 | 1 | 1 | 0 |
| +440.5 | +47.29° | 1 | 0 | 1 | 1 | 0 | 1 | 0 | 0 |
| +441.5 | +47.43° | 1 | 0 | 1 | 0 | 0 | 1 | 0 | 1 |
| +442.5 | +47.57° | 0 | 0 | 1 | 0 | 1 | 1 | 0 | 1 |
| +443.5 | +47.71° | 0 | 1 | 1 | 0 | 1 | 0 | 0 | 1 |
| +444.5 | +47.86° | 0 | 1 | 0 | 0 | 1 | 0 | 1 | 1 |
| +445.5 | +48.00° | 0 | 1 | 0 | 1 | 1 | 0 | 1 | 0 |
| +446.5 | +48.14° | 1 | 1 | 0 | 1 | 0 | 0 | 1 | 0 |
| +447.5 | +48.28° | 1 | 0 | 0 | 1 | 0 | 1 | 1 | 0 |
| +448.5 | +48.43° | 1 | 0 | 1 | 1 | 0 | 1 | 0 | 0 |
| +449.5 | +48.57° | 1 | 0 | 1 | 0 | 0 | 1 | 0 | 1 |
| +450.5 | +48.72° | 1 | 0 | 1 | 0 | 0 | 1 | 0 | 1 |
| +451.5 | +48.86° | 0 | 0 | 1 | 0 | 1 | 1 | 0 | 1 |
| +452.5 | +49.01° | 0 | 1 | 1 | 0 | 1 | 0 | 0 | 1 |
| +453.5 | +49.15° | 0 | 1 | 0 | 0 | 1 | 0 | 1 | 1 |
| +454.5 | +49.30° | 0 | 1 | 0 | 1 | 1 | 0 | 1 | 0 |
| +455.5 | +49.45° | 1 | 1 | 0 | 1 | 0 | 0 | 1 | 0 |
| +456.5 | +49.59° | 1 | 0 | 0 | 1 | 0 | 1 | 1 | 0 |
| +457.5 | +49.74° | 1 | 0 | 1 | 1 | 0 | 1 | 0 | 0 |
| +458.5 | +49.89° | 1 | 0 | 1 | 0 | 0 | 1 | 0 | 1 |
| +459.5 | +50.04° | 0 | 0 | 1 | 0 | 1 | 1 | 0 | 1 |
| +460.5 | +50.19° | 0 | 1 | 1 | 0 | 1 | 0 | 0 | 1 |
| +461.5 | +50.34° | 0 | 1 | 0 | 0 | 1 | 0 | 1 | 1 |
| +462.5 | +50.49° | 0 | 1 | 0 | 1 | 1 | 0 | 1 | 0 |
| +463.5 | +50.64° | 1 | 1 | 0 | 1 | 0 | 0 | 1 | 0 |
| +464.5 | +50.79° | 1 | 0 | 0 | 1 | 0 | 1 | 1 | 0 |
| +465.5 | +50.94° | 1 | 0 | 1 | 1 | 0 | 1 | 0 | 0 |
| +466.5 | +51.09° | 1 | 0 | 1 | 0 | 0 | 1 | 0 | 1 |
| +467.5 | +51.24° | 0 | 0 | 1 | 0 | 1 | 1 | 0 | 1 |
| +468.5 | +51.40° | 0 | 1 | 1 | 0 | 1 | 0 | 0 | 1 |
| +469.5 | +51.55° | 0 | 1 | 0 | 0 | 1 | 0 | 1 | 1 |
| +470.5 | +51.70° | 0 | 1 | 0 | 1 | 1 | 0 | 1 | 0 |
| +471.5 | +51.86° | 0 | 1 | 0 | 1 | 0 | 0 | 1 | 0 |
| +472.5 | +52.01° | 1 | 0 | 0 | 1 | 0 | 1 | 1 | 0 |
| +473.5 | +52.17° | 1 | 0 | 1 | 1 | 0 | 1 | 0 | 0 |
| +474.5 | +52.33° | 1 | 0 | 1 | 0 | 0 | 1 | 0 | 1 |
| +475.5 | +52.48° | 1 | 0 | 1 | 0 | 1 | 1 | 0 | 1 |
| +476.5 | +52.64° | 0 | 0 | 1 | 0 | 1 | 0 | 0 | 1 |
| +477.5 | +52.80° | 0 | 1 | 1 | 0 | 1 | 0 | 1 | 1 |
| +478.5 | +52.96° | 0 | 1 | 0 | 1 | 1 | 0 | 1 | 0 |
| +479.5 | +53.11° | 0 | 1 | 0 | 1 | 0 | 0 | 1 | 0 |
| +480.5 | +53.27° | 1 | 1 | 0 | 1 | 0 | 1 | 1 | 0 |
| +481.5 | +53.43° | 1 | 0 | 0 | 1 | 0 | 1 | 0 | 0 |
| +482.5 | +53.59° | 1 | 0 | 1 | 0 | 0 | 1 | 0 | 1 |
| +483.5 | +53.76° | 1 | 0 | 1 | 0 | 1 | 1 | 0 | 1 |
| +484.5 | +53.92° | 0 | 0 | 1 | 0 | 1 | 0 | 0 | 1 |
| +485.5 | +54.08° | 0 | 1 | 1 | 0 | 1 | 0 | 1 | 1 |
| +486.5 | +54.24° | 0 | 1 | 0 | 0 | 1 | 0 | 1 | 0 |
| +487.5 | +54.41° | 0 | 1 | 0 | 1 | 0 | 0 | 1 | 0 |
| +488.5 | +54.57° | 1 | 1 | 0 | 1 | 0 | 1 | 1 | 0 |
| +489.5 | +54.74° | 1 | 0 | 0 | 1 | 0 | 1 | 0 | 0 |
| +490.5 | +54.90° | 1 | 0 | 1 | 0 | 0 | 1 | 0 | 1 |
| +491.5 | +55.07° | 1 | 0 | 1 | 0 | 1 | 1 | 0 | 1 |
| +492.5 | +55.24° | 1 | 0 | 1 | 0 | 1 | 0 | 0 | 1 |
| +493.5 | +55.41° | 0 | 1 | 1 | 0 | 1 | 0 | 1 | 1 |
| +494.5 | +55.57° | 0 | 1 | 0 | 0 | 1 | 0 | 1 | 0 |

-continued

| | | | | | | | | | |
|---|---|---|---|---|---|---|---|---|---|
| +495.5 | +55.74° | 0 | 1 | 0 | 1 | 1 | 0 | 1 | 0 |
| +496.5 | +55.91° | 0 | 1 | 0 | 1 | 0 | 1 | 1 | 0 |
| +497.5 | +56.08° | 1 | 1 | 0 | 1 | 0 | 1 | 0 | 0 |
| +498.5 | +56.26° | 1 | 0 | 1 | 1 | 0 | 1 | 0 | 1 |
| +499.5 | +56.43° | 1 | 0 | 1 | 0 | 0 | 1 | 0 | 1 |
| +500.5 | +56.60° | 1 | 0 | 1 | 0 | 1 | 0 | 0 | 1 |
| +501.5 | +56.78° | 0 | 0 | 1 | 0 | 1 | 0 | 1 | 1 |
| +502.5 | +56.95° | 0 | 1 | 0 | 0 | 1 | 0 | 1 | 0 |
| +503.5 | +57.13° | 0 | 1 | 0 | 1 | 1 | 0 | 1 | 0 |
| +504.5 | +57.30° | 0 | 1 | 0 | 1 | 0 | 1 | 1 | 0 |
| +505.5 | +57.48° | 1 | 1 | 0 | 1 | 0 | 1 | 0 | 0 |
| +506.5 | +57.66° | 1 | 0 | 0 | 1 | 0 | 1 | 0 | 1 |
| +507.5 | +57.84° | 1 | 0 | 1 | 0 | 0 | 1 | 0 | 1 |
| +508.5 | +58.02° | 1 | 0 | 1 | 0 | 1 | 0 | 0 | 1 |
| +509.5 | +58.20° | 0 | 0 | 1 | 0 | 1 | 0 | 1 | 1 |
| +510.5 | +58.38° | 0 | 1 | 1 | 0 | 1 | 0 | 1 | 0 |
| +511.5 | +58.56° | 0 | 1 | 0 | 1 | 1 | 0 | 1 | 0 |
| +512.5 | +58.75° | 0 | 1 | 0 | 1 | 0 | 0 | 1 | 0 |
| +513.5 | +58.93° | 0 | 1 | 0 | 1 | 0 | 1 | 0 | 0 |
| +514.5 | +59.12° | 1 | 0 | 0 | 1 | 0 | 1 | 0 | 1 |
| +515.5 | +59.30° | 1 | 0 | 1 | 0 | 0 | 1 | 0 | 1 |
| +516.5 | +59.49° | 1 | 0 | 1 | 0 | 1 | 1 | 0 | 1 |
| +517.5 | +59.68° | 1 | 0 | 1 | 0 | 1 | 0 | 1 | 1 |
| +518.5 | +59.87° | 0 | 1 | 1 | 0 | 1 | 0 | 1 | 0 |
| +519.5 | +60.06° | 0 | 1 | 0 | 0 | 1 | 0 | 1 | 0 |
| +520.5 | +60.25° | 0 | 1 | 0 | 1 | 0 | 0 | 1 | 0 |
| +521.5 | +60.45° | 0 | 1 | 0 | 1 | 0 | 1 | 0 | 0 |
| +522.5 | +60.64° | 1 | 1 | 0 | 1 | 0 | 1 | 0 | 1 |
| +523.5 | +60.84° | 1 | 0 | 1 | 1 | 0 | 1 | 0 | 1 |
| +524.5 | +61.03° | 1 | 0 | 1 | 0 | 1 | 1 | 0 | 1 |
| +525.5 | +61.23° | 1 | 0 | 1 | 0 | 1 | 0 | 1 | 1 |
| +526.5 | +61.43° | 0 | 0 | 1 | 0 | 1 | 0 | 1 | 0 |
| +527.5 | +61.63° | 0 | 1 | 0 | 0 | 1 | 0 | 1 | 0 |
| +528.5 | +61.83° | 0 | 1 | 0 | 1 | 0 | 0 | 1 | 0 |
| +529.5 | +62.04° | 0 | 1 | 0 | 1 | 0 | 1 | 0 | 0 |
| +530.5 | +62.24° | 0 | 1 | 0 | 1 | 0 | 1 | 0 | 1 |
| +531.5 | +62.45° | 1 | 0 | 1 | 1 | 0 | 1 | 0 | 1 |
| +532.5 | +62.65° | 1 | 0 | 1 | 0 | 1 | 1 | 0 | 1 |
| +533.5 | +62.86° | 1 | 0 | 1 | 0 | 1 | 0 | 1 | 1 |
| +534.5 | +63.07° | 1 | 0 | 1 | 0 | 1 | 0 | 1 | 0 |
| +535.5 | +63.28° | 0 | 1 | 1 | 0 | 1 | 0 | 1 | 0 |
| +536.5 | +63.50° | 0 | 1 | 0 | 1 | 1 | 0 | 1 | 0 |
| +537.5 | +63.71° | 0 | 1 | 0 | 1 | 0 | 1 | 0 | 0 |
| +538.5 | +63.93° | 0 | 1 | 0 | 1 | 0 | 1 | 0 | 1 |
| +539.5 | +64.15° | 1 | 0 | 0 | 1 | 0 | 1 | 0 | 1 |
| +540.5 | +64.37° | 1 | 0 | 1 | 0 | 0 | 1 | 0 | 1 |
| +541.5 | +64.59° | 1 | 0 | 1 | 0 | 1 | 0 | 1 | 1 |
| +542.5 | +64.81° | 1 | 0 | 1 | 0 | 1 | 0 | 1 | 0 |
| +543.5 | +65.04° | 0 | 0 | 1 | 0 | 1 | 0 | 1 | 0 |
| +544.5 | +65.27° | 0 | 1 | 0 | 1 | 1 | 0 | 1 | 0 |
| +545.5 | +65.49° | 0 | 1 | 0 | 1 | 0 | 1 | 0 | 0 |
| +546.5 | +65.73° | 0 | 1 | 0 | 1 | 0 | 1 | 0 | 1 |
| +547.5 | +65.96° | 1 | 1 | 0 | 1 | 0 | 1 | 0 | 1 |
| +548.5 | +66.20° | 1 | 0 | 1 | 0 | 0 | 1 | 0 | 1 |
| +549.5 | +66.43° | 1 | 0 | 1 | 0 | 1 | 0 | 1 | 1 |
| +550.5 | +66.67° | 1 | 0 | 1 | 0 | 1 | 0 | 1 | 0 |
| +551.5 | +66.92° | 1 | 0 | 1 | 0 | 1 | 0 | 1 | 0 |
| +552.5 | +67.16° | 0 | 1 | 0 | 0 | 1 | 0 | 1 | 0 |
| +553.5 | +67.41° | 0 | 1 | 0 | 1 | 0 | 1 | 1 | 0 |
| +554.5 | +67.66° | 0 | 1 | 0 | 1 | 0 | 1 | 0 | 1 |
| +555.5 | +67.91° | 0 | 1 | 0 | 1 | 0 | 1 | 0 | 1 |
| +556.5 | +68.17° | 1 | 0 | 1 | 0 | 0 | 1 | 0 | 1 |
| +557.5 | +68.43° | 1 | 0 | 1 | 0 | 1 | 0 | 0 | 1 |
| +558.5 | +68.69° | 1 | 0 | 1 | 0 | 1 | 0 | 1 | 0 |
| +559.5 | +68.95° | 1 | 0 | 1 | 0 | 1 | 0 | 1 | 0 |
| +560.5 | +69.22° | 0 | 1 | 1 | 0 | 1 | 0 | 1 | 0 |
| +561.5 | +69.49° | 0 | 1 | 0 | 1 | 0 | 1 | 1 | 0 |
| +562.5 | +69.76° | 0 | 1 | 0 | 1 | 0 | 1 | 0 | 1 |
| +563.5 | +70.04° | 0 | 1 | 0 | 1 | 0 | 1 | 0 | 1 |
| +564.5 | +70.33° | 1 | 0 | 0 | 1 | 0 | 1 | 0 | 1 |
| +565.5 | +70.61° | 1 | 0 | 1 | 0 | 1 | 0 | 0 | 1 |
| +566.5 | +70.90° | 1 | 0 | 1 | 0 | 1 | 0 | 1 | 0 |
| +567.5 | +71.20° | 1 | 0 | 1 | 0 | 1 | 0 | 1 | 0 |
| +568.5 | +71.49° | 0 | 0 | 1 | 0 | 1 | 0 | 1 | 0 |
| +569.5 | +71.80° | 0 | 1 | 0 | 1 | 0 | 1 | 1 | 0 |
| +570.5 | +72.11° | 0 | 1 | 0 | 1 | 0 | 1 | 0 | 1 |
| +571.5 | +72.42° | 0 | 1 | 0 | 1 | 0 | 1 | 0 | 1 |
| +572.5 | +72.74° | 0 | 1 | 0 | 1 | 0 | 1 | 0 | 1 |
| +573.5 | +73.06° | 1 | 0 | 1 | 0 | 1 | 1 | 0 | 1 |

-continued

| Samples | Steer Angle | $f_{LO+0.5}$ | $f_{LO+1.5}$ | $f_{LO+2.5}$ | $f_{LO+3.5}$ | $f_{LO+4.5}$ | $f_{LO+5.5}$ | $f_{LO+6.5}$ | $f_{LO+7.5}$ |
|---|---|---|---|---|---|---|---|---|---|
| +574.5 | +73.40° | 1 | 0 | 1 | 0 | 1 | 0 | 1 | 0 |
| +575.5 | +73.73° | 1 | 0 | 1 | 0 | 1 | 0 | 1 | 0 |
| +576.5 | +74.08° | 1 | 0 | 1 | 0 | 1 | 0 | 1 | 0 |
| +577.5 | +74.43° | 0 | 1 | 0 | 1 | 0 | 0 | 1 | 0 |
| +578.5 | +74.79° | 0 | 1 | 0 | 1 | 0 | 1 | 0 | 1 |
| +579.5 | +75.16° | 0 | 1 | 0 | 1 | 0 | 1 | 0 | 1 |
| +580.5 | +75.54° | 0 | 1 | 0 | 1 | 0 | 1 | 0 | 1 |
| +581.5 | +75.92° | 1 | 0 | 1 | 0 | 0 | 1 | 0 | 1 |
| +582.5 | +76.32° | 1 | 0 | 1 | 0 | 1 | 0 | 1 | 0 |
| +583.5 | +76.73° | 1 | 0 | 1 | 0 | 1 | 0 | 1 | 0 |
| +584.5 | +77.16° | 1 | 0 | 1 | 0 | 1 | 0 | 1 | 0 |
| +585.5 | +77.59° | 0 | 1 | 0 | 0 | 1 | 0 | 1 | 0 |
| +586.5 | +78.05° | 0 | 1 | 0 | 1 | 0 | 1 | 0 | 1 |
| +587.5 | +78.52° | 0 | 1 | 0 | 1 | 0 | 1 | 0 | 1 |
| +588.5 | +79.01° | 0 | 1 | 0 | 1 | 0 | 1 | 0 | 1 |
| +589.5 | +79.52° | 1 | 1 | 0 | 1 | 0 | 1 | 0 | 1 |
| +590.5 | +80.06° | 1 | 0 | 1 | 0 | 1 | 0 | 1 | 0 |
| +591.5 | +80.63° | 1 | 0 | 1 | 0 | 1 | 0 | 1 | 0 |
| +592.5 | +81.24° | 1 | 0 | 1 | 0 | 1 | 0 | 1 | 0 |
| +593.5 | +81.89° | 1 | 0 | 1 | 0 | 1 | 0 | 1 | 0 |
| +594.5 | +82.59° | 0 | 1 | 0 | 1 | 0 | 1 | 0 | 1 |
| +595.5 | +83.38° | 0 | 1 | 0 | 1 | 0 | 1 | 0 | 1 |
| +596.5 | +84.27° | 0 | 1 | 0 | 1 | 0 | 1 | 0 | 1 |
| +597.5 | +85.32° | 0 | 1 | 0 | 1 | 0 | 1 | 0 | 1 |
| +598.5 | +86.69° | 1 | 0 | 1 | 0 | 1 | 0 | 1 | 0 |
| +599.5 | +90.00° | 1 | 0 | 1 | 0 | 1 | 0 | 1 | 0 |
| −559.5 | −68.95° | 0 | 1 | 0 | 1 | 0 | 1 | 1 | 0 |
| −558.5 | −68.69° | 0 | 1 | 1 | 0 | 1 | 0 | 1 | 0 |
| −557.5 | −68.43° | 0 | 1 | 0 | 1 | 0 | 1 | 0 | 0 |
| −556.5 | −68.17° | 1 | 0 | 1 | 0 | 1 | 0 | 1 | 0 |
| −555.5 | −67.91° | 1 | 0 | 1 | 0 | 1 | 1 | 0 | 1 |
| −554.5 | −67.66° | 1 | 0 | 0 | 1 | 0 | 1 | 0 | 1 |
| −553.5 | −67.41° | 0 | 1 | 0 | 1 | 0 | 1 | 0 | 1 |
| −552.5 | −67.16° | 0 | 1 | 0 | 1 | 0 | 1 | 0 | 1 |
| −551.5 | −66.92° | 0 | 1 | 0 | 1 | 0 | 0 | 1 | 0 |
| −550.5 | −66.67° | 0 | 1 | 1 | 0 | 1 | 0 | 1 | 0 |
| −549.5 | −66.43° | 1 | 0 | 1 | 0 | 1 | 0 | 1 | 0 |
| −548.5 | −66.20° | 1 | 0 | 1 | 0 | 1 | 0 | 1 | 1 |
| −547.5 | −65.96° | 1 | 0 | 1 | 0 | 0 | 1 | 0 | 1 |
| −546.5 | −65.73° | 1 | 1 | 0 | 1 | 0 | 1 | 0 | 1 |
| −545.5 | −65.49° | 0 | 1 | 0 | 1 | 0 | 1 | 0 | 1 |
| −544.5 | −65.27° | 0 | 1 | 0 | 1 | 0 | 1 | 0 | 0 |
| −543.5 | −65.04° | 0 | 1 | 0 | 1 | 1 | 0 | 1 | 0 |
| −542.5 | −64.81° | 0 | 0 | 1 | 0 | 1 | 0 | 1 | 0 |
| −541.5 | −64.59° | 1 | 0 | 1 | 0 | 1 | 0 | 1 | 0 |
| −540.5 | −64.37° | 1 | 0 | 1 | 0 | 1 | 0 | 0 | 1 |
| −539.5 | −64.15° | 1 | 0 | 1 | 0 | 0 | 1 | 0 | 1 |
| −538.5 | −63.93° | 1 | 1 | 0 | 1 | 0 | 1 | 0 | 1 |
| −537.5 | −63.71° | 0 | 1 | 0 | 1 | 0 | 1 | 0 | 1 |
| −536.5 | −63.50° | 0 | 1 | 0 | 1 | 0 | 1 | 1 | 0 |
| −535.5 | −63.28° | 0 | 1 | 0 | 0 | 1 | 0 | 1 | 0 |
| −534.5 | −63.07° | 0 | 0 | 1 | 0 | 1 | 0 | 1 | 0 |
| −533.5 | −62.86° | 1 | 0 | 1 | 0 | 1 | 0 | 1 | 0 |
| −532.5 | −62.65° | 1 | 0 | 1 | 0 | 1 | 0 | 0 | 1 |
| −531.5 | −62.45° | 1 | 0 | 1 | 1 | 0 | 1 | 0 | 1 |
| −530.5 | −62.24° | 1 | 1 | 0 | 1 | 0 | 1 | 0 | 1 |
| −529.5 | −62.04° | 0 | 1 | 0 | 1 | 0 | 1 | 0 | 0 |
| −528.5 | −61.83° | 0 | 1 | 0 | 1 | 0 | 0 | 1 | 0 |
| −527.5 | −61.63° | 0 | 1 | 0 | 0 | 1 | 0 | 1 | 0 |
| −526.5 | −61.43° | 0 | 0 | 1 | 0 | 1 | 0 | 1 | 0 |
| −525.5 | −61.23° | 1 | 0 | 1 | 0 | 1 | 0 | 1 | 1 |
| −524.5 | −61.03° | 1 | 0 | 1 | 0 | 1 | 1 | 0 | 1 |
| −523.5 | −60.84° | 1 | 0 | 1 | 1 | 0 | 1 | 0 | 1 |
| −522.5 | −60.64° | 1 | 1 | 0 | 1 | 0 | 1 | 0 | 1 |
| −521.5 | −60.45° | 0 | 1 | 0 | 1 | 0 | 1 | 0 | 0 |
| −520.5 | −60.25° | 0 | 1 | 0 | 1 | 0 | 0 | 1 | 0 |
| −519.5 | −60.06° | 0 | 1 | 0 | 0 | 1 | 0 | 1 | 0 |
| −518.5 | −59.87° | 0 | 0 | 1 | 0 | 1 | 0 | 1 | 0 |
| −517.5 | −59.68° | 1 | 0 | 1 | 0 | 1 | 0 | 0 | 1 |
| −516.5 | −59.49° | 1 | 0 | 1 | 0 | 0 | 1 | 0 | 1 |
| −515.5 | −59.30° | 1 | 0 | 1 | 1 | 0 | 1 | 0 | 1 |
| −514.5 | −59.12° | 1 | 1 | 0 | 1 | 0 | 1 | 0 | 1 |
| −513.5 | −58.93° | 0 | 1 | 0 | 1 | 0 | 1 | 1 | 0 |
| −512.5 | −58.75° | 0 | 1 | 0 | 1 | 1 | 0 | 1 | 0 |
| −511.5 | −58.56° | 0 | 1 | 0 | 0 | 1 | 0 | 1 | 0 |

-continued

|  |  |  |  |  |  |  |  |  |  |
|---|---|---|---|---|---|---|---|---|---|
| −510.5 | −58.38° | 0 | 0 | 1 | 0 | 1 | 0 | 1 | 0 |
| −509.5 | −58.20° | 1 | 0 | 1 | 0 | 1 | 0 | 0 | 1 |
| −508.5 | −58.02° | 1 | 0 | 1 | 0 | 0 | 1 | 0 | 1 |
| −507.5 | −57.84° | 1 | 0 | 0 | 1 | 0 | 1 | 0 | 1 |
| −506.5 | −57.66° | 1 | 1 | 0 | 1 | 0 | 1 | 0 | 0 |
| −505.5 | −57.48° | 0 | 1 | 0 | 1 | 0 | 1 | 1 | 0 |
| −504.5 | −57.30° | 0 | 1 | 0 | 1 | 1 | 0 | 1 | 0 |
| −503.5 | −57.13° | 0 | 1 | 1 | 0 | 1 | 0 | 1 | 0 |
| −502.5 | −56.95° | 0 | 0 | 1 | 0 | 1 | 0 | 1 | 1 |
| −501.5 | −56.78° | 1 | 0 | 1 | 0 | 1 | 1 | 0 | 1 |
| −500.5 | −56.60° | 1 | 0 | 1 | 0 | 0 | 1 | 0 | 1 |
| −499.5 | −56.43° | 1 | 0 | 0 | 1 | 0 | 1 | 0 | 1 |
| −498.5 | −56.26° | 1 | 1 | 0 | 1 | 0 | 1 | 0 | 0 |
| −497.5 | −56.08° | 0 | 1 | 0 | 1 | 0 | 0 | 1 | 0 |
| −496.5 | −55.91° | 0 | 1 | 0 | 1 | 1 | 0 | 1 | 0 |
| −495.5 | −55.74° | 0 | 1 | 1 | 0 | 1 | 0 | 1 | 0 |
| −494.5 | −55.57° | 0 | 0 | 1 | 0 | 1 | 0 | 0 | 1 |
| −493.5 | −55.41° | 1 | 0 | 1 | 0 | 1 | 1 | 0 | 1 |
| −492.5 | −55.24° | 1 | 0 | 1 | 1 | 0 | 1 | 0 | 1 |
| −491.5 | −55.07° | 1 | 0 | 0 | 1 | 0 | 1 | 0 | 1 |
| −490.5 | −54.90° | 1 | 1 | 0 | 1 | 0 | 1 | 1 | 0 |
| −489.5 | −54.74° | 0 | 1 | 0 | 1 | 0 | 0 | 1 | 0 |
| −488.5 | −54.57° | 0 | 1 | 0 | 0 | 1 | 0 | 1 | 0 |
| −487.5 | −54.41° | 0 | 1 | 1 | 0 | 1 | 0 | 1 | 1 |
| −486.5 | −54.24° | 0 | 0 | 1 | 0 | 1 | 0 | 0 | 1 |
| −485.5 | −54.08° | 1 | 0 | 1 | 0 | 1 | 1 | 0 | 1 |
| −484.5 | −53.92° | 1 | 0 | 1 | 1 | 0 | 1 | 0 | 1 |
| −483.5 | −53.76° | 1 | 0 | 0 | 1 | 0 | 1 | 0 | 0 |
| −482.5 | −53.59° | 1 | 1 | 0 | 1 | 0 | 1 | 1 | 0 |
| −481.5 | −53.43° | 0 | 1 | 0 | 1 | 1 | 0 | 1 | 0 |
| −480.5 | −53.27° | 0 | 1 | 0 | 0 | 1 | 0 | 1 | 0 |
| −479.5 | −53.11° | 0 | 1 | 1 | 0 | 1 | 0 | 1 | 1 |
| −478.5 | −52.96° | 0 | 0 | 1 | 0 | 1 | 0 | 0 | 1 |
| −477.5 | −52.80° | 1 | 0 | 1 | 0 | 0 | 1 | 0 | 1 |
| −476.5 | −52.64° | 1 | 0 | 1 | 1 | 0 | 1 | 0 | 1 |
| −475.5 | −52.48° | 1 | 0 | 0 | 1 | 0 | 1 | 0 | 0 |
| −474.5 | −52.33° | 1 | 1 | 0 | 1 | 0 | 0 | 1 | 0 |
| −473.5 | −52.17° | 0 | 1 | 0 | 1 | 1 | 0 | 1 | 0 |
| −472.5 | −52.01° | 0 | 1 | 0 | 0 | 1 | 0 | 1 | 0 |
| −471.5 | −51.86° | 0 | 1 | 1 | 0 | 1 | 0 | 0 | 1 |
| −470.5 | −51.70° | 0 | 0 | 1 | 0 | 1 | 1 | 0 | 1 |
| −469.5 | −51.55° | 1 | 0 | 1 | 0 | 0 | 1 | 0 | 1 |
| −468.5 | −51.40° | 1 | 0 | 1 | 1 | 0 | 1 | 0 | 0 |
| −467.5 | −51.24° | 1 | 0 | 0 | 1 | 0 | 1 | 1 | 0 |
| −466.5 | −51.09° | 1 | 1 | 0 | 1 | 0 | 0 | 1 | 0 |
| −465.5 | −50.94° | 0 | 1 | 0 | 1 | 1 | 0 | 1 | 0 |
| −464.5 | −50.79° | 0 | 1 | 0 | 0 | 1 | 0 | 1 | 1 |
| −463.5 | −50.64° | 0 | 1 | 1 | 0 | 1 | 0 | 0 | 1 |
| −462.5 | −50.49° | 0 | 0 | 1 | 0 | 1 | 1 | 0 | 1 |
| −461.5 | −50.34° | 1 | 0 | 1 | 0 | 0 | 1 | 0 | 1 |
| −460.5 | −50.19° | 1 | 0 | 1 | 1 | 0 | 1 | 0 | 0 |
| −459.5 | −50.04° | 1 | 0 | 0 | 1 | 0 | 1 | 1 | 0 |
| −458.5 | −49.89° | 1 | 1 | 0 | 1 | 0 | 0 | 1 | 0 |
| −457.5 | −49.74° | 0 | 1 | 0 | 1 | 1 | 0 | 1 | 0 |
| −456.5 | −49.59° | 0 | 1 | 0 | 0 | 1 | 0 | 1 | 1 |
| −455.5 | −49.45° | 0 | 1 | 1 | 0 | 1 | 0 | 0 | 1 |
| −454.5 | −49.30° | 0 | 0 | 1 | 0 | 1 | 1 | 0 | 1 |
| −453.5 | −49.15° | 1 | 0 | 1 | 0 | 0 | 1 | 0 | 1 |
| −452.5 | −49.01° | 1 | 0 | 1 | 1 | 0 | 1 | 0 | 0 |
| −451.5 | −48.86° | 1 | 0 | 0 | 1 | 0 | 1 | 1 | 0 |
| −450.5 | −48.72° | 1 | 1 | 0 | 1 | 0 | 0 | 1 | 0 |
| −449.5 | −48.57° | 0 | 1 | 0 | 0 | 1 | 0 | 1 | 1 |
| −448.5 | −48.43° | 0 | 1 | 1 | 0 | 1 | 0 | 0 | 1 |
| −447.5 | −48.28° | 0 | 0 | 1 | 0 | 1 | 1 | 0 | 1 |
| −446.5 | −48.14° | 1 | 0 | 1 | 0 | 0 | 1 | 0 | 1 |
| −445.5 | −48.00° | 1 | 0 | 1 | 1 | 0 | 1 | 0 | 0 |
| −444.5 | −47.86° | 1 | 0 | 0 | 1 | 0 | 1 | 1 | 0 |
| −443.5 | −47.71° | 1 | 1 | 0 | 1 | 0 | 0 | 1 | 0 |
| −442.5 | −47.57° | 0 | 1 | 0 | 1 | 1 | 0 | 1 | 0 |
| −441.5 | −47.43° | 0 | 1 | 0 | 0 | 1 | 0 | 1 | 1 |
| −440.5 | −47.29° | 0 | 1 | 1 | 0 | 1 | 0 | 0 | 1 |
| −439.5 | −47.15° | 0 | 0 | 1 | 0 | 1 | 1 | 0 | 1 |
| −438.5 | −47.01° | 1 | 0 | 1 | 0 | 0 | 1 | 0 | 1 |
| −437.5 | −46.87° | 1 | 0 | 1 | 1 | 0 | 1 | 0 | 0 |
| −436.5 | −46.73° | 1 | 0 | 0 | 1 | 0 | 1 | 1 | 0 |
| −435.5 | −46.59° | 1 | 1 | 0 | 1 | 0 | 0 | 1 | 0 |
| −434.5 | −46.45° | 0 | 1 | 0 | 1 | 1 | 0 | 1 | 0 |
| −433.5 | −46.31° | 0 | 1 | 0 | 0 | 1 | 0 | 1 | 1 |
| −432.5 | −46.17° | 0 | 1 | 1 | 0 | 1 | 0 | 0 | 1 |

|   |   |   |   |   |   |   |   |   |   |
|---|---|---|---|---|---|---|---|---|---|
| −431.5 | −46.04° | 0 | 0 | 1 | 0 | 1 | 1 | 0 | 1 |
| −430.5 | −45.90° | 1 | 0 | 1 | 0 | 0 | 1 | 0 | 1 |
| −429.5 | −45.76° | 1 | 0 | 1 | 1 | 0 | 1 | 0 | 0 |
| −428.5 | −45.62° | 1 | 0 | 0 | 1 | 0 | 1 | 1 | 0 |
| −427.5 | −45.49° | 1 | 1 | 0 | 1 | 0 | 0 | 1 | 0 |
| −426.5 | −45.35° | 0 | 1 | 0 | 1 | 1 | 0 | 1 | 1 |
| −425.5 | −45.22° | 0 | 1 | 0 | 0 | 1 | 0 | 0 | 1 |
| −424.5 | −45.08° | 0 | 1 | 1 | 0 | 1 | 0 | 0 | 1 |
| −423.5 | −44.94° | 0 | 0 | 1 | 0 | 1 | 1 | 0 | 1 |
| −422.5 | −44.81° | 1 | 0 | 1 | 0 | 0 | 1 | 0 | 0 |
| −421.5 | −44.68° | 1 | 0 | 1 | 1 | 0 | 1 | 1 | 0 |
| −420.5 | −44.54° | 1 | 0 | 0 | 1 | 0 | 0 | 1 | 0 |
| −419.5 | −44.41° | 1 | 1 | 0 | 1 | 0 | 0 | 1 | 0 |
| −418.5 | −44.27° | 0 | 1 | 0 | 1 | 1 | 0 | 1 | 1 |
| −417.5 | −44.14° | 0 | 1 | 0 | 0 | 1 | 0 | 0 | 1 |
| −416.5 | −44.01° | 0 | 1 | 1 | 0 | 1 | 1 | 0 | 1 |
| −415.5 | −43.87° | 0 | 0 | 1 | 0 | 0 | 1 | 0 | 1 |
| −414.5 | −43.74° | 1 | 0 | 1 | 0 | 0 | 1 | 0 | 0 |
| −413.5 | −43.61° | 1 | 0 | 1 | 1 | 0 | 1 | 1 | 0 |
| −412.5 | −43.48° | 1 | 0 | 0 | 1 | 0 | 0 | 1 | 0 |
| −411.5 | −43.35° | 1 | 1 | 0 | 1 | 1 | 0 | 1 | 0 |
| −410.5 | −43.21° | 0 | 1 | 0 | 1 | 1 | 0 | 1 | 1 |
| −409.5 | −43.08° | 0 | 1 | 0 | 0 | 1 | 0 | 0 | 1 |
| −408.5 | −42.95° | 0 | 1 | 1 | 0 | 1 | 1 | 0 | 1 |
| −407.5 | −42.82° | 0 | 0 | 1 | 0 | 0 | 1 | 0 | 0 |
| −406.5 | −42.69° | 1 | 0 | 1 | 1 | 0 | 1 | 0 | 0 |
| −405.5 | −42.56° | 1 | 0 | 1 | 1 | 0 | 1 | 1 | 0 |
| −404.5 | −42.43° | 1 | 0 | 0 | 1 | 0 | 0 | 1 | 0 |
| −403.5 | −42.30° | 1 | 1 | 0 | 1 | 1 | 0 | 1 | 1 |
| −402.5 | −42.17° | 0 | 1 | 0 | 0 | 1 | 0 | 0 | 1 |
| −401.5 | −42.05° | 0 | 1 | 0 | 0 | 1 | 0 | 0 | 1 |
| −400.5 | −41.92° | 0 | 1 | 1 | 0 | 1 | 1 | 0 | 1 |
| −399.5 | −41.79° | 0 | 0 | 1 | 0 | 0 | 1 | 0 | 0 |
| −398.5 | −41.66° | 1 | 0 | 1 | 1 | 0 | 1 | 1 | 0 |
| −397.5 | −41.53° | 1 | 0 | 1 | 1 | 0 | 1 | 1 | 0 |
| −396.5 | −41.41° | 1 | 0 | 0 | 1 | 0 | 0 | 1 | 0 |
| −395.5 | −41.28° | 1 | 1 | 0 | 1 | 1 | 0 | 1 | 1 |
| −394.5 | −41.15° | 0 | 1 | 0 | 0 | 1 | 0 | 0 | 1 |
| −393.5 | −41.02° | 0 | 1 | 0 | 0 | 1 | 1 | 0 | 1 |
| −392.5 | −40.90° | 0 | 1 | 1 | 0 | 1 | 1 | 0 | 1 |
| −391.5 | −40.77° | 0 | 0 | 1 | 0 | 0 | 1 | 0 | 0 |
| −390.5 | −40.65° | 1 | 0 | 1 | 1 | 0 | 1 | 1 | 0 |
| −389.5 | −40.52° | 1 | 0 | 0 | 1 | 0 | 0 | 1 | 0 |
| −388.5 | −40.39° | 1 | 0 | 0 | 1 | 0 | 0 | 1 | 1 |
| −387.5 | −40.27° | 1 | 1 | 0 | 1 | 1 | 0 | 1 | 1 |
| −386.5 | −40.14° | 0 | 1 | 0 | 0 | 1 | 0 | 0 | 1 |
| −385.5 | −40.02° | 0 | 1 | 1 | 0 | 1 | 1 | 0 | 1 |
| −384.5 | −39.89° | 0 | 1 | 1 | 0 | 1 | 1 | 0 | 0 |
| −383.5 | −39.77° | 0 | 0 | 1 | 0 | 0 | 1 | 0 | 0 |
| −382.5 | −39.65° | 1 | 0 | 1 | 1 | 0 | 1 | 1 | 0 |
| −381.5 | −39.52° | 1 | 0 | 0 | 1 | 0 | 0 | 1 | 0 |
| −380.5 | −39.40° | 1 | 0 | 0 | 1 | 1 | 0 | 1 | 1 |
| −379.5 | −39.27° | 1 | 1 | 0 | 1 | 1 | 0 | 0 | 1 |
| −378.5 | −39.15° | 0 | 1 | 0 | 0 | 1 | 0 | 0 | 1 |
| −377.5 | −39.03° | 0 | 1 | 1 | 0 | 1 | 1 | 0 | 1 |
| −376.5 | −38.90° | 0 | 1 | 1 | 0 | 0 | 1 | 0 | 0 |
| −375.5 | −38.78° | 0 | 0 | 1 | 0 | 0 | 1 | 1 | 0 |
| −374.5 | −38.66° | 1 | 0 | 1 | 1 | 0 | 1 | 1 | 0 |
| −373.5 | −38.54° | 1 | 0 | 0 | 1 | 0 | 0 | 1 | 0 |
| −372.5 | −38.41° | 1 | 0 | 0 | 1 | 1 | 0 | 1 | 1 |
| −371.5 | −38.29° | 1 | 1 | 0 | 1 | 1 | 0 | 0 | 1 |
| −370.5 | −38.17° | 0 | 1 | 0 | 0 | 1 | 0 | 0 | 1 |
| −369.5 | −38.05° | 0 | 1 | 1 | 0 | 1 | 1 | 0 | 0 |
| −368.5 | −37.93° | 0 | 1 | 1 | 0 | 0 | 1 | 0 | 0 |
| −367.5 | −37.81° | 0 | 0 | 1 | 0 | 0 | 1 | 1 | 0 |
| −366.5 | −37.69° | 1 | 0 | 1 | 1 | 0 | 0 | 1 | 0 |
| −365.5 | −37.57° | 1 | 0 | 0 | 1 | 0 | 0 | 1 | 1 |
| −364.5 | −37.45° | 1 | 0 | 0 | 1 | 1 | 0 | 1 | 1 |
| −363.5 | −37.33° | 1 | 1 | 0 | 0 | 1 | 0 | 0 | 1 |
| −362.5 | −37.21° | 0 | 1 | 0 | 0 | 1 | 1 | 0 | 1 |
| −361.5 | −37.09° | 0 | 1 | 1 | 0 | 1 | 1 | 0 | 0 |
| −360.5 | −36.97° | 0 | 1 | 1 | 0 | 0 | 1 | 0 | 0 |
| −359.5 | −36.85° | 0 | 0 | 1 | 1 | 0 | 1 | 1 | 0 |
| −358.5 | −36.73° | 1 | 0 | 1 | 1 | 0 | 0 | 1 | 0 |
| −357.5 | −36.61° | 1 | 0 | 0 | 1 | 0 | 0 | 1 | 1 |
| −356.5 | −36.49° | 1 | 0 | 0 | 1 | 1 | 0 | 0 | 1 |
| −355.5 | −36.37° | 1 | 1 | 0 | 0 | 1 | 0 | 0 | 1 |
| −354.5 | −36.25° | 0 | 1 | 0 | 0 | 1 | 1 | 0 | 1 |
| −353.5 | −36.13° | 0 | 1 | 1 | 0 | 1 | 1 | 0 | 0 |

-continued

| | | | | | | | | | |
|---|---|---|---|---|---|---|---|---|---|
| −352.5 | −36.01° | 0 | 1 | 1 | 0 | 0 | 1 | 1 | 0 |
| −351.5 | −35.90° | 0 | 0 | 1 | 1 | 0 | 1 | 1 | 0 |
| −350.5 | −35.78° | 1 | 0 | 1 | 1 | 0 | 0 | 1 | 0 |
| −349.5 | −35.66° | 1 | 0 | 0 | 1 | 1 | 0 | 1 | 1 |
| −348.5 | −35.54° | 1 | 1 | 0 | 1 | 1 | 0 | 0 | 1 |
| −347.5 | −35.43° | 1 | 1 | 0 | 0 | 1 | 0 | 0 | 1 |
| −346.5 | −35.31° | 0 | 1 | 0 | 0 | 1 | 1 | 0 | 0 |
| −345.5 | −35.19° | 0 | 1 | 1 | 0 | 0 | 1 | 0 | 0 |
| −344.5 | −35.07° | 0 | 0 | 1 | 0 | 0 | 1 | 1 | 0 |
| −343.5 | −34.96° | 0 | 0 | 1 | 1 | 0 | 1 | 1 | 0 |
| −342.5 | −34.84° | 1 | 0 | 1 | 1 | 0 | 0 | 1 | 1 |
| −341.5 | −34.73° | 1 | 0 | 0 | 1 | 1 | 0 | 1 | 1 |
| −340.5 | −34.61° | 1 | 1 | 0 | 1 | 1 | 0 | 0 | 1 |
| −339.5 | −34.49° | 1 | 1 | 0 | 0 | 1 | 1 | 0 | 1 |
| −338.5 | −34.38° | 0 | 1 | 0 | 0 | 1 | 1 | 0 | 0 |
| −337.5 | −34.26° | 0 | 1 | 1 | 0 | 0 | 1 | 0 | 0 |
| −336.5 | −34.15° | 0 | 0 | 1 | 0 | 0 | 1 | 1 | 0 |
| −335.5 | −34.03° | 0 | 0 | 1 | 1 | 0 | 0 | 1 | 0 |
| −334.5 | −33.92° | 1 | 0 | 1 | 1 | 0 | 0 | 1 | 1 |
| −333.5 | −33.80° | 1 | 0 | 0 | 1 | 1 | 0 | 0 | 1 |
| −332.5 | −33.69° | 1 | 1 | 0 | 1 | 1 | 0 | 0 | 1 |
| −331.5 | −33.57° | 1 | 1 | 0 | 0 | 1 | 1 | 0 | 1 |
| −330.5 | −33.46° | 0 | 1 | 0 | 0 | 1 | 1 | 0 | 0 |
| −329.5 | −33.34° | 0 | 1 | 1 | 0 | 0 | 1 | 1 | 0 |
| −328.5 | −33.23° | 0 | 0 | 1 | 0 | 0 | 1 | 1 | 0 |
| −327.5 | −33.11° | 0 | 0 | 1 | 1 | 0 | 0 | 1 | 1 |
| −326.5 | −33.00° | 1 | 0 | 0 | 1 | 0 | 0 | 1 | 1 |
| −325.5 | −32.88° | 1 | 0 | 0 | 1 | 1 | 0 | 0 | 1 |
| −324.5 | −32.77° | 1 | 1 | 0 | 1 | 1 | 0 | 0 | 1 |
| −323.5 | −32.66° | 1 | 1 | 0 | 0 | 1 | 1 | 0 | 0 |
| −322.5 | −32.54° | 0 | 1 | 1 | 0 | 1 | 1 | 0 | 0 |
| −321.5 | −32.43° | 0 | 1 | 1 | 0 | 0 | 1 | 1 | 0 |
| −320.5 | −32.32° | 0 | 0 | 1 | 1 | 0 | 1 | 1 | 0 |
| −319.5 | −32.20° | 0 | 0 | 1 | 1 | 0 | 0 | 1 | 1 |
| −318.5 | −32.09° | 1 | 0 | 0 | 1 | 0 | 0 | 1 | 1 |
| −317.5 | −31.98° | 1 | 0 | 0 | 1 | 1 | 0 | 0 | 1 |
| −316.5 | −31.87° | 1 | 1 | 0 | 0 | 1 | 0 | 0 | 1 |
| −315.5 | −31.75° | 1 | 1 | 0 | 0 | 1 | 1 | 0 | 0 |
| −314.5 | −31.64° | 0 | 1 | 1 | 0 | 0 | 1 | 0 | 0 |
| −313.5 | −31.53° | 0 | 1 | 1 | 0 | 0 | 1 | 1 | 0 |
| −312.5 | −31.42° | 0 | 0 | 1 | 1 | 0 | 0 | 1 | 0 |
| −311.5 | −31.31° | 0 | 0 | 1 | 1 | 0 | 0 | 1 | 1 |
| −310.5 | −31.19° | 1 | 0 | 0 | 1 | 1 | 0 | 0 | 1 |
| −309.5 | −31.08° | 1 | 0 | 0 | 1 | 1 | 0 | 0 | 1 |
| −308.5 | −30.97° | 1 | 1 | 0 | 0 | 1 | 1 | 0 | 0 |
| −307.5 | −30.86° | 1 | 1 | 0 | 0 | 1 | 1 | 0 | 0 |
| −306.5 | −30.75° | 0 | 1 | 1 | 0 | 0 | 1 | 1 | 0 |
| −305.5 | −30.64° | 0 | 1 | 1 | 0 | 0 | 1 | 1 | 0 |
| −304.5 | −30.53° | 0 | 0 | 1 | 1 | 0 | 0 | 1 | 1 |
| −303.5 | −30.41° | 0 | 0 | 1 | 1 | 0 | 0 | 1 | 1 |
| −302.5 | −30.30° | 1 | 0 | 0 | 1 | 1 | 0 | 0 | 1 |
| −301.5 | −30.19° | 1 | 0 | 0 | 1 | 1 | 0 | 0 | 1 |
| −300.5 | −30.08° | 1 | 1 | 0 | 0 | 1 | 1 | 0 | 0 |
| −299.5 | −29.97° | 1 | 1 | 0 | 0 | 1 | 1 | 0 | 0 |
| −298.5 | −29.86° | 0 | 1 | 1 | 0 | 0 | 1 | 1 | 0 |
| −297.5 | −29.75° | 0 | 1 | 1 | 0 | 0 | 1 | 1 | 0 |
| −296.5 | −29.64° | 0 | 0 | 1 | 1 | 0 | 0 | 1 | 1 |
| −295.5 | −29.53° | 0 | 0 | 1 | 1 | 0 | 0 | 1 | 1 |
| −294.5 | −29.42° | 1 | 0 | 0 | 1 | 1 | 0 | 0 | 1 |
| −293.5 | −29.31° | 1 | 0 | 0 | 1 | 1 | 0 | 0 | 1 |
| −292.5 | −29.20° | 1 | 1 | 0 | 0 | 1 | 1 | 0 | 0 |
| −291.5 | −29.09° | 1 | 1 | 0 | 0 | 1 | 1 | 0 | 0 |
| −290.5 | −28.98° | 0 | 1 | 1 | 0 | 0 | 1 | 1 | 0 |
| −289.5 | −28.88° | 0 | 1 | 1 | 0 | 0 | 1 | 1 | 1 |
| −288.5 | −28.77° | 0 | 0 | 1 | 1 | 0 | 0 | 1 | 1 |
| −287.5 | −28.66° | 0 | 0 | 1 | 1 | 0 | 0 | 0 | 1 |
| −286.5 | −28.55° | 1 | 0 | 0 | 1 | 1 | 0 | 0 | 1 |
| −285.5 | −28.44° | 1 | 0 | 0 | 1 | 1 | 1 | 0 | 0 |
| −284.5 | −28.33° | 1 | 1 | 0 | 0 | 1 | 1 | 0 | 0 |
| −283.5 | −28.22° | 1 | 1 | 0 | 0 | 1 | 1 | 1 | 0 |
| −282.5 | −28.11° | 0 | 1 | 1 | 0 | 0 | 1 | 1 | 0 |
| −281.5 | −28.01° | 0 | 1 | 1 | 0 | 0 | 0 | 1 | 1 |
| −280.5 | −27.90° | 0 | 0 | 1 | 1 | 0 | 0 | 1 | 1 |
| −279.5 | −27.79° | 0 | 0 | 1 | 1 | 1 | 0 | 0 | 1 |
| −278.5 | −27.68° | 1 | 0 | 0 | 1 | 1 | 0 | 0 | 1 |
| −277.5 | −27.57° | 1 | 0 | 0 | 0 | 1 | 1 | 0 | 0 |
| −276.5 | −27.47° | 1 | 1 | 0 | 0 | 1 | 1 | 0 | 0 |
| −275.5 | −27.36° | 1 | 1 | 0 | 0 | 0 | 1 | 1 | 0 |
| −274.5 | −27.25° | 0 | 1 | 1 | 0 | 0 | 1 | 1 | 0 |

-continued

| | | | | | | | | | |
|---|---|---|---|---|---|---|---|---|---|
| −273.5 | −27.14° | 0 | 1 | 1 | 1 | 0 | 0 | 1 | 1 |
| −272.5 | −27.04° | 0 | 0 | 1 | 1 | 0 | 0 | 1 | 1 |
| −271.5 | −26.93° | 0 | 0 | 1 | 1 | 1 | 0 | 0 | 1 |
| −270.5 | −26.82° | 1 | 0 | 0 | 1 | 1 | 0 | 0 | 1 |
| −269.5 | −26.71° | 1 | 0 | 0 | 0 | 1 | 1 | 0 | 0 |
| −268.5 | −26.61° | 1 | 1 | 0 | 0 | 1 | 1 | 0 | 0 |
| −267.5 | −26.50° | 1 | 1 | 1 | 0 | 0 | 1 | 1 | 0 |
| −266.5 | −26.39° | 0 | 1 | 1 | 0 | 0 | 1 | 1 | 1 |
| −265.5 | −26.29° | 0 | 1 | 1 | 1 | 0 | 0 | 1 | 1 |
| −264.5 | −26.18° | 0 | 0 | 1 | 1 | 0 | 0 | 0 | 1 |
| −263.5 | −26.07° | 0 | 0 | 0 | 1 | 1 | 0 | 0 | 1 |
| −262.5 | −25.97° | 1 | 0 | 0 | 1 | 1 | 0 | 0 | 0 |
| −261.5 | −25.86° | 1 | 0 | 0 | 0 | 1 | 1 | 0 | 0 |
| −260.5 | −25.76° | 1 | 1 | 0 | 0 | 1 | 1 | 1 | 0 |
| −259.5 | −25.65° | 1 | 1 | 1 | 0 | 0 | 1 | 1 | 0 |
| −258.5 | −25.54° | 0 | 1 | 1 | 0 | 0 | 0 | 1 | 1 |
| −257.5 | −25.44° | 0 | 1 | 1 | 1 | 0 | 0 | 1 | 1 |
| −256.5 | −25.33° | 0 | 0 | 1 | 1 | 0 | 0 | 0 | 1 |
| −255.5 | −25.23° | 0 | 0 | 0 | 1 | 1 | 0 | 0 | 1 |
| −254.5 | −25.12° | 1 | 0 | 0 | 1 | 1 | 1 | 0 | 0 |
| −253.5 | −25.01° | 1 | 0 | 0 | 0 | 1 | 1 | 0 | 0 |
| −252.5 | −24.91° | 1 | 1 | 0 | 0 | 1 | 1 | 1 | 0 |
| −251.5 | −24.80° | 1 | 1 | 1 | 0 | 0 | 1 | 1 | 0 |
| −250.5 | −24.70° | 0 | 1 | 1 | 0 | 0 | 0 | 1 | 1 |
| −249.5 | −24.59° | 0 | 0 | 1 | 1 | 0 | 0 | 1 | 1 |
| −248.5 | −24.49° | 0 | 0 | 1 | 1 | 1 | 0 | 0 | 1 |
| −247.5 | −24.38° | 0 | 0 | 0 | 1 | 1 | 0 | 0 | 0 |
| −246.5 | −24.28° | 1 | 0 | 0 | 1 | 1 | 1 | 0 | 0 |
| −245.5 | −24.17° | 1 | 1 | 0 | 0 | 1 | 1 | 0 | 0 |
| −244.5 | −24.07° | 1 | 1 | 0 | 0 | 0 | 1 | 1 | 0 |
| −243.5 | −23.96° | 1 | 1 | 1 | 0 | 0 | 1 | 1 | 1 |
| −242.5 | −23.86° | 0 | 1 | 1 | 0 | 0 | 0 | 1 | 1 |
| −241.5 | −23.76° | 0 | 0 | 1 | 1 | 0 | 0 | 0 | 1 |
| −240.5 | −23.65° | 0 | 0 | 1 | 1 | 1 | 0 | 0 | 1 |
| −239.5 | −23.55° | 0 | 0 | 0 | 1 | 1 | 0 | 0 | 0 |
| −238.5 | −23.44° | 1 | 0 | 0 | 1 | 1 | 1 | 0 | 0 |
| −237.5 | −23.34° | 1 | 1 | 0 | 0 | 1 | 1 | 1 | 0 |
| −236.5 | −23.23° | 1 | 1 | 0 | 0 | 0 | 1 | 1 | 0 |
| −235.5 | −23.13° | 1 | 1 | 1 | 0 | 0 | 1 | 1 | 1 |
| −234.5 | −23.03° | 0 | 1 | 1 | 1 | 0 | 0 | 1 | 1 |
| −233.5 | −22.92° | 0 | 0 | 1 | 1 | 0 | 0 | 0 | 1 |
| −232.5 | −22.82° | 0 | 0 | 1 | 1 | 1 | 0 | 0 | 1 |
| −231.5 | −22.72° | 0 | 0 | 0 | 1 | 1 | 1 | 0 | 0 |
| −230.5 | −22.61° | 1 | 0 | 0 | 0 | 1 | 1 | 0 | 0 |
| −229.5 | −22.51° | 1 | 1 | 0 | 0 | 1 | 1 | 1 | 0 |
| −228.5 | −22.40° | 1 | 1 | 0 | 0 | 0 | 1 | 1 | 1 |
| −227.5 | −22.30° | 1 | 1 | 1 | 0 | 0 | 0 | 1 | 1 |
| −226.5 | −22.20° | 0 | 1 | 1 | 1 | 0 | 0 | 1 | 1 |
| −225.5 | −22.10° | 0 | 0 | 1 | 1 | 0 | 0 | 0 | 1 |
| −224.5 | −21.99° | 0 | 0 | 1 | 1 | 1 | 0 | 0 | 0 |
| −223.5 | −21.89° | 0 | 0 | 0 | 1 | 1 | 1 | 0 | 0 |
| −222.5 | −21.79° | 1 | 0 | 0 | 0 | 1 | 1 | 0 | 0 |
| −221.5 | −21.68° | 1 | 1 | 0 | 0 | 1 | 1 | 1 | 0 |
| −220.5 | −21.58° | 1 | 1 | 0 | 0 | 0 | 1 | 1 | 1 |
| −219.5 | −21.48° | 1 | 1 | 1 | 0 | 0 | 0 | 1 | 1 |
| −218.5 | −21.37° | 0 | 1 | 1 | 1 | 0 | 0 | 0 | 1 |
| −217.5 | −21.27° | 0 | 0 | 1 | 1 | 0 | 0 | 0 | 1 |
| −216.5 | −21.17° | 0 | 0 | 1 | 1 | 1 | 0 | 0 | 0 |
| −215.5 | −21.07° | 0 | 0 | 0 | 1 | 1 | 1 | 0 | 0 |
| −214.5 | −20.97° | 1 | 0 | 0 | 0 | 1 | 1 | 1 | 0 |
| −213.5 | −20.86° | 1 | 1 | 0 | 0 | 0 | 1 | 1 | 0 |
| −212.5 | −20.76° | 1 | 1 | 0 | 0 | 0 | 1 | 1 | 1 |
| −211.5 | −20.66° | 1 | 1 | 1 | 0 | 0 | 0 | 1 | 1 |
| −210.5 | −20.56° | 0 | 1 | 1 | 1 | 0 | 0 | 0 | 1 |
| −209.5 | −20.45° | 0 | 0 | 1 | 1 | 1 | 0 | 0 | 0 |
| −208.5 | −20.35° | 0 | 0 | 0 | 1 | 1 | 0 | 0 | 0 |
| −207.5 | −20.25° | 0 | 0 | 0 | 1 | 1 | 1 | 0 | 0 |
| −206.5 | −20.15° | 1 | 0 | 0 | 0 | 1 | 1 | 1 | 0 |
| −205.5 | −20.05° | 1 | 1 | 0 | 0 | 0 | 1 | 1 | 1 |
| −204.5 | −19.94° | 1 | 1 | 1 | 0 | 0 | 0 | 1 | 1 |
| −203.5 | −19.84° | 1 | 1 | 1 | 0 | 0 | 0 | 1 | 1 |
| −202.5 | −19.74° | 0 | 1 | 1 | 1 | 0 | 0 | 0 | 1 |
| −201.5 | −19.64° | 0 | 0 | 1 | 1 | 1 | 0 | 0 | 0 |
| −200.5 | −19.54° | 0 | 0 | 0 | 1 | 1 | 0 | 0 | 0 |
| −199.5 | −19.44° | 0 | 0 | 0 | 1 | 1 | 1 | 0 | 0 |
| −198.5 | −19.34° | 1 | 0 | 0 | 0 | 1 | 1 | 1 | 0 |
| −197.5 | −19.23° | 1 | 1 | 0 | 0 | 0 | 1 | 1 | 1 |
| −196.5 | −19.13° | 1 | 1 | 1 | 0 | 0 | 0 | 1 | 1 |
| −195.5 | −19.03° | 1 | 1 | 1 | 0 | 0 | 0 | 0 | 1 |

-continued

| | | | | | | | | | |
|---|---|---|---|---|---|---|---|---|---|
| −194.5 | −18.93° | 0 | 1 | 1 | 1 | 0 | 0 | 0 | 1 |
| −193.5 | −18.83° | 0 | 0 | 1 | 1 | 1 | 0 | 0 | 0 |
| −192.5 | −18.73° | 0 | 0 | 0 | 1 | 1 | 1 | 0 | 0 |
| −191.5 | −18.63° | 0 | 0 | 0 | 0 | 1 | 1 | 1 | 0 |
| −190.5 | −18.53° | 1 | 0 | 0 | 0 | 1 | 1 | 1 | 0 |
| −189.5 | −18.43° | 1 | 1 | 0 | 0 | 0 | 1 | 1 | 1 |
| −188.5 | −18.33° | 1 | 1 | 1 | 0 | 0 | 0 | 1 | 1 |
| −187.5 | −18.23° | 1 | 1 | 1 | 1 | 0 | 0 | 0 | 1 |
| −186.5 | −18.13° | 0 | 1 | 1 | 1 | 0 | 0 | 0 | 0 |
| −185.5 | −18.02° | 0 | 0 | 1 | 1 | 1 | 0 | 0 | 0 |
| −184.5 | −17.92° | 0 | 0 | 0 | 1 | 1 | 1 | 0 | 0 |
| −183.5 | −17.82° | 0 | 0 | 0 | 0 | 1 | 1 | 1 | 0 |
| −182.5 | −17.72° | 1 | 0 | 0 | 0 | 0 | 1 | 1 | 1 |
| −181.5 | −17.62° | 1 | 1 | 0 | 0 | 0 | 1 | 1 | 1 |
| −180.5 | −17.52° | 1 | 1 | 1 | 0 | 0 | 0 | 1 | 1 |
| −179.5 | −17.42° | 1 | 1 | 1 | 1 | 0 | 0 | 0 | 1 |
| −178.5 | −17.32° | 0 | 1 | 1 | 1 | 1 | 0 | 0 | 0 |
| −177.5 | −17.22° | 0 | 0 | 1 | 1 | 1 | 0 | 0 | 0 |
| −176.5 | −17.12° | 0 | 0 | 0 | 1 | 1 | 1 | 0 | 0 |
| −175.5 | −17.02° | 0 | 0 | 0 | 0 | 1 | 1 | 1 | 0 |
| −174.5 | −16.92° | 1 | 0 | 0 | 0 | 0 | 1 | 1 | 1 |
| −173.5 | −16.82° | 1 | 1 | 0 | 0 | 0 | 0 | 1 | 1 |
| −172.5 | −16.72° | 1 | 1 | 1 | 0 | 0 | 0 | 0 | 1 |
| −171.5 | −16.62° | 1 | 1 | 1 | 1 | 0 | 0 | 0 | 1 |
| −170.5 | −16.52° | 0 | 1 | 1 | 1 | 1 | 0 | 0 | 0 |
| −169.5 | −16.42° | 0 | 0 | 1 | 1 | 1 | 1 | 0 | 0 |
| −168.5 | −16.32° | 0 | 0 | 0 | 1 | 1 | 1 | 1 | 0 |
| −167.5 | −16.22° | 0 | 0 | 0 | 0 | 1 | 1 | 1 | 1 |
| −166.5 | −16.12° | 1 | 0 | 0 | 0 | 0 | 1 | 1 | 1 |
| −165.5 | −16.03° | 1 | 1 | 0 | 0 | 0 | 0 | 1 | 1 |
| −164.5 | −15.93° | 1 | 1 | 1 | 0 | 0 | 0 | 0 | 1 |
| −163.5 | −15.83° | 1 | 1 | 1 | 1 | 0 | 0 | 0 | 0 |
| −162.5 | −15.73° | 0 | 1 | 1 | 1 | 1 | 0 | 0 | 0 |
| −161.5 | −15.63° | 0 | 0 | 1 | 1 | 1 | 1 | 0 | 0 |
| −160.5 | −15.53° | 0 | 0 | 0 | 1 | 1 | 1 | 1 | 0 |
| −159.5 | −15.43° | 0 | 0 | 0 | 0 | 1 | 1 | 1 | 1 |
| −158.5 | −15.33° | 1 | 0 | 0 | 0 | 0 | 1 | 1 | 1 |
| −157.5 | −15.23° | 1 | 1 | 0 | 0 | 0 | 0 | 1 | 1 |
| −156.5 | −15.13° | 1 | 1 | 1 | 0 | 0 | 0 | 0 | 1 |
| −155.5 | −15.03° | 1 | 1 | 1 | 1 | 0 | 0 | 0 | 0 |
| −154.5 | −14.93° | 0 | 1 | 1 | 1 | 1 | 0 | 0 | 0 |
| −153.5 | −14.84° | 0 | 0 | 1 | 1 | 1 | 1 | 0 | 0 |
| −152.5 | −14.74° | 0 | 0 | 0 | 1 | 1 | 1 | 1 | 0 |
| −151.5 | −14.64° | 0 | 0 | 0 | 0 | 1 | 1 | 1 | 1 |
| −150.5 | −14.54° | 1 | 0 | 0 | 0 | 0 | 1 | 1 | 1 |
| −149.5 | −14.44° | 1 | 1 | 1 | 0 | 0 | 0 | 0 | 1 |
| −148.5 | −14.34° | 1 | 1 | 1 | 1 | 0 | 0 | 0 | 0 |
| −147.5 | −14.24° | 0 | 1 | 1 | 1 | 1 | 0 | 0 | 0 |
| −146.5 | −14.14° | 0 | 0 | 1 | 1 | 1 | 0 | 0 | 0 |
| −145.5 | −14.05° | 0 | 0 | 0 | 1 | 1 | 1 | 1 | 0 |
| −144.5 | −13.95° | 0 | 0 | 0 | 0 | 1 | 1 | 1 | 1 |
| −143.5 | −13.85° | 1 | 0 | 0 | 0 | 0 | 1 | 1 | 1 |
| −142.5 | −13.75° | 1 | 1 | 0 | 0 | 0 | 0 | 1 | 1 |
| −141.5 | −13.65° | 1 | 1 | 1 | 0 | 0 | 0 | 0 | 1 |
| −140.5 | −13.55° | 1 | 1 | 1 | 1 | 0 | 0 | 0 | 0 |
| −139.5 | −13.46° | 0 | 1 | 1 | 1 | 1 | 0 | 0 | 0 |
| −138.5 | −13.36° | 0 | 0 | 1 | 1 | 1 | 1 | 0 | 0 |
| −137.5 | −13.26° | 0 | 0 | 0 | 1 | 1 | 1 | 1 | 0 |
| −136.5 | −13.16° | 0 | 0 | 0 | 0 | 1 | 1 | 1 | 1 |
| −135.5 | −13.06° | 1 | 0 | 0 | 0 | 0 | 1 | 1 | 1 |
| −134.5 | −12.96° | 1 | 1 | 0 | 0 | 0 | 0 | 1 | 1 |
| −133.5 | −12.87° | 1 | 1 | 1 | 0 | 0 | 0 | 0 | 1 |
| −132.5 | −12.77° | 1 | 1 | 1 | 1 | 0 | 0 | 0 | 0 |
| −131.5 | −12.67° | 0 | 1 | 1 | 1 | 1 | 0 | 0 | 0 |
| −130.5 | −12.57° | 0 | 0 | 1 | 1 | 1 | 1 | 0 | 0 |
| −129.5 | −12.47° | 0 | 0 | 0 | 0 | 1 | 1 | 1 | 1 |
| −128.5 | −12.38° | 0 | 0 | 0 | 0 | 1 | 1 | 1 | 1 |
| −127.5 | −12.28° | 1 | 0 | 0 | 0 | 0 | 1 | 1 | 1 |
| −126.5 | −12.18° | 1 | 1 | 0 | 0 | 0 | 0 | 0 | 1 |
| −125.5 | −12.08° | 1 | 1 | 1 | 0 | 0 | 0 | 0 | 0 |
| −124.5 | −11.99° | 1 | 1 | 1 | 1 | 0 | 0 | 0 | 0 |
| −123.5 | −11.89° | 0 | 1 | 1 | 1 | 1 | 0 | 0 | 0 |
| −122.5 | −11.79° | 0 | 0 | 1 | 1 | 1 | 1 | 1 | 0 |
| −121.5 | −11.69° | 0 | 0 | 0 | 1 | 1 | 1 | 1 | 1 |
| −120.5 | −11.60° | 0 | 0 | 0 | 0 | 1 | 1 | 1 | 1 |
| −119.5 | −11.50° | 1 | 0 | 0 | 0 | 0 | 0 | 1 | 1 |
| −118.5 | −11.40° | 1 | 1 | 0 | 0 | 0 | 0 | 0 | 1 |
| −117.5 | −11.30° | 1 | 1 | 1 | 0 | 0 | 0 | 0 | 0 |
| −116.5 | −11.21° | 1 | 1 | 1 | 1 | 1 | 0 | 0 | 0 |

-continued

| | | | | | | | | | |
|---|---|---|---|---|---|---|---|---|---|
| −115.5 | −11.11° | 0 | 1 | 1 | 1 | 1 | 1 | 0 | 0 |
| −114.5 | −11.01° | 0 | 0 | 1 | 1 | 1 | 1 | 1 | 0 |
| −113.5 | −10.91° | 0 | 0 | 0 | 1 | 1 | 1 | 1 | 1 |
| −112.5 | −10.82° | 0 | 0 | 0 | 0 | 0 | 1 | 1 | 1 |
| −111.5 | −10.72° | 1 | 0 | 0 | 0 | 0 | 0 | 1 | 1 |
| −110.5 | −10.62° | 1 | 1 | 0 | 0 | 0 | 0 | 0 | 1 |
| −109.5 | −10.52° | 1 | 1 | 1 | 0 | 0 | 0 | 0 | 0 |
| −108.5 | −10.43° | 1 | 1 | 1 | 1 | 1 | 0 | 0 | 0 |
| −107.5 | −10.33° | 0 | 1 | 1 | 1 | 1 | 1 | 0 | 0 |
| −106.5 | −10.23° | 0 | 0 | 1 | 1 | 1 | 1 | 1 | 1 |
| −105.5 | −10.14° | 0 | 0 | 0 | 0 | 1 | 1 | 1 | 1 |
| −104.5 | −10.04° | 0 | 0 | 0 | 0 | 0 | 1 | 1 | 1 |
| −103.5 | −9.94° | 1 | 0 | 0 | 0 | 0 | 0 | 0 | 1 |
| −102.5 | −9.84° | 1 | 1 | 0 | 0 | 0 | 0 | 0 | 0 |
| −101.5 | −9.75° | 1 | 1 | 1 | 1 | 0 | 0 | 0 | 0 |
| −100.5 | −9.65° | 1 | 1 | 1 | 1 | 1 | 0 | 0 | 0 |
| −99.5 | −9.55° | 0 | 1 | 1 | 1 | 1 | 1 | 1 | 0 |
| −98.5 | −9.46° | 0 | 0 | 1 | 1 | 1 | 1 | 1 | 1 |
| −97.5 | −9.36° | 0 | 0 | 0 | 0 | 1 | 1 | 1 | 1 |
| −96.5 | −9.26° | 0 | 0 | 0 | 0 | 0 | 1 | 1 | 1 |
| −95.5 | −9.17° | 1 | 0 | 0 | 0 | 0 | 0 | 0 | 1 |
| −94.5 | −9.07° | 1 | 1 | 0 | 0 | 0 | 0 | 0 | 0 |
| −93.5 | −8.97° | 1 | 1 | 1 | 1 | 0 | 0 | 0 | 0 |
| −92.5 | −8.88° | 1 | 1 | 1 | 1 | 1 | 0 | 0 | 0 |
| −91.5 | −8.78° | 0 | 1 | 1 | 1 | 1 | 1 | 1 | 0 |
| −90.5 | −8.68° | 0 | 0 | 1 | 1 | 1 | 1 | 1 | 1 |
| −89.5 | −8.59° | 0 | 0 | 0 | 0 | 1 | 1 | 1 | 1 |
| −88.5 | −8.49° | 0 | 0 | 0 | 0 | 0 | 0 | 1 | 1 |
| −87.5 | −8.39° | 1 | 0 | 0 | 0 | 0 | 0 | 0 | 0 |
| −86.5 | −8.30° | 1 | 1 | 1 | 0 | 0 | 0 | 0 | 0 |
| −85.5 | −8.20° | 1 | 1 | 1 | 1 | 0 | 0 | 0 | 0 |
| −84.5 | −8.10° | 1 | 1 | 1 | 1 | 1 | 1 | 0 | 0 |
| −83.5 | −8.01° | 0 | 1 | 1 | 1 | 1 | 1 | 1 | 1 |
| −82.5 | −7.91° | 0 | 0 | 0 | 1 | 1 | 1 | 1 | 1 |
| −81.5 | −7.81° | 0 | 0 | 0 | 0 | 0 | 1 | 1 | 1 |
| −80.5 | −7.72° | 0 | 0 | 0 | 0 | 0 | 0 | 0 | 1 |
| −79.5 | −7.62° | 1 | 0 | 0 | 0 | 0 | 0 | 0 | 0 |
| −78.5 | −7.52° | 1 | 1 | 1 | 0 | 0 | 0 | 0 | 0 |
| −77.5 | −7.43° | 1 | 1 | 1 | 1 | 1 | 0 | 0 | 0 |
| −76.5 | −7.33° | 1 | 1 | 1 | 1 | 1 | 1 | 1 | 0 |
| −75.5 | −7.23° | 0 | 1 | 1 | 1 | 1 | 1 | 1 | 1 |
| −74.5 | −7.14° | 0 | 0 | 0 | 1 | 1 | 1 | 1 | 1 |
| −73.5 | −7.04° | 0 | 0 | 0 | 0 | 0 | 1 | 1 | 1 |
| −72.5 | −6.95° | 0 | 0 | 0 | 0 | 0 | 0 | 0 | 1 |
| −71.5 | −6.85° | 1 | 0 | 0 | 0 | 0 | 0 | 0 | 0 |
| −70.5 | −6.75° | 1 | 1 | 1 | 0 | 0 | 0 | 0 | 0 |
| −69.5 | −6.66° | 1 | 1 | 1 | 1 | 1 | 0 | 0 | 0 |
| −68.5 | −6.56° | 1 | 1 | 1 | 1 | 1 | 1 | 1 | 1 |
| −67.5 | −6.46° | 0 | 1 | 1 | 1 | 1 | 1 | 1 | 1 |
| −66.5 | −6.37° | 0 | 0 | 0 | 1 | 1 | 1 | 1 | 1 |
| −65.5 | −6.27° | 0 | 0 | 0 | 0 | 0 | 0 | 1 | 1 |
| −64.5 | −6.18° | 0 | 0 | 0 | 0 | 0 | 0 | 0 | 0 |
| −63.5 | −6.08° | 1 | 0 | 0 | 0 | 0 | 0 | 0 | 0 |
| −62.5 | −5.98° | 1 | 1 | 1 | 1 | 0 | 0 | 0 | 0 |
| −61.5 | −5.89° | 1 | 1 | 1 | 1 | 1 | 1 | 0 | 0 |
| −60.5 | −5.79° | 1 | 1 | 1 | 1 | 1 | 1 | 1 | 1 |
| −59.5 | −5.70° | 0 | 1 | 1 | 1 | 1 | 1 | 1 | 1 |
| −58.5 | −5.60° | 0 | 0 | 0 | 0 | 1 | 1 | 1 | 1 |
| −57.5 | −5.50° | 0 | 0 | 0 | 0 | 0 | 0 | 0 | 1 |
| −56.5 | −5.41° | 0 | 0 | 0 | 0 | 0 | 0 | 0 | 0 |
| −55.5 | −5.31° | 1 | 0 | 0 | 0 | 0 | 0 | 0 | 0 |
| −54.5 | −5.22° | 1 | 1 | 1 | 1 | 0 | 0 | 0 | 0 |
| −53.5 | −5.12° | 1 | 1 | 1 | 1 | 1 | 1 | 1 | 0 |
| −52.5 | −5.02° | 1 | 1 | 1 | 1 | 1 | 1 | 1 | 1 |
| −51.5 | −4.93° | 0 | 1 | 1 | 1 | 1 | 1 | 1 | 1 |
| −50.5 | −4.83° | 0 | 0 | 0 | 0 | 1 | 1 | 1 | 1 |
| −49.5 | −4.74° | 0 | 0 | 0 | 0 | 0 | 0 | 0 | 0 |
| −48.5 | −4.64° | 0 | 0 | 0 | 0 | 0 | 0 | 0 | 0 |
| −47.5 | −4.54° | 1 | 1 | 0 | 0 | 0 | 0 | 0 | 0 |
| −46.5 | −4.45° | 1 | 1 | 1 | 1 | 1 | 0 | 0 | 0 |
| −45.5 | −4.35° | 1 | 1 | 1 | 1 | 1 | 1 | 1 | 1 |
| −44.5 | −4.26° | 1 | 1 | 1 | 1 | 1 | 1 | 1 | 1 |
| −43.5 | −4.16° | 0 | 0 | 1 | 1 | 1 | 1 | 1 | 1 |
| −42.5 | −4.07° | 0 | 0 | 0 | 0 | 0 | 1 | 1 | 1 |
| −41.5 | −3.97° | 0 | 0 | 0 | 0 | 0 | 0 | 0 | 0 |
| −40.5 | −3.87° | 0 | 0 | 0 | 0 | 0 | 0 | 0 | 0 |
| −39.5 | −3.78° | 1 | 1 | 0 | 0 | 0 | 0 | 0 | 0 |
| −38.5 | −3.68° | 1 | 1 | 1 | 1 | 1 | 1 | 0 | 0 |
| −37.5 | −3.59° | 1 | 1 | 1 | 1 | 1 | 1 | 1 | 1 |

-continued

| | | | | | | | | | |
|---|---|---|---|---|---|---|---|---|---|
| −36.5 | −3.49° | 1 | 1 | 1 | 1 | 1 | 1 | 1 | 1 |
| −35.5 | −3.39° | 0 | 0 | 1 | 1 | 1 | 1 | 1 | 1 |
| −34.5 | −3.30° | 0 | 0 | 0 | 0 | 0 | 0 | 0 | 1 |
| −33.5 | −3.20° | 0 | 0 | 0 | 0 | 0 | 0 | 0 | 0 |
| −32.5 | −3.11° | 0 | 0 | 0 | 0 | 0 | 0 | 0 | 0 |
| −31.5 | −3.01° | 1 | 1 | 0 | 0 | 0 | 0 | 0 | 0 |
| −30.5 | −2.92° | 1 | 1 | 1 | 1 | 1 | 1 | 1 | 0 |
| −29.5 | −2.82° | 1 | 1 | 1 | 1 | 1 | 1 | 1 | 1 |
| −28.5 | −2.72° | 1 | 1 | 1 | 1 | 1 | 1 | 1 | 1 |
| −27.5 | −2.63° | 0 | 0 | 0 | 1 | 1 | 1 | 1 | 1 |
| −26.5 | −2.53° | 0 | 0 | 0 | 0 | 0 | 0 | 0 | 0 |
| −25.5 | −2.44° | 0 | 0 | 0 | 0 | 0 | 0 | 0 | 0 |
| −24.5 | −2.34° | 0 | 0 | 0 | 0 | 0 | 0 | 0 | 0 |
| −23.5 | −2.25° | 1 | 1 | 1 | 0 | 0 | 0 | 0 | 0 |
| −22.5 | −2.15° | 1 | 1 | 1 | 1 | 1 | 1 | 1 | 1 |
| −21.5 | −2.06° | 1 | 1 | 1 | 1 | 1 | 1 | 1 | 1 |
| −20.5 | −1.96° | 1 | 1 | 1 | 1 | 1 | 1 | 1 | 1 |
| −19.5 | −1.86° | 0 | 0 | 0 | 0 | 1 | 1 | 1 | 1 |
| −18.5 | −1.77° | 0 | 0 | 0 | 0 | 0 | 0 | 0 | 0 |
| −17.5 | −1.67° | 0 | 0 | 0 | 0 | 0 | 0 | 0 | 0 |
| −16.5 | −1.58° | 0 | 0 | 0 | 0 | 0 | 0 | 0 | 0 |
| −15.5 | −1.48° | 1 | 1 | 1 | 1 | 1 | 0 | 0 | 0 |
| −14.5 | −1.39° | 1 | 1 | 1 | 1 | 1 | 1 | 1 | 1 |
| −13.5 | −1.29° | 1 | 1 | 1 | 1 | 1 | 1 | 1 | 1 |
| −12.5 | −1.19° | 1 | 1 | 1 | 1 | 1 | 1 | 1 | 1 |
| −11.5 | −1.10° | 0 | 0 | 0 | 0 | 0 | 0 | 0 | 1 |
| −10.5 | −1.00° | 0 | 0 | 0 | 0 | 0 | 0 | 0 | 0 |
| −9.5 | −0.91° | 0 | 0 | 0 | 0 | 0 | 0 | 0 | 0 |
| −8.5 | −0.81° | 0 | 0 | 0 | 0 | 0 | 0 | 0 | 0 |
| −7.5 | −0.72° | 1 | 1 | 1 | 1 | 1 | 1 | 1 | 1 |
| −6.5 | −0.62° | 1 | 1 | 1 | 1 | 1 | 1 | 1 | 1 |
| −5.5 | −0.53° | 1 | 1 | 1 | 1 | 1 | 1 | 1 | 1 |
| −4.5 | −0.43° | 1 | 1 | 1 | 1 | 1 | 1 | 1 | 1 |
| −3.5 | −0.33° | 0 | 0 | 0 | 0 | 0 | 0 | 0 | 0 |
| −2.5 | −0.24° | 0 | 0 | 0 | 0 | 0 | 0 | 0 | 0 |
| −1.5 | −0.14° | 0 | 0 | 0 | 0 | 0 | 0 | 0 | 0 |
| −0.5 | −0.05° | 0 | 0 | 0 | 0 | 0 | 0 | 0 | 0 |
| +0.5 | +0.05° | 1 | 1 | 1 | 1 | 1 | 1 | 1 | 1 |
| +1.5 | +0.14° | 1 | 1 | 1 | 1 | 1 | 1 | 1 | 1 |
| +2.5 | +0.24° | 1 | 1 | 1 | 1 | 1 | 1 | 1 | 1 |
| +3.5 | +0.33° | 1 | 1 | 1 | 1 | 1 | 1 | 1 | 1 |
| +4.5 | +0.43° | 0 | 0 | 0 | 0 | 0 | 0 | 0 | 0 |
| +5.5 | +0.53° | 0 | 0 | 0 | 0 | 0 | 0 | 0 | 0 |
| +6.5 | +0.62° | 0 | 0 | 0 | 0 | 0 | 0 | 0 | 0 |
| +7.5 | +0.72° | 0 | 0 | 0 | 0 | 0 | 0 | 0 | 0 |
| +8.5 | +0.81° | 1 | 1 | 1 | 1 | 1 | 1 | 1 | 1 |
| +9.5 | +0.91° | 1 | 1 | 1 | 1 | 1 | 1 | 1 | 1 |
| +10.5 | +1.00° | 1 | 1 | 1 | 1 | 1 | 1 | 1 | 1 |
| +11.5 | +1.10° | 1 | 1 | 1 | 1 | 1 | 1 | 1 | 0 |
| +12.5 | +1.19° | 0 | 0 | 0 | 0 | 0 | 0 | 0 | 0 |
| +13.5 | +1.29° | 0 | 0 | 0 | 0 | 0 | 0 | 0 | 0 |
| +14.5 | +1.39° | 0 | 0 | 0 | 0 | 0 | 0 | 0 | 0 |
| +15.5 | +1.48° | 0 | 0 | 0 | 0 | 0 | 1 | 1 | 1 |
| +16.5 | +1.58° | 1 | 1 | 1 | 1 | 1 | 1 | 1 | 1 |
| +17.5 | +1.67° | 1 | 1 | 1 | 1 | 1 | 1 | 1 | 1 |
| +18.5 | +1.77° | 1 | 1 | 1 | 1 | 1 | 1 | 1 | 1 |
| +19.5 | +1.86° | 1 | 1 | 1 | 1 | 0 | 0 | 0 | 0 |
| +20.5 | +1.96° | 0 | 0 | 0 | 0 | 0 | 0 | 0 | 0 |
| +21.5 | +2.06° | 0 | 0 | 0 | 0 | 0 | 0 | 0 | 0 |
| +22.5 | +2.15° | 0 | 0 | 0 | 0 | 0 | 0 | 0 | 0 |
| +23.5 | +2.25° | 0 | 0 | 0 | 1 | 1 | 1 | 1 | 1 |
| +24.5 | +2.34° | 1 | 1 | 1 | 1 | 1 | 1 | 1 | 1 |
| +25.5 | +2.44° | 1 | 1 | 1 | 1 | 1 | 1 | 1 | 1 |
| +26.5 | +2.53° | 1 | 1 | 1 | 1 | 1 | 1 | 1 | 1 |
| +27.5 | +2.63° | 1 | 1 | 1 | 0 | 0 | 0 | 0 | 0 |
| +28.5 | +2.72° | 0 | 0 | 0 | 0 | 0 | 0 | 0 | 0 |
| +29.5 | +2.82° | 0 | 0 | 0 | 0 | 0 | 0 | 0 | 0 |
| +30.5 | +2.92° | 0 | 0 | 0 | 0 | 0 | 0 | 0 | 1 |
| +31.5 | +3.01° | 0 | 0 | 1 | 1 | 1 | 1 | 1 | 1 |
| +32.5 | +3.11° | 1 | 1 | 1 | 1 | 1 | 1 | 1 | 1 |
| +33.5 | +3.20° | 1 | 1 | 1 | 1 | 1 | 1 | 1 | 1 |
| +34.5 | +3.30° | 1 | 1 | 1 | 1 | 1 | 1 | 1 | 0 |
| +35.5 | +3.39° | 1 | 1 | 0 | 0 | 0 | 0 | 0 | 0 |
| +36.5 | +3.49° | 0 | 0 | 0 | 0 | 0 | 0 | 0 | 0 |
| +37.5 | +3.59° | 0 | 0 | 0 | 0 | 0 | 0 | 0 | 0 |
| +38.5 | +3.68° | 0 | 0 | 0 | 0 | 0 | 0 | 1 | 1 |
| +39.5 | +3.78° | 0 | 0 | 1 | 1 | 1 | 1 | 1 | 1 |
| +40.5 | +3.87° | 1 | 1 | 1 | 1 | 1 | 1 | 1 | 1 |
| +41.5 | +3.97° | 1 | 1 | 1 | 1 | 1 | 1 | 1 | 1 |

-continued

| | | | | | | | | | |
|---|---|---|---|---|---|---|---|---|---|
| +42.5 | +4.07° | 1 | 1 | 1 | 1 | 1 | 0 | 0 | 0 |
| +43.5 | +4.16° | 1 | 1 | 0 | 0 | 0 | 0 | 0 | 0 |
| +44.5 | +4.26° | 0 | 0 | 0 | 0 | 0 | 0 | 0 | 0 |
| +45.5 | +4.35° | 0 | 0 | 0 | 0 | 0 | 0 | 0 | 0 |
| +46.5 | +4.45° | 0 | 0 | 0 | 0 | 0 | 1 | 1 | 1 |
| +47.5 | +4.54° | 0 | 0 | 1 | 1 | 1 | 1 | 1 | 1 |
| +48.5 | +4.64° | 1 | 1 | 1 | 1 | 1 | 1 | 1 | 1 |
| +49.5 | +4.74° | 1 | 1 | 1 | 1 | 1 | 1 | 1 | 1 |
| +50.5 | +4.83° | 1 | 1 | 1 | 1 | 0 | 0 | 0 | 0 |
| +51.5 | +4.93° | 1 | 0 | 0 | 0 | 0 | 0 | 0 | 0 |
| +52.5 | +5.02° | 0 | 0 | 0 | 0 | 0 | 0 | 0 | 0 |
| +53.5 | +5.12° | 0 | 0 | 0 | 0 | 0 | 0 | 0 | 1 |
| +54.5 | +5.22° | 0 | 0 | 0 | 0 | 1 | 1 | 1 | 1 |
| +55.5 | +5.31° | 0 | 1 | 1 | 1 | 1 | 1 | 1 | 1 |
| +56.5 | +5.41° | 1 | 1 | 1 | 1 | 1 | 1 | 1 | 1 |
| +57.5 | +5.50° | 1 | 1 | 1 | 1 | 1 | 1 | 1 | 0 |
| +58.5 | +5.60° | 1 | 1 | 1 | 1 | 0 | 0 | 0 | 0 |
| +59.5 | +5.70° | 1 | 0 | 0 | 0 | 0 | 0 | 0 | 0 |
| +60.5 | +5.79° | 0 | 0 | 0 | 0 | 0 | 0 | 0 | 0 |
| +61.5 | +5.89° | 0 | 0 | 0 | 0 | 0 | 0 | 1 | 1 |
| +62.5 | +5.98° | 0 | 0 | 0 | 0 | 1 | 1 | 1 | 1 |
| +63.5 | +6.08° | 0 | 1 | 1 | 1 | 1 | 1 | 1 | 1 |
| +64.5 | +6.18° | 1 | 1 | 1 | 1 | 1 | 1 | 1 | 1 |
| +65.5 | +6.27° | 1 | 1 | 1 | 1 | 1 | 1 | 0 | 0 |
| +66.5 | +6.37° | 1 | 1 | 1 | 0 | 0 | 0 | 0 | 0 |
| +67.5 | +6.46° | 1 | 0 | 0 | 0 | 0 | 0 | 0 | 0 |
| +68.5 | +6.56° | 0 | 0 | 0 | 0 | 0 | 0 | 0 | 0 |
| +69.5 | +6.66° | 0 | 0 | 0 | 0 | 0 | 1 | 1 | 1 |
| +70.5 | +6.75° | 0 | 0 | 0 | 1 | 1 | 1 | 1 | 1 |
| +71.5 | +6.85° | 0 | 1 | 1 | 1 | 1 | 1 | 1 | 1 |
| +72.5 | +6.95° | 1 | 1 | 1 | 1 | 1 | 1 | 1 | 0 |
| +73.5 | +7.04° | 1 | 1 | 1 | 1 | 1 | 0 | 0 | 0 |
| +74.5 | +7.14° | 1 | 1 | 1 | 0 | 0 | 0 | 0 | 0 |
| +75.5 | +7.23° | 1 | 0 | 0 | 0 | 0 | 0 | 0 | 0 |
| +76.5 | +7.33° | 0 | 0 | 0 | 0 | 0 | 0 | 0 | 1 |
| +77.5 | +7.43° | 0 | 0 | 0 | 0 | 0 | 1 | 1 | 1 |
| +78.5 | +7.52° | 0 | 0 | 0 | 1 | 1 | 1 | 1 | 1 |
| +79.5 | +7.62° | 0 | 1 | 1 | 1 | 1 | 1 | 1 | 1 |
| +80.5 | +7.72° | 1 | 1 | 1 | 1 | 1 | 1 | 1 | 0 |
| +81.5 | +7.81° | 1 | 1 | 1 | 1 | 1 | 0 | 0 | 0 |
| +82.5 | +7.91° | 1 | 1 | 1 | 0 | 0 | 0 | 0 | 0 |
| +83.5 | +8.01° | 1 | 0 | 0 | 0 | 0 | 0 | 0 | 0 |
| +84.5 | +8.10° | 0 | 0 | 0 | 0 | 0 | 0 | 1 | 1 |
| +85.5 | +8.20° | 0 | 0 | 0 | 0 | 1 | 1 | 1 | 1 |
| +86.5 | +8.30° | 0 | 0 | 0 | 1 | 1 | 1 | 1 | 1 |
| +87.5 | +8.39° | 0 | 1 | 1 | 1 | 1 | 1 | 1 | 1 |
| +88.5 | +8.49° | 1 | 1 | 1 | 1 | 1 | 1 | 0 | 0 |
| +89.5 | +8.59° | 1 | 1 | 1 | 1 | 0 | 0 | 0 | 0 |
| +90.5 | +8.68° | 1 | 1 | 0 | 0 | 0 | 0 | 0 | 0 |
| +91.5 | +8.78° | 1 | 0 | 0 | 0 | 0 | 0 | 0 | 1 |
| +92.5 | +8.88° | 0 | 0 | 0 | 0 | 0 | 0 | 1 | 1 |
| +93.5 | +8.97° | 0 | 0 | 0 | 0 | 1 | 1 | 1 | 1 |
| +94.5 | +9.07° | 0 | 0 | 1 | 1 | 1 | 1 | 1 | 1 |
| +95.5 | +9.17° | 0 | 1 | 1 | 1 | 1 | 1 | 1 | 0 |
| +96.5 | +9.26° | 1 | 1 | 1 | 1 | 1 | 0 | 0 | 0 |
| +97.5 | +9.36° | 1 | 1 | 1 | 1 | 0 | 0 | 0 | 0 |
| +98.5 | +9.46° | 1 | 1 | 0 | 0 | 0 | 0 | 0 | 0 |
| +99.5 | +9.55° | 1 | 0 | 0 | 0 | 0 | 0 | 0 | 1 |
| +100.5 | +9.65° | 0 | 0 | 0 | 0 | 0 | 1 | 1 | 1 |
| +101.5 | +9.75° | 0 | 0 | 0 | 0 | 1 | 1 | 1 | 1 |
| +102.5 | +9.84° | 0 | 0 | 1 | 1 | 1 | 1 | 1 | 1 |
| +103.5 | +9.94° | 0 | 1 | 1 | 1 | 1 | 1 | 1 | 0 |
| +104.5 | +10.04° | 1 | 1 | 1 | 1 | 1 | 0 | 0 | 0 |
| +105.5 | +10.14° | 1 | 1 | 1 | 1 | 0 | 0 | 0 | 0 |
| +106.5 | +10.23° | 1 | 1 | 0 | 0 | 0 | 0 | 0 | 0 |
| +107.5 | +10.33° | 1 | 0 | 0 | 0 | 0 | 0 | 0 | 1 |
| +108.5 | +10.43° | 0 | 0 | 0 | 0 | 0 | 1 | 1 | 1 |
| +109.5 | +10.52° | 0 | 0 | 0 | 1 | 1 | 1 | 1 | 1 |
| +110.5 | +10.62° | 0 | 0 | 1 | 1 | 1 | 1 | 1 | 0 |
| +111.5 | +10.72° | 0 | 1 | 1 | 1 | 1 | 1 | 0 | 0 |
| +112.5 | +10.82° | 1 | 1 | 1 | 1 | 1 | 0 | 0 | 0 |
| +113.5 | +10.91° | 1 | 1 | 1 | 0 | 0 | 0 | 0 | 0 |
| +114.5 | +11.01° | 1 | 1 | 0 | 0 | 0 | 0 | 0 | 1 |
| +115.5 | +11.11° | 1 | 0 | 0 | 0 | 0 | 0 | 1 | 1 |
| +116.5 | +11.21° | 0 | 0 | 0 | 0 | 0 | 1 | 1 | 1 |
| +117.5 | +11.30° | 0 | 0 | 0 | 1 | 1 | 1 | 1 | 1 |
| +118.5 | +11.40° | 0 | 0 | 1 | 1 | 1 | 1 | 1 | 0 |
| +119.5 | +11.50° | 0 | 1 | 1 | 1 | 1 | 1 | 0 | 0 |
| +120.5 | +11.60° | 1 | 1 | 1 | 1 | 0 | 0 | 0 | 0 |

-continued

| | | | | | | | | | |
|---|---|---|---|---|---|---|---|---|---|
| +121.5 | +11.69° | 1 | 1 | 1 | 0 | 0 | 0 | 0 | 0 |
| +122.5 | +11.79° | 1 | 1 | 0 | 0 | 0 | 0 | 0 | 1 |
| +123.5 | +11.89° | 1 | 0 | 0 | 0 | 0 | 1 | 1 | 1 |
| +124.5 | +11.99° | 0 | 0 | 0 | 0 | 1 | 1 | 1 | 1 |
| +125.5 | +12.08° | 0 | 0 | 0 | 1 | 1 | 1 | 1 | 1 |
| +126.5 | +12.18° | 0 | 0 | 1 | 1 | 1 | 1 | 1 | 0 |
| +127.5 | +12.28° | 0 | 1 | 1 | 1 | 1 | 0 | 0 | 0 |
| +128.5 | +12.38° | 1 | 1 | 1 | 1 | 0 | 0 | 0 | 0 |
| +129.5 | +12.47° | 1 | 1 | 1 | 0 | 0 | 0 | 0 | 0 |
| +130.5 | +12.57° | 1 | 1 | 0 | 0 | 0 | 0 | 1 | 1 |
| +131.5 | +12.67° | 1 | 0 | 0 | 0 | 0 | 1 | 1 | 1 |
| +132.5 | +12.77° | 0 | 0 | 0 | 0 | 1 | 1 | 1 | 1 |
| +133.5 | +12.87° | 0 | 0 | 0 | 1 | 1 | 1 | 1 | 0 |
| +134.5 | +12.96° | 0 | 0 | 1 | 1 | 1 | 1 | 0 | 0 |
| +135.5 | +13.06° | 0 | 1 | 1 | 1 | 1 | 0 | 0 | 0 |
| +136.5 | +13.16° | 1 | 1 | 1 | 1 | 0 | 0 | 0 | 0 |
| +137.5 | +13.26° | 1 | 1 | 1 | 0 | 0 | 0 | 0 | 1 |
| +138.5 | +13.36° | 1 | 1 | 0 | 0 | 0 | 0 | 1 | 1 |
| +139.5 | +13.46° | 1 | 0 | 0 | 0 | 0 | 1 | 1 | 1 |
| +140.5 | +13.55° | 0 | 0 | 0 | 0 | 1 | 1 | 1 | 1 |
| +141.5 | +13.65° | 0 | 0 | 0 | 1 | 1 | 1 | 1 | 0 |
| +142.5 | +13.75° | 0 | 0 | 1 | 1 | 1 | 1 | 0 | 0 |
| +143.5 | +13.85° | 0 | 1 | 1 | 1 | 1 | 0 | 0 | 0 |
| +144.5 | +13.95° | 1 | 1 | 1 | 1 | 0 | 0 | 0 | 0 |
| +145.5 | +14.05° | 1 | 1 | 1 | 0 | 0 | 0 | 0 | 1 |
| +146.5 | +14.14° | 1 | 1 | 0 | 0 | 0 | 0 | 1 | 1 |
| +147.5 | +14.24° | 1 | 0 | 0 | 0 | 0 | 1 | 1 | 1 |
| +148.5 | +14.34° | 0 | 0 | 0 | 0 | 1 | 1 | 1 | 1 |
| +149.5 | +14.44° | 0 | 0 | 0 | 1 | 1 | 1 | 1 | 0 |
| +150.5 | +14.54° | 0 | 1 | 1 | 1 | 1 | 0 | 0 | 0 |
| +151.5 | +14.64° | 1 | 1 | 1 | 1 | 0 | 0 | 0 | 0 |
| +152.5 | +14.74° | 1 | 1 | 1 | 0 | 0 | 0 | 0 | 1 |
| +153.5 | +14.84° | 1 | 1 | 0 | 0 | 0 | 0 | 1 | 1 |
| +154.5 | +14.93° | 1 | 0 | 0 | 0 | 0 | 1 | 1 | 1 |
| +155.5 | +15.03° | 0 | 0 | 0 | 0 | 1 | 1 | 1 | 1 |
| +156.5 | +15.13° | 0 | 0 | 0 | 1 | 1 | 1 | 1 | 0 |
| +157.5 | +15.23° | 0 | 0 | 1 | 1 | 1 | 1 | 0 | 0 |
| +158.5 | +15.33° | 0 | 1 | 1 | 1 | 1 | 0 | 0 | 0 |
| +159.5 | +15.43° | 1 | 1 | 1 | 1 | 0 | 0 | 0 | 0 |
| +160.5 | +15.53° | 1 | 1 | 1 | 0 | 0 | 0 | 0 | 1 |
| +161.5 | +15.63° | 1 | 1 | 0 | 0 | 0 | 0 | 1 | 1 |
| +162.5 | +15.73° | 1 | 0 | 0 | 0 | 0 | 1 | 1 | 1 |
| +163.5 | +15.83° | 0 | 0 | 0 | 0 | 1 | 1 | 1 | 1 |
| +164.5 | +15.93° | 0 | 0 | 0 | 1 | 1 | 1 | 1 | 0 |
| +165.5 | +16.03° | 0 | 0 | 1 | 1 | 1 | 1 | 0 | 0 |
| +166.5 | +16.12° | 0 | 1 | 1 | 1 | 1 | 0 | 0 | 0 |
| +167.5 | +16.22° | 1 | 1 | 1 | 1 | 0 | 0 | 0 | 0 |
| +168.5 | +16.32° | 1 | 1 | 1 | 0 | 0 | 0 | 0 | 1 |
| +169.5 | +16.42° | 1 | 1 | 0 | 0 | 0 | 0 | 1 | 1 |
| +170.5 | +16.52° | 1 | 0 | 0 | 0 | 0 | 1 | 1 | 1 |
| +171.5 | +16.62° | 0 | 0 | 0 | 0 | 1 | 1 | 1 | 0 |
| +172.5 | +16.72° | 0 | 0 | 0 | 1 | 1 | 1 | 1 | 0 |
| +173.5 | +16.82° | 0 | 0 | 1 | 1 | 1 | 1 | 0 | 0 |
| +174.5 | +16.92° | 0 | 1 | 1 | 1 | 1 | 0 | 0 | 0 |
| +175.5 | +17.02° | 1 | 1 | 1 | 1 | 0 | 0 | 0 | 1 |
| +176.5 | +17.12° | 1 | 1 | 1 | 0 | 0 | 0 | 1 | 1 |
| +177.5 | +17.22° | 1 | 1 | 0 | 0 | 0 | 1 | 1 | 1 |
| +178.5 | +17.32° | 1 | 0 | 0 | 0 | 0 | 1 | 1 | 1 |
| +179.5 | +17.42° | 0 | 0 | 0 | 0 | 1 | 1 | 1 | 0 |
| +180.5 | +17.52° | 0 | 0 | 0 | 1 | 1 | 1 | 0 | 0 |
| +181.5 | +17.62° | 0 | 0 | 1 | 1 | 1 | 0 | 0 | 0 |
| +182.5 | +17.72° | 0 | 1 | 1 | 1 | 1 | 0 | 0 | 0 |
| +183.5 | +17.82° | 1 | 1 | 1 | 1 | 0 | 0 | 0 | 1 |
| +184.5 | +17.92° | 1 | 1 | 1 | 0 | 0 | 0 | 1 | 1 |
| +185.5 | +18.02° | 1 | 1 | 0 | 0 | 0 | 1 | 1 | 1 |
| +186.5 | +18.13° | 1 | 0 | 0 | 0 | 1 | 1 | 1 | 1 |
| +187.5 | +18.23° | 0 | 0 | 0 | 1 | 1 | 1 | 1 | 0 |
| +188.5 | +18.33° | 0 | 0 | 0 | 1 | 1 | 1 | 0 | 0 |
| +189.5 | +18.43° | 0 | 0 | 1 | 1 | 1 | 0 | 0 | 0 |
| +190.5 | +18.53° | 0 | 1 | 1 | 1 | 0 | 0 | 0 | 0 |
| +191.5 | +18.63° | 1 | 1 | 1 | 1 | 0 | 0 | 0 | 1 |
| +192.5 | +18.73° | 1 | 1 | 1 | 0 | 0 | 0 | 1 | 1 |
| +193.5 | +18.83° | 1 | 1 | 0 | 0 | 0 | 1 | 1 | 1 |
| +194.5 | +18.93° | 1 | 0 | 0 | 0 | 1 | 1 | 1 | 0 |
| +195.5 | +19.03° | 0 | 0 | 0 | 1 | 1 | 1 | 1 | 0 |
| +196.5 | +19.13° | 0 | 0 | 0 | 1 | 1 | 1 | 0 | 0 |
| +197.5 | +19.23° | 0 | 0 | 1 | 1 | 1 | 0 | 0 | 0 |
| +198.5 | +19.34° | 0 | 1 | 1 | 1 | 0 | 0 | 0 | 1 |
| +199.5 | +19.44° | 1 | 1 | 1 | 0 | 0 | 0 | 1 | 1 |

-continued

| | | | | | | | | | |
|---|---|---|---|---|---|---|---|---|---|
| +200.5 | +19.54° | 1 | 1 | 1 | 0 | 0 | 0 | 1 | 1 |
| +201.5 | +19.64° | 1 | 1 | 0 | 0 | 0 | 1 | 1 | 1 |
| +202.5 | +19.74° | 1 | 0 | 0 | 0 | 1 | 1 | 1 | 0 |
| +203.5 | +19.84° | 0 | 0 | 0 | 1 | 1 | 1 | 0 | 0 |
| +204.5 | +19.94° | 0 | 0 | 0 | 1 | 1 | 1 | 0 | 0 |
| +205.5 | +20.05° | 0 | 0 | 1 | 1 | 1 | 0 | 0 | 0 |
| +206.5 | +20.15° | 0 | 1 | 1 | 1 | 0 | 0 | 0 | 1 |
| +207.5 | +20.25° | 1 | 1 | 1 | 0 | 0 | 0 | 1 | 1 |
| +208.5 | +20.35° | 1 | 1 | 1 | 0 | 0 | 1 | 1 | 1 |
| +209.5 | +20.45° | 1 | 1 | 0 | 0 | 0 | 1 | 1 | 1 |
| +210.5 | +20.56° | 1 | 0 | 0 | 0 | 1 | 1 | 1 | 0 |
| +211.5 | +20.66° | 0 | 0 | 0 | 1 | 1 | 1 | 0 | 0 |
| +212.5 | +20.76° | 0 | 0 | 1 | 1 | 1 | 0 | 0 | 0 |
| +213.5 | +20.86° | 0 | 0 | 1 | 1 | 1 | 0 | 0 | 1 |
| +214.5 | +20.97° | 0 | 1 | 1 | 1 | 0 | 0 | 0 | 1 |
| +215.5 | +21.07° | 1 | 1 | 1 | 0 | 0 | 0 | 1 | 1 |
| +216.5 | +21.17° | 1 | 1 | 0 | 0 | 0 | 1 | 1 | 1 |
| +217.5 | +21.27° | 1 | 1 | 0 | 0 | 1 | 1 | 1 | 0 |
| +218.5 | +21.37° | 1 | 0 | 0 | 0 | 1 | 1 | 1 | 0 |
| +219.5 | +21.48° | 0 | 0 | 0 | 1 | 1 | 1 | 0 | 0 |
| +220.5 | +21.58° | 0 | 0 | 1 | 1 | 1 | 0 | 0 | 0 |
| +221.5 | +21.68° | 0 | 0 | 1 | 1 | 0 | 0 | 0 | 1 |
| +222.5 | +21.79° | 0 | 1 | 1 | 1 | 0 | 0 | 1 | 1 |
| +223.5 | +21.89° | 1 | 1 | 1 | 0 | 0 | 0 | 1 | 1 |
| +224.5 | +21.99° | 1 | 1 | 0 | 0 | 0 | 1 | 1 | 1 |
| +225.5 | +22.10° | 1 | 1 | 0 | 0 | 1 | 1 | 1 | 0 |
| +226.5 | +22.20° | 1 | 0 | 0 | 0 | 1 | 1 | 0 | 0 |
| +227.5 | +22.30° | 0 | 0 | 0 | 1 | 1 | 1 | 0 | 0 |
| +228.5 | +22.40° | 0 | 0 | 1 | 1 | 1 | 0 | 0 | 0 |
| +229.5 | +22.51° | 0 | 0 | 1 | 1 | 0 | 0 | 0 | 1 |
| +230.5 | +22.61° | 0 | 1 | 1 | 1 | 0 | 0 | 1 | 1 |
| +231.5 | +22.72° | 1 | 1 | 1 | 0 | 0 | 0 | 1 | 1 |
| +232.5 | +22.82° | 1 | 1 | 0 | 0 | 0 | 1 | 1 | 0 |
| +233.5 | +22.92° | 1 | 1 | 0 | 0 | 1 | 1 | 1 | 0 |
| +234.5 | +23.03° | 1 | 0 | 0 | 0 | 1 | 1 | 0 | 0 |
| +235.5 | +23.13° | 0 | 0 | 0 | 1 | 1 | 0 | 0 | 0 |
| +236.5 | +23.23° | 0 | 0 | 1 | 1 | 1 | 0 | 0 | 1 |
| +237.5 | +23.34° | 0 | 0 | 1 | 1 | 0 | 0 | 0 | 1 |
| +238.5 | +23.44° | 0 | 1 | 1 | 0 | 0 | 0 | 1 | 1 |
| +239.5 | +23.55° | 1 | 1 | 1 | 0 | 0 | 1 | 1 | 1 |
| +240.5 | +23.65° | 1 | 1 | 0 | 0 | 0 | 1 | 1 | 0 |
| +241.5 | +23.76° | 1 | 1 | 0 | 0 | 1 | 1 | 1 | 0 |
| +242.5 | +23.86° | 1 | 0 | 0 | 1 | 1 | 1 | 0 | 0 |
| +243.5 | +23.96° | 0 | 0 | 0 | 1 | 1 | 0 | 0 | 0 |
| +244.5 | +24.07° | 0 | 0 | 1 | 1 | 1 | 0 | 0 | 1 |
| +245.5 | +24.17° | 0 | 0 | 1 | 1 | 0 | 0 | 1 | 1 |
| +246.5 | +24.28° | 0 | 1 | 1 | 0 | 0 | 0 | 1 | 1 |
| +247.5 | +24.38° | 1 | 1 | 1 | 0 | 0 | 1 | 1 | 1 |
| +248.5 | +24.49° | 1 | 1 | 0 | 0 | 0 | 1 | 1 | 0 |
| +249.5 | +24.59° | 1 | 1 | 0 | 0 | 1 | 1 | 0 | 0 |
| +250.5 | +24.70° | 1 | 0 | 0 | 1 | 1 | 1 | 0 | 0 |
| +251.5 | +24.80° | 0 | 0 | 0 | 1 | 1 | 0 | 0 | 1 |
| +252.5 | +24.91° | 0 | 0 | 1 | 1 | 0 | 0 | 0 | 1 |
| +253.5 | +25.01° | 0 | 1 | 1 | 0 | 0 | 0 | 1 | 1 |
| +254.5 | +25.12° | 0 | 1 | 1 | 0 | 0 | 0 | 1 | 1 |
| +255.5 | +25.23° | 1 | 1 | 1 | 0 | 0 | 1 | 1 | 0 |
| +256.5 | +25.33° | 1 | 1 | 0 | 0 | 1 | 1 | 1 | 0 |
| +257.5 | +25.44° | 1 | 0 | 0 | 0 | 1 | 1 | 0 | 0 |
| +258.5 | +25.54° | 1 | 0 | 0 | 1 | 1 | 1 | 0 | 0 |
| +259.5 | +25.65° | 0 | 0 | 0 | 1 | 1 | 0 | 0 | 1 |
| +260.5 | +25.76° | 0 | 0 | 1 | 1 | 0 | 0 | 0 | 1 |
| +261.5 | +25.86° | 0 | 1 | 1 | 1 | 0 | 0 | 1 | 1 |
| +262.5 | +25.97° | 0 | 1 | 1 | 0 | 0 | 1 | 1 | 1 |
| +263.5 | +26.07° | 1 | 1 | 1 | 0 | 0 | 1 | 1 | 0 |
| +264.5 | +26.18° | 1 | 1 | 0 | 0 | 1 | 1 | 1 | 0 |
| +265.5 | +26.29° | 1 | 0 | 0 | 0 | 1 | 1 | 0 | 0 |
| +266.5 | +26.39° | 1 | 0 | 0 | 1 | 1 | 0 | 0 | 0 |
| +267.5 | +26.50° | 0 | 0 | 0 | 1 | 1 | 0 | 0 | 1 |
| +268.5 | +26.61° | 0 | 0 | 1 | 1 | 0 | 0 | 1 | 1 |
| +269.5 | +26.71° | 0 | 1 | 1 | 1 | 0 | 0 | 1 | 1 |
| +270.5 | +26.82° | 0 | 1 | 1 | 0 | 0 | 1 | 1 | 0 |
| +271.5 | +26.93° | 1 | 1 | 0 | 0 | 0 | 1 | 1 | 0 |
| +272.5 | +27.04° | 1 | 1 | 0 | 0 | 1 | 1 | 0 | 0 |
| +273.5 | +27.14° | 1 | 0 | 0 | 0 | 1 | 1 | 0 | 0 |
| +274.5 | +27.25° | 1 | 0 | 0 | 1 | 1 | 0 | 0 | 1 |
| +275.5 | +27.36° | 0 | 0 | 1 | 1 | 1 | 0 | 0 | 1 |
| +276.5 | +27.47° | 0 | 0 | 1 | 1 | 0 | 0 | 1 | 1 |
| +277.5 | +27.57° | 0 | 1 | 1 | 1 | 0 | 0 | 1 | 1 |
| +278.5 | +27.68° | 0 | 1 | 1 | 0 | 0 | 1 | 1 | 0 |

-continued

| | | | | | | | | | |
|---|---|---|---|---|---|---|---|---|---|
| +279.5 | +27.79° | 1 | 1 | 0 | 0 | 0 | 1 | 1 | 0 |
| +280.5 | +27.90° | 1 | 1 | 0 | 0 | 1 | 1 | 0 | 0 |
| +281.5 | +28.01° | 1 | 0 | 0 | 1 | 1 | 1 | 0 | 0 |
| +282.5 | +28.11° | 1 | 0 | 0 | 1 | 1 | 0 | 0 | 1 |
| +283.5 | +28.22° | 0 | 0 | 1 | 1 | 0 | 0 | 0 | 1 |
| +284.5 | +28.33° | 0 | 0 | 1 | 1 | 0 | 0 | 1 | 1 |
| +285.5 | +28.44° | 0 | 1 | 1 | 0 | 0 | 0 | 1 | 1 |
| +286.5 | +28.55° | 0 | 1 | 1 | 0 | 0 | 1 | 1 | 0 |
| +287.5 | +28.66° | 1 | 1 | 0 | 0 | 1 | 1 | 1 | 0 |
| +288.5 | +28.77° | 1 | 1 | 0 | 0 | 1 | 1 | 0 | 0 |
| +289.5 | +28.88° | 1 | 0 | 0 | 1 | 1 | 0 | 0 | 0 |
| +290.5 | +28.98° | 1 | 0 | 0 | 1 | 1 | 0 | 0 | 1 |
| +291.5 | +29.09° | 0 | 0 | 1 | 1 | 0 | 0 | 1 | 1 |
| +292.5 | +29.20° | 0 | 0 | 1 | 1 | 0 | 0 | 1 | 1 |
| +293.5 | +29.31° | 0 | 1 | 1 | 0 | 0 | 1 | 1 | 0 |
| +294.5 | +29.42° | 0 | 1 | 1 | 0 | 0 | 1 | 1 | 0 |
| +295.5 | +29.53° | 1 | 1 | 0 | 0 | 1 | 1 | 0 | 0 |
| +296.5 | +29.64° | 1 | 1 | 0 | 0 | 1 | 1 | 0 | 0 |
| +297.5 | +29.75° | 1 | 0 | 0 | 1 | 1 | 0 | 0 | 1 |
| +298.5 | +29.86° | 1 | 0 | 0 | 1 | 1 | 0 | 0 | 1 |
| +299.5 | +29.97° | 0 | 0 | 1 | 1 | 0 | 0 | 1 | 1 |
| +300.5 | +30.08° | 0 | 0 | 1 | 1 | 0 | 0 | 1 | 1 |
| +301.5 | +30.19° | 0 | 1 | 1 | 0 | 0 | 1 | 1 | 0 |
| +302.5 | +30.30° | 0 | 1 | 1 | 0 | 0 | 1 | 1 | 0 |
| +303.5 | +30.41° | 1 | 1 | 0 | 0 | 1 | 1 | 0 | 0 |
| +304.5 | +30.53° | 1 | 1 | 0 | 0 | 1 | 1 | 0 | 0 |
| +305.5 | +30.64° | 1 | 0 | 0 | 1 | 1 | 0 | 0 | 1 |
| +306.5 | +30.75° | 1 | 0 | 0 | 1 | 1 | 0 | 0 | 1 |
| +307.5 | +30.86° | 0 | 0 | 1 | 1 | 0 | 0 | 1 | 1 |
| +308.5 | +30.97° | 0 | 0 | 1 | 1 | 0 | 0 | 1 | 1 |
| +309.5 | +31.08° | 0 | 1 | 1 | 0 | 0 | 1 | 1 | 0 |
| +310.5 | +31.19° | 0 | 1 | 1 | 0 | 0 | 1 | 1 | 0 |
| +311.5 | +31.31° | 1 | 1 | 0 | 0 | 1 | 1 | 0 | 0 |
| +312.5 | +31.42° | 1 | 1 | 0 | 0 | 1 | 1 | 0 | 1 |
| +313.5 | +31.53° | 1 | 0 | 0 | 1 | 1 | 0 | 0 | 1 |
| +314.5 | +31.64° | 1 | 0 | 0 | 1 | 1 | 0 | 1 | 1 |
| +315.5 | +31.75° | 0 | 0 | 1 | 1 | 0 | 0 | 1 | 1 |
| +316.5 | +31.87° | 0 | 0 | 1 | 1 | 0 | 1 | 1 | 0 |
| +317.5 | +31.98° | 0 | 1 | 1 | 0 | 0 | 1 | 1 | 0 |
| +318.5 | +32.09° | 0 | 1 | 1 | 0 | 1 | 1 | 0 | 0 |
| +319.5 | +32.20° | 1 | 1 | 0 | 0 | 1 | 1 | 0 | 0 |
| +320.5 | +32.32° | 1 | 1 | 0 | 0 | 1 | 0 | 0 | 1 |
| +321.5 | +32.43° | 1 | 0 | 0 | 1 | 1 | 0 | 0 | 1 |
| +322.5 | +32.54° | 1 | 0 | 0 | 1 | 0 | 0 | 1 | 1 |
| +323.5 | +32.66° | 0 | 0 | 1 | 1 | 0 | 0 | 1 | 1 |
| +324.5 | +32.77° | 0 | 0 | 1 | 0 | 0 | 1 | 1 | 0 |
| +325.5 | +32.88° | 0 | 1 | 1 | 0 | 0 | 1 | 1 | 0 |
| +326.5 | +33.00° | 0 | 1 | 1 | 0 | 1 | 1 | 0 | 0 |
| +327.5 | +33.11° | 1 | 1 | 0 | 0 | 1 | 1 | 0 | 0 |
| +328.5 | +33.23° | 1 | 1 | 0 | 1 | 1 | 0 | 0 | 1 |
| +329.5 | +33.34° | 1 | 0 | 0 | 1 | 1 | 0 | 0 | 1 |
| +330.5 | +33.46° | 1 | 0 | 1 | 1 | 0 | 0 | 1 | 1 |
| +331.5 | +33.57° | 0 | 0 | 1 | 1 | 0 | 0 | 1 | 0 |
| +332.5 | +33.69° | 0 | 0 | 1 | 0 | 0 | 1 | 1 | 0 |
| +333.5 | +33.80° | 0 | 1 | 1 | 0 | 0 | 1 | 1 | 0 |
| +334.5 | +33.92° | 0 | 1 | 0 | 0 | 1 | 1 | 0 | 0 |
| +335.5 | +34.03° | 1 | 1 | 0 | 0 | 1 | 1 | 0 | 1 |
| +336.5 | +34.15° | 1 | 1 | 0 | 0 | 1 | 1 | 0 | 1 |
| +337.5 | +34.26° | 1 | 0 | 0 | 1 | 1 | 0 | 1 | 1 |
| +338.5 | +34.38° | 1 | 0 | 1 | 1 | 0 | 0 | 1 | 1 |
| +339.5 | +34.49° | 0 | 0 | 1 | 1 | 0 | 0 | 1 | 0 |
| +340.5 | +34.61° | 0 | 0 | 1 | 0 | 0 | 1 | 1 | 0 |
| +341.5 | +34.73° | 0 | 1 | 1 | 0 | 0 | 1 | 0 | 0 |
| +342.5 | +34.84° | 0 | 1 | 0 | 0 | 1 | 1 | 0 | 0 |
| +343.5 | +34.96° | 1 | 1 | 0 | 0 | 1 | 0 | 0 | 1 |
| +344.5 | +35.07° | 1 | 1 | 0 | 1 | 1 | 0 | 0 | 1 |
| +345.5 | +35.19° | 1 | 0 | 0 | 1 | 1 | 0 | 1 | 1 |
| +346.5 | +35.31° | 1 | 0 | 1 | 1 | 0 | 0 | 1 | 1 |
| +347.5 | +35.43° | 0 | 0 | 1 | 1 | 0 | 1 | 1 | 0 |
| +348.5 | +35.54° | 0 | 0 | 1 | 0 | 0 | 1 | 1 | 0 |
| +349.5 | +35.66° | 0 | 1 | 1 | 0 | 0 | 1 | 0 | 0 |
| +350.5 | +35.78° | 0 | 1 | 0 | 0 | 1 | 1 | 0 | 1 |
| +351.5 | +35.90° | 1 | 1 | 0 | 0 | 1 | 0 | 0 | 1 |
| +352.5 | +36.01° | 1 | 0 | 0 | 1 | 1 | 0 | 0 | 1 |
| +353.5 | +36.13° | 1 | 0 | 0 | 1 | 0 | 0 | 1 | 1 |
| +354.5 | +36.25° | 1 | 0 | 1 | 1 | 0 | 0 | 1 | 0 |
| +355.5 | +36.37° | 0 | 0 | 1 | 1 | 0 | 1 | 1 | 0 |
| +356.5 | +36.49° | 0 | 1 | 1 | 0 | 0 | 1 | 1 | 0 |
| +357.5 | +36.61° | 0 | 1 | 1 | 0 | 1 | 1 | 0 | 0 |

| | | | | | | | | | |
|---|---|---|---|---|---|---|---|---|---|
| +358.5 | +36.73° | 0 | 1 | 0 | 0 | 1 | 1 | 0 | 1 |
| +359.5 | +36.85° | 1 | 1 | 0 | 0 | 1 | 0 | 0 | 1 |
| +360.5 | +36.97° | 1 | 0 | 0 | 1 | 1 | 0 | 1 | 1 |
| +361.5 | +37.09° | 1 | 0 | 0 | 1 | 0 | 0 | 1 | 1 |
| +362.5 | +37.21° | 1 | 0 | 1 | 1 | 0 | 0 | 1 | 0 |
| +363.5 | +37.33° | 0 | 0 | 1 | 1 | 0 | 1 | 1 | 0 |
| +364.5 | +37.45° | 0 | 1 | 1 | 0 | 0 | 1 | 0 | 0 |
| +365.5 | +37.57° | 0 | 1 | 1 | 0 | 1 | 1 | 0 | 0 |
| +366.5 | +37.69° | 0 | 1 | 0 | 0 | 1 | 1 | 0 | 1 |
| +367.5 | +37.81° | 1 | 1 | 0 | 1 | 1 | 0 | 0 | 1 |
| +368.5 | +37.93° | 1 | 0 | 0 | 1 | 1 | 0 | 1 | 1 |
| +369.5 | +38.05° | 1 | 0 | 0 | 1 | 0 | 0 | 1 | 1 |
| +370.5 | +38.17° | 1 | 0 | 1 | 1 | 0 | 1 | 1 | 0 |
| +371.5 | +38.29° | 0 | 0 | 1 | 0 | 0 | 1 | 1 | 0 |
| +372.5 | +38.41° | 0 | 1 | 1 | 0 | 0 | 1 | 0 | 0 |
| +373.5 | +38.54° | 0 | 1 | 1 | 0 | 1 | 1 | 0 | 1 |
| +374.5 | +38.66° | 0 | 1 | 0 | 0 | 1 | 0 | 0 | 1 |
| +375.5 | +38.78° | 1 | 1 | 0 | 1 | 1 | 0 | 0 | 1 |
| +376.5 | +38.90° | 1 | 0 | 0 | 1 | 1 | 0 | 1 | 1 |
| +377.5 | +39.03° | 1 | 0 | 0 | 1 | 0 | 0 | 1 | 0 |
| +378.5 | +39.15° | 1 | 0 | 1 | 1 | 0 | 1 | 1 | 0 |
| +379.5 | +39.27° | 0 | 0 | 1 | 0 | 0 | 1 | 1 | 0 |
| +380.5 | +39.40° | 0 | 1 | 1 | 0 | 0 | 1 | 0 | 0 |
| +381.5 | +39.52° | 0 | 1 | 1 | 0 | 1 | 1 | 0 | 1 |
| +382.5 | +39.65° | 0 | 1 | 0 | 0 | 1 | 0 | 0 | 1 |
| +383.5 | +39.77° | 1 | 1 | 0 | 1 | 1 | 0 | 1 | 1 |
| +384.5 | +39.89° | 1 | 0 | 0 | 1 | 0 | 0 | 1 | 1 |
| +385.5 | +40.02° | 1 | 0 | 0 | 1 | 0 | 0 | 1 | 0 |
| +386.5 | +40.14° | 1 | 0 | 1 | 0 | 0 | 1 | 1 | 0 |
| +387.5 | +40.27° | 0 | 0 | 1 | 0 | 0 | 1 | 0 | 0 |
| +388.5 | +40.39° | 0 | 1 | 1 | 0 | 1 | 1 | 0 | 0 |
| +389.5 | +40.52° | 0 | 1 | 1 | 0 | 1 | 1 | 0 | 1 |
| +390.5 | +40.65° | 0 | 1 | 0 | 0 | 1 | 0 | 0 | 1 |
| +391.5 | +40.77° | 1 | 1 | 0 | 1 | 1 | 0 | 1 | 1 |
| +392.5 | +40.90° | 1 | 0 | 0 | 1 | 0 | 0 | 1 | 0 |
| +393.5 | +41.02° | 1 | 0 | 1 | 1 | 0 | 0 | 1 | 0 |
| +394.5 | +41.15° | 1 | 0 | 1 | 1 | 0 | 1 | 1 | 0 |
| +395.5 | +41.28° | 0 | 0 | 1 | 0 | 0 | 1 | 0 | 0 |
| +396.5 | +41.41° | 0 | 1 | 1 | 0 | 1 | 1 | 0 | 1 |
| +397.5 | +41.53° | 0 | 1 | 0 | 0 | 1 | 0 | 0 | 1 |
| +398.5 | +41.66° | 0 | 1 | 0 | 0 | 1 | 0 | 0 | 1 |
| +399.5 | +41.79° | 1 | 1 | 0 | 1 | 1 | 0 | 1 | 1 |
| +400.5 | +41.92° | 1 | 0 | 0 | 1 | 0 | 0 | 1 | 0 |
| +401.5 | +42.05° | 1 | 0 | 1 | 1 | 0 | 1 | 1 | 0 |
| +402.5 | +42.17° | 1 | 0 | 1 | 1 | 0 | 1 | 1 | 0 |
| +403.5 | +42.30° | 0 | 0 | 1 | 0 | 0 | 1 | 0 | 0 |
| +404.5 | +42.43° | 0 | 1 | 1 | 0 | 1 | 1 | 0 | 1 |
| +405.5 | +42.56° | 0 | 1 | 0 | 0 | 1 | 0 | 0 | 1 |
| +406.5 | +42.69° | 0 | 1 | 0 | 0 | 1 | 0 | 1 | 1 |
| +407.5 | +42.82° | 1 | 1 | 0 | 1 | 1 | 0 | 1 | 1 |
| +408.5 | +42.95° | 1 | 0 | 0 | 1 | 0 | 0 | 1 | 0 |
| +409.5 | +43.08° | 1 | 0 | 1 | 1 | 0 | 1 | 1 | 0 |
| +410.5 | +43.21° | 1 | 0 | 1 | 0 | 0 | 1 | 0 | 0 |
| +411.5 | +43.35° | 0 | 0 | 1 | 0 | 0 | 1 | 0 | 1 |
| +412.5 | +43.48° | 0 | 1 | 1 | 0 | 1 | 1 | 0 | 1 |
| +413.5 | +43.61° | 0 | 1 | 0 | 0 | 1 | 0 | 0 | 1 |
| +414.5 | +43.74° | 0 | 1 | 0 | 1 | 1 | 0 | 1 | 1 |
| +415.5 | +43.87° | 1 | 1 | 0 | 1 | 1 | 0 | 1 | 0 |
| +416.5 | +44.01° | 1 | 0 | 0 | 1 | 0 | 0 | 1 | 0 |
| +417.5 | +44.14° | 1 | 0 | 1 | 1 | 0 | 1 | 1 | 0 |
| +418.5 | +44.27° | 1 | 0 | 1 | 0 | 0 | 1 | 0 | 0 |
| +419.5 | +44.41° | 0 | 0 | 1 | 0 | 1 | 1 | 0 | 1 |
| +420.5 | +44.54° | 0 | 1 | 1 | 0 | 1 | 1 | 0 | 1 |
| +421.5 | +44.68° | 0 | 1 | 0 | 0 | 1 | 0 | 0 | 1 |
| +422.5 | +44.81° | 0 | 1 | 0 | 1 | 1 | 0 | 1 | 1 |
| +423.5 | +44.94° | 1 | 1 | 0 | 1 | 0 | 0 | 1 | 0 |
| +424.5 | +45.08° | 1 | 0 | 0 | 1 | 0 | 1 | 1 | 0 |
| +425.5 | +45.22° | 1 | 0 | 1 | 1 | 0 | 1 | 1 | 0 |
| +426.5 | +45.35° | 1 | 0 | 1 | 0 | 0 | 1 | 0 | 0 |
| +427.5 | +45.49° | 0 | 0 | 1 | 0 | 1 | 1 | 0 | 1 |
| +428.5 | +45.62° | 0 | 1 | 1 | 0 | 1 | 0 | 0 | 1 |
| +429.5 | +45.76° | 0 | 1 | 0 | 0 | 1 | 0 | 1 | 1 |
| +430.5 | +45.90° | 0 | 1 | 0 | 1 | 1 | 0 | 1 | 0 |
| +431.5 | +46.04° | 1 | 1 | 0 | 1 | 0 | 0 | 1 | 0 |
| +432.5 | +46.17° | 1 | 0 | 0 | 1 | 0 | 1 | 0 | 0 |
| +433.5 | +46.31° | 1 | 0 | 1 | 1 | 0 | 1 | 0 | 0 |
| +434.5 | +46.45° | 1 | 0 | 1 | 0 | 0 | 1 | 0 | 1 |
| +435.5 | +46.59° | 0 | 0 | 1 | 0 | 1 | 1 | 0 | 1 |
| +436.5 | +46.73° | 0 | 1 | 1 | 0 | 1 | 0 | 0 | 1 |

-continued

| | | | | | | | | | |
|---|---|---|---|---|---|---|---|---|---|
| +437.5 | +46.87° | 0 | 1 | 0 | 0 | 1 | 0 | 1 | 1 |
| +438.5 | +47.01° | 0 | 1 | 0 | 1 | 1 | 0 | 1 | 0 |
| +439.5 | +47.15° | 1 | 1 | 0 | 1 | 0 | 0 | 1 | 0 |
| +440.5 | +47.29° | 1 | 0 | 0 | 1 | 0 | 1 | 1 | 0 |
| +441.5 | +47.43° | 1 | 0 | 1 | 1 | 0 | 1 | 0 | 0 |
| +442.5 | +47.57° | 1 | 0 | 1 | 0 | 0 | 1 | 0 | 1 |
| +443.5 | +47.71° | 0 | 0 | 1 | 0 | 1 | 1 | 0 | 1 |
| +444.5 | +47.86° | 0 | 1 | 1 | 0 | 1 | 0 | 0 | 1 |
| +445.5 | +48.00° | 0 | 1 | 0 | 0 | 1 | 0 | 1 | 1 |
| +446.5 | +48.14° | 0 | 1 | 0 | 1 | 1 | 0 | 1 | 0 |
| +447.5 | +48.28° | 1 | 1 | 0 | 1 | 0 | 0 | 1 | 0 |
| +448.5 | +48.43° | 1 | 0 | 0 | 1 | 0 | 1 | 1 | 0 |
| +449.5 | +48.57° | 1 | 0 | 1 | 1 | 0 | 1 | 0 | 0 |
| +450.5 | +48.72° | 0 | 0 | 1 | 0 | 1 | 1 | 0 | 1 |
| +451.5 | +48.86° | 0 | 1 | 1 | 0 | 1 | 0 | 0 | 1 |
| +452.5 | +49.01° | 0 | 1 | 0 | 0 | 1 | 0 | 1 | 1 |
| +453.5 | +49.15° | 0 | 1 | 0 | 1 | 1 | 0 | 1 | 0 |
| +454.5 | +49.30° | 1 | 1 | 0 | 1 | 0 | 0 | 1 | 0 |
| +455.5 | +49.45° | 1 | 0 | 0 | 1 | 0 | 1 | 1 | 0 |
| +456.5 | +49.59° | 1 | 0 | 1 | 1 | 0 | 1 | 0 | 0 |
| +457.5 | +49.74° | 1 | 0 | 1 | 0 | 0 | 1 | 0 | 1 |
| +458.5 | +49.89° | 0 | 0 | 1 | 0 | 1 | 1 | 0 | 1 |
| +459.5 | +50.04° | 0 | 1 | 1 | 0 | 1 | 0 | 0 | 1 |
| +460.5 | +50.19° | 0 | 1 | 0 | 0 | 1 | 0 | 1 | 1 |
| +461.5 | +50.34° | 0 | 1 | 0 | 1 | 1 | 0 | 1 | 0 |
| +462.5 | +50.49° | 1 | 1 | 0 | 1 | 0 | 0 | 1 | 0 |
| +463.5 | +50.64° | 1 | 0 | 0 | 1 | 0 | 1 | 1 | 0 |
| +464.5 | +50.79° | 1 | 0 | 1 | 1 | 0 | 1 | 0 | 0 |
| +465.5 | +50.94° | 1 | 0 | 1 | 0 | 0 | 1 | 0 | 1 |
| +466.5 | +51.09° | 0 | 0 | 1 | 0 | 1 | 1 | 0 | 1 |
| +467.5 | +51.24° | 0 | 1 | 1 | 0 | 1 | 0 | 0 | 1 |
| +468.5 | +51.40° | 0 | 1 | 0 | 0 | 1 | 0 | 1 | 1 |
| +469.5 | +51.55° | 0 | 1 | 0 | 1 | 1 | 0 | 1 | 0 |
| +470.5 | +51.70° | 1 | 1 | 0 | 1 | 0 | 0 | 1 | 0 |
| +471.5 | +51.86° | 1 | 0 | 0 | 1 | 0 | 1 | 1 | 0 |
| +472.5 | +52.01° | 1 | 0 | 1 | 1 | 0 | 1 | 0 | 1 |
| +473.5 | +52.17° | 1 | 0 | 1 | 0 | 0 | 1 | 0 | 1 |
| +474.5 | +52.33° | 0 | 0 | 1 | 0 | 1 | 1 | 0 | 1 |
| +475.5 | +52.48° | 0 | 1 | 1 | 0 | 1 | 0 | 1 | 1 |
| +476.5 | +52.64° | 0 | 1 | 0 | 0 | 1 | 0 | 1 | 0 |
| +477.5 | +52.80° | 0 | 1 | 0 | 1 | 1 | 0 | 1 | 0 |
| +478.5 | +52.96° | 1 | 1 | 0 | 1 | 0 | 1 | 1 | 0 |
| +479.5 | +53.11° | 1 | 0 | 0 | 1 | 0 | 1 | 0 | 0 |
| +480.5 | +53.27° | 1 | 0 | 1 | 1 | 0 | 1 | 0 | 1 |
| +481.5 | +53.43° | 1 | 0 | 1 | 0 | 0 | 1 | 0 | 1 |
| +482.5 | +53.59° | 0 | 0 | 1 | 0 | 1 | 0 | 0 | 1 |
| +483.5 | +53.76° | 0 | 1 | 1 | 0 | 1 | 0 | 1 | 1 |
| +484.5 | +53.92° | 0 | 1 | 0 | 0 | 1 | 0 | 1 | 0 |
| +485.5 | +54.08° | 0 | 1 | 0 | 1 | 0 | 0 | 1 | 0 |
| +486.5 | +54.24° | 1 | 1 | 0 | 1 | 0 | 1 | 1 | 0 |
| +487.5 | +54.41° | 1 | 0 | 0 | 1 | 0 | 1 | 0 | 0 |
| +488.5 | +54.57° | 1 | 0 | 1 | 1 | 0 | 1 | 0 | 1 |
| +489.5 | +54.74° | 1 | 0 | 1 | 0 | 1 | 1 | 0 | 1 |
| +490.5 | +54.90° | 0 | 0 | 1 | 0 | 1 | 0 | 0 | 1 |
| +491.5 | +55.07° | 0 | 1 | 1 | 0 | 1 | 0 | 1 | 0 |
| +492.5 | +55.24° | 0 | 1 | 0 | 0 | 1 | 0 | 1 | 0 |
| +493.5 | +55.41° | 0 | 1 | 0 | 1 | 0 | 0 | 1 | 0 |
| +494.5 | +55.57° | 1 | 1 | 0 | 1 | 0 | 1 | 1 | 0 |
| +495.5 | +55.74° | 1 | 0 | 0 | 1 | 0 | 1 | 0 | 1 |
| +496.5 | +55.91° | 1 | 0 | 1 | 0 | 0 | 1 | 0 | 1 |
| +497.5 | +56.08° | 1 | 0 | 1 | 0 | 1 | 1 | 0 | 1 |
| +498.5 | +56.26° | 0 | 0 | 1 | 0 | 1 | 0 | 1 | 1 |
| +499.5 | +56.43° | 0 | 1 | 1 | 0 | 1 | 0 | 1 | 0 |
| +500.5 | +56.60° | 0 | 1 | 0 | 1 | 1 | 0 | 1 | 0 |
| +501.5 | +56.78° | 0 | 1 | 0 | 1 | 0 | 0 | 1 | 0 |
| +502.5 | +56.95° | 1 | 1 | 0 | 1 | 0 | 1 | 0 | 0 |
| +503.5 | +57.13° | 1 | 0 | 0 | 1 | 0 | 1 | 0 | 1 |
| +504.5 | +57.30° | 1 | 0 | 1 | 0 | 0 | 1 | 0 | 1 |
| +505.5 | +57.48° | 1 | 0 | 1 | 0 | 1 | 0 | 0 | 1 |
| +506.5 | +57.66° | 0 | 0 | 1 | 0 | 1 | 0 | 1 | 1 |
| +507.5 | +57.84° | 0 | 1 | 1 | 0 | 1 | 0 | 1 | 0 |
| +508.5 | +58.02° | 0 | 1 | 0 | 1 | 1 | 0 | 1 | 0 |
| +509.5 | +58.20° | 0 | 1 | 0 | 1 | 0 | 1 | 1 | 0 |
| +510.5 | +58.38° | 1 | 1 | 0 | 1 | 0 | 1 | 0 | 1 |
| +511.5 | +58.56° | 1 | 0 | 0 | 1 | 0 | 1 | 0 | 1 |
| +512.5 | +58.75° | 1 | 0 | 1 | 0 | 0 | 1 | 0 | 1 |
| +513.5 | +58.93° | 1 | 0 | 1 | 0 | 1 | 0 | 0 | 1 |
| +514.5 | +59.12° | 0 | 0 | 1 | 0 | 1 | 0 | 1 | 0 |
| +515.5 | +59.30° | 0 | 1 | 0 | 0 | 1 | 0 | 1 | 0 |

-continued

| | | | | | | | | | |
|---|---|---|---|---|---|---|---|---|---|
| +516.5 | +59.49° | 0 | 1 | 0 | 1 | 1 | 0 | 1 | 0 |
| +517.5 | +59.68° | 0 | 1 | 0 | 1 | 0 | 1 | 1 | 0 |
| +518.5 | +59.87° | 1 | 1 | 0 | 1 | 0 | 1 | 0 | 1 |
| +519.5 | +60.06° | 1 | 0 | 1 | 1 | 0 | 1 | 0 | 1 |
| +520.5 | +60.25° | 1 | 0 | 1 | 0 | 1 | 1 | 0 | 1 |
| +521.5 | +60.45° | 1 | 0 | 1 | 0 | 1 | 0 | 1 | 1 |
| +522.5 | +60.64° | 0 | 0 | 1 | 0 | 1 | 0 | 1 | 0 |
| +523.5 | +60.84° | 0 | 1 | 0 | 0 | 1 | 0 | 1 | 0 |
| +524.5 | +61.03° | 0 | 1 | 0 | 1 | 0 | 0 | 1 | 0 |
| +525.5 | +61.23° | 0 | 1 | 0 | 1 | 0 | 1 | 0 | 0 |
| +526.5 | +61.43° | 1 | 1 | 0 | 1 | 0 | 1 | 0 | 1 |
| +527.5 | +61.63° | 1 | 0 | 1 | 1 | 0 | 1 | 0 | 1 |
| +528.5 | +61.83° | 1 | 0 | 1 | 0 | 1 | 1 | 0 | 1 |
| +529.5 | +62.04° | 1 | 0 | 1 | 0 | 1 | 0 | 1 | 1 |
| +530.5 | +62.24° | 0 | 0 | 1 | 0 | 1 | 0 | 1 | 0 |
| +531.5 | +62.45° | 0 | 1 | 0 | 0 | 1 | 0 | 1 | 0 |
| +532.5 | +62.65° | 0 | 1 | 0 | 1 | 0 | 1 | 1 | 0 |
| +533.5 | +62.86° | 0 | 1 | 0 | 1 | 0 | 1 | 0 | 1 |
| +534.5 | +63.07° | 1 | 1 | 0 | 1 | 0 | 1 | 0 | 1 |
| +535.5 | +63.28° | 1 | 0 | 1 | 1 | 0 | 1 | 0 | 1 |
| +536.5 | +63.50° | 1 | 0 | 1 | 0 | 1 | 0 | 0 | 1 |
| +537.5 | +63.71° | 1 | 0 | 1 | 0 | 1 | 0 | 1 | 0 |
| +538.5 | +63.93° | 0 | 0 | 1 | 0 | 1 | 0 | 1 | 0 |
| +539.5 | +64.15° | 0 | 1 | 0 | 1 | 1 | 0 | 1 | 0 |
| +540.5 | +64.37° | 0 | 1 | 0 | 1 | 0 | 1 | 1 | 0 |
| +541.5 | +64.59° | 0 | 1 | 0 | 1 | 0 | 1 | 0 | 1 |
| +542.5 | +64.81° | 1 | 1 | 0 | 1 | 0 | 1 | 0 | 1 |
| +543.5 | +65.04° | 1 | 0 | 1 | 0 | 0 | 1 | 0 | 1 |
| +544.5 | +65.27° | 1 | 0 | 1 | 0 | 1 | 0 | 1 | 1 |
| +545.5 | +65.49° | 1 | 0 | 1 | 0 | 1 | 0 | 1 | 0 |
| +546.5 | +65.73° | 0 | 0 | 1 | 0 | 1 | 0 | 1 | 0 |
| +547.5 | +65.96° | 0 | 1 | 0 | 1 | 1 | 0 | 1 | 0 |
| +548.5 | +66.20° | 0 | 1 | 0 | 1 | 0 | 1 | 0 | 0 |
| +549.5 | +66.43° | 0 | 1 | 0 | 1 | 0 | 1 | 0 | 1 |
| +550.5 | +66.67° | 1 | 0 | 0 | 1 | 0 | 1 | 0 | 1 |
| +551.5 | +66.92° | 1 | 0 | 1 | 0 | 1 | 1 | 0 | 1 |
| +552.5 | +67.16° | 1 | 0 | 1 | 0 | 1 | 0 | 1 | 0 |
| +553.5 | +67.41° | 1 | 0 | 1 | 0 | 1 | 0 | 1 | 0 |
| +554.5 | +67.66° | 0 | 1 | 1 | 0 | 1 | 0 | 1 | 0 |
| +555.5 | +67.91° | 0 | 1 | 0 | 1 | 0 | 0 | 1 | 0 |
| +556.5 | +68.17° | 0 | 1 | 0 | 1 | 0 | 1 | 0 | 1 |
| +557.5 | +68.43° | 0 | 1 | 0 | 1 | 0 | 1 | 0 | 1 |
| +558.5 | +68.69° | 1 | 0 | 0 | 1 | 0 | 1 | 0 | 1 |
| +559.5 | +68.95° | 1 | 0 | 1 | 0 | 1 | 0 | 0 | 1 |
| +560.5 | +69.22° | 1 | 0 | 1 | 0 | 1 | 0 | 1 | 0 |
| +561.5 | +69.49° | 1 | 0 | 1 | 0 | 1 | 0 | 1 | 0 |
| +562.5 | +69.76° | 0 | 1 | 1 | 0 | 1 | 0 | 1 | 0 |
| +563.5 | +70.04° | 0 | 1 | 0 | 1 | 0 | 1 | 1 | 0 |
| +564.5 | +70.33° | 0 | 1 | 0 | 1 | 0 | 1 | 0 | 1 |
| +565.5 | +70.61° | 0 | 1 | 0 | 1 | 0 | 1 | 0 | 1 |
| +566.5 | +70.90° | 1 | 0 | 0 | 1 | 0 | 1 | 0 | 1 |
| +567.5 | +71.20° | 1 | 0 | 1 | 0 | 1 | 0 | 1 | 1 |
| +568.5 | +71.49° | 1 | 0 | 1 | 0 | 1 | 0 | 1 | 0 |
| +569.5 | +71.80° | 1 | 0 | 1 | 0 | 1 | 0 | 1 | 0 |
| +570.5 | +72.11° | 0 | 1 | 0 | 0 | 1 | 0 | 1 | 0 |
| +571.5 | +72.42° | 0 | 1 | 0 | 1 | 0 | 1 | 0 | 1 |
| +572.5 | +72.74° | 0 | 1 | 0 | 1 | 0 | 1 | 0 | 1 |
| +573.5 | +73.06° | 0 | 1 | 0 | 1 | 0 | 1 | 0 | 1 |
| +574.5 | +73.40° | 1 | 0 | 1 | 1 | 0 | 1 | 0 | 1 |
| +575.5 | +73.73° | 1 | 0 | 1 | 0 | 1 | 0 | 1 | 0 |
| +576.5 | +74.08° | 1 | 0 | 1 | 0 | 1 | 0 | 1 | 0 |
| +577.5 | +74.43° | 1 | 0 | 1 | 0 | 1 | 0 | 1 | 0 |
| +578.5 | +74.79° | 0 | 1 | 0 | 0 | 1 | 0 | 1 | 0 |
| +579.5 | +75.16° | 0 | 1 | 0 | 1 | 0 | 1 | 0 | 1 |
| +580.5 | +75.54° | 0 | 1 | 0 | 1 | 0 | 1 | 0 | 1 |
| +581.5 | +75.92° | 0 | 1 | 0 | 1 | 0 | 1 | 0 | 1 |
| +582.5 | +76.32° | 1 | 0 | 1 | 0 | 0 | 1 | 0 | 1 |
| +583.5 | +76.73° | 1 | 0 | 1 | 0 | 1 | 0 | 1 | 0 |
| +584.5 | +77.16° | 1 | 0 | 1 | 0 | 1 | 0 | 1 | 0 |
| +585.5 | +77.59° | 1 | 0 | 1 | 0 | 1 | 0 | 1 | 0 |
| +586.5 | +78.05° | 0 | 1 | 0 | 1 | 0 | 1 | 1 | 0 |
| +587.5 | +78.52° | 0 | 1 | 0 | 1 | 0 | 1 | 0 | 1 |
| +588.5 | +79.01° | 0 | 1 | 0 | 1 | 0 | 1 | 0 | 1 |
| +589.5 | +79.52° | 0 | 1 | 0 | 1 | 0 | 1 | 0 | 1 |
| +590.5 | +80.06° | 1 | 0 | 1 | 0 | 1 | 0 | 1 | 0 |
| +591.5 | +80.63° | 1 | 0 | 1 | 0 | 1 | 0 | 1 | 0 |
| +592.5 | +81.24° | 1 | 0 | 1 | 0 | 1 | 0 | 1 | 0 |
| +593.5 | +81.89° | 1 | 0 | 1 | 0 | 1 | 0 | 1 | 0 |
| +594.5 | +82.59° | 0 | 1 | 0 | 1 | 0 | 1 | 0 | 1 |

-continued

| | | | | | | | | | |
|---|---|---|---|---|---|---|---|---|---|
| +595.5 | +83.38° | 0 | 1 | 0 | 1 | 0 | 1 | 0 | 1 |
| +596.5 | +84.27° | 0 | 1 | 0 | 1 | 0 | 1 | 0 | 1 |
| +597.5 | +85.32° | 0 | 1 | 0 | 1 | 0 | 1 | 0 | 1 |
| +598.5 | +86.69° | 1 | 0 | 1 | 0 | 1 | 0 | 1 | 0 |
| +599.5 | +90.00° | 1 | 0 | 1 | 0 | 1 | 0 | 1 | 0 |

| Samples | Angle of d.b. 120 | 145-1 | 145-2 | 145-3 | 145-4 | 145-5 | 145-6 | 145-7 | 145-8 |
|---|---|---|---|---|---|---|---|---|---|
| −599.5 | −59.95° | 1 | 0 | 1 | 1 | 0 | 1 | 0 | 1 |
| −598.5 | −59.85° | 1 | 0 | 0 | 1 | 0 | 1 | 0 | 1 |
| −597.5 | −59.75° | 0 | 1 | 0 | 1 | 0 | 1 | 0 | 0 |
| −596.5 | −59.65° | 0 | 1 | 0 | 1 | 0 | 0 | 1 | 0 |
| −595.5 | −59.55° | 0 | 1 | 0 | 0 | 1 | 0 | 1 | 0 |
| −594.5 | −59.45° | 0 | 1 | 1 | 0 | 1 | 0 | 1 | 0 |
| −593.5 | −59.35° | 1 | 0 | 1 | 0 | 1 | 0 | 1 | 1 |
| −592.5 | −59.25° | 1 | 0 | 1 | 0 | 1 | 1 | 0 | 1 |
| −591.5 | −59.15° | 1 | 0 | 1 | 0 | 0 | 1 | 0 | 1 |
| −590.5 | −59.05° | 1 | 0 | 0 | 1 | 0 | 1 | 0 | 1 |
| −589.5 | −58.95° | 0 | 1 | 0 | 1 | 0 | 1 | 0 | 0 |
| −588.5 | −58.85° | 0 | 1 | 0 | 1 | 0 | 0 | 1 | 0 |
| −587.5 | −58.75° | 0 | 1 | 0 | 1 | 1 | 0 | 1 | 0 |
| −586.5 | −58.65° | 0 | 1 | 1 | 0 | 1 | 0 | 1 | 0 |
| −585.5 | −58.55° | 1 | 0 | 1 | 0 | 1 | 0 | 1 | 1 |
| −584.5 | −58.45° | 1 | 0 | 1 | 0 | 1 | 1 | 0 | 1 |
| −583.5 | −58.35° | 1 | 0 | 1 | 0 | 0 | 1 | 0 | 1 |
| −582.5 | −58.25° | 1 | 0 | 0 | 1 | 0 | 1 | 0 | 1 |
| −581.5 | −58.15° | 1 | 1 | 0 | 1 | 0 | 1 | 0 | 0 |
| −580.5 | −58.05° | 0 | 1 | 0 | 1 | 0 | 1 | 1 | 0 |
| −579.5 | −57.95° | 0 | 1 | 0 | 1 | 1 | 0 | 1 | 0 |
| −578.5 | −57.85° | 0 | 1 | 1 | 0 | 1 | 0 | 1 | 0 |
| −577.5 | −57.75° | 0 | 0 | 1 | 0 | 1 | 0 | 1 | 1 |
| −576.5 | −57.65° | 1 | 0 | 1 | 0 | 1 | 0 | 0 | 1 |
| −575.5 | −57.55° | 1 | 0 | 1 | 0 | 0 | 1 | 0 | 1 |
| −574.5 | −57.45° | 1 | 0 | 0 | 1 | 0 | 1 | 0 | 1 |
| −573.5 | −57.35° | 1 | 1 | 0 | 1 | 0 | 1 | 0 | 0 |
| −572.5 | −57.25° | 0 | 1 | 0 | 1 | 0 | 1 | 1 | 0 |
| −571.5 | −57.15° | 0 | 1 | 0 | 1 | 1 | 0 | 1 | 0 |
| −570.5 | −57.05° | 0 | 1 | 0 | 0 | 1 | 0 | 1 | 0 |
| −569.5 | −56.95° | 0 | 0 | 1 | 0 | 1 | 0 | 1 | 1 |
| −568.5 | −56.85° | 1 | 0 | 1 | 0 | 1 | 0 | 0 | 1 |
| −567.5 | −56.75° | 1 | 0 | 1 | 0 | 0 | 1 | 0 | 1 |
| −566.5 | −56.65° | 1 | 0 | 1 | 1 | 0 | 1 | 0 | 1 |
| −565.5 | −56.55° | 1 | 1 | 0 | 1 | 0 | 1 | 0 | 0 |
| −564.5 | −56.45° | 0 | 1 | 0 | 1 | 0 | 1 | 1 | 0 |
| −563.5 | −56.35° | 0 | 1 | 0 | 1 | 1 | 0 | 1 | 0 |
| −562.5 | −56.25° | 0 | 1 | 0 | 0 | 1 | 0 | 1 | 0 |
| −561.5 | −56.15° | 0 | 0 | 1 | 0 | 1 | 0 | 1 | 1 |
| −560.5 | −56.05° | 1 | 0 | 1 | 0 | 1 | 0 | 0 | 1 |

| Samples | Angle of d.b. 120 | 145-9 | 145-10 | 145-11 | 145-12 | 145-13 | 145-14 | 145-15 | 145-16 |
|---|---|---|---|---|---|---|---|---|---|
| −599.5 | −59.95° | 0 | 1 | 0 | 0 | 1 | 0 | 1 | 0 |
| −598.5 | −59.85° | 0 | 0 | 1 | 0 | 1 | 0 | 1 | 0 |
| −597.5 | −59.75° | 1 | 0 | 1 | 0 | 1 | 0 | 0 | 1 |
| −596.5 | −59.65° | 1 | 0 | 1 | 0 | 1 | 1 | 0 | 1 |
| −595.5 | −59.55° | 1 | 0 | 1 | 1 | 0 | 1 | 0 | 1 |
| −594.5 | −59.45° | 1 | 1 | 0 | 1 | 0 | 1 | 0 | 1 |
| −593.5 | −59.35° | 0 | 1 | 0 | 1 | 0 | 1 | 1 | 0 |
| −592.5 | −59.25° | 0 | 1 | 0 | 1 | 1 | 0 | 1 | 0 |
| −591.5 | −59.15° | 0 | 1 | 0 | 0 | 1 | 0 | 1 | 0 |
| −590.5 | −59.05° | 0 | 0 | 1 | 0 | 1 | 0 | 1 | 0 |
| −589.5 | −58.95° | 1 | 0 | 1 | 0 | 1 | 0 | 0 | 1 |
| −588.5 | −58.85° | 1 | 0 | 1 | 0 | 0 | 1 | 0 | 1 |
| −587.5 | −58.75° | 1 | 0 | 1 | 1 | 0 | 1 | 0 | 1 |
| −586.5 | −58.65° | 1 | 1 | 0 | 1 | 0 | 1 | 0 | 1 |
| −585.5 | −58.55° | 0 | 1 | 0 | 1 | 0 | 1 | 1 | 0 |
| −584.5 | −58.45° | 0 | 1 | 0 | 1 | 1 | 0 | 1 | 0 |
| −583.5 | −58.35° | 0 | 1 | 0 | 0 | 1 | 0 | 1 | 0 |
| −582.5 | −58.25° | 0 | 0 | 1 | 0 | 1 | 0 | 1 | 0 |
| −581.5 | −58.15° | 1 | 0 | 1 | 0 | 1 | 0 | 0 | 1 |

-continued

| Samples | Steer Angle | $f_{LO-7.5}$ | $f_{LO-6.5}$ | $f_{LO-5.5}$ | $f_{LO-4.5}$ | $f_{LO-3.5}$ | $f_{LO-2.5}$ | $f_{LO-1.5}$ | $f_{LO-0.5}$ |
|---|---|---|---|---|---|---|---|---|---|
| −580.5 | −58.05° | 1 | 0 | 1 | 0 | 0 | 1 | 0 | 1 |
| −579.5 | −57.95° | 1 | 0 | 0 | 1 | 0 | 1 | 0 | 1 |
| −578.5 | −57.85° | 1 | 1 | 0 | 1 | 0 | 1 | 0 | 0 |
| −577.5 | −57.75° | 0 | 1 | 0 | 1 | 0 | 1 | 1 | 0 |
| −576.5 | −57.65° | 0 | 1 | 0 | 1 | 1 | 0 | 1 | 0 |
| −575.5 | −57.55° | 0 | 1 | 1 | 0 | 1 | 0 | 1 | 0 |
| −574.5 | −57.45° | 0 | 0 | 1 | 0 | 1 | 0 | 1 | 1 |
| −573.5 | −57.35° | 1 | 0 | 1 | 0 | 1 | 0 | 0 | 1 |
| −572.5 | −57.25° | 1 | 0 | 1 | 0 | 0 | 1 | 0 | 1 |
| −571.5 | −57.15° | 1 | 0 | 0 | 1 | 0 | 1 | 0 | 1 |
| −570.5 | −57.05° | 1 | 1 | 0 | 1 | 0 | 1 | 0 | 0 |
| −569.5 | −56.95° | 0 | 1 | 0 | 1 | 0 | 0 | 1 | 0 |
| −568.5 | −56.85° | 0 | 1 | 0 | 1 | 1 | 0 | 1 | 0 |
| −567.5 | −56.75° | 0 | 1 | 1 | 0 | 1 | 0 | 1 | 0 |
| −566.5 | −56.65° | 0 | 0 | 1 | 0 | 1 | 0 | 1 | 1 |
| −565.5 | −56.55° | 1 | 0 | 1 | 0 | 1 | 1 | 0 | 1 |
| −564.5 | −56.45° | 1 | 0 | 1 | 0 | 0 | 1 | 0 | 1 |
| −563.5 | −56.35° | 1 | 0 | 0 | 1 | 0 | 1 | 0 | 1 |
| −562.5 | −56.25° | 1 | 1 | 0 | 1 | 0 | 1 | 0 | 0 |
| −561.5 | −56.15° | 0 | 1 | 0 | 1 | 0 | 0 | 1 | 0 |
| −560.5 | −56.05° | 0 | 1 | 0 | 1 | 1 | 0 | 1 | 0 |

| Samples | Steer Angle | $f_{LO-7.5}$ | $f_{LO-6.5}$ | $f_{LO-5.5}$ | $f_{LO-4.5}$ | $f_{LO-3.5}$ | $f_{LO-2.5}$ | $f_{LO-1.5}$ | $f_{LO-0.5}$ |
|---|---|---|---|---|---|---|---|---|---|
| −559.5 | −55.95° | 1 | 0 | 1 | 0 | 0 | 1 | 0 | 1 |
| −558.5 | −55.85° | 1 | 0 | 1 | 1 | 0 | 1 | 0 | 1 |
| −557.5 | −55.75° | 1 | 0 | 0 | 1 | 0 | 1 | 0 | 0 |
| −556.5 | −55.65° | 0 | 1 | 0 | 1 | 0 | 1 | 1 | 0 |
| −555.5 | −55.55° | 0 | 1 | 0 | 1 | 1 | 0 | 1 | 0 |
| −554.5 | −55.45° | 0 | 1 | 0 | 0 | 1 | 0 | 1 | 0 |
| −553.5 | −55.35° | 0 | 1 | 1 | 0 | 1 | 0 | 1 | 1 |
| −552.5 | −55.25° | 1 | 0 | 1 | 0 | 1 | 0 | 0 | 1 |
| −551.5 | −55.15° | 1 | 0 | 1 | 0 | 1 | 1 | 0 | 1 |
| −550.5 | −55.05° | 1 | 0 | 1 | 1 | 0 | 1 | 0 | 1 |
| −549.5 | −54.95° | 1 | 0 | 0 | 1 | 0 | 1 | 0 | 0 |
| −548.5 | −54.85° | 0 | 1 | 0 | 1 | 0 | 1 | 1 | 0 |
| −547.5 | −54.75° | 0 | 1 | 0 | 1 | 0 | 0 | 1 | 0 |
| −546.5 | −54.65° | 0 | 1 | 0 | 0 | 1 | 0 | 1 | 0 |
| −545.5 | −54.55° | 0 | 1 | 1 | 0 | 1 | 0 | 1 | 1 |
| −544.5 | −54.45° | 0 | 0 | 1 | 0 | 1 | 0 | 0 | 1 |
| −543.5 | −54.35° | 1 | 0 | 1 | 0 | 1 | 1 | 0 | 1 |
| −542.5 | −54.25° | 1 | 0 | 1 | 1 | 0 | 1 | 0 | 1 |
| −541.5 | −54.15° | 1 | 0 | 0 | 1 | 0 | 1 | 0 | 0 |
| −540.5 | −54.05° | 1 | 1 | 0 | 1 | 0 | 1 | 1 | 0 |
| −539.5 | −53.95° | 0 | 1 | 0 | 1 | 0 | 0 | 1 | 0 |
| −538.5 | −53.85° | 0 | 1 | 0 | 0 | 1 | 0 | 1 | 0 |
| −537.5 | −53.75° | 0 | 1 | 1 | 0 | 1 | 0 | 1 | 1 |
| −536.5 | −53.65° | 0 | 0 | 1 | 0 | 1 | 0 | 0 | 1 |
| −535.5 | −53.55° | 1 | 0 | 1 | 0 | 1 | 1 | 0 | 1 |
| −534.5 | −53.45° | 1 | 0 | 1 | 0 | 0 | 1 | 0 | 1 |
| −533.5 | −53.35° | 1 | 0 | 0 | 1 | 0 | 1 | 0 | 0 |
| −532.5 | −53.25° | 1 | 1 | 0 | 1 | 0 | 1 | 1 | 0 |
| −531.5 | −53.15° | 0 | 1 | 0 | 1 | 0 | 0 | 1 | 0 |
| −530.5 | −53.05° | 0 | 1 | 0 | 1 | 1 | 0 | 1 | 0 |
| −529.5 | −52.95° | 0 | 1 | 1 | 0 | 1 | 0 | 1 | 1 |
| −528.5 | −52.85° | 0 | 0 | 1 | 0 | 1 | 0 | 0 | 1 |
| −527.5 | −52.75° | 1 | 0 | 1 | 0 | 1 | 1 | 0 | 1 |
| −526.5 | −52.65° | 1 | 0 | 1 | 0 | 0 | 1 | 0 | 1 |
| −525.5 | −52.55° | 1 | 0 | 1 | 1 | 0 | 1 | 0 | 0 |
| −524.5 | −52.45° | 1 | 1 | 0 | 1 | 0 | 1 | 1 | 0 |
| −523.5 | −52.35° | 0 | 1 | 0 | 1 | 0 | 0 | 1 | 0 |
| −522.5 | −52.25° | 0 | 1 | 0 | 1 | 1 | 0 | 1 | 0 |
| −521.5 | −52.15° | 0 | 1 | 0 | 0 | 1 | 0 | 1 | 1 |
| −520.5 | −52.05° | 0 | 0 | 1 | 0 | 1 | 0 | 0 | 1 |
| −519.5 | −51.95° | 1 | 0 | 1 | 0 | 1 | 1 | 0 | 1 |
| −518.5 | −51.85° | 1 | 0 | 1 | 0 | 0 | 1 | 0 | 1 |
| −517.5 | −51.75° | 1 | 0 | 1 | 1 | 0 | 1 | 0 | 0 |
| −516.5 | −51.65° | 1 | 0 | 0 | 1 | 0 | 1 | 1 | 0 |
| −515.5 | −51.55° | 1 | 1 | 0 | 1 | 0 | 0 | 1 | 0 |
| −514.5 | −51.45° | 0 | 1 | 0 | 1 | 1 | 0 | 1 | 0 |
| −513.5 | −51.35° | 0 | 1 | 0 | 0 | 1 | 0 | 1 | 1 |
| −512.5 | −51.25° | 0 | 1 | 1 | 0 | 1 | 0 | 0 | 1 |
| −511.5 | −51.15° | 0 | 0 | 1 | 0 | 1 | 1 | 0 | 1 |
| −510.5 | −51.05° | 1 | 0 | 1 | 0 | 0 | 1 | 0 | 1 |
| −509.5 | −50.95° | 1 | 0 | 1 | 1 | 0 | 1 | 0 | 0 |
| −508.5 | −50.85° | 1 | 0 | 0 | 1 | 0 | 1 | 1 | 0 |
| −507.5 | −50.75° | 1 | 1 | 0 | 1 | 0 | 0 | 1 | 0 |
| −506.5 | −50.65° | 0 | 1 | 0 | 1 | 1 | 0 | 1 | 0 |

-continued

| | | | | | | | | | |
|---|---|---|---|---|---|---|---|---|---|
| −505.5 | −50.55° | 0 | 1 | 0 | 0 | 1 | 0 | 1 | 1 |
| −504.5 | −50.45° | 0 | 1 | 1 | 0 | 1 | 0 | 0 | 1 |
| −503.5 | −50.35° | 0 | 0 | 1 | 0 | 1 | 1 | 0 | 1 |
| −502.5 | −50.25° | 1 | 0 | 1 | 0 | 0 | 1 | 0 | 1 |
| −501.5 | −50.15° | 1 | 0 | 1 | 1 | 0 | 1 | 0 | 0 |
| −500.5 | −50.05° | 1 | 0 | 0 | 1 | 0 | 1 | 1 | 0 |
| −499.5 | −49.95° | 1 | 1 | 0 | 1 | 0 | 0 | 1 | 0 |
| −498.5 | −49.85° | 0 | 1 | 0 | 1 | 1 | 0 | 1 | 0 |
| −497.5 | −49.75° | 0 | 1 | 0 | 0 | 1 | 0 | 1 | 1 |
| −496.5 | −49.65° | 0 | 1 | 1 | 0 | 1 | 0 | 0 | 1 |
| −495.5 | −49.55° | 0 | 0 | 1 | 0 | 1 | 1 | 0 | 1 |
| −494.5 | −49.45° | 1 | 0 | 1 | 0 | 0 | 1 | 0 | 1 |
| −493.5 | −49.35° | 1 | 0 | 1 | 1 | 0 | 1 | 0 | 0 |
| −492.5 | −49.25° | 1 | 0 | 0 | 1 | 0 | 1 | 1 | 0 |
| −491.5 | −49.15° | 1 | 1 | 0 | 1 | 0 | 0 | 1 | 0 |
| −490.5 | −49.05° | 0 | 1 | 0 | 1 | 1 | 0 | 1 | 0 |
| −489.5 | −48.95° | 0 | 1 | 0 | 0 | 1 | 0 | 1 | 1 |
| −488.5 | −48.85° | 0 | 1 | 1 | 0 | 1 | 0 | 0 | 1 |
| −487.5 | −48.75° | 0 | 0 | 1 | 0 | 1 | 1 | 0 | 1 |
| −486.5 | −48.65° | 1 | 0 | 1 | 0 | 0 | 1 | 0 | 1 |
| −485.5 | −48.55° | 1 | 0 | 1 | 0 | 0 | 1 | 0 | 1 |
| −484.5 | −48.45° | 1 | 0 | 1 | 1 | 0 | 1 | 0 | 0 |
| −483.5 | −48.35° | 1 | 0 | 0 | 1 | 0 | 1 | 1 | 0 |
| −482.5 | −48.25° | 1 | 1 | 0 | 1 | 0 | 0 | 1 | 0 |
| −481.5 | −48.15° | 0 | 1 | 0 | 1 | 1 | 0 | 1 | 0 |
| −480.5 | −48.05° | 0 | 1 | 0 | 0 | 1 | 0 | 1 | 1 |
| −479.5 | −47.95° | 0 | 1 | 1 | 0 | 1 | 0 | 0 | 1 |
| −478.5 | −47.85° | 0 | 0 | 1 | 0 | 1 | 1 | 0 | 1 |
| −477.5 | −47.75° | 1 | 0 | 1 | 0 | 0 | 1 | 0 | 1 |
| −476.5 | −47.65° | 1 | 0 | 1 | 1 | 0 | 1 | 0 | 0 |
| −475.5 | −47.55° | 1 | 0 | 0 | 1 | 0 | 1 | 1 | 0 |
| −474.5 | −47.45° | 1 | 1 | 0 | 1 | 0 | 0 | 1 | 0 |
| −473.5 | −47.35° | 0 | 1 | 0 | 1 | 1 | 0 | 1 | 0 |
| −472.5 | −47.25° | 0 | 1 | 0 | 0 | 1 | 0 | 1 | 1 |
| −471.5 | −47.15° | 0 | 1 | 1 | 0 | 1 | 0 | 0 | 1 |
| −470.5 | −47.05° | 0 | 0 | 1 | 0 | 1 | 1 | 0 | 1 |
| −469.5 | −46.95° | 1 | 0 | 1 | 0 | 0 | 1 | 0 | 1 |
| −468.5 | −46.85° | 1 | 0 | 1 | 1 | 0 | 1 | 0 | 0 |
| −467.5 | −46.75° | 1 | 0 | 0 | 1 | 0 | 1 | 1 | 0 |
| −466.5 | −46.65° | 1 | 1 | 0 | 1 | 0 | 0 | 1 | 0 |
| −465.5 | −46.55° | 0 | 1 | 0 | 1 | 1 | 0 | 1 | 0 |
| −464.5 | −46.45° | 0 | 1 | 0 | 0 | 1 | 0 | 1 | 1 |
| −463.5 | −46.35° | 0 | 1 | 1 | 0 | 1 | 0 | 0 | 1 |
| −462.5 | −46.25° | 0 | 0 | 1 | 0 | 1 | 1 | 0 | 1 |
| −461.5 | −46.15° | 1 | 0 | 1 | 0 | 0 | 1 | 0 | 1 |
| −460.5 | −46.05° | 1 | 0 | 1 | 1 | 0 | 1 | 0 | 0 |
| −459.5 | −45.95° | 1 | 0 | 0 | 1 | 0 | 1 | 1 | 0 |
| −458.5 | −45.85° | 1 | 1 | 0 | 1 | 0 | 0 | 1 | 0 |
| −457.5 | −45.75° | 1 | 1 | 0 | 1 | 1 | 0 | 1 | 0 |
| −456.5 | −45.65° | 0 | 1 | 0 | 0 | 1 | 0 | 1 | 1 |
| −455.5 | −45.55° | 0 | 1 | 1 | 0 | 1 | 0 | 0 | 1 |
| −454.5 | −45.45° | 0 | 0 | 1 | 0 | 1 | 1 | 0 | 1 |
| −453.5 | −45.35° | 0 | 0 | 1 | 0 | 0 | 1 | 0 | 1 |
| −452.5 | −45.25° | 1 | 0 | 1 | 1 | 0 | 1 | 0 | 0 |
| −451.5 | −45.15° | 1 | 0 | 0 | 1 | 0 | 1 | 1 | 0 |
| −450.5 | −45.05° | 1 | 0 | 0 | 1 | 0 | 0 | 1 | 0 |
| −449.5 | −44.95° | 1 | 1 | 0 | 1 | 1 | 0 | 1 | 0 |
| −448.5 | −44.85° | 0 | 1 | 0 | 0 | 1 | 0 | 1 | 1 |
| −447.5 | −44.75° | 0 | 1 | 0 | 0 | 1 | 0 | 0 | 1 |
| −446.5 | −44.65° | 0 | 1 | 1 | 0 | 1 | 1 | 0 | 1 |
| −445.5 | −44.55° | 0 | 0 | 1 | 0 | 0 | 1 | 0 | 1 |
| −444.5 | −44.45° | 1 | 0 | 1 | 1 | 0 | 1 | 0 | 0 |
| −443.5 | −44.35° | 1 | 0 | 1 | 1 | 0 | 1 | 1 | 0 |
| −442.5 | −44.25° | 1 | 0 | 0 | 1 | 0 | 0 | 1 | 0 |
| −441.5 | −44.15° | 1 | 1 | 0 | 1 | 1 | 0 | 1 | 0 |
| −440.5 | −44.05° | 0 | 1 | 0 | 0 | 1 | 0 | 1 | 1 |
| −439.5 | −43.95° | 0 | 1 | 0 | 0 | 1 | 0 | 0 | 1 |
| −438.5 | −43.85° | 0 | 1 | 1 | 0 | 1 | 1 | 0 | 1 |
| −437.5 | −43.75° | 0 | 0 | 1 | 0 | 0 | 1 | 0 | 1 |
| −436.5 | −43.65° | 1 | 0 | 1 | 0 | 0 | 1 | 0 | 0 |
| −435.5 | −43.55° | 1 | 0 | 1 | 1 | 0 | 1 | 1 | 0 |
| −434.5 | −43.45° | 1 | 0 | 0 | 1 | 0 | 0 | 1 | 0 |
| −433.5 | −43.35° | 1 | 1 | 0 | 1 | 1 | 0 | 1 | 0 |
| −432.5 | −43.25° | 0 | 1 | 0 | 1 | 1 | 0 | 1 | 1 |
| −431.5 | −43.15° | 0 | 1 | 0 | 0 | 1 | 0 | 0 | 1 |
| −430.5 | −43.05° | 0 | 1 | 1 | 0 | 1 | 1 | 0 | 1 |
| −429.5 | −42.95° | 0 | 0 | 1 | 0 | 0 | 1 | 0 | 1 |
| −428.5 | −42.85° | 0 | 0 | 1 | 0 | 0 | 1 | 0 | 0 |
| −427.5 | −42.75° | 1 | 0 | 1 | 1 | 0 | 1 | 1 | 0 |

-continued

| | | | | | | | | | |
|---|---|---|---|---|---|---|---|---|---|
| −426.5 | −42.65° | 1 | 0 | 0 | 1 | 0 | 0 | 1 | 0 |
| −425.5 | −42.55° | 1 | 1 | 0 | 1 | 0 | 0 | 1 | 0 |
| −424.5 | −42.45° | 1 | 1 | 0 | 1 | 1 | 0 | 1 | 1 |
| −423.5 | −42.35° | 0 | 1 | 0 | 0 | 1 | 0 | 0 | 1 |
| −422.5 | −42.25° | 0 | 1 | 1 | 0 | 1 | 1 | 0 | 1 |
| −421.5 | −42.15° | 0 | 1 | 1 | 0 | 1 | 1 | 0 | 1 |
| −420.5 | −42.05° | 0 | 0 | 1 | 0 | 0 | 1 | 0 | 0 |
| −419.5 | −41.95° | 1 | 0 | 1 | 1 | 0 | 1 | 1 | 0 |
| −418.5 | −41.85° | 1 | 0 | 0 | 1 | 0 | 0 | 1 | 0 |
| −417.5 | −41.75° | 1 | 0 | 0 | 1 | 0 | 0 | 1 | 0 |
| −416.5 | −41.65° | 1 | 1 | 0 | 1 | 1 | 0 | 1 | 1 |
| −415.5 | −41.55° | 0 | 1 | 0 | 0 | 1 | 0 | 0 | 1 |
| −414.5 | −41.45° | 0 | 1 | 1 | 0 | 1 | 1 | 0 | 1 |
| −413.5 | −41.35° | 0 | 1 | 1 | 0 | 1 | 1 | 0 | 1 |
| −412.5 | −41.25° | 0 | 0 | 1 | 0 | 0 | 1 | 0 | 0 |
| −411.5 | −41.15° | 1 | 0 | 1 | 1 | 0 | 1 | 1 | 0 |
| −410.5 | −41.05° | 1 | 0 | 1 | 1 | 0 | 0 | 1 | 0 |
| −409.5 | −40.95° | 1 | 0 | 0 | 1 | 0 | 0 | 1 | 0 |
| −408.5 | −40.85° | 1 | 1 | 0 | 1 | 1 | 0 | 1 | 1 |
| −407.5 | −40.75° | 0 | 1 | 0 | 0 | 1 | 0 | 0 | 1 |
| −406.5 | −40.65° | 0 | 1 | 0 | 0 | 1 | 1 | 0 | 1 |
| −405.5 | −40.55° | 0 | 1 | 1 | 0 | 1 | 1 | 0 | 1 |
| −404.5 | −40.45° | 0 | 0 | 1 | 0 | 0 | 1 | 0 | 0 |
| −403.5 | −40.35° | 0 | 0 | 1 | 1 | 0 | 1 | 1 | 0 |
| −402.5 | −40.25° | 1 | 0 | 1 | 1 | 0 | 1 | 1 | 0 |
| −401.5 | −40.15° | 1 | 0 | 0 | 1 | 0 | 0 | 1 | 0 |
| −400.5 | −40.05° | 1 | 1 | 0 | 1 | 1 | 0 | 1 | 1 |
| −399.5 | −39.95° | 1 | 1 | 0 | 0 | 1 | 0 | 0 | 1 |
| −398.5 | −39.85° | 0 | 1 | 0 | 0 | 1 | 0 | 0 | 1 |
| −397.5 | −39.75° | 0 | 1 | 1 | 0 | 1 | 1 | 0 | 1 |
| −396.5 | −39.65° | 0 | 0 | 1 | 0 | 0 | 1 | 0 | 0 |
| −395.5 | −39.55° | 0 | 0 | 1 | 0 | 0 | 1 | 1 | 0 |
| −394.5 | −39.45° | 0 | 1 | 1 | 1 | 0 | 1 | 1 | 0 |
| −393.5 | −39.35° | 1 | 0 | 0 | 1 | 0 | 0 | 1 | 0 |
| −392.5 | −39.25° | 1 | 0 | 0 | 1 | 1 | 0 | 1 | 1 |
| −391.5 | −39.15° | 1 | 1 | 0 | 1 | 1 | 0 | 0 | 1 |
| −390.5 | −39.05° | 0 | 1 | 0 | 0 | 1 | 0 | 0 | 1 |
| −389.5 | −38.95° | 0 | 1 | 1 | 0 | 1 | 1 | 0 | 1 |
| −388.5 | −38.85° | 0 | 1 | 1 | 0 | 0 | 1 | 0 | 0 |
| −387.5 | −38.75° | 0 | 0 | 1 | 0 | 0 | 1 | 1 | 0 |
| −386.5 | −38.65° | 1 | 0 | 1 | 1 | 0 | 1 | 1 | 0 |
| −385.5 | −38.55° | 1 | 0 | 0 | 1 | 0 | 0 | 1 | 0 |
| −384.5 | −38.45° | 1 | 0 | 0 | 1 | 1 | 0 | 1 | 1 |
| −383.5 | −38.35° | 1 | 1 | 0 | 1 | 1 | 0 | 0 | 1 |
| −382.5 | −38.25° | 0 | 1 | 0 | 0 | 1 | 0 | 0 | 1 |
| −381.5 | −38.15° | 0 | 1 | 1 | 0 | 1 | 1 | 0 | 1 |
| −380.5 | −38.05° | 0 | 1 | 1 | 0 | 0 | 1 | 0 | 0 |
| −379.5 | −37.95° | 0 | 0 | 1 | 0 | 0 | 1 | 1 | 0 |
| −378.5 | −37.85° | 0 | 0 | 1 | 1 | 0 | 1 | 1 | 0 |
| −377.5 | −37.75° | 1 | 0 | 1 | 1 | 0 | 0 | 1 | 0 |
| −376.5 | −37.65° | 1 | 0 | 0 | 1 | 1 | 0 | 1 | 1 |
| −375.5 | −37.55° | 1 | 1 | 0 | 1 | 1 | 0 | 0 | 1 |
| −374.5 | −37.45° | 1 | 1 | 0 | 0 | 1 | 0 | 0 | 1 |
| −373.5 | −37.35° | 0 | 1 | 0 | 0 | 1 | 1 | 0 | 1 |
| −372.5 | −37.25° | 0 | 1 | 1 | 0 | 1 | 1 | 0 | 0 |
| −371.5 | −37.15° | 0 | 0 | 1 | 0 | 0 | 1 | 1 | 0 |
| −370.5 | −37.05° | 0 | 0 | 1 | 1 | 0 | 1 | 1 | 0 |
| −369.5 | −36.95° | 1 | 0 | 1 | 1 | 0 | 0 | 1 | 0 |
| −368.5 | −36.85° | 1 | 0 | 0 | 1 | 0 | 0 | 1 | 1 |
| −367.5 | −36.75° | 1 | 1 | 0 | 1 | 1 | 0 | 0 | 1 |
| −366.5 | −36.65° | 1 | 1 | 0 | 0 | 1 | 0 | 0 | 1 |
| −365.5 | −36.55° | 0 | 1 | 0 | 0 | 1 | 1 | 0 | 1 |
| −364.5 | −36.45° | 0 | 1 | 1 | 0 | 1 | 1 | 0 | 0 |
| −363.5 | −36.35° | 0 | 1 | 1 | 0 | 0 | 1 | 1 | 0 |
| −362.5 | −36.25° | 0 | 0 | 1 | 1 | 0 | 1 | 1 | 0 |
| −361.5 | −36.15° | 1 | 0 | 1 | 0 | 0 | 0 | 1 | 0 |
| −360.5 | −36.05° | 1 | 0 | 0 | 1 | 0 | 0 | 1 | 1 |
| −359.5 | −35.95° | 1 | 0 | 0 | 1 | 1 | 0 | 0 | 1 |
| −358.5 | −35.85° | 1 | 1 | 0 | 0 | 1 | 0 | 0 | 1 |
| −357.5 | −35.75° | 0 | 1 | 0 | 0 | 1 | 1 | 0 | 1 |
| −356.5 | −35.65° | 0 | 1 | 1 | 0 | 1 | 1 | 0 | 0 |
| −355.5 | −35.55° | 0 | 1 | 1 | 0 | 0 | 1 | 0 | 0 |
| −354.5 | −35.45° | 0 | 0 | 1 | 0 | 0 | 1 | 1 | 0 |
| −353.5 | −35.35° | 0 | 0 | 1 | 1 | 0 | 0 | 1 | 0 |
| −352.5 | −35.25° | 1 | 0 | 0 | 1 | 0 | 0 | 1 | 1 |
| −351.5 | −35.15° | 1 | 0 | 0 | 1 | 1 | 0 | 1 | 1 |
| −350.5 | −35.05° | 1 | 1 | 0 | 1 | 1 | 0 | 0 | 1 |
| −349.5 | −34.95° | 1 | 1 | 0 | 0 | 1 | 1 | 0 | 1 |
| −348.5 | −34.85° | 0 | 1 | 1 | 0 | 1 | 1 | 0 | 0 |

-continued

| | | | | | | | | | |
|---|---|---|---|---|---|---|---|---|---|
| −347.5 | −34.75° | 0 | 1 | 1 | 0 | 0 | 1 | 0 | 0 |
| −346.5 | −34.65° | 0 | 0 | 1 | 0 | 0 | 1 | 1 | 0 |
| −345.5 | −34.55° | 0 | 0 | 1 | 1 | 0 | 0 | 1 | 0 |
| −344.5 | −34.45° | 1 | 0 | 1 | 1 | 0 | 0 | 1 | 1 |
| −343.5 | −34.35° | 1 | 0 | 0 | 1 | 1 | 0 | 1 | 1 |
| −342.5 | −34.25° | 1 | 1 | 0 | 1 | 1 | 0 | 0 | 1 |
| −341.5 | −34.15° | 1 | 1 | 0 | 0 | 1 | 1 | 0 | 1 |
| −340.5 | −34.05° | 1 | 1 | 0 | 0 | 1 | 1 | 0 | 0 |
| −339.5 | −33.95° | 0 | 1 | 1 | 0 | 0 | 1 | 0 | 0 |
| −338.5 | −33.85° | 0 | 1 | 1 | 0 | 0 | 1 | 1 | 0 |
| −337.5 | −33.75° | 0 | 0 | 1 | 1 | 0 | 0 | 1 | 0 |
| −336.5 | −33.65° | 1 | 0 | 1 | 1 | 0 | 0 | 1 | 1 |
| −335.5 | −33.55° | 1 | 0 | 0 | 1 | 1 | 0 | 1 | 1 |
| −334.5 | −33.45° | 1 | 0 | 0 | 1 | 1 | 0 | 0 | 1 |
| −333.5 | −33.35° | 1 | 1 | 0 | 0 | 1 | 0 | 0 | 1 |
| −332.5 | −33.25° | 1 | 1 | 0 | 0 | 1 | 1 | 0 | 0 |
| −331.5 | −33.15° | 0 | 1 | 1 | 0 | 0 | 1 | 0 | 0 |
| −330.5 | −33.05° | 0 | 1 | 1 | 0 | 0 | 1 | 1 | 0 |
| −329.5 | −32.95° | 0 | 0 | 1 | 1 | 0 | 1 | 1 | 0 |
| −328.5 | −32.85° | 0 | 0 | 1 | 1 | 0 | 0 | 1 | 1 |
| −327.5 | −32.75° | 1 | 0 | 0 | 1 | 1 | 0 | 1 | 1 |
| −326.5 | −32.65° | 1 | 0 | 0 | 1 | 1 | 0 | 0 | 1 |
| −325.5 | −32.55° | 1 | 1 | 0 | 0 | 1 | 0 | 0 | 1 |
| −324.5 | −32.45° | 1 | 1 | 0 | 0 | 1 | 1 | 0 | 0 |
| −323.5 | −32.35° | 0 | 1 | 1 | 0 | 1 | 1 | 0 | 0 |
| −322.5 | −32.25° | 0 | 1 | 1 | 0 | 0 | 1 | 1 | 0 |
| −321.5 | −32.15° | 0 | 0 | 1 | 1 | 0 | 1 | 1 | 0 |
| −320.5 | −32.05° | 0 | 0 | 1 | 1 | 0 | 0 | 1 | 1 |
| −319.5 | −31.95° | 1 | 0 | 0 | 1 | 0 | 0 | 1 | 1 |
| −318.5 | −31.85° | 1 | 0 | 0 | 1 | 1 | 0 | 0 | 1 |
| −317.5 | −31.75° | 1 | 1 | 0 | 1 | 1 | 0 | 0 | 1 |
| −316.5 | −31.65° | 1 | 1 | 0 | 0 | 1 | 1 | 0 | 0 |
| −315.5 | −31.55° | 0 | 1 | 1 | 0 | 1 | 1 | 0 | 0 |
| −314.5 | −31.45° | 0 | 1 | 1 | 0 | 0 | 1 | 1 | 0 |
| −313.5 | −31.35° | 0 | 0 | 1 | 0 | 0 | 1 | 1 | 0 |
| −312.5 | −31.25° | 0 | 0 | 1 | 1 | 0 | 0 | 1 | 1 |
| −311.5 | −31.15° | 1 | 0 | 1 | 1 | 0 | 0 | 1 | 1 |
| −310.5 | −31.05° | 1 | 0 | 0 | 1 | 1 | 0 | 0 | 1 |
| −309.5 | −30.95° | 1 | 0 | 0 | 1 | 1 | 0 | 0 | 1 |
| −308.5 | −30.85° | 1 | 1 | 0 | 0 | 1 | 1 | 0 | 0 |
| −307.5 | −30.75° | 1 | 1 | 0 | 0 | 1 | 1 | 0 | 0 |
| −306.5 | −30.65° | 0 | 1 | 1 | 0 | 0 | 1 | 1 | 0 |
| −305.5 | −30.55° | 0 | 1 | 1 | 0 | 0 | 1 | 1 | 0 |
| −304.5 | −30.45° | 0 | 0 | 1 | 1 | 0 | 0 | 1 | 1 |
| −303.5 | −30.35° | 0 | 0 | 1 | 1 | 0 | 0 | 1 | 1 |
| −302.5 | −30.25° | 1 | 0 | 0 | 1 | 1 | 0 | 0 | 1 |
| −301.5 | −30.15° | 1 | 0 | 0 | 1 | 1 | 0 | 0 | 1 |
| −300.5 | −30.05° | 1 | 1 | 0 | 0 | 1 | 1 | 0 | 0 |
| −299.5 | −29.95° | 1 | 1 | 0 | 0 | 1 | 1 | 0 | 0 |
| −298.5 | −29.85° | 0 | 1 | 1 | 0 | 0 | 1 | 1 | 0 |
| −297.5 | −29.75° | 0 | 1 | 1 | 0 | 0 | 1 | 1 | 0 |
| −296.5 | −29.65° | 0 | 0 | 1 | 1 | 0 | 0 | 1 | 1 |
| −295.5 | −29.55° | 0 | 0 | 1 | 1 | 0 | 0 | 1 | 1 |
| −294.5 | −29.45° | 1 | 0 | 0 | 1 | 1 | 0 | 0 | 1 |
| −293.5 | −29.35° | 1 | 0 | 0 | 1 | 1 | 0 | 0 | 1 |
| −292.5 | −29.25° | 1 | 1 | 0 | 0 | 1 | 1 | 0 | 0 |
| −291.5 | −29.15° | 1 | 1 | 0 | 0 | 1 | 1 | 0 | 0 |
| −290.5 | −29.05° | 0 | 1 | 1 | 0 | 0 | 1 | 1 | 0 |
| −289.5 | −28.95° | 0 | 1 | 1 | 0 | 0 | 1 | 1 | 0 |
| −288.5 | −28.85° | 0 | 0 | 1 | 1 | 0 | 0 | 1 | 1 |
| −287.5 | −28.75° | 0 | 0 | 1 | 1 | 0 | 0 | 1 | 1 |
| −286.5 | −28.65° | 0 | 0 | 0 | 1 | 1 | 0 | 0 | 1 |
| −285.5 | −28.55° | 1 | 0 | 0 | 1 | 1 | 0 | 0 | 1 |
| −284.5 | −28.45° | 1 | 0 | 0 | 0 | 1 | 1 | 0 | 0 |
| −283.5 | −28.35° | 1 | 1 | 0 | 0 | 1 | 1 | 0 | 0 |
| −282.5 | −28.25° | 1 | 1 | 0 | 0 | 0 | 1 | 1 | 0 |
| −281.5 | −28.15° | 0 | 1 | 1 | 0 | 0 | 1 | 1 | 0 |
| −280.5 | −28.05° | 0 | 1 | 1 | 0 | 0 | 0 | 1 | 1 |
| −279.5 | −27.95° | 0 | 0 | 1 | 1 | 0 | 0 | 1 | 1 |
| −278.5 | −27.85° | 0 | 0 | 1 | 1 | 1 | 0 | 0 | 1 |
| −277.5 | −27.75° | 1 | 0 | 0 | 1 | 1 | 0 | 0 | 1 |
| −276.5 | −27.65° | 1 | 0 | 0 | 1 | 1 | 1 | 0 | 0 |
| −275.5 | −27.55° | 1 | 1 | 0 | 0 | 1 | 1 | 0 | 0 |
| −274.5 | −27.45° | 1 | 1 | 0 | 0 | 1 | 1 | 1 | 0 |
| −273.5 | −27.35° | 0 | 1 | 1 | 0 | 0 | 1 | 1 | 0 |
| −272.5 | −27.25° | 0 | 1 | 1 | 0 | 0 | 0 | 1 | 1 |
| −271.5 | −27.15° | 0 | 0 | 1 | 1 | 0 | 0 | 1 | 1 |
| −270.5 | −27.05° | 0 | 0 | 1 | 1 | 0 | 0 | 0 | 1 |
| −269.5 | −26.95° | 1 | 0 | 0 | 1 | 1 | 0 | 0 | 1 |

-continued

| | | | | | | | | | |
|---|---|---|---|---|---|---|---|---|---|
| −268.5 | −26.85° | 1 | 0 | 0 | 1 | 1 | 1 | 0 | 0 |
| −267.5 | −26.75° | 1 | 1 | 0 | 0 | 1 | 1 | 0 | 0 |
| −266.5 | −26.65° | 1 | 1 | 0 | 0 | 1 | 1 | 1 | 0 |
| −265.5 | −26.55° | 1 | 1 | 1 | 0 | 0 | 1 | 1 | 0 |
| −264.5 | −26.45° | 0 | 1 | 1 | 0 | 0 | 1 | 1 | 1 |
| −263.5 | −26.35° | 0 | 0 | 1 | 1 | 0 | 0 | 1 | 1 |
| −262.5 | −26.25° | 0 | 0 | 1 | 1 | 0 | 0 | 0 | 1 |
| −261.5 | −26.15° | 0 | 0 | 0 | 1 | 1 | 0 | 0 | 1 |
| −260.5 | −26.05° | 1 | 0 | 0 | 1 | 1 | 0 | 0 | 0 |
| −259.5 | −25.95° | 1 | 0 | 0 | 0 | 1 | 1 | 0 | 0 |
| −258.5 | −25.85° | 1 | 1 | 0 | 0 | 1 | 1 | 1 | 0 |
| −257.5 | −25.75° | 1 | 1 | 1 | 0 | 0 | 1 | 1 | 0 |
| −256.5 | −25.65° | 0 | 1 | 1 | 0 | 0 | 1 | 1 | 1 |
| −255.5 | −25.55° | 0 | 1 | 1 | 1 | 0 | 0 | 1 | 1 |
| −254.5 | −25.45° | 0 | 0 | 1 | 1 | 0 | 0 | 0 | 1 |
| −253.5 | −25.35° | 0 | 0 | 1 | 1 | 1 | 0 | 0 | 1 |
| −252.5 | −25.25° | 1 | 0 | 0 | 1 | 1 | 0 | 0 | 0 |
| −251.5 | −25.15° | 1 | 0 | 0 | 0 | 1 | 1 | 0 | 0 |
| −250.5 | −25.05° | 1 | 1 | 0 | 0 | 1 | 1 | 1 | 0 |
| −249.5 | −24.95° | 1 | 1 | 0 | 0 | 0 | 1 | 1 | 0 |
| −248.5 | −24.85° | 0 | 1 | 1 | 0 | 0 | 1 | 1 | 1 |
| −247.5 | −24.75° | 0 | 1 | 1 | 1 | 0 | 0 | 1 | 1 |
| −246.5 | −24.65° | 0 | 0 | 1 | 1 | 0 | 0 | 0 | 1 |
| −245.5 | −24.55° | 0 | 0 | 1 | 1 | 1 | 0 | 0 | 1 |
| −244.5 | −24.45° | 0 | 0 | 0 | 1 | 1 | 0 | 0 | 0 |
| −243.5 | −24.35° | 1 | 0 | 0 | 1 | 1 | 1 | 0 | 0 |
| −242.5 | −24.25° | 1 | 1 | 0 | 0 | 1 | 1 | 0 | 0 |
| −241.5 | −24.15° | 1 | 1 | 0 | 0 | 0 | 1 | 1 | 0 |
| −240.5 | −24.05° | 1 | 1 | 1 | 0 | 0 | 1 | 1 | 1 |
| −239.5 | −23.95° | 0 | 1 | 1 | 0 | 0 | 0 | 1 | 1 |
| −238.5 | −23.85° | 0 | 0 | 1 | 1 | 0 | 0 | 1 | 1 |
| −237.5 | −23.75° | 0 | 0 | 1 | 1 | 1 | 0 | 0 | 1 |
| −236.5 | −23.65° | 0 | 0 | 0 | 1 | 1 | 0 | 0 | 0 |
| −235.5 | −23.55° | 1 | 0 | 0 | 1 | 1 | 1 | 0 | 0 |
| −234.5 | −23.45° | 1 | 0 | 0 | 0 | 1 | 1 | 0 | 0 |
| −233.5 | −23.35° | 1 | 1 | 0 | 0 | 0 | 1 | 1 | 0 |
| −232.5 | −23.25° | 1 | 1 | 1 | 0 | 0 | 1 | 1 | 1 |
| −231.5 | −23.15° | 0 | 1 | 1 | 0 | 0 | 0 | 1 | 1 |
| −230.5 | −23.05° | 0 | 1 | 1 | 1 | 0 | 0 | 1 | 1 |
| −229.5 | −22.95° | 0 | 0 | 1 | 1 | 0 | 0 | 0 | 1 |
| −228.5 | −22.85° | 0 | 0 | 0 | 1 | 1 | 0 | 0 | 0 |
| −227.5 | −22.75° | 1 | 0 | 0 | 1 | 1 | 1 | 0 | 0 |
| −226.5 | −22.65° | 1 | 0 | 0 | 0 | 1 | 1 | 0 | 0 |
| −225.5 | −22.55° | 1 | 1 | 0 | 0 | 1 | 1 | 1 | 0 |
| −224.5 | −22.45° | 1 | 1 | 0 | 0 | 0 | 1 | 1 | 1 |
| −223.5 | −22.35° | 1 | 1 | 1 | 0 | 0 | 0 | 1 | 1 |
| −222.5 | −22.25° | 0 | 1 | 1 | 1 | 0 | 0 | 1 | 1 |
| −221.5 | −22.15° | 0 | 0 | 1 | 1 | 0 | 0 | 0 | 1 |
| −220.5 | −22.05° | 0 | 0 | 1 | 1 | 1 | 0 | 0 | 0 |
| −219.5 | −21.95° | 0 | 0 | 0 | 1 | 1 | 1 | 0 | 0 |
| −218.5 | −21.85° | 1 | 0 | 0 | 0 | 1 | 1 | 0 | 0 |
| −217.5 | −21.75° | 1 | 1 | 0 | 0 | 1 | 1 | 1 | 0 |
| −216.5 | −21.65° | 1 | 1 | 0 | 0 | 0 | 1 | 1 | 1 |
| −215.5 | −21.55° | 1 | 1 | 1 | 0 | 0 | 0 | 1 | 1 |
| −214.5 | −21.45° | 0 | 1 | 1 | 1 | 0 | 0 | 1 | 1 |
| −213.5 | −21.35° | 0 | 1 | 1 | 1 | 0 | 0 | 0 | 1 |
| −212.5 | −21.25° | 0 | 0 | 1 | 1 | 1 | 0 | 0 | 0 |
| −211.5 | −21.15° | 0 | 0 | 0 | 1 | 1 | 1 | 0 | 0 |
| −210.5 | −21.05° | 1 | 0 | 0 | 1 | 1 | 1 | 0 | 0 |
| −209.5 | −20.95° | 1 | 0 | 0 | 0 | 1 | 1 | 1 | 0 |
| −208.5 | −20.85° | 1 | 1 | 0 | 0 | 0 | 1 | 1 | 1 |
| −207.5 | −20.75° | 1 | 1 | 1 | 0 | 0 | 0 | 1 | 1 |
| −206.5 | −20.65° | 0 | 1 | 1 | 0 | 0 | 0 | 1 | 1 |
| −205.5 | −20.55° | 0 | 1 | 1 | 1 | 0 | 0 | 0 | 1 |
| −204.5 | −20.45° | 0 | 0 | 1 | 1 | 1 | 0 | 0 | 0 |
| −203.5 | −20.35° | 0 | 0 | 0 | 1 | 1 | 0 | 0 | 0 |
| −202.5 | −20.25° | 0 | 0 | 0 | 1 | 1 | 1 | 0 | 0 |
| −201.5 | −20.15° | 1 | 0 | 0 | 0 | 1 | 1 | 1 | 0 |
| −200.5 | −20.05° | 1 | 1 | 0 | 0 | 0 | 1 | 1 | 1 |
| −199.5 | −19.95° | 1 | 1 | 1 | 0 | 0 | 1 | 1 | 1 |
| −198.5 | −19.85° | 1 | 1 | 1 | 0 | 0 | 0 | 1 | 1 |
| −197.5 | −19.75° | 0 | 1 | 1 | 1 | 0 | 0 | 0 | 1 |
| −196.5 | −19.65° | 0 | 0 | 1 | 1 | 1 | 0 | 0 | 0 |
| −195.5 | −19.55° | 0 | 0 | 1 | 1 | 1 | 0 | 0 | 0 |
| −194.5 | −19.45° | 0 | 0 | 0 | 1 | 1 | 1 | 0 | 0 |
| −193.5 | −19.35° | 1 | 0 | 0 | 0 | 1 | 1 | 1 | 0 |
| −192.5 | −19.25° | 1 | 1 | 0 | 0 | 0 | 1 | 1 | 1 |
| −191.5 | −19.15° | 1 | 1 | 0 | 0 | 0 | 1 | 1 | 1 |
| −190.5 | −19.05° | 1 | 1 | 1 | 0 | 0 | 0 | 1 | 1 |

-continued

| | | | | | | | | | |
|---|---|---|---|---|---|---|---|---|---|
| −189.5 | −18.95° | 0 | 1 | 1 | 1 | 0 | 0 | 0 | 1 |
| −188.5 | −18.85° | 0 | 1 | 1 | 1 | 1 | 0 | 0 | 0 |
| −187.5 | −18.75° | 0 | 0 | 1 | 1 | 1 | 0 | 0 | 0 |
| −186.5 | −18.65° | 0 | 0 | 0 | 1 | 1 | 1 | 0 | 0 |
| −185.5 | −18.55° | 1 | 0 | 0 | 0 | 1 | 1 | 1 | 0 |
| −184.5 | −18.45° | 1 | 0 | 0 | 0 | 1 | 1 | 1 | 1 |
| −183.5 | −18.35° | 1 | 1 | 0 | 0 | 0 | 1 | 1 | 1 |
| −182.5 | −18.25° | 1 | 1 | 1 | 0 | 0 | 0 | 1 | 1 |
| −181.5 | −18.15° | 1 | 1 | 1 | 1 | 0 | 0 | 0 | 1 |
| −180.5 | −18.05° | 0 | 1 | 1 | 1 | 0 | 0 | 0 | 0 |
| −179.5 | −17.95° | 0 | 0 | 1 | 1 | 1 | 0 | 0 | 0 |
| −178.5 | −17.85° | 0 | 0 | 0 | 1 | 1 | 1 | 0 | 0 |
| −177.5 | −17.75° | 0 | 0 | 0 | 1 | 1 | 1 | 1 | 0 |
| −176.5 | −17.65° | 1 | 0 | 0 | 0 | 1 | 1 | 1 | 1 |
| −175.5 | −17.55° | 1 | 1 | 0 | 0 | 0 | 1 | 1 | 1 |
| −174.5 | −17.45° | 1 | 1 | 1 | 0 | 0 | 0 | 1 | 1 |
| −173.5 | −17.35° | 1 | 1 | 1 | 0 | 0 | 0 | 0 | 1 |
| −172.5 | −17.25° | 0 | 1 | 1 | 1 | 0 | 0 | 0 | 0 |
| −171.5 | −17.15° | 0 | 0 | 1 | 1 | 1 | 0 | 0 | 0 |
| −170.5 | −17.05° | 0 | 0 | 1 | 1 | 1 | 1 | 0 | 0 |
| −169.5 | −16.95° | 0 | 0 | 0 | 1 | 1 | 1 | 1 | 0 |
| −168.5 | −16.85° | 1 | 0 | 0 | 0 | 1 | 1 | 1 | 1 |
| −167.5 | −16.75° | 1 | 0 | 0 | 0 | 0 | 1 | 1 | 1 |
| −166.5 | −16.65° | 1 | 1 | 0 | 0 | 0 | 0 | 1 | 1 |
| −165.5 | −16.55° | 1 | 1 | 1 | 0 | 0 | 0 | 0 | 1 |
| −164.5 | −16.45° | 1 | 1 | 1 | 1 | 0 | 0 | 0 | 0 |
| −163.5 | −16.35° | 0 | 1 | 1 | 1 | 1 | 0 | 0 | 0 |
| −162.5 | −16.25° | 0 | 0 | 1 | 1 | 1 | 1 | 0 | 0 |
| −161.5 | −16.15° | 0 | 0 | 0 | 1 | 1 | 1 | 1 | 0 |
| −160.5 | −16.05° | 0 | 0 | 0 | 0 | 1 | 1 | 1 | 1 |
| −159.5 | −15.95° | 1 | 0 | 0 | 0 | 0 | 1 | 1 | 1 |
| −158.5 | −15.85° | 1 | 1 | 0 | 0 | 0 | 0 | 1 | 1 |
| −157.5 | −15.75° | 1 | 1 | 1 | 0 | 0 | 0 | 0 | 1 |
| −156.5 | −15.65° | 1 | 1 | 1 | 1 | 0 | 0 | 0 | 0 |
| −155.5 | −15.55° | 0 | 1 | 1 | 1 | 1 | 0 | 0 | 0 |
| −154.5 | −15.45° | 0 | 0 | 1 | 1 | 1 | 1 | 0 | 0 |
| −153.5 | −15.35° | 0 | 0 | 0 | 1 | 1 | 1 | 1 | 0 |
| −152.5 | −15.25° | 0 | 0 | 0 | 0 | 1 | 1 | 1 | 1 |
| −151.5 | −15.15° | 1 | 0 | 0 | 0 | 0 | 1 | 1 | 1 |
| −150.5 | −15.05° | 1 | 1 | 0 | 0 | 0 | 0 | 1 | 1 |
| −149.5 | −14.95° | 1 | 1 | 1 | 0 | 0 | 0 | 0 | 1 |
| −148.5 | −14.85° | 1 | 1 | 1 | 1 | 0 | 0 | 0 | 0 |
| −147.5 | −14.75° | 0 | 1 | 1 | 1 | 1 | 0 | 0 | 0 |
| −146.5 | −14.65° | 0 | 0 | 1 | 1 | 1 | 1 | 0 | 0 |
| −145.5 | −14.55° | 0 | 0 | 0 | 1 | 1 | 1 | 1 | 0 |
| −144.5 | −14.45° | 0 | 0 | 0 | 1 | 1 | 1 | 1 | 0 |
| −143.5 | −14.35° | 0 | 0 | 0 | 0 | 1 | 1 | 1 | 1 |
| −142.5 | −14.25° | 1 | 0 | 0 | 0 | 0 | 1 | 1 | 1 |
| −141.5 | −14.15° | 1 | 1 | 0 | 0 | 0 | 0 | 1 | 1 |
| −140.5 | −14.05° | 1 | 1 | 1 | 0 | 0 | 0 | 0 | 1 |
| −139.5 | −13.95° | 1 | 1 | 1 | 1 | 0 | 0 | 0 | 0 |
| −138.5 | −13.85° | 0 | 1 | 1 | 1 | 1 | 0 | 0 | 0 |
| −137.5 | −13.75° | 0 | 0 | 1 | 1 | 1 | 1 | 0 | 0 |
| −136.5 | −13.65° | 0 | 0 | 0 | 1 | 1 | 1 | 1 | 0 |
| −135.5 | −13.55° | 0 | 0 | 0 | 0 | 1 | 1 | 1 | 1 |
| −134.5 | −13.45° | 1 | 0 | 0 | 0 | 0 | 1 | 1 | 1 |
| −133.5 | −13.35° | 1 | 1 | 0 | 0 | 0 | 0 | 1 | 1 |
| −132.5 | −13.25° | 1 | 1 | 1 | 0 | 0 | 0 | 0 | 1 |
| −131.5 | −13.15° | 1 | 1 | 1 | 1 | 0 | 0 | 0 | 0 |
| −130.5 | −13.05° | 0 | 1 | 1 | 1 | 1 | 0 | 0 | 0 |
| −129.5 | −12.95° | 0 | 0 | 1 | 1 | 1 | 1 | 0 | 0 |
| −128.5 | −12.85° | 0 | 0 | 0 | 1 | 1 | 1 | 1 | 0 |
| −127.5 | −12.75° | 0 | 0 | 0 | 0 | 1 | 1 | 1 | 1 |
| −126.5 | −12.65° | 1 | 0 | 0 | 0 | 0 | 1 | 1 | 1 |
| −125.5 | −12.55° | 1 | 1 | 0 | 0 | 0 | 0 | 1 | 1 |
| −124.5 | −12.45° | 1 | 1 | 1 | 0 | 0 | 0 | 0 | 1 |
| −123.5 | −12.35° | 1 | 1 | 1 | 1 | 0 | 0 | 0 | 0 |
| −122.5 | −12.25° | 1 | 1 | 1 | 1 | 1 | 0 | 0 | 0 |
| −121.5 | −12.15° | 0 | 1 | 1 | 1 | 1 | 1 | 0 | 0 |
| −120.5 | −12.05° | 0 | 0 | 0 | 1 | 1 | 1 | 1 | 0 |
| −119.5 | −11.95° | 0 | 0 | 0 | 0 | 1 | 1 | 1 | 1 |
| −118.5 | −11.85° | 0 | 0 | 0 | 0 | 0 | 1 | 1 | 1 |
| −117.5 | −11.75° | 1 | 0 | 0 | 0 | 0 | 0 | 1 | 1 |
| −116.5 | −11.65° | 1 | 1 | 0 | 0 | 0 | 0 | 0 | 1 |
| −115.5 | −11.55° | 1 | 1 | 1 | 0 | 0 | 0 | 0 | 0 |
| −114.5 | −11.45° | 1 | 1 | 1 | 1 | 0 | 0 | 0 | 0 |
| −113.5 | −11.35° | 0 | 1 | 1 | 1 | 1 | 1 | 0 | 0 |
| −112.5 | −11.25° | 0 | 0 | 1 | 1 | 1 | 1 | 1 | 0 |
| −111.5 | −11.15° | 0 | 0 | 0 | 1 | 1 | 1 | 1 | 1 |

-continued

| | | | | | | | | | |
|---|---|---|---|---|---|---|---|---|---|
| −110.5 | −11.05° | 0 | 0 | 0 | 0 | 0 | 1 | 1 | 1 |
| −109.5 | −10.95° | 1 | 0 | 0 | 0 | 0 | 0 | 1 | 1 |
| −108.5 | −10.85° | 1 | 1 | 0 | 0 | 0 | 0 | 0 | 1 |
| −107.5 | −10.75° | 1 | 1 | 1 | 0 | 0 | 0 | 0 | 0 |
| −106.5 | −10.65° | 1 | 1 | 1 | 1 | 1 | 0 | 0 | 0 |
| −105.5 | −10.55° | 1 | 1 | 1 | 1 | 1 | 1 | 0 | 0 |
| −104.5 | −10.45° | 0 | 0 | 1 | 1 | 1 | 1 | 1 | 0 |
| −103.5 | −10.35° | 0 | 0 | 0 | 1 | 1 | 1 | 1 | 1 |
| −102.5 | −10.25° | 0 | 0 | 0 | 0 | 1 | 1 | 1 | 1 |
| −101.5 | −10.15° | 0 | 0 | 0 | 0 | 0 | 0 | 1 | 1 |
| −100.5 | −10.05° | 1 | 1 | 0 | 0 | 0 | 0 | 0 | 1 |
| −99.5 | −99.50° | 1 | 1 | 1 | 0 | 0 | 0 | 0 | 0 |
| −98.5 | −9.85° | 1 | 1 | 1 | 1 | 0 | 0 | 0 | 0 |
| −97.5 | −9.75° | 1 | 1 | 1 | 1 | 1 | 1 | 0 | 0 |
| −96.5 | −9.65° | 0 | 1 | 1 | 1 | 1 | 1 | 1 | 0 |
| −95.5 | −9.55° | 0 | 0 | 0 | 1 | 1 | 1 | 1 | 1 |
| −94.5 | −9.45° | 0 | 0 | 0 | 0 | 1 | 1 | 1 | 1 |
| −93.5 | −9.35° | 0 | 0 | 0 | 0 | 0 | 0 | 1 | 1 |
| −92.5 | −9.25° | 1 | 0 | 0 | 0 | 0 | 0 | 0 | 1 |
| −91.5 | −9.15° | 1 | 1 | 0 | 0 | 0 | 0 | 0 | 0 |
| −90.5 | −9.05° | 1 | 1 | 1 | 1 | 0 | 0 | 0 | 0 |
| −89.5 | −8.95° | 1 | 1 | 1 | 1 | 1 | 1 | 0 | 0 |
| −88.5 | −8.85° | 0 | 1 | 1 | 1 | 1 | 1 | 1 | 0 |
| −87.5 | −8.75° | 0 | 0 | 1 | 1 | 1 | 1 | 1 | 1 |
| −86.5 | −8.65° | 0 | 0 | 0 | 0 | 1 | 1 | 1 | 1 |
| −85.5 | −8.55° | 0 | 0 | 0 | 0 | 0 | 1 | 1 | 1 |
| −84.5 | −8.45° | 0 | 0 | 0 | 0 | 0 | 0 | 0 | 1 |
| −83.5 | −8.35° | 1 | 1 | 0 | 0 | 0 | 0 | 0 | 0 |
| −82.5 | −8.25° | 1 | 1 | 1 | 1 | 0 | 0 | 0 | 0 |
| −81.5 | −8.15° | 1 | 1 | 1 | 1 | 1 | 0 | 0 | 0 |
| −80.5 | −8.05° | 1 | 1 | 1 | 1 | 1 | 1 | 1 | 0 |
| −79.5 | −7.95° | 0 | 0 | 1 | 1 | 1 | 1 | 1 | 1 |
| −78.5 | −7.85° | 0 | 0 | 0 | 1 | 1 | 1 | 1 | 1 |
| −77.5 | −7.75° | 0 | 0 | 0 | 0 | 0 | 1 | 1 | 1 |
| −76.5 | −7.65° | 0 | 0 | 0 | 0 | 0 | 0 | 0 | 1 |
| −75.5 | −7.55° | 1 | 0 | 0 | 0 | 0 | 0 | 0 | 0 |
| −74.5 | −7.45° | 1 | 1 | 1 | 0 | 0 | 0 | 0 | 0 |
| −73.5 | −7.35° | 1 | 1 | 1 | 1 | 1 | 0 | 0 | 0 |
| −72.5 | −7.25° | 1 | 1 | 1 | 1 | 1 | 1 | 1 | 0 |
| −71.5 | −7.15° | 0 | 1 | 1 | 1 | 1 | 1 | 1 | 1 |
| −70.5 | −7.05° | 0 | 0 | 0 | 0 | 1 | 1 | 1 | 1 |
| −69.5 | −6.95° | 0 | 0 | 0 | 0 | 0 | 1 | 1 | 1 |
| −68.5 | −6.85° | 0 | 0 | 0 | 0 | 0 | 0 | 0 | 1 |
| −67.5 | −6.75° | 1 | 0 | 0 | 0 | 0 | 0 | 0 | 0 |
| −66.5 | −6.65° | 1 | 1 | 1 | 0 | 0 | 0 | 0 | 0 |
| −65.5 | −6.55° | 1 | 1 | 1 | 1 | 1 | 0 | 0 | 0 |
| −64.5 | −6.45° | 1 | 1 | 1 | 1 | 1 | 1 | 1 | 0 |
| −63.5 | −6.35° | 1 | 1 | 1 | 1 | 1 | 1 | 1 | 1 |
| −62.5 | −6.25° | 0 | 0 | 1 | 1 | 1 | 1 | 1 | 1 |
| −61.5 | −6.15° | 0 | 0 | 0 | 0 | 1 | 1 | 1 | 1 |
| −60.5 | −6.05° | 0 | 0 | 0 | 0 | 0 | 0 | 0 | 1 |
| −59.5 | −5.95° | 0 | 0 | 0 | 0 | 0 | 0 | 0 | 0 |
| −58.5 | −5.85° | 1 | 1 | 0 | 0 | 0 | 0 | 0 | 0 |
| −57.5 | −5.75° | 1 | 1 | 1 | 1 | 0 | 0 | 0 | 0 |
| −56.5 | −5.65° | 1 | 1 | 1 | 1 | 1 | 1 | 1 | 0 |
| −55.5 | −5.55° | 1 | 1 | 1 | 1 | 1 | 1 | 1 | 1 |
| −54.5 | −5.45° | 0 | 1 | 1 | 1 | 1 | 1 | 1 | 1 |
| −53.5 | −5.35° | 0 | 0 | 0 | 0 | 1 | 1 | 1 | 1 |
| −52.5 | −5.25° | 0 | 0 | 0 | 0 | 0 | 0 | 0 | 1 |
| −51.5 | −5.15° | 0 | 0 | 0 | 0 | 0 | 0 | 0 | 0 |
| −50.5 | −5.05° | 1 | 0 | 0 | 0 | 0 | 0 | 0 | 0 |
| −49.5 | −4.95° | 1 | 1 | 1 | 1 | 0 | 0 | 0 | 0 |
| −48.5 | −4.85° | 1 | 1 | 1 | 1 | 1 | 1 | 1 | 0 |
| −47.5 | −4.75° | 1 | 1 | 1 | 1 | 1 | 1 | 1 | 1 |
| −46.5 | −4.65° | 1 | 1 | 1 | 1 | 1 | 1 | 1 | 1 |
| −45.5 | −4.55° | 0 | 0 | 0 | 1 | 1 | 1 | 1 | 1 |
| −44.5 | −4.45° | 0 | 0 | 0 | 0 | 0 | 0 | 1 | 1 |
| −43.5 | −4.35° | 0 | 0 | 0 | 0 | 0 | 0 | 0 | 0 |
| −42.5 | −4.25° | 0 | 0 | 0 | 0 | 0 | 0 | 0 | 0 |
| −41.5 | −4.15° | 1 | 1 | 1 | 0 | 0 | 0 | 0 | 0 |
| −40.5 | −4.05° | 1 | 1 | 1 | 1 | 1 | 1 | 0 | 0 |
| −39.5 | −3.95° | 1 | 1 | 1 | 1 | 1 | 1 | 1 | 1 |
| −38.5 | −3.85° | 1 | 1 | 1 | 1 | 1 | 1 | 1 | 1 |
| −37.5 | −3.75° | 0 | 0 | 1 | 1 | 1 | 1 | 1 | 1 |
| −36.5 | −3.65° | 0 | 0 | 0 | 0 | 0 | 0 | 1 | 1 |
| −35.5 | −3.55° | 0 | 0 | 0 | 0 | 0 | 0 | 0 | 0 |
| −34.5 | −3.45° | 0 | 0 | 0 | 0 | 0 | 0 | 0 | 0 |
| −33.5 | −3.35° | 1 | 1 | 0 | 0 | 0 | 0 | 0 | 0 |
| −32.5 | −3.25° | 1 | 1 | 1 | 1 | 1 | 1 | 0 | 0 |

-continued

| | | | | | | | | | |
|---|---|---|---|---|---|---|---|---|---|
| −31.5 | −3.15° | 1 | 1 | 1 | 1 | 1 | 1 | 1 | 1 |
| −30.5 | −3.05° | 1 | 1 | 1 | 1 | 1 | 1 | 1 | 1 |
| −29.5 | −2.95° | 0 | 1 | 1 | 1 | 1 | 1 | 1 | 1 |
| −28.5 | −2.85° | 0 | 0 | 0 | 0 | 0 | 1 | 1 | 1 |
| −27.5 | −2.75° | 0 | 0 | 0 | 0 | 0 | 0 | 0 | 0 |
| −26.5 | −2.65° | 0 | 0 | 0 | 0 | 0 | 0 | 0 | 0 |
| −25.5 | −2.55° | 0 | 0 | 0 | 0 | 0 | 0 | 0 | 0 |
| −24.5 | −2.45° | 1 | 1 | 1 | 1 | 1 | 0 | 0 | 0 |
| −23.5 | −2.35° | 1 | 1 | 1 | 1 | 1 | 1 | 1 | 1 |
| −22.5 | −2.25° | 1 | 1 | 1 | 1 | 1 | 1 | 1 | 1 |
| −21.5 | −2.15° | 1 | 1 | 1 | 1 | 1 | 1 | 1 | 1 |
| −20.5 | −2.05° | 0 | 0 | 0 | 0 | 0 | 1 | 1 | 1 |
| −19.5 | −1.95° | 0 | 0 | 0 | 0 | 0 | 0 | 0 | 0 |
| −18.5 | −1.85° | 0 | 0 | 0 | 0 | 0 | 0 | 0 | 0 |
| −17.5 | −1.75° | 0 | 0 | 0 | 0 | 0 | 0 | 0 | 0 |
| −16.5 | −1.65° | 1 | 1 | 1 | 1 | 0 | 0 | 0 | 0 |
| −15.5 | −1.55° | 1 | 1 | 1 | 1 | 1 | 1 | 1 | 1 |
| −14.5 | −1.45° | 1 | 1 | 1 | 1 | 1 | 1 | 1 | 1 |
| −13.5 | −1.35° | 1 | 1 | 1 | 1 | 1 | 1 | 1 | 1 |
| −12.5 | −1.25° | 0 | 0 | 1 | 1 | 1 | 1 | 1 | 1 |
| −11.5 | −1.15° | 0 | 0 | 0 | 0 | 0 | 0 | 0 | 0 |
| −10.5 | −1.05° | 0 | 0 | 0 | 0 | 0 | 0 | 0 | 0 |
| −9.5 | −0.95° | 0 | 0 | 0 | 0 | 0 | 0 | 0 | 0 |
| −8.5 | −0.85° | 0 | 0 | 0 | 0 | 0 | 0 | 0 | 0 |
| −7.5 | −0.75° | 1 | 1 | 1 | 1 | 1 | 1 | 1 | 1 |
| −6.5 | −0.65° | 1 | 1 | 1 | 1 | 1 | 1 | 1 | 1 |
| −5.5 | −0.55° | 1 | 1 | 1 | 1 | 1 | 1 | 1 | 1 |
| −4.5 | −0.45° | 1 | 1 | 1 | 1 | 1 | 1 | 1 | 1 |
| −3.5 | −0.35° | 0 | 0 | 0 | 0 | 0 | 0 | 0 | 0 |
| −2.5 | −0.25° | 0 | 0 | 0 | 0 | 0 | 0 | 0 | 0 |
| −1.5 | −0.15° | 0 | 0 | 0 | 0 | 0 | 0 | 0 | 0 |
| −0.5 | −0.05° | 0 | 0 | 0 | 0 | 0 | 0 | 0 | 0 |
| +0.5 | +0.05° | 1 | 1 | 1 | 1 | 1 | 1 | 1 | 1 |
| +1.5 | +0.15° | 1 | 1 | 1 | 1 | 1 | 1 | 1 | 1 |
| +2.5 | +0.25° | 1 | 1 | 1 | 1 | 1 | 1 | 1 | 1 |
| +3.5 | +0.35° | 1 | 1 | 1 | 1 | 1 | 1 | 1 | 1 |
| +4.5 | +0.45° | 0 | 0 | 0 | 0 | 0 | 0 | 0 | 0 |
| +5.5 | +0.55° | 0 | 0 | 0 | 0 | 0 | 0 | 0 | 0 |
| +6.5 | +0.65° | 0 | 0 | 0 | 0 | 0 | 0 | 0 | 0 |
| +7.5 | +0.75° | 0 | 0 | 0 | 0 | 0 | 0 | 0 | 0 |
| +8.5 | +0.85° | 1 | 1 | 1 | 1 | 1 | 1 | 1 | 1 |
| +9.5 | +0.95° | 1 | 1 | 1 | 1 | 1 | 1 | 1 | 1 |
| +10.5 | +1.05° | 1 | 1 | 1 | 1 | 1 | 1 | 1 | 1 |
| +11.5 | +1.15° | 1 | 1 | 1 | 1 | 1 | 1 | 1 | 1 |
| +12.5 | +1.25° | 1 | 1 | 0 | 0 | 0 | 0 | 0 | 0 |
| +13.5 | +1.35° | 0 | 0 | 0 | 0 | 0 | 0 | 0 | 0 |
| +14.5 | +1.45° | 0 | 0 | 0 | 0 | 0 | 0 | 0 | 0 |
| +15.5 | +1.55° | 0 | 0 | 0 | 0 | 0 | 0 | 0 | 0 |
| +16.5 | +1.65° | 0 | 0 | 0 | 0 | 1 | 1 | 1 | 1 |
| +17.5 | +1.75° | 1 | 1 | 1 | 1 | 1 | 1 | 1 | 1 |
| +18.5 | +1.85° | 1 | 1 | 1 | 1 | 1 | 1 | 1 | 1 |
| +19.5 | +1.95° | 1 | 1 | 1 | 1 | 1 | 1 | 1 | 1 |
| +20.5 | +2.05° | 1 | 1 | 1 | 1 | 1 | 0 | 0 | 0 |
| +21.5 | +2.15° | 0 | 0 | 0 | 0 | 0 | 0 | 0 | 0 |
| +22.5 | +2.25° | 0 | 0 | 0 | 0 | 0 | 0 | 0 | 0 |
| +23.5 | +2.35° | 0 | 0 | 0 | 0 | 0 | 0 | 0 | 0 |
| +24.5 | +2.45° | 0 | 0 | 0 | 0 | 0 | 1 | 1 | 1 |
| +25.5 | +2.55° | 1 | 1 | 1 | 1 | 1 | 1 | 1 | 1 |
| +26.5 | +2.65° | 1 | 1 | 1 | 1 | 1 | 1 | 1 | 1 |
| +27.5 | +2.75° | 1 | 1 | 1 | 1 | 1 | 1 | 1 | 1 |
| +28.5 | +2.85° | 1 | 1 | 1 | 1 | 1 | 0 | 0 | 0 |
| +29.5 | +2.95° | 1 | 0 | 0 | 0 | 0 | 0 | 0 | 0 |
| +30.5 | +3.05° | 0 | 0 | 0 | 0 | 0 | 0 | 0 | 0 |
| +31.5 | +3.15° | 0 | 0 | 0 | 0 | 0 | 0 | 0 | 0 |
| +32.5 | +3.25° | 0 | 0 | 0 | 0 | 0 | 0 | 1 | 1 |
| +33.5 | +3.35° | 0 | 0 | 1 | 1 | 1 | 1 | 1 | 1 |
| +34.5 | +3.45° | 1 | 1 | 1 | 1 | 1 | 1 | 1 | 1 |
| +35.5 | +3.55° | 1 | 1 | 1 | 1 | 1 | 1 | 1 | 1 |
| +36.5 | +3.65° | 1 | 1 | 1 | 1 | 1 | 1 | 0 | 0 |
| +37.5 | +3.75° | 1 | 1 | 0 | 0 | 0 | 0 | 0 | 0 |
| +38.5 | +3.85° | 0 | 0 | 0 | 0 | 0 | 0 | 0 | 0 |
| +39.5 | +3.95° | 0 | 0 | 0 | 0 | 0 | 0 | 0 | 0 |
| +40.5 | +4.05° | 0 | 0 | 0 | 0 | 0 | 0 | 1 | 1 |
| +41.5 | +4.15° | 0 | 0 | 0 | 1 | 1 | 1 | 1 | 1 |
| +42.5 | +4.25° | 1 | 1 | 1 | 1 | 1 | 1 | 1 | 1 |
| +43.5 | +4.35° | 1 | 1 | 1 | 1 | 1 | 1 | 1 | 1 |
| +44.5 | +4.45° | 1 | 1 | 1 | 1 | 1 | 1 | 0 | 0 |
| +45.5 | +4.55° | 1 | 1 | 1 | 0 | 0 | 0 | 0 | 0 |
| +46.5 | +4.65° | 0 | 0 | 0 | 0 | 0 | 0 | 0 | 0 |

-continued

| | | | | | | | | | |
|---|---|---|---|---|---|---|---|---|---|
| +47.5 | +4.75° | 0 | 0 | 0 | 0 | 0 | 0 | 0 | 0 |
| +48.5 | +4.85° | 0 | 0 | 0 | 0 | 0 | 0 | 0 | 1 |
| +49.5 | +4.95° | 0 | 0 | 0 | 0 | 1 | 1 | 1 | 1 |
| +50.5 | +5.05° | 0 | 1 | 1 | 1 | 1 | 1 | 1 | 1 |
| +51.5 | +5.15° | 1 | 1 | 1 | 1 | 1 | 1 | 1 | 1 |
| +52.5 | +5.25° | 1 | 1 | 1 | 1 | 1 | 1 | 1 | 0 |
| +53.5 | +5.35° | 1 | 1 | 1 | 1 | 0 | 0 | 0 | 0 |
| +54.5 | +5.45° | 1 | 0 | 0 | 0 | 0 | 0 | 0 | 0 |
| +55.5 | +5.55° | 0 | 0 | 0 | 0 | 0 | 0 | 0 | 0 |
| +56.5 | +5.65° | 0 | 0 | 0 | 0 | 0 | 0 | 0 | 1 |
| +57.5 | +5.75° | 0 | 0 | 0 | 0 | 1 | 1 | 1 | 1 |
| +58.5 | +5.85° | 0 | 0 | 1 | 1 | 1 | 1 | 1 | 1 |
| +59.5 | +5.95° | 1 | 1 | 1 | 1 | 1 | 1 | 1 | 1 |
| +60.5 | +6.05° | 1 | 1 | 1 | 1 | 1 | 1 | 1 | 0 |
| +61.5 | +6.15° | 1 | 1 | 1 | 1 | 0 | 0 | 0 | 0 |
| +62.5 | +6.25° | 1 | 1 | 0 | 0 | 0 | 0 | 0 | 0 |
| +63.5 | +6.35° | 0 | 0 | 0 | 0 | 0 | 0 | 0 | 0 |
| +64.5 | +6.45° | 0 | 0 | 0 | 0 | 0 | 0 | 0 | 1 |
| +65.5 | +6.55° | 0 | 0 | 0 | 0 | 0 | 1 | 1 | 1 |
| +66.5 | +6.65° | 0 | 0 | 0 | 1 | 1 | 1 | 1 | 1 |
| +67.5 | +6.75° | 0 | 1 | 1 | 1 | 1 | 1 | 1 | 1 |
| +68.5 | +6.85° | 1 | 1 | 1 | 1 | 1 | 1 | 1 | 0 |
| +69.5 | +6.95° | 1 | 1 | 1 | 1 | 1 | 0 | 0 | 0 |
| +70.5 | +7.05° | 1 | 1 | 1 | 0 | 0 | 0 | 0 | 0 |
| +71.5 | +7.15° | 1 | 0 | 0 | 0 | 0 | 0 | 0 | 0 |
| +72.5 | +7.25° | 0 | 0 | 0 | 0 | 0 | 0 | 0 | 1 |
| +73.5 | +7.35° | 0 | 0 | 0 | 0 | 0 | 1 | 1 | 1 |
| +74.5 | +7.45° | 0 | 0 | 0 | 1 | 1 | 1 | 1 | 1 |
| +75.5 | +7.55° | 0 | 1 | 1 | 1 | 1 | 1 | 1 | 1 |
| +76.5 | +7.65° | 1 | 1 | 1 | 1 | 1 | 1 | 1 | 0 |
| +77.5 | +7.75° | 1 | 1 | 1 | 1 | 1 | 0 | 0 | 0 |
| +78.5 | +7.85° | 1 | 1 | 1 | 0 | 0 | 0 | 0 | 0 |
| +79.5 | +7.95° | 1 | 1 | 0 | 0 | 0 | 0 | 0 | 0 |
| +80.5 | +8.05° | 0 | 0 | 0 | 0 | 0 | 0 | 0 | 1 |
| +81.5 | +8.15° | 0 | 0 | 0 | 0 | 0 | 1 | 1 | 1 |
| +82.5 | +8.25° | 0 | 0 | 0 | 0 | 1 | 1 | 1 | 1 |
| +83.5 | +8.35° | 0 | 0 | 1 | 1 | 1 | 1 | 1 | 1 |
| +84.5 | +8.45° | 1 | 1 | 1 | 1 | 1 | 1 | 1 | 0 |
| +85.5 | +8.55° | 1 | 1 | 1 | 1 | 1 | 0 | 0 | 0 |
| +86.5 | +8.65° | 1 | 1 | 1 | 1 | 0 | 0 | 0 | 0 |
| +87.5 | +8.75° | 1 | 1 | 0 | 0 | 0 | 0 | 0 | 0 |
| +88.5 | +8.85° | 1 | 0 | 0 | 0 | 0 | 0 | 0 | 1 |
| +89.5 | +8.95° | 0 | 0 | 0 | 0 | 0 | 0 | 1 | 1 |
| +90.5 | +9.05° | 0 | 0 | 0 | 0 | 1 | 1 | 1 | 1 |
| +91.5 | +9.15° | 0 | 0 | 1 | 1 | 1 | 1 | 1 | 1 |
| +92.5 | +9.25° | 0 | 1 | 1 | 1 | 1 | 1 | 1 | 0 |
| +93.5 | +9.35° | 1 | 1 | 1 | 1 | 1 | 1 | 0 | 0 |
| +94.5 | +9.45° | 1 | 1 | 1 | 1 | 0 | 0 | 0 | 0 |
| +95.5 | +9.55° | 1 | 1 | 1 | 0 | 0 | 0 | 0 | 0 |
| +96.5 | +9.65° | 1 | 0 | 0 | 0 | 0 | 0 | 0 | 1 |
| +97.5 | +9.75° | 0 | 0 | 0 | 0 | 0 | 0 | 1 | 1 |
| +98.5 | +9.85° | 0 | 0 | 0 | 0 | 1 | 1 | 1 | 1 |
| +99.5 | +9.95° | 0 | 0 | 0 | 1 | 1 | 1 | 1 | 1 |
| +100.5 | +10.05° | 0 | 0 | 1 | 1 | 1 | 1 | 1 | 0 |
| +101.5 | +10.15° | 1 | 1 | 1 | 1 | 1 | 1 | 0 | 0 |
| +102.5 | +10.25° | 1 | 1 | 1 | 1 | 0 | 0 | 0 | 0 |
| +103.5 | +10.35° | 1 | 1 | 1 | 0 | 0 | 0 | 0 | 0 |
| +104.5 | +10.45° | 1 | 1 | 0 | 0 | 0 | 0 | 0 | 1 |
| +105.5 | +10.55° | 0 | 0 | 0 | 0 | 0 | 0 | 1 | 1 |
| +106.5 | +10.65° | 0 | 0 | 0 | 0 | 0 | 1 | 1 | 1 |
| +107.5 | +10.75° | 0 | 0 | 0 | 1 | 1 | 1 | 1 | 1 |
| +108.5 | +10.85° | 0 | 0 | 1 | 1 | 1 | 1 | 1 | 0 |
| +109.5 | +10.95° | 0 | 1 | 1 | 1 | 1 | 1 | 0 | 0 |
| +110.5 | +11.05° | 1 | 1 | 1 | 1 | 1 | 0 | 0 | 0 |
| +111.5 | +11.15° | 1 | 1 | 1 | 0 | 0 | 0 | 0 | 0 |
| +112.5 | +11.25° | 1 | 1 | 0 | 0 | 0 | 0 | 0 | 1 |
| +113.5 | +11.35° | 1 | 0 | 0 | 0 | 0 | 0 | 1 | 1 |
| +114.5 | +11.45° | 0 | 0 | 0 | 0 | 0 | 1 | 1 | 1 |
| +115.5 | +11.55° | 0 | 0 | 0 | 0 | 1 | 1 | 1 | 1 |
| +116.5 | +11.65° | 0 | 0 | 0 | 1 | 1 | 1 | 1 | 0 |
| +117.5 | +11.75° | 0 | 1 | 1 | 1 | 1 | 1 | 0 | 0 |
| +118.5 | +11.85° | 1 | 1 | 1 | 1 | 1 | 0 | 0 | 0 |
| +119.5 | +11.95° | 1 | 1 | 1 | 1 | 0 | 0 | 0 | 0 |
| +120.5 | +12.05° | 1 | 1 | 1 | 0 | 0 | 0 | 0 | 1 |
| +121.5 | +12.15° | 1 | 0 | 0 | 0 | 0 | 0 | 1 | 1 |
| +122.5 | +12.25° | 0 | 0 | 0 | 0 | 0 | 1 | 1 | 1 |
| +123.5 | +12.35° | 0 | 0 | 0 | 0 | 1 | 1 | 1 | 1 |
| +124.5 | +12.45° | 0 | 0 | 0 | 1 | 1 | 1 | 1 | 0 |
| +125.5 | +12.55° | 0 | 0 | 1 | 1 | 1 | 1 | 0 | 0 |

-continued

| | | | | | | | | | |
|---|---|---|---|---|---|---|---|---|---|
| +126.5 | +12.65° | 0 | 1 | 1 | 1 | 1 | 0 | 0 | 0 |
| +127.5 | +12.75° | 1 | 1 | 1 | 1 | 0 | 0 | 0 | 0 |
| +128.5 | +12.85° | 1 | 1 | 1 | 0 | 0 | 0 | 0 | 1 |
| +129.5 | +12.95° | 1 | 1 | 0 | 0 | 0 | 0 | 1 | 1 |
| +130.5 | +13.05° | 1 | 0 | 0 | 0 | 0 | 1 | 1 | 1 |
| +131.5 | +13.15° | 0 | 0 | 0 | 0 | 1 | 1 | 1 | 1 |
| +132.5 | +13.25° | 0 | 0 | 0 | 1 | 1 | 1 | 1 | 0 |
| +133.5 | +13.35° | 0 | 0 | 1 | 1 | 1 | 1 | 0 | 0 |
| +134.5 | +13.45° | 0 | 1 | 1 | 1 | 1 | 0 | 0 | 0 |
| +135.5 | +13.55° | 1 | 1 | 1 | 1 | 0 | 0 | 0 | 0 |
| +136.5 | +13.65° | 1 | 1 | 1 | 0 | 0 | 0 | 0 | 1 |
| +137.5 | +13.75° | 1 | 1 | 0 | 0 | 0 | 0 | 1 | 1 |
| +138.5 | +13.85° | 1 | 0 | 0 | 0 | 0 | 1 | 1 | 1 |
| +139.5 | +13.95° | 0 | 0 | 0 | 0 | 1 | 1 | 1 | 1 |
| +140.5 | +14.05° | 0 | 0 | 0 | 1 | 1 | 1 | 1 | 0 |
| +141.5 | +14.15° | 0 | 0 | 1 | 1 | 1 | 1 | 0 | 0 |
| +142.5 | +14.25° | 0 | 1 | 1 | 1 | 1 | 0 | 0 | 0 |
| +143.5 | +14.35° | 1 | 1 | 1 | 1 | 0 | 0 | 0 | 0 |
| +144.5 | +14.45° | 1 | 1 | 1 | 0 | 0 | 0 | 0 | 1 |
| +145.5 | +14.55° | 1 | 1 | 1 | 0 | 0 | 0 | 0 | 1 |
| +146.5 | +14.65° | 1 | 1 | 0 | 0 | 0 | 0 | 1 | 1 |
| +147.5 | +14.75° | 1 | 0 | 0 | 0 | 0 | 1 | 1 | 1 |
| +148.5 | +14.85° | 0 | 0 | 0 | 0 | 1 | 1 | 1 | 1 |
| +149.5 | +14.95° | 0 | 0 | 0 | 1 | 1 | 1 | 1 | 0 |
| +150.5 | +15.05° | 0 | 0 | 1 | 1 | 1 | 1 | 0 | 0 |
| +151.5 | +15.15° | 0 | 1 | 1 | 1 | 1 | 0 | 0 | 0 |
| +152.5 | +15.25° | 1 | 1 | 1 | 1 | 0 | 0 | 0 | 0 |
| +153.5 | +15.35° | 1 | 1 | 1 | 0 | 0 | 0 | 0 | 1 |
| +154.5 | +15.45° | 1 | 1 | 0 | 0 | 0 | 0 | 1 | 1 |
| +155.5 | +15.55° | 1 | 0 | 0 | 0 | 0 | 1 | 1 | 1 |
| +156.5 | +15.65° | 0 | 0 | 0 | 0 | 1 | 1 | 1 | 1 |
| +157.5 | +15.75° | 0 | 0 | 0 | 1 | 1 | 1 | 1 | 0 |
| +158.5 | +15.85° | 0 | 0 | 1 | 1 | 1 | 1 | 0 | 0 |
| +159.5 | +15.95° | 0 | 1 | 1 | 1 | 1 | 0 | 0 | 0 |
| +160.5 | +16.05° | 1 | 1 | 1 | 1 | 0 | 0 | 0 | 0 |
| +161.5 | +16.15° | 1 | 1 | 1 | 0 | 0 | 0 | 0 | 1 |
| +162.5 | +16.25° | 1 | 1 | 0 | 0 | 0 | 0 | 1 | 1 |
| +163.5 | +16.35° | 1 | 0 | 0 | 0 | 0 | 1 | 1 | 1 |
| +164.5 | +16.45° | 0 | 0 | 0 | 0 | 1 | 1 | 1 | 1 |
| +165.5 | +16.55° | 0 | 0 | 0 | 1 | 1 | 1 | 1 | 0 |
| +166.5 | +16.65° | 0 | 0 | 1 | 1 | 1 | 1 | 0 | 0 |
| +167.5 | +16.75° | 0 | 1 | 1 | 1 | 1 | 0 | 0 | 0 |
| +168.5 | +16.85° | 0 | 1 | 1 | 1 | 0 | 0 | 0 | 0 |
| +169.5 | +16.95° | 1 | 1 | 1 | 0 | 0 | 0 | 0 | 1 |
| +170.5 | +17.05° | 1 | 1 | 0 | 0 | 0 | 0 | 1 | 1 |
| +171.5 | +17.15° | 1 | 1 | 0 | 0 | 0 | 1 | 1 | 1 |
| +172.5 | +17.25° | 1 | 0 | 0 | 0 | 1 | 1 | 1 | 1 |
| +173.5 | +17.35° | 0 | 0 | 0 | 1 | 1 | 1 | 1 | 0 |
| +174.5 | +17.45° | 0 | 0 | 0 | 1 | 1 | 1 | 0 | 0 |
| +175.5 | +17.55° | 0 | 0 | 1 | 1 | 1 | 0 | 0 | 0 |
| +176.5 | +17.65° | 0 | 1 | 1 | 1 | 0 | 0 | 0 | 0 |
| +177.5 | +17.75° | 1 | 1 | 1 | 0 | 0 | 0 | 0 | 1 |
| +178.5 | +17.85° | 1 | 1 | 1 | 0 | 0 | 0 | 1 | 1 |
| +179.5 | +17.95° | 1 | 1 | 0 | 0 | 0 | 1 | 1 | 1 |
| +180.5 | +18.05° | 1 | 0 | 0 | 0 | 1 | 1 | 1 | 1 |
| +181.5 | +18.15° | 0 | 0 | 0 | 0 | 1 | 1 | 1 | 0 |
| +182.5 | +18.25° | 0 | 0 | 0 | 1 | 1 | 1 | 0 | 0 |
| +183.5 | +18.35° | 0 | 0 | 1 | 1 | 1 | 0 | 0 | 0 |
| +184.5 | +18.45° | 0 | 1 | 1 | 1 | 0 | 0 | 0 | 0 |
| +185.5 | +18.55° | 0 | 1 | 1 | 1 | 0 | 0 | 0 | 1 |
| +186.5 | +18.65° | 1 | 1 | 1 | 0 | 0 | 0 | 1 | 1 |
| +187.5 | +18.75° | 1 | 1 | 0 | 0 | 0 | 1 | 1 | 1 |
| +188.5 | +18.85° | 1 | 0 | 0 | 0 | 1 | 1 | 1 | 1 |
| +189.5 | +18.95° | 1 | 0 | 0 | 1 | 1 | 1 | 1 | 0 |
| +190.5 | +19.05° | 0 | 0 | 0 | 1 | 1 | 1 | 0 | 0 |
| +191.5 | +19.15° | 0 | 0 | 1 | 1 | 1 | 0 | 0 | 0 |
| +192.5 | +19.25° | 0 | 1 | 1 | 1 | 1 | 0 | 0 | 0 |
| +193.5 | +19.35° | 0 | 1 | 1 | 1 | 0 | 0 | 0 | 1 |
| +194.5 | +19.45° | 1 | 1 | 1 | 0 | 0 | 0 | 1 | 1 |
| +195.5 | +19.55° | 1 | 1 | 0 | 0 | 0 | 1 | 1 | 1 |
| +196.5 | +19.65° | 1 | 1 | 0 | 0 | 0 | 1 | 1 | 1 |
| +197.5 | +19.75° | 1 | 0 | 0 | 0 | 1 | 1 | 1 | 0 |
| +198.5 | +19.85° | 0 | 0 | 0 | 1 | 1 | 1 | 0 | 0 |
| +199.5 | +19.95° | 0 | 0 | 0 | 1 | 1 | 0 | 0 | 0 |
| +200.5 | +20.05° | 0 | 0 | 1 | 1 | 1 | 0 | 0 | 0 |
| +201.5 | +20.15° | 0 | 1 | 1 | 1 | 0 | 0 | 0 | 1 |
| +202.5 | +20.25° | 1 | 1 | 1 | 0 | 0 | 0 | 1 | 1 |
| +203.5 | +20.35° | 1 | 1 | 1 | 0 | 0 | 1 | 1 | 1 |
| +204.5 | +20.45° | 1 | 1 | 0 | 0 | 0 | 1 | 1 | 1 |

-continued

| | | | | | | | | | |
|---|---|---|---|---|---|---|---|---|---|
| +205.5 | +20.55° | 1 | 0 | 0 | 0 | 1 | 1 | 1 | 0 |
| +206.5 | +20.65° | 1 | 0 | 0 | 1 | 1 | 1 | 0 | 0 |
| +207.5 | +20.75° | 0 | 0 | 0 | 1 | 1 | 1 | 0 | 0 |
| +208.5 | +20.85° | 0 | 0 | 1 | 1 | 1 | 0 | 0 | 0 |
| +209.5 | +20.95° | 0 | 1 | 1 | 1 | 0 | 0 | 0 | 1 |
| +210.5 | +21.05° | 0 | 1 | 1 | 0 | 0 | 0 | 1 | 1 |
| +211.5 | +21.15° | 1 | 1 | 1 | 0 | 0 | 0 | 1 | 1 |
| +212.5 | +21.25° | 1 | 1 | 0 | 0 | 0 | 1 | 1 | 1 |
| +213.5 | +21.35° | 1 | 0 | 0 | 0 | 1 | 1 | 1 | 0 |
| +214.5 | +21.45° | 1 | 0 | 0 | 0 | 1 | 1 | 0 | 0 |
| +215.5 | +21.55° | 0 | 0 | 0 | 1 | 1 | 1 | 0 | 0 |
| +216.5 | +21.65° | 0 | 0 | 1 | 1 | 1 | 0 | 0 | 0 |
| +217.5 | +21.75° | 0 | 0 | 1 | 1 | 0 | 0 | 0 | 1 |
| +218.5 | +21.85° | 0 | 1 | 1 | 1 | 0 | 0 | 1 | 1 |
| +219.5 | +21.95° | 1 | 1 | 1 | 0 | 0 | 0 | 1 | 1 |
| +220.5 | +22.05° | 1 | 1 | 0 | 0 | 0 | 1 | 1 | 1 |
| +221.5 | +22.15° | 1 | 1 | 0 | 0 | 1 | 1 | 1 | 0 |
| +222.5 | +22.25° | 1 | 0 | 0 | 0 | 1 | 1 | 0 | 0 |
| +223.5 | +22.35° | 0 | 0 | 0 | 1 | 1 | 1 | 0 | 0 |
| +224.5 | +22.45° | 0 | 0 | 1 | 1 | 1 | 0 | 0 | 0 |
| +225.5 | +22.55° | 0 | 0 | 1 | 1 | 0 | 0 | 0 | 1 |
| +226.5 | +22.65° | 0 | 1 | 1 | 1 | 0 | 0 | 1 | 1 |
| +227.5 | +22.75° | 0 | 1 | 1 | 0 | 0 | 0 | 1 | 1 |
| +228.5 | +22.85° | 1 | 1 | 1 | 0 | 0 | 1 | 1 | 1 |
| +229.5 | +22.95° | 1 | 1 | 0 | 0 | 1 | 1 | 1 | 0 |
| +230.5 | +23.05° | 1 | 0 | 0 | 0 | 1 | 1 | 0 | 0 |
| +231.5 | +23.15° | 1 | 0 | 0 | 1 | 1 | 1 | 0 | 0 |
| +232.5 | +23.25° | 0 | 0 | 0 | 1 | 1 | 0 | 0 | 0 |
| +233.5 | +23.35° | 0 | 0 | 1 | 1 | 1 | 0 | 0 | 1 |
| +234.5 | +23.45° | 0 | 1 | 1 | 1 | 0 | 0 | 1 | 1 |
| +235.5 | +23.55° | 0 | 1 | 1 | 0 | 0 | 0 | 1 | 1 |
| +236.5 | +23.65° | 1 | 1 | 1 | 0 | 0 | 1 | 1 | 1 |
| +237.5 | +23.75° | 1 | 1 | 0 | 0 | 0 | 1 | 1 | 0 |
| +238.5 | +23.85° | 1 | 1 | 0 | 0 | 1 | 1 | 0 | 0 |
| +239.5 | +23.95° | 1 | 0 | 0 | 1 | 1 | 1 | 0 | 0 |
| +240.5 | +24.05° | 0 | 0 | 0 | 1 | 1 | 0 | 0 | 0 |
| +241.5 | +24.15° | 0 | 0 | 1 | 1 | 1 | 0 | 0 | 1 |
| +242.5 | +24.25° | 0 | 0 | 1 | 1 | 0 | 0 | 1 | 1 |
| +243.5 | +24.35° | 0 | 1 | 1 | 0 | 0 | 0 | 1 | 1 |
| +244.5 | +24.45° | 1 | 1 | 1 | 0 | 0 | 1 | 1 | 1 |
| +245.5 | +24.55° | 1 | 1 | 0 | 0 | 0 | 1 | 1 | 0 |
| +246.5 | +24.65° | 1 | 1 | 0 | 0 | 1 | 1 | 1 | 0 |
| +247.5 | +24.75° | 1 | 0 | 0 | 0 | 1 | 1 | 0 | 0 |
| +248.5 | +24.85° | 1 | 0 | 0 | 1 | 1 | 0 | 0 | 0 |
| +249.5 | +24.95° | 0 | 0 | 1 | 1 | 1 | 0 | 0 | 1 |
| +250.5 | +25.05° | 0 | 0 | 1 | 1 | 0 | 0 | 0 | 1 |
| +251.5 | +25.15° | 0 | 1 | 1 | 1 | 0 | 0 | 1 | 1 |
| +252.5 | +25.25° | 0 | 1 | 1 | 0 | 0 | 1 | 1 | 1 |
| +253.5 | +25.35° | 1 | 1 | 0 | 0 | 0 | 1 | 1 | 0 |
| +254.5 | +25.45° | 1 | 1 | 0 | 0 | 1 | 1 | 1 | 0 |
| +255.5 | +25.55° | 1 | 0 | 0 | 0 | 1 | 1 | 0 | 0 |
| +256.5 | +25.65° | 1 | 0 | 0 | 1 | 1 | 0 | 0 | 0 |
| +257.5 | +25.75° | 0 | 0 | 0 | 1 | 1 | 0 | 0 | 1 |
| +258.5 | +25.85° | 0 | 0 | 1 | 1 | 0 | 0 | 0 | 1 |
| +259.5 | +25.95° | 0 | 1 | 1 | 1 | 0 | 0 | 1 | 1 |
| +260.5 | +26.05° | 0 | 1 | 1 | 0 | 0 | 1 | 1 | 1 |
| +261.5 | +26.15° | 1 | 1 | 1 | 0 | 0 | 1 | 1 | 0 |
| +262.5 | +26.25° | 1 | 1 | 0 | 0 | 1 | 1 | 1 | 0 |
| +263.5 | +26.35° | 1 | 1 | 0 | 0 | 1 | 1 | 0 | 0 |
| +264.5 | +26.45° | 1 | 0 | 0 | 1 | 1 | 0 | 0 | 0 |
| +265.5 | +26.55° | 0 | 0 | 0 | 1 | 1 | 0 | 0 | 1 |
| +266.5 | +26.65° | 0 | 0 | 1 | 1 | 0 | 0 | 0 | 1 |
| +267.5 | +26.75° | 0 | 0 | 1 | 1 | 0 | 0 | 1 | 1 |
| +268.5 | +26.85° | 0 | 1 | 1 | 0 | 0 | 0 | 1 | 1 |
| +269.5 | +26.95° | 0 | 1 | 1 | 0 | 0 | 1 | 1 | 0 |
| +270.5 | +27.05° | 1 | 1 | 0 | 0 | 1 | 1 | 1 | 0 |
| +271.5 | +27.15° | 1 | 1 | 0 | 0 | 1 | 1 | 0 | 0 |
| +272.5 | +27.25° | 1 | 0 | 0 | 1 | 1 | 1 | 0 | 0 |
| +273.5 | +27.35° | 1 | 0 | 0 | 1 | 1 | 0 | 0 | 1 |
| +274.5 | +27.45° | 0 | 0 | 1 | 1 | 0 | 0 | 0 | 1 |
| +275.5 | +27.55° | 0 | 0 | 1 | 1 | 0 | 0 | 1 | 1 |
| +276.5 | +27.65° | 0 | 1 | 1 | 0 | 0 | 0 | 1 | 1 |
| +277.5 | +27.75° | 0 | 1 | 1 | 0 | 0 | 1 | 1 | 0 |
| +278.5 | +27.85° | 1 | 1 | 0 | 0 | 0 | 1 | 1 | 0 |
| +279.5 | +27.95° | 1 | 1 | 0 | 0 | 1 | 1 | 0 | 0 |
| +280.5 | +28.05° | 1 | 0 | 0 | 1 | 1 | 1 | 0 | 0 |
| +281.5 | +28.15° | 1 | 0 | 0 | 1 | 1 | 0 | 0 | 1 |
| +282.5 | +28.25° | 0 | 0 | 1 | 1 | 1 | 0 | 0 | 1 |
| +283.5 | +28.35° | 0 | 0 | 1 | 1 | 0 | 0 | 1 | 1 |

-continued

| | | | | | | | | | |
|---|---|---|---|---|---|---|---|---|---|
| +284.5 | +28.45° | 0 | 1 | 1 | 1 | 0 | 0 | 1 | 1 |
| +285.5 | +28.55° | 0 | 1 | 1 | 0 | 0 | 1 | 1 | 0 |
| +286.5 | +28.65° | 1 | 1 | 1 | 0 | 0 | 1 | 1 | 0 |
| +287.5 | +28.75° | 1 | 1 | 0 | 0 | 1 | 1 | 0 | 0 |
| +288.5 | +28.85° | 1 | 1 | 0 | 0 | 1 | 1 | 0 | 0 |
| +289.5 | +28.95° | 1 | 0 | 0 | 1 | 1 | 0 | 0 | 1 |
| +290.5 | +29.05° | 1 | 0 | 0 | 1 | 1 | 0 | 0 | 1 |
| +291.5 | +29.15° | 0 | 0 | 1 | 1 | 0 | 0 | 1 | 1 |
| +292.5 | +29.25° | 0 | 0 | 1 | 1 | 0 | 0 | 1 | 1 |
| +293.5 | +29.35° | 0 | 1 | 1 | 0 | 0 | 1 | 1 | 0 |
| +294.5 | +29.45° | 0 | 1 | 1 | 0 | 0 | 1 | 1 | 0 |
| +295.5 | +29.55° | 1 | 1 | 0 | 0 | 1 | 1 | 0 | 0 |
| +296.5 | +29.65° | 1 | 1 | 0 | 0 | 1 | 1 | 0 | 0 |
| +297.5 | +29.75° | 1 | 0 | 0 | 1 | 1 | 0 | 0 | 1 |
| +298.5 | +29.85° | 1 | 0 | 0 | 1 | 1 | 0 | 0 | 1 |
| +299.5 | +29.95° | 0 | 0 | 1 | 1 | 0 | 0 | 1 | 1 |
| +300.5 | +30.05° | 0 | 0 | 1 | 1 | 0 | 0 | 1 | 1 |
| +301.5 | +30.15° | 0 | 1 | 1 | 0 | 0 | 1 | 1 | 0 |
| +302.5 | +30.25° | 0 | 1 | 1 | 0 | 0 | 1 | 1 | 0 |
| +303.5 | +30.35° | 1 | 1 | 0 | 0 | 1 | 1 | 0 | 0 |
| +304.5 | +30.45° | 1 | 1 | 0 | 0 | 1 | 1 | 0 | 0 |
| +305.5 | +30.55° | 1 | 0 | 0 | 1 | 1 | 0 | 0 | 1 |
| +306.5 | +30.65° | 1 | 0 | 0 | 1 | 1 | 0 | 0 | 1 |
| +307.5 | +30.75° | 0 | 0 | 1 | 1 | 0 | 0 | 1 | 1 |
| +308.5 | +30.85° | 0 | 0 | 1 | 1 | 0 | 0 | 1 | 1 |
| +309.5 | +30.95° | 0 | 1 | 1 | 0 | 0 | 1 | 1 | 0 |
| +310.5 | +31.05° | 0 | 1 | 1 | 0 | 0 | 1 | 1 | 0 |
| +311.5 | +31.15° | 0 | 1 | 0 | 0 | 1 | 1 | 0 | 0 |
| +312.5 | +31.25° | 1 | 1 | 0 | 0 | 1 | 1 | 0 | 0 |
| +313.5 | +31.35° | 1 | 1 | 0 | 1 | 1 | 0 | 0 | 1 |
| +314.5 | +31.45° | 1 | 0 | 0 | 1 | 1 | 0 | 0 | 1 |
| +315.5 | +31.55° | 1 | 0 | 0 | 1 | 0 | 0 | 1 | 1 |
| +316.5 | +31.65° | 0 | 0 | 1 | 1 | 0 | 0 | 1 | 1 |
| +317.5 | +31.75° | 0 | 0 | 1 | 0 | 0 | 1 | 1 | 0 |
| +318.5 | +31.85° | 0 | 1 | 1 | 0 | 0 | 1 | 1 | 0 |
| +319.5 | +31.95° | 0 | 1 | 1 | 0 | 1 | 1 | 0 | 0 |
| +320.5 | +32.05° | 1 | 1 | 0 | 0 | 1 | 1 | 0 | 0 |
| +321.5 | +32.15° | 1 | 1 | 0 | 0 | 1 | 0 | 0 | 1 |
| +322.5 | +32.25° | 1 | 0 | 0 | 1 | 1 | 0 | 0 | 1 |
| +323.5 | +32.35° | 1 | 0 | 0 | 1 | 0 | 0 | 1 | 1 |
| +324.5 | +32.45° | 0 | 0 | 1 | 1 | 0 | 0 | 1 | 1 |
| +325.5 | +32.55° | 0 | 0 | 1 | 1 | 0 | 1 | 1 | 0 |
| +326.5 | +32.65° | 0 | 1 | 1 | 0 | 0 | 1 | 1 | 0 |
| +327.5 | +32.75° | 0 | 1 | 1 | 0 | 0 | 1 | 0 | 0 |
| +328.5 | +32.85° | 1 | 1 | 0 | 0 | 1 | 1 | 0 | 0 |
| +329.5 | +32.95° | 1 | 1 | 0 | 0 | 1 | 0 | 0 | 1 |
| +330.5 | +33.05° | 1 | 0 | 0 | 1 | 1 | 0 | 0 | 1 |
| +331.5 | +33.15° | 1 | 0 | 0 | 1 | 1 | 0 | 1 | 1 |
| +332.5 | +33.25° | 0 | 0 | 1 | 1 | 0 | 0 | 1 | 1 |
| +333.5 | +33.35° | 0 | 0 | 1 | 1 | 0 | 1 | 1 | 0 |
| +334.5 | +33.45° | 0 | 1 | 1 | 0 | 0 | 1 | 1 | 0 |
| +335.5 | +33.55° | 0 | 1 | 1 | 0 | 0 | 1 | 0 | 0 |
| +336.5 | +33.65° | 0 | 1 | 0 | 0 | 1 | 1 | 0 | 0 |
| +337.5 | +33.75° | 1 | 1 | 0 | 0 | 1 | 1 | 0 | 1 |
| +338.5 | +33.85° | 1 | 0 | 0 | 1 | 1 | 0 | 0 | 1 |
| +339.5 | +33.95° | 1 | 0 | 0 | 1 | 1 | 0 | 1 | 1 |
| +340.5 | +34.05° | 1 | 0 | 1 | 1 | 0 | 0 | 1 | 1 |
| +341.5 | +34.15° | 0 | 0 | 1 | 1 | 0 | 0 | 1 | 0 |
| +342.5 | +34.25° | 0 | 0 | 1 | 0 | 0 | 1 | 1 | 0 |
| +343.5 | +34.35° | 0 | 1 | 1 | 0 | 0 | 1 | 0 | 0 |
| +344.5 | +34.45° | 0 | 1 | 0 | 0 | 1 | 1 | 0 | 0 |
| +345.5 | +34.55° | 1 | 1 | 0 | 0 | 1 | 1 | 0 | 1 |
| +346.5 | +34.65° | 1 | 1 | 0 | 1 | 1 | 0 | 0 | 1 |
| +347.5 | +34.75° | 1 | 0 | 0 | 1 | 1 | 0 | 1 | 1 |
| +348.5 | +34.85° | 1 | 0 | 0 | 1 | 0 | 0 | 1 | 1 |
| +349.5 | +34.95° | 0 | 0 | 1 | 1 | 0 | 0 | 1 | 0 |
| +350.5 | +35.05° | 0 | 0 | 1 | 0 | 0 | 1 | 1 | 0 |
| +351.5 | +35.15° | 0 | 1 | 1 | 0 | 0 | 1 | 0 | 0 |
| +352.5 | +35.25° | 0 | 1 | 1 | 0 | 1 | 1 | 0 | 0 |
| +353.5 | +35.35° | 1 | 1 | 0 | 0 | 1 | 1 | 0 | 0 |
| +354.5 | +35.45° | 1 | 1 | 0 | 1 | 1 | 0 | 0 | 1 |
| +355.5 | +35.55° | 1 | 0 | 0 | 1 | 1 | 0 | 1 | 1 |
| +356.5 | +35.65° | 1 | 0 | 0 | 1 | 0 | 0 | 1 | 1 |
| +357.5 | +35.75° | 1 | 0 | 1 | 1 | 0 | 0 | 1 | 0 |
| +358.5 | +35.85° | 0 | 0 | 1 | 0 | 0 | 1 | 1 | 0 |
| +359.5 | +35.95° | 0 | 1 | 1 | 0 | 0 | 1 | 1 | 0 |
| +360.5 | +36.05° | 0 | 1 | 1 | 0 | 1 | 1 | 0 | 0 |
| +361.5 | +36.15° | 0 | 1 | 0 | 0 | 1 | 1 | 0 | 1 |
| +362.5 | +36.25° | 1 | 1 | 0 | 0 | 1 | 0 | 0 | 1 |

-continued

| | | | | | | | | | |
|---|---|---|---|---|---|---|---|---|---|
| +363.5 | +36.35° | 1 | 0 | 0 | 1 | 1 | 0 | 0 | 1 |
| +364.5 | +36.45° | 1 | 0 | 0 | 1 | 0 | 0 | 1 | 1 |
| +365.5 | +36.55° | 1 | 0 | 1 | 1 | 0 | 0 | 1 | 0 |
| +366.5 | +36.65° | 0 | 0 | 1 | 1 | 0 | 1 | 1 | 0 |
| +367.5 | +36.75° | 0 | 0 | 1 | 0 | 0 | 1 | 1 | 0 |
| +368.5 | +36.85° | 0 | 1 | 1 | 0 | 1 | 1 | 0 | 0 |
| +369.5 | +36.95° | 0 | 1 | 0 | 0 | 1 | 1 | 0 | 1 |
| +370.5 | +37.05° | 1 | 1 | 0 | 0 | 1 | 0 | 0 | 1 |
| +371.5 | +37.15° | 1 | 1 | 0 | 1 | 1 | 0 | 0 | 1 |
| +372.5 | +37.25° | 1 | 0 | 0 | 1 | 0 | 0 | 1 | 1 |
| +373.5 | +37.35° | 1 | 0 | 1 | 1 | 0 | 0 | 1 | 0 |
| +374.5 | +37.45° | 0 | 0 | 1 | 1 | 0 | 1 | 1 | 0 |
| +375.5 | +37.55° | 0 | 0 | 1 | 0 | 0 | 1 | 1 | 0 |
| +376.5 | +37.65° | 0 | 1 | 1 | 0 | 0 | 1 | 0 | 0 |
| +377.5 | +37.75° | 0 | 1 | 0 | 0 | 1 | 1 | 0 | 1 |
| +378.5 | +37.85° | 1 | 1 | 0 | 0 | 1 | 0 | 0 | 1 |
| +379.5 | +37.95° | 1 | 1 | 0 | 1 | 1 | 0 | 0 | 1 |
| +380.5 | +38.05° | 1 | 0 | 0 | 1 | 1 | 0 | 1 | 1 |
| +381.5 | +38.15° | 1 | 0 | 0 | 1 | 0 | 0 | 1 | 0 |
| +382.5 | +38.25° | 1 | 0 | 1 | 1 | 0 | 1 | 1 | 0 |
| +383.5 | +38.35° | 0 | 0 | 1 | 0 | 0 | 1 | 1 | 0 |
| +384.5 | +38.45° | 0 | 1 | 1 | 0 | 0 | 1 | 0 | 0 |
| +385.5 | +38.55° | 0 | 1 | 1 | 0 | 1 | 1 | 0 | 1 |
| +386.5 | +38.65° | 0 | 1 | 0 | 0 | 1 | 0 | 0 | 1 |
| +387.5 | +38.75° | 1 | 1 | 0 | 1 | 1 | 0 | 0 | 1 |
| +388.5 | +38.85° | 1 | 0 | 0 | 1 | 1 | 0 | 1 | 1 |
| +389.5 | +38.95° | 1 | 0 | 0 | 1 | 0 | 0 | 1 | 0 |
| +390.5 | +39.05° | 1 | 0 | 1 | 1 | 0 | 1 | 1 | 0 |
| +391.5 | +39.15° | 0 | 0 | 1 | 0 | 0 | 1 | 1 | 0 |
| +392.5 | +39.25° | 0 | 1 | 1 | 0 | 0 | 1 | 0 | 0 |
| +393.5 | +39.35° | 0 | 1 | 1 | 0 | 1 | 1 | 0 | 1 |
| +394.5 | +39.45° | 0 | 1 | 0 | 0 | 1 | 0 | 0 | 1 |
| +395.5 | +39.55° | 1 | 1 | 0 | 1 | 1 | 0 | 0 | 1 |
| +396.5 | +39.65° | 1 | 1 | 0 | 1 | 1 | 0 | 1 | 1 |
| +397.5 | +39.75° | 1 | 0 | 0 | 1 | 0 | 0 | 1 | 0 |
| +398.5 | +39.85° | 1 | 0 | 1 | 1 | 0 | 1 | 1 | 0 |
| +399.5 | +39.95° | 0 | 0 | 1 | 1 | 0 | 1 | 1 | 0 |
| +400.5 | +40.05° | 0 | 0 | 1 | 0 | 0 | 1 | 0 | 0 |
| +401.5 | +40.15° | 0 | 1 | 1 | 0 | 1 | 1 | 0 | 1 |
| +402.5 | +40.25° | 0 | 1 | 0 | 0 | 1 | 0 | 0 | 1 |
| +403.5 | +40.35° | 1 | 1 | 0 | 0 | 1 | 0 | 0 | 1 |
| +404.5 | +40.45° | 1 | 1 | 0 | 1 | 1 | 0 | 1 | 1 |
| +405.5 | +40.55° | 1 | 0 | 0 | 1 | 0 | 0 | 1 | 0 |
| +406.5 | +40.65° | 1 | 0 | 1 | 1 | 0 | 0 | 1 | 0 |
| +407.5 | +40.75° | 1 | 0 | 1 | 1 | 0 | 1 | 1 | 0 |
| +408.5 | +40.85° | 0 | 0 | 1 | 0 | 0 | 1 | 0 | 0 |
| +409.5 | +40.95° | 0 | 1 | 1 | 0 | 1 | 1 | 0 | 1 |
| +410.5 | +41.05° | 0 | 1 | 0 | 0 | 1 | 1 | 0 | 1 |
| +411.5 | +41.15° | 0 | 1 | 0 | 0 | 1 | 0 | 0 | 1 |
| +412.5 | +41.25° | 1 | 1 | 0 | 1 | 1 | 0 | 1 | 1 |
| +413.5 | +41.35° | 1 | 0 | 0 | 1 | 0 | 0 | 1 | 0 |
| +414.5 | +41.45° | 1 | 0 | 0 | 1 | 0 | 0 | 1 | 0 |
| +415.5 | +41.55° | 1 | 0 | 1 | 1 | 0 | 1 | 1 | 0 |
| +416.5 | +41.65° | 0 | 0 | 1 | 0 | 0 | 1 | 0 | 0 |
| +417.5 | +41.75° | 0 | 1 | 1 | 0 | 1 | 1 | 0 | 1 |
| +418.5 | +41.85° | 0 | 1 | 1 | 0 | 1 | 1 | 0 | 1 |
| +419.5 | +41.95° | 0 | 1 | 0 | 0 | 1 | 0 | 0 | 1 |
| +420.5 | +42.05° | 1 | 1 | 0 | 1 | 1 | 0 | 1 | 1 |
| +421.5 | +42.15° | 1 | 0 | 0 | 1 | 0 | 0 | 1 | 0 |
| +422.5 | +42.25° | 1 | 0 | 0 | 1 | 0 | 0 | 1 | 0 |
| +423.5 | +42.35° | 1 | 0 | 1 | 1 | 0 | 1 | 1 | 0 |
| +424.5 | +42.45° | 0 | 0 | 1 | 0 | 0 | 1 | 0 | 0 |
| +425.5 | +42.55° | 0 | 0 | 1 | 0 | 1 | 1 | 0 | 1 |
| +426.5 | +42.65° | 0 | 1 | 1 | 0 | 1 | 1 | 0 | 1 |
| +427.5 | +42.75° | 0 | 1 | 0 | 0 | 1 | 0 | 0 | 1 |
| +428.5 | +42.85° | 1 | 1 | 0 | 1 | 1 | 0 | 1 | 1 |
| +429.5 | +42.95° | 1 | 1 | 0 | 1 | 1 | 0 | 1 | 0 |
| +430.5 | +43.05° | 1 | 0 | 0 | 1 | 0 | 0 | 1 | 0 |
| +431.5 | +43.15° | 1 | 0 | 1 | 1 | 0 | 1 | 1 | 0 |
| +432.5 | +43.25° | 1 | 0 | 1 | 0 | 0 | 1 | 0 | 0 |
| +433.5 | +43.35° | 0 | 0 | 1 | 0 | 0 | 1 | 0 | 1 |
| +434.5 | +43.45° | 0 | 1 | 1 | 0 | 1 | 1 | 0 | 1 |
| +435.5 | +43.55° | 0 | 1 | 0 | 0 | 1 | 0 | 0 | 1 |
| +436.5 | +43.65° | 0 | 1 | 0 | 1 | 1 | 0 | 1 | 1 |
| +437.5 | +43.75° | 1 | 1 | 0 | 1 | 1 | 0 | 1 | 0 |
| +438.5 | +43.85° | 1 | 0 | 0 | 1 | 0 | 0 | 1 | 0 |
| +439.5 | +43.95° | 1 | 0 | 1 | 1 | 0 | 1 | 1 | 0 |
| +440.5 | +44.05° | 1 | 0 | 1 | 1 | 0 | 1 | 0 | 0 |
| +441.5 | +44.15° | 0 | 0 | 1 | 0 | 0 | 1 | 0 | 1 |

-continued

| | | | | | | | | | |
|---|---|---|---|---|---|---|---|---|---|
| +442.5 | +44.25° | 0 | 1 | 1 | 0 | 1 | 1 | 0 | 1 |
| +443.5 | +44.35° | 0 | 1 | 0 | 0 | 1 | 0 | 0 | 1 |
| +444.5 | +44.45° | 0 | 1 | 0 | 0 | 1 | 0 | 1 | 1 |
| +445.5 | +44.55° | 1 | 1 | 0 | 1 | 1 | 0 | 1 | 0 |
| +446.5 | +44.65° | 1 | 0 | 0 | 1 | 0 | 0 | 1 | 0 |
| +447.5 | +44.75° | 1 | 0 | 1 | 1 | 0 | 1 | 1 | 0 |
| +448.5 | +44.85° | 1 | 0 | 1 | 1 | 0 | 1 | 0 | 0 |
| +449.5 | +44.95° | 0 | 0 | 1 | 0 | 0 | 1 | 0 | 1 |
| +450.5 | +45.05° | 0 | 1 | 1 | 0 | 1 | 1 | 0 | 1 |
| +451.5 | +45.15° | 0 | 1 | 1 | 0 | 1 | 0 | 0 | 1 |
| +452.5 | +45.25° | 0 | 1 | 0 | 0 | 1 | 0 | 1 | 1 |
| +453.5 | +45.35° | 1 | 1 | 0 | 1 | 1 | 0 | 1 | 0 |
| +454.5 | +45.45° | 1 | 1 | 0 | 1 | 0 | 0 | 1 | 0 |
| +455.5 | +45.55° | 1 | 0 | 0 | 1 | 0 | 1 | 1 | 0 |
| +456.5 | +45.65° | 1 | 0 | 1 | 1 | 0 | 1 | 0 | 0 |
| +457.5 | +45.75° | 0 | 0 | 1 | 0 | 0 | 1 | 0 | 1 |
| +458.5 | +45.85° | 0 | 0 | 1 | 0 | 1 | 1 | 0 | 1 |
| +459.5 | +45.95° | 0 | 1 | 1 | 0 | 1 | 0 | 0 | 1 |
| +460.5 | +46.05° | 0 | 1 | 0 | 0 | 1 | 0 | 1 | 1 |
| +461.5 | +46.15° | 0 | 1 | 0 | 1 | 1 | 0 | 1 | 0 |
| +462.5 | +46.25° | 1 | 1 | 0 | 1 | 0 | 0 | 1 | 0 |
| +463.5 | +46.35° | 1 | 0 | 0 | 1 | 0 | 1 | 1 | 0 |
| +464.5 | +46.45° | 1 | 0 | 1 | 1 | 0 | 1 | 0 | 0 |
| +465.5 | +46.55° | 1 | 0 | 1 | 0 | 0 | 1 | 0 | 1 |
| +466.5 | +46.65° | 0 | 0 | 1 | 0 | 1 | 1 | 0 | 1 |
| +467.5 | +46.75° | 0 | 1 | 1 | 0 | 1 | 0 | 0 | 1 |
| +468.5 | +46.85° | 0 | 1 | 0 | 0 | 1 | 0 | 1 | 1 |
| +469.5 | +46.95° | 0 | 1 | 0 | 1 | 1 | 0 | 1 | 0 |
| +470.5 | +47.05° | 1 | 1 | 0 | 1 | 0 | 0 | 1 | 0 |
| +471.5 | +47.15° | 1 | 0 | 0 | 1 | 0 | 1 | 1 | 0 |
| +472.5 | +47.25° | 1 | 0 | 1 | 1 | 0 | 1 | 0 | 0 |
| +473.5 | +47.35° | 1 | 0 | 1 | 0 | 0 | 1 | 0 | 1 |
| +474.5 | +47.45° | 0 | 0 | 1 | 0 | 1 | 1 | 0 | 1 |
| +475.5 | +47.55° | 0 | 1 | 1 | 0 | 1 | 0 | 0 | 1 |
| +476.5 | +47.65° | 0 | 1 | 0 | 0 | 1 | 0 | 1 | 1 |
| +477.5 | +47.75° | 0 | 1 | 0 | 1 | 1 | 0 | 1 | 0 |
| +478.5 | +47.85° | 1 | 1 | 0 | 1 | 0 | 0 | 1 | 0 |
| +479.5 | +47.95° | 1 | 0 | 0 | 1 | 0 | 1 | 1 | 0 |
| +480.5 | +48.05° | 1 | 0 | 1 | 1 | 0 | 1 | 0 | 0 |
| +481.5 | +48.15° | 1 | 0 | 1 | 0 | 0 | 1 | 0 | 1 |
| +482.5 | +48.25° | 0 | 0 | 1 | 0 | 1 | 1 | 0 | 1 |
| +483.5 | +48.35° | 0 | 1 | 1 | 0 | 1 | 0 | 0 | 1 |
| +484.5 | +48.45° | 0 | 1 | 0 | 0 | 1 | 0 | 1 | 1 |
| +485.5 | +48.55° | 0 | 1 | 0 | 1 | 1 | 0 | 1 | 0 |
| +486.5 | +48.65° | 0 | 1 | 0 | 1 | 1 | 0 | 1 | 0 |
| +487.5 | +48.75° | 1 | 1 | 0 | 1 | 0 | 0 | 1 | 0 |
| +488.5 | +48.85° | 1 | 0 | 0 | 1 | 0 | 1 | 1 | 0 |
| +489.5 | +48.95° | 1 | 0 | 1 | 1 | 0 | 1 | 0 | 0 |
| +490.5 | +49.05° | 1 | 0 | 1 | 0 | 0 | 1 | 0 | 1 |
| +491.5 | +49.15° | 0 | 0 | 1 | 0 | 1 | 1 | 0 | 1 |
| +492.5 | +49.25° | 0 | 1 | 1 | 0 | 1 | 0 | 0 | 1 |
| +493.5 | +49.35° | 0 | 1 | 0 | 0 | 1 | 0 | 1 | 1 |
| +494.5 | +49.45° | 0 | 1 | 0 | 1 | 1 | 0 | 1 | 0 |
| +495.5 | +49.55° | 1 | 1 | 0 | 1 | 0 | 0 | 1 | 0 |
| +496.5 | +49.65° | 1 | 0 | 0 | 1 | 0 | 1 | 1 | 0 |
| +497.5 | +49.75° | 1 | 0 | 1 | 1 | 0 | 1 | 0 | 0 |
| +498.5 | +49.85° | 1 | 0 | 1 | 0 | 0 | 1 | 0 | 1 |
| +499.5 | +49.95° | 0 | 0 | 1 | 0 | 1 | 1 | 0 | 1 |
| +500.5 | +50.05° | 0 | 1 | 1 | 0 | 1 | 0 | 0 | 1 |
| +501.5 | +50.15° | 0 | 1 | 0 | 0 | 1 | 0 | 1 | 1 |
| +502.5 | +50.25° | 0 | 1 | 0 | 1 | 1 | 0 | 1 | 0 |
| +503.5 | +50.35° | 1 | 1 | 0 | 1 | 0 | 0 | 1 | 0 |
| +504.5 | +50.45° | 1 | 0 | 0 | 1 | 0 | 1 | 1 | 0 |
| +505.5 | +50.55° | 1 | 0 | 1 | 1 | 0 | 1 | 0 | 0 |
| +506.5 | +50.65° | 1 | 0 | 1 | 0 | 0 | 1 | 0 | 1 |
| +507.5 | +50.75° | 0 | 0 | 1 | 0 | 1 | 1 | 0 | 1 |
| +508.5 | +50.85° | 0 | 1 | 1 | 0 | 1 | 0 | 0 | 1 |
| +509.5 | +50.95° | 0 | 1 | 0 | 0 | 1 | 0 | 1 | 1 |
| +510.5 | +51.05° | 0 | 1 | 0 | 1 | 1 | 0 | 1 | 0 |
| +511.5 | +51.15° | 1 | 1 | 0 | 1 | 0 | 0 | 1 | 0 |
| +512.5 | +51.25° | 1 | 0 | 0 | 1 | 0 | 1 | 1 | 0 |
| +513.5 | +51.35° | 1 | 0 | 1 | 1 | 0 | 1 | 0 | 0 |
| +514.5 | +51.45° | 1 | 0 | 1 | 0 | 0 | 1 | 0 | 1 |
| +515.5 | +51.55° | 0 | 0 | 1 | 0 | 1 | 1 | 0 | 1 |
| +516.5 | +51.65° | 0 | 1 | 1 | 0 | 1 | 0 | 0 | 1 |
| +517.5 | +51.75° | 0 | 1 | 0 | 0 | 1 | 0 | 1 | 1 |
| +518.5 | +51.85° | 0 | 1 | 0 | 1 | 1 | 0 | 1 | 0 |
| +519.5 | +51.95° | 0 | 1 | 0 | 1 | 0 | 0 | 1 | 0 |
| +520.5 | +52.05° | 1 | 1 | 0 | 1 | 0 | 1 | 1 | 0 |

-continued

| | | | | | | | | |
|---|---|---|---|---|---|---|---|---|
| +521.5 | +52.15° | 1 | 0 | 1 | 1 | 0 | 1 | 0 | 0 |
| +522.5 | +52.25° | 1 | 0 | 1 | 0 | 0 | 1 | 0 | 1 |
| +523.5 | +52.35° | 1 | 0 | 1 | 0 | 1 | 1 | 0 | 1 |
| +524.5 | +52.45° | 0 | 0 | 1 | 0 | 1 | 0 | 0 | 1 |
| +525.5 | +52.55° | 0 | 1 | 0 | 0 | 1 | 0 | 1 | 1 |
| +526.5 | +52.65° | 0 | 1 | 0 | 1 | 1 | 0 | 1 | 0 |
| +527.5 | +52.75° | 0 | 1 | 0 | 1 | 0 | 0 | 1 | 0 |
| +528.5 | +52.85° | 1 | 1 | 0 | 1 | 0 | 1 | 1 | 0 |
| +529.5 | +52.95° | 1 | 0 | 0 | 1 | 0 | 1 | 0 | 0 |
| +530.5 | +53.05° | 1 | 0 | 1 | 0 | 0 | 1 | 0 | 1 |
| +531.5 | +53.15° | 1 | 0 | 1 | 0 | 1 | 1 | 0 | 1 |
| +532.5 | +53.25° | 0 | 0 | 1 | 0 | 1 | 0 | 0 | 1 |
| +533.5 | +53.35° | 0 | 1 | 1 | 0 | 1 | 0 | 1 | 1 |
| +534.5 | +53.45° | 0 | 1 | 0 | 1 | 1 | 0 | 1 | 0 |
| +535.5 | +53.55° | 0 | 1 | 0 | 1 | 0 | 0 | 1 | 0 |
| +536.5 | +53.65° | 1 | 1 | 0 | 1 | 0 | 1 | 1 | 0 |
| +537.5 | +53.75° | 1 | 0 | 0 | 1 | 0 | 1 | 0 | 0 |
| +538.5 | +53.85° | 1 | 0 | 1 | 1 | 0 | 1 | 0 | 1 |
| +539.5 | +53.95° | 1 | 0 | 1 | 0 | 1 | 1 | 0 | 1 |
| +540.5 | +54.05° | 0 | 0 | 1 | 0 | 1 | 0 | 0 | 1 |
| +541.5 | +54.15° | 0 | 1 | 1 | 0 | 1 | 0 | 1 | 1 |
| +542.5 | +54.25° | 0 | 1 | 0 | 0 | 1 | 0 | 1 | 0 |
| +543.5 | +54.35° | 0 | 1 | 0 | 1 | 0 | 0 | 1 | 0 |
| +544.5 | +54.45° | 1 | 1 | 0 | 1 | 0 | 1 | 1 | 0 |
| +545.5 | +54.55° | 1 | 0 | 0 | 1 | 0 | 1 | 0 | 0 |
| +546.5 | +54.65° | 1 | 0 | 1 | 1 | 0 | 1 | 0 | 1 |
| +547.5 | +54.75° | 1 | 0 | 1 | 0 | 1 | 1 | 0 | 1 |
| +548.5 | +54.85° | 1 | 0 | 1 | 0 | 1 | 0 | 0 | 1 |
| +549.5 | +54.95° | 0 | 1 | 1 | 0 | 1 | 0 | 1 | 1 |
| +550.5 | +55.05° | 0 | 1 | 0 | 0 | 1 | 0 | 1 | 0 |
| +551.5 | +55.15° | 0 | 1 | 0 | 1 | 0 | 0 | 1 | 0 |
| +552.5 | +55.25° | 0 | 1 | 0 | 1 | 0 | 1 | 1 | 0 |
| +553.5 | +55.35° | 0 | 0 | 0 | 1 | 0 | 1 | 0 | 0 |
| +554.5 | +55.45° | 1 | 0 | 1 | 1 | 0 | 1 | 0 | 1 |
| +555.5 | +55.55° | 1 | 0 | 1 | 0 | 0 | 1 | 0 | 1 |
| +556.5 | +55.65° | 1 | 0 | 1 | 0 | 1 | 0 | 0 | 1 |
| +557.5 | +55.75° | 1 | 1 | 1 | 0 | 1 | 0 | 1 | 1 |
| +558.5 | +55.85° | 0 | 1 | 0 | 0 | 1 | 0 | 1 | 0 |
| +559.5 | +55.95° | 0 | 1 | 0 | 1 | 1 | 0 | 1 | 0 |
| +560.5 | +56.05° | 0 | 1 | 0 | 1 | 0 | 1 | 1 | 0 |
| +561.5 | +56.15° | 1 | 1 | 0 | 1 | 0 | 1 | 0 | 0 |
| +562.5 | +56.25° | 1 | 0 | 1 | 1 | 0 | 1 | 0 | 1 |
| +563.5 | +56.35° | 1 | 0 | 1 | 0 | 0 | 1 | 0 | 1 |
| +564.5 | +56.45° | 1 | 0 | 1 | 0 | 1 | 0 | 0 | 1 |
| +565.5 | +56.55° | 0 | 0 | 1 | 0 | 1 | 0 | 1 | 1 |
| +566.5 | +56.65° | 0 | 1 | 0 | 0 | 1 | 0 | 1 | 0 |
| +567.5 | +56.75° | 0 | 1 | 0 | 1 | 1 | 0 | 1 | 0 |
| +568.5 | +56.85° | 0 | 1 | 0 | 1 | 0 | 1 | 1 | 0 |
| +569.5 | +56.95° | 1 | 1 | 0 | 1 | 0 | 1 | 0 | 0 |
| +570.5 | +57.05° | 1 | 0 | 1 | 1 | 0 | 1 | 0 | 1 |
| +571.5 | +57.15° | 1 | 0 | 1 | 0 | 0 | 1 | 0 | 1 |
| +572.5 | +57.25° | 1 | 0 | 1 | 0 | 1 | 0 | 0 | 1 |
| +573.5 | +57.35° | 0 | 0 | 1 | 0 | 1 | 0 | 1 | 1 |
| +574.5 | +57.45° | 0 | 1 | 1 | 0 | 1 | 0 | 1 | 0 |
| +575.5 | +57.55° | 0 | 1 | 0 | 1 | 1 | 0 | 1 | 0 |
| +576.5 | +57.65° | 0 | 1 | 0 | 1 | 0 | 1 | 1 | 0 |
| +577.5 | +57.75° | 1 | 1 | 0 | 1 | 0 | 1 | 0 | 0 |
| +578.5 | +57.85° | 1 | 0 | 0 | 1 | 0 | 1 | 0 | 1 |
| +579.5 | +57.95° | 1 | 0 | 1 | 0 | 0 | 1 | 0 | 1 |
| +580.5 | +58.05° | 1 | 0 | 1 | 0 | 1 | 0 | 0 | 1 |
| +581.5 | +58.15° | 0 | 0 | 1 | 0 | 1 | 0 | 1 | 1 |
| +582.5 | +58.25° | 0 | 1 | 1 | 0 | 1 | 0 | 1 | 0 |
| +583.5 | +58.35° | 0 | 1 | 0 | 1 | 1 | 0 | 1 | 0 |
| +584.5 | +58.45° | 0 | 1 | 0 | 1 | 0 | 0 | 1 | 0 |
| +585.5 | +58.55° | 0 | 1 | 0 | 1 | 0 | 1 | 0 | 0 |
| +586.5 | +58.65° | 1 | 0 | 0 | 0 | 0 | 1 | 0 | 1 |
| +587.5 | +58.75° | 1 | 0 | 1 | 0 | 0 | 1 | 0 | 1 |
| +588.5 | +58.85° | 1 | 0 | 1 | 0 | 1 | 1 | 0 | 1 |
| +589.5 | +58.95° | 1 | 0 | 1 | 0 | 1 | 0 | 1 | 1 |
| +590.5 | +59.05° | 0 | 1 | 1 | 0 | 1 | 0 | 1 | 0 |
| +591.5 | +59.15° | 0 | 1 | 0 | 1 | 1 | 0 | 1 | 0 |
| +592.5 | +59.25° | 0 | 1 | 0 | 1 | 0 | 0 | 1 | 0 |
| +593.5 | +59.35° | 0 | 1 | 0 | 1 | 0 | 1 | 0 | 0 |
| +594.5 | +59.45° | 1 | 0 | 0 | 1 | 0 | 1 | 0 | 1 |
| +595.5 | +59.55° | 1 | 0 | 1 | 0 | 0 | 1 | 0 | 1 |
| +596.5 | +59.65° | 1 | 0 | 1 | 0 | 1 | 1 | 0 | 1 |
| +597.5 | +59.75° | 1 | 0 | 1 | 0 | 1 | 0 | 1 | 1 |
| +598.5 | +59.85° | 0 | 1 | 1 | 0 | 1 | 0 | 1 | 0 |
| +599.5 | +59.95° | 0 | 1 | 0 | 0 | 1 | 0 | 1 | 0 |

-continued

| Samples | Steer Angle | $f_{LO+0.5}$ | $f_{LO+1.5}$ | $f_{LO+2.5}$ | $f_{LO+3.5}$ | $f_{LO+4.5}$ | $f_{LO+5.5}$ | $f_{LO+6.5}$ | $f_{LO+7.5}$ |
|---|---|---|---|---|---|---|---|---|---|
| −559.5 | −55.95° | 0 | 1 | 1 | 0 | 1 | 0 | 1 | 0 |
| −558.5 | −55.85° | 0 | 0 | 1 | 0 | 1 | 0 | 1 | 1 |
| −557.5 | −55.75° | 1 | 0 | 1 | 0 | 1 | 1 | 0 | 1 |
| −556.5 | −55.65° | 1 | 0 | 1 | 0 | 0 | 1 | 0 | 1 |
| −555.5 | −55.55° | 1 | 0 | 0 | 1 | 0 | 1 | 0 | 1 |
| −554.5 | −55.45° | 1 | 1 | 0 | 1 | 0 | 1 | 1 | 0 |
| −553.5 | −55.35° | 0 | 1 | 0 | 1 | 0 | 0 | 1 | 0 |
| −552.5 | −55.25° | 0 | 1 | 0 | 1 | 1 | 0 | 1 | 0 |
| −551.5 | −55.15° | 0 | 1 | 1 | 0 | 1 | 0 | 1 | 0 |
| −550.5 | −55.05° | 0 | 0 | 1 | 0 | 1 | 0 | 0 | 1 |
| −549.5 | −54.95° | 1 | 0 | 1 | 0 | 1 | 1 | 0 | 1 |
| −548.5 | −54.85° | 1 | 0 | 1 | 1 | 0 | 1 | 0 | 1 |
| −547.5 | −54.75° | 1 | 0 | 0 | 1 | 0 | 1 | 0 | 0 |
| −546.5 | −54.65° | 1 | 1 | 0 | 1 | 0 | 1 | 1 | 0 |
| −545.5 | −54.55° | 0 | 1 | 0 | 1 | 0 | 0 | 1 | 0 |
| −544.5 | −54.45° | 0 | 1 | 0 | 0 | 1 | 0 | 1 | 0 |
| −543.5 | −54.35° | 0 | 1 | 1 | 0 | 1 | 0 | 1 | 1 |
| −542.5 | −54.25° | 0 | 0 | 1 | 0 | 1 | 0 | 0 | 1 |
| −541.5 | −54.15° | 1 | 0 | 1 | 0 | 1 | 1 | 0 | 1 |
| −540.5 | −54.05° | 1 | 0 | 1 | 1 | 0 | 1 | 0 | 1 |
| −539.5 | −53.95° | 1 | 0 | 0 | 1 | 0 | 1 | 0 | 0 |
| −538.5 | −53.85° | 1 | 1 | 0 | 1 | 0 | 1 | 1 | 0 |
| −537.5 | −53.75° | 0 | 1 | 0 | 1 | 0 | 0 | 1 | 0 |
| −536.5 | −53.65° | 0 | 1 | 0 | 0 | 1 | 0 | 1 | 0 |
| −535.5 | −53.55° | 0 | 1 | 1 | 0 | 1 | 0 | 1 | 1 |
| −534.5 | −53.45° | 0 | 0 | 1 | 0 | 1 | 0 | 0 | 1 |
| −533.5 | −53.35° | 1 | 0 | 1 | 0 | 0 | 1 | 0 | 1 |
| −532.5 | −53.25° | 1 | 0 | 1 | 1 | 0 | 1 | 0 | 1 |
| −531.5 | −53.15° | 1 | 0 | 0 | 1 | 0 | 1 | 0 | 0 |
| −530.5 | −53.05° | 1 | 1 | 0 | 1 | 0 | 1 | 1 | 0 |
| −529.5 | −52.95° | 0 | 1 | 0 | 1 | 1 | 0 | 1 | 0 |
| −528.5 | −52.85° | 0 | 1 | 0 | 0 | 1 | 0 | 1 | 0 |
| −527.5 | −52.75° | 0 | 1 | 1 | 0 | 1 | 0 | 1 | 1 |
| −526.5 | −52.65° | 0 | 0 | 1 | 0 | 1 | 1 | 0 | 1 |
| −525.5 | −52.55° | 1 | 0 | 1 | 0 | 0 | 1 | 0 | 1 |
| −524.5 | −52.45° | 1 | 0 | 1 | 1 | 0 | 1 | 0 | 1 |
| −523.5 | −52.35° | 1 | 0 | 0 | 1 | 0 | 1 | 0 | 0 |
| −522.5 | −52.25° | 1 | 1 | 0 | 1 | 0 | 0 | 1 | 0 |
| −521.5 | −52.15° | 0 | 1 | 0 | 1 | 1 | 0 | 1 | 0 |
| −520.5 | −52.05° | 0 | 1 | 0 | 0 | 1 | 0 | 1 | 0 |
| −519.5 | −51.95° | 0 | 1 | 1 | 0 | 1 | 0 | 0 | 1 |
| −518.5 | −51.85° | 0 | 0 | 1 | 0 | 1 | 1 | 0 | 1 |
| −517.5 | −51.75° | 1 | 0 | 1 | 0 | 0 | 1 | 0 | 1 |
| −516.5 | −51.65° | 1 | 0 | 1 | 1 | 0 | 1 | 0 | 1 |
| −515.5 | −51.55° | 1 | 0 | 0 | 1 | 0 | 1 | 1 | 0 |
| −514.5 | −51.45° | 1 | 1 | 0 | 1 | 0 | 0 | 1 | 0 |
| −513.5 | −51.35° | 0 | 1 | 0 | 1 | 1 | 0 | 1 | 0 |
| −512.5 | −51.25° | 0 | 1 | 0 | 0 | 1 | 0 | 1 | 1 |
| −511.5 | −51.15° | 0 | 1 | 1 | 0 | 1 | 0 | 0 | 1 |
| −510.5 | −51.05° | 0 | 0 | 1 | 0 | 1 | 1 | 0 | 1 |
| −509.5 | −50.95° | 1 | 0 | 1 | 0 | 0 | 1 | 0 | 1 |
| −508.5 | −50.85° | 1 | 0 | 1 | 1 | 0 | 1 | 0 | 0 |
| −507.5 | −50.75° | 1 | 0 | 0 | 1 | 0 | 1 | 1 | 0 |
| −506.5 | −50.65° | 1 | 1 | 0 | 1 | 0 | 0 | 1 | 0 |
| −505.5 | −50.55° | 0 | 1 | 0 | 1 | 1 | 0 | 1 | 0 |
| −504.5 | −50.45° | 0 | 1 | 0 | 0 | 1 | 0 | 1 | 1 |
| −503.5 | −50.35° | 0 | 1 | 1 | 0 | 1 | 0 | 0 | 1 |
| −502.5 | −50.25° | 0 | 0 | 1 | 0 | 1 | 1 | 0 | 1 |
| −501.5 | −50.15° | 1 | 0 | 1 | 0 | 0 | 1 | 0 | 1 |
| −500.5 | −50.05° | 1 | 0 | 1 | 1 | 0 | 1 | 0 | 0 |
| −499.5 | −49.95° | 1 | 0 | 0 | 1 | 0 | 1 | 1 | 0 |
| −498.5 | −49.85° | 1 | 1 | 0 | 1 | 0 | 0 | 1 | 0 |
| −497.5 | −49.75° | 0 | 1 | 0 | 1 | 1 | 0 | 1 | 0 |
| −496.5 | −49.65° | 0 | 1 | 0 | 0 | 1 | 0 | 1 | 1 |
| −495.5 | −49.55° | 0 | 1 | 1 | 0 | 1 | 0 | 0 | 1 |
| −494.5 | −49.45° | 0 | 0 | 1 | 0 | 1 | 1 | 0 | 1 |
| −493.5 | −49.35° | 1 | 0 | 1 | 0 | 0 | 1 | 0 | 1 |
| −492.5 | −49.25° | 1 | 0 | 1 | 1 | 0 | 1 | 0 | 0 |
| −491.5 | −49.15° | 1 | 0 | 0 | 1 | 0 | 1 | 1 | 0 |
| −490.5 | −49.05° | 1 | 1 | 0 | 1 | 0 | 0 | 1 | 0 |
| −489.5 | −48.95° | 0 | 1 | 0 | 1 | 1 | 0 | 1 | 0 |
| −488.5 | −48.85° | 0 | 1 | 0 | 0 | 1 | 0 | 1 | 1 |
| −487.5 | −48.75° | 0 | 1 | 1 | 0 | 1 | 0 | 0 | 1 |
| −486.5 | −48.65° | 0 | 0 | 1 | 0 | 1 | 1 | 0 | 1 |
| −485.5 | −48.55° | 1 | 0 | 1 | 1 | 0 | 1 | 0 | 0 |

-continued

| | | | | | | | | | |
|---|---|---|---|---|---|---|---|---|---|
| −484.5 | −48.45° | 1 | 0 | 0 | 1 | 0 | 1 | 1 | 0 |
| −483.5 | −48.35° | 1 | 1 | 0 | 1 | 0 | 0 | 1 | 0 |
| −482.5 | −48.25° | 0 | 1 | 0 | 1 | 1 | 0 | 1 | 0 |
| −481.5 | −48.15° | 0 | 1 | 0 | 0 | 1 | 0 | 1 | 1 |
| −480.5 | −48.05° | 0 | 1 | 1 | 0 | 1 | 0 | 0 | 1 |
| −479.5 | −47.95° | 0 | 0 | 1 | 0 | 1 | 1 | 0 | 1 |
| −478.5 | −47.85° | 1 | 0 | 1 | 0 | 0 | 1 | 0 | 1 |
| −477.5 | −47.75° | 1 | 0 | 1 | 1 | 0 | 1 | 0 | 0 |
| −476.5 | −47.65° | 1 | 0 | 0 | 1 | 0 | 1 | 1 | 0 |
| −475.5 | −47.55° | 1 | 1 | 0 | 1 | 0 | 0 | 1 | 0 |
| −474.5 | −47.45° | 0 | 1 | 0 | 1 | 1 | 0 | 1 | 0 |
| −473.5 | −47.35° | 0 | 1 | 0 | 0 | 1 | 0 | 1 | 1 |
| −472.5 | −47.25° | 0 | 1 | 1 | 0 | 1 | 0 | 0 | 1 |
| −471.5 | −47.15° | 0 | 0 | 1 | 0 | 1 | 1 | 0 | 1 |
| −470.5 | −47.05° | 1 | 0 | 1 | 0 | 0 | 1 | 0 | 1 |
| −469.5 | −46.95° | 1 | 0 | 1 | 1 | 0 | 1 | 0 | 0 |
| −468.5 | −46.85° | 1 | 0 | 0 | 1 | 0 | 1 | 1 | 0 |
| −467.5 | −46.75° | 1 | 1 | 0 | 1 | 0 | 0 | 1 | 0 |
| −466.5 | −46.65° | 0 | 1 | 0 | 1 | 1 | 0 | 1 | 0 |
| −465.5 | −46.55° | 0 | 1 | 0 | 0 | 1 | 0 | 1 | 1 |
| −464.5 | −46.45° | 0 | 1 | 1 | 0 | 1 | 0 | 0 | 1 |
| −463.5 | −46.35° | 0 | 0 | 1 | 0 | 1 | 1 | 0 | 1 |
| −462.5 | −46.25° | 1 | 0 | 1 | 0 | 0 | 1 | 0 | 1 |
| −461.5 | −46.15° | 1 | 0 | 1 | 1 | 0 | 1 | 0 | 0 |
| −460.5 | −46.05° | 1 | 0 | 0 | 1 | 0 | 1 | 1 | 0 |
| −459.5 | −45.95° | 1 | 1 | 0 | 1 | 0 | 0 | 1 | 0 |
| −458.5 | −45.85° | 0 | 1 | 0 | 1 | 1 | 0 | 1 | 0 |
| −457.5 | −45.75° | 0 | 1 | 0 | 0 | 1 | 0 | 1 | 1 |
| −456.5 | −45.65° | 0 | 1 | 1 | 0 | 1 | 0 | 0 | 1 |
| −455.5 | −45.55° | 0 | 0 | 1 | 0 | 1 | 1 | 0 | 1 |
| −454.5 | −45.45° | 1 | 0 | 1 | 0 | 0 | 1 | 0 | 0 |
| −453.5 | −45.35° | 1 | 0 | 1 | 1 | 0 | 1 | 1 | 0 |
| −452.5 | −45.25° | 1 | 0 | 0 | 1 | 0 | 1 | 1 | 0 |
| −451.5 | −45.15° | 1 | 1 | 0 | 1 | 0 | 0 | 1 | 0 |
| −450.5 | −45.05° | 0 | 1 | 0 | 1 | 1 | 0 | 1 | 1 |
| −449.5 | −44.95° | 0 | 1 | 0 | 0 | 1 | 0 | 0 | 1 |
| −448.5 | −44.85° | 0 | 1 | 1 | 0 | 1 | 0 | 0 | 1 |
| −447.5 | −44.75° | 0 | 0 | 1 | 0 | 1 | 1 | 0 | 1 |
| −446.5 | −44.65° | 1 | 0 | 1 | 0 | 0 | 1 | 0 | 0 |
| −445.5 | −44.55° | 1 | 0 | 1 | 1 | 0 | 1 | 1 | 0 |
| −444.5 | −44.45° | 1 | 0 | 0 | 1 | 0 | 0 | 1 | 0 |
| −443.5 | −44.35° | 1 | 1 | 0 | 1 | 0 | 0 | 1 | 0 |
| −442.5 | −44.25° | 0 | 1 | 0 | 1 | 1 | 0 | 1 | 1 |
| −441.5 | −44.15° | 0 | 1 | 0 | 0 | 1 | 0 | 0 | 1 |
| −440.5 | −44.05° | 0 | 1 | 1 | 0 | 1 | 1 | 0 | 1 |
| −439.5 | −43.95° | 0 | 0 | 1 | 0 | 0 | 1 | 0 | 1 |
| −438.5 | −43.85° | 1 | 0 | 1 | 0 | 0 | 1 | 0 | 0 |
| −437.5 | −43.75° | 1 | 0 | 1 | 1 | 0 | 1 | 1 | 0 |
| −436.5 | −43.65° | 1 | 0 | 0 | 1 | 0 | 0 | 1 | 0 |
| −435.5 | −43.55° | 1 | 1 | 0 | 1 | 1 | 0 | 1 | 0 |
| −434.5 | −43.45° | 0 | 1 | 0 | 1 | 1 | 0 | 1 | 1 |
| −433.5 | −43.35° | 0 | 1 | 0 | 0 | 1 | 0 | 0 | 1 |
| −432.5 | −43.25° | 0 | 1 | 1 | 0 | 1 | 1 | 0 | 1 |
| −431.5 | −43.15° | 0 | 0 | 1 | 0 | 0 | 1 | 0 | 1 |
| −430.5 | −43.05° | 1 | 0 | 1 | 0 | 0 | 1 | 0 | 0 |
| −429.5 | −42.95° | 1 | 0 | 1 | 1 | 0 | 1 | 1 | 0 |
| −428.5 | −42.85° | 1 | 0 | 0 | 1 | 0 | 0 | 1 | 0 |
| −427.5 | −42.75° | 1 | 1 | 0 | 1 | 1 | 0 | 1 | 1 |
| −426.5 | −42.65° | 0 | 1 | 0 | 0 | 1 | 0 | 1 | 1 |
| −425.5 | −42.55° | 0 | 1 | 0 | 0 | 1 | 0 | 0 | 1 |
| −424.5 | −42.45° | 0 | 1 | 1 | 0 | 1 | 1 | 0 | 1 |
| −423.5 | −42.35° | 0 | 0 | 1 | 0 | 0 | 1 | 0 | 0 |
| −422.5 | −42.25° | 1 | 0 | 1 | 1 | 0 | 1 | 1 | 0 |
| −421.5 | −42.15° | 1 | 0 | 1 | 1 | 0 | 1 | 1 | 0 |
| −420.5 | −42.05° | 1 | 0 | 0 | 1 | 0 | 0 | 1 | 0 |
| −419.5 | −41.95° | 1 | 1 | 0 | 1 | 1 | 0 | 1 | 1 |
| −418.5 | −41.85° | 0 | 1 | 0 | 0 | 1 | 0 | 0 | 1 |
| −417.5 | −41.75° | 0 | 1 | 0 | 0 | 1 | 0 | 0 | 1 |
| −416.5 | −41.65° | 0 | 1 | 1 | 0 | 1 | 1 | 0 | 1 |
| −415.5 | −41.55° | 0 | 0 | 1 | 0 | 0 | 1 | 0 | 0 |
| −414.5 | −41.45° | 1 | 0 | 1 | 1 | 0 | 1 | 1 | 0 |
| −413.5 | −41.35° | 1 | 0 | 1 | 1 | 0 | 1 | 1 | 0 |
| −412.5 | −41.25° | 1 | 0 | 0 | 1 | 0 | 0 | 1 | 0 |
| −411.5 | −41.15° | 1 | 1 | 0 | 1 | 1 | 0 | 1 | 1 |
| −410.5 | −41.05° | 0 | 1 | 0 | 0 | 1 | 0 | 0 | 1 |
| −409.5 | −40.95° | 0 | 1 | 0 | 0 | 1 | 1 | 0 | 1 |
| −408.5 | −40.85° | 0 | 1 | 1 | 0 | 1 | 1 | 0 | 1 |
| −407.5 | −40.75° | 0 | 0 | 1 | 0 | 0 | 1 | 0 | 0 |
| −406.5 | −40.65° | 1 | 0 | 1 | 1 | 0 | 1 | 1 | 0 |

-continued

| | | | | | | | | | |
|---|---|---|---|---|---|---|---|---|---|
| −405.5 | −40.55° | 1 | 0 | 1 | 1 | 0 | 0 | 1 | 0 |
| −404.5 | −40.45° | 1 | 0 | 0 | 1 | 0 | 0 | 1 | 1 |
| −403.5 | −40.35° | 1 | 1 | 0 | 1 | 1 | 0 | 1 | 1 |
| −402.5 | −40.25° | 0 | 1 | 0 | 0 | 1 | 0 | 0 | 1 |
| −401.5 | −40.15° | 0 | 1 | 1 | 0 | 1 | 1 | 0 | 1 |
| −400.5 | −40.05° | 0 | 1 | 1 | 0 | 1 | 1 | 0 | 0 |
| −399.5 | −39.95° | 0 | 0 | 1 | 0 | 0 | 1 | 0 | 0 |
| −398.5 | −39.85° | 1 | 0 | 1 | 1 | 0 | 1 | 1 | 0 |
| −397.5 | −39.75° | 1 | 0 | 0 | 1 | 0 | 0 | 1 | 0 |
| −396.5 | −39.65° | 1 | 0 | 0 | 1 | 1 | 0 | 1 | 1 |
| −395.5 | −39.55° | 1 | 1 | 0 | 1 | 1 | 0 | 1 | 1 |
| −394.5 | −39.45° | 0 | 1 | 0 | 0 | 1 | 0 | 0 | 1 |
| −393.5 | −39.35° | 0 | 1 | 1 | 0 | 1 | 1 | 0 | 1 |
| −392.5 | −39.25° | 0 | 1 | 1 | 0 | 0 | 1 | 0 | 0 |
| −391.5 | −39.15° | 0 | 0 | 1 | 0 | 0 | 1 | 1 | 0 |
| −390.5 | −39.05° | 1 | 0 | 1 | 1 | 0 | 1 | 1 | 0 |
| −389.5 | −38.95° | 1 | 0 | 0 | 1 | 0 | 0 | 1 | 0 |
| −388.5 | −38.85° | 1 | 0 | 0 | 1 | 1 | 0 | 1 | 1 |
| −387.5 | −38.75° | 1 | 1 | 0 | 1 | 1 | 0 | 0 | 1 |
| −386.5 | −38.65° | 0 | 1 | 0 | 0 | 1 | 0 | 0 | 1 |
| −385.5 | −38.55° | 0 | 1 | 1 | 0 | 1 | 1 | 0 | 1 |
| −384.5 | −38.45° | 0 | 1 | 1 | 0 | 0 | 1 | 0 | 0 |
| −383.5 | −38.35° | 0 | 0 | 1 | 0 | 0 | 1 | 1 | 0 |
| −382.5 | −38.25° | 1 | 0 | 1 | 1 | 0 | 1 | 1 | 0 |
| −381.5 | −38.15° | 1 | 0 | 0 | 1 | 0 | 0 | 1 | 0 |
| −380.5 | −38.05° | 1 | 0 | 0 | 1 | 1 | 0 | 1 | 1 |
| −379.5 | −37.95° | 1 | 1 | 0 | 1 | 1 | 0 | 0 | 1 |
| −378.5 | −37.85° | 0 | 1 | 0 | 0 | 1 | 1 | 0 | 1 |
| −377.5 | −37.75° | 0 | 1 | 1 | 0 | 1 | 1 | 0 | 0 |
| −376.5 | −37.65° | 0 | 1 | 1 | 0 | 0 | 1 | 0 | 0 |
| −375.5 | −37.55° | 0 | 0 | 1 | 0 | 0 | 1 | 1 | 0 |
| −374.5 | −37.45° | 1 | 0 | 1 | 1 | 0 | 0 | 1 | 0 |
| −373.5 | −37.35° | 1 | 0 | 0 | 1 | 0 | 0 | 1 | 1 |
| −372.5 | −37.25° | 1 | 0 | 0 | 1 | 1 | 0 | 1 | 1 |
| −371.5 | −37.15° | 1 | 1 | 0 | 0 | 1 | 0 | 0 | 1 |
| −370.5 | −37.05° | 0 | 1 | 0 | 0 | 1 | 1 | 0 | 1 |
| −369.5 | −36.95° | 0 | 1 | 1 | 0 | 1 | 1 | 0 | 0 |
| −368.5 | −36.85° | 0 | 1 | 1 | 0 | 0 | 1 | 0 | 0 |
| −367.5 | −36.75° | 0 | 0 | 1 | 1 | 0 | 1 | 1 | 0 |
| −366.5 | −36.65° | 1 | 0 | 1 | 1 | 0 | 0 | 1 | 0 |
| −365.5 | −36.55° | 1 | 0 | 0 | 1 | 0 | 0 | 1 | 1 |
| −364.5 | −36.45° | 1 | 0 | 0 | 1 | 1 | 0 | 0 | 1 |
| −363.5 | −36.35° | 1 | 1 | 0 | 0 | 1 | 0 | 0 | 1 |
| −362.5 | −36.25° | 0 | 1 | 0 | 0 | 1 | 1 | 0 | 1 |
| −361.5 | −36.15° | 0 | 1 | 1 | 0 | 1 | 1 | 0 | 0 |
| −360.5 | −36.05° | 0 | 1 | 1 | 0 | 0 | 1 | 1 | 0 |
| −359.5 | −35.95° | 0 | 0 | 1 | 1 | 0 | 1 | 1 | 0 |
| −358.5 | −35.85° | 1 | 0 | 1 | 1 | 0 | 0 | 1 | 0 |
| −357.5 | −35.75° | 1 | 0 | 0 | 1 | 0 | 0 | 1 | 1 |
| −356.5 | −35.65° | 1 | 1 | 0 | 1 | 1 | 0 | 0 | 1 |
| −355.5 | −35.55° | 1 | 1 | 0 | 0 | 1 | 0 | 0 | 1 |
| −354.5 | −35.45° | 0 | 1 | 0 | 0 | 1 | 1 | 0 | 0 |
| −353.5 | −35.35° | 0 | 1 | 1 | 0 | 0 | 1 | 0 | 0 |
| −352.5 | −35.25° | 0 | 0 | 1 | 0 | 0 | 1 | 1 | 0 |
| −351.5 | −35.15° | 0 | 0 | 1 | 1 | 0 | 1 | 1 | 0 |
| −350.5 | −35.05° | 1 | 0 | 1 | 1 | 0 | 0 | 1 | 1 |
| −349.5 | −34.95° | 1 | 0 | 0 | 1 | 1 | 0 | 1 | 1 |
| −348.5 | −34.85° | 1 | 1 | 0 | 1 | 1 | 0 | 0 | 1 |
| −347.5 | −34.75° | 1 | 1 | 0 | 0 | 1 | 0 | 0 | 1 |
| −346.5 | −34.65° | 0 | 1 | 0 | 0 | 1 | 1 | 0 | 0 |
| −345.5 | −34.55° | 0 | 1 | 1 | 0 | 0 | 1 | 0 | 0 |
| −344.5 | −34.45° | 0 | 0 | 1 | 0 | 0 | 1 | 1 | 0 |
| −343.5 | −34.35° | 0 | 0 | 1 | 1 | 0 | 0 | 1 | 0 |
| −342.5 | −34.25° | 1 | 0 | 1 | 1 | 0 | 0 | 1 | 1 |
| −341.5 | −34.15° | 1 | 0 | 0 | 1 | 1 | 0 | 1 | 1 |
| −340.5 | −34.05° | 1 | 1 | 0 | 1 | 1 | 0 | 0 | 1 |
| −339.5 | −33.95° | 1 | 1 | 0 | 0 | 1 | 1 | 0 | 1 |
| −338.5 | −33.85° | 0 | 1 | 0 | 0 | 1 | 1 | 0 | 0 |
| −337.5 | −33.75° | 0 | 1 | 1 | 0 | 0 | 1 | 1 | 0 |
| −336.5 | −33.65° | 0 | 0 | 1 | 0 | 0 | 1 | 1 | 0 |
| −335.5 | −33.55° | 0 | 0 | 1 | 1 | 0 | 0 | 1 | 0 |
| −334.5 | −33.45° | 1 | 0 | 1 | 1 | 0 | 0 | 1 | 1 |
| −333.5 | −33.35° | 1 | 0 | 0 | 1 | 1 | 0 | 0 | 1 |
| −332.5 | −33.25° | 1 | 1 | 0 | 1 | 1 | 0 | 0 | 1 |
| −331.5 | −33.15° | 1 | 1 | 0 | 0 | 1 | 1 | 0 | 0 |
| −330.5 | −33.05° | 0 | 1 | 1 | 0 | 1 | 1 | 0 | 0 |
| −329.5 | −32.95° | 0 | 1 | 1 | 0 | 0 | 1 | 1 | 0 |
| −328.5 | −32.85° | 0 | 0 | 1 | 0 | 0 | 1 | 1 | 0 |
| −327.5 | −32.75° | 0 | 0 | 1 | 1 | 0 | 0 | 1 | 1 |

-continued

| | | | | | | | | | |
|---|---|---|---|---|---|---|---|---|---|
| −326.5 | −32.65° | 1 | 0 | 0 | 1 | 0 | 0 | 1 | 1 |
| −325.5 | −32.55° | 1 | 0 | 0 | 1 | 1 | 0 | 0 | 1 |
| −324.5 | −32.45° | 1 | 1 | 0 | 1 | 1 | 0 | 0 | 1 |
| −323.5 | −32.35° | 1 | 1 | 0 | 0 | 1 | 1 | 0 | 0 |
| −322.5 | −32.25° | 0 | 1 | 1 | 0 | 1 | 1 | 0 | 0 |
| −321.5 | −32.15° | 0 | 1 | 1 | 0 | 0 | 1 | 1 | 0 |
| −320.5 | −32.05° | 0 | 0 | 1 | 1 | 0 | 1 | 1 | 0 |
| −319.5 | −31.95° | 0 | 0 | 1 | 1 | 0 | 0 | 1 | 1 |
| −318.5 | −31.85° | 1 | 0 | 0 | 1 | 1 | 0 | 1 | 1 |
| −317.5 | −31.75° | 1 | 0 | 0 | 1 | 1 | 0 | 0 | 1 |
| −316.5 | −31.65° | 1 | 1 | 0 | 0 | 1 | 0 | 0 | 1 |
| −315.5 | −31.55° | 1 | 1 | 0 | 0 | 1 | 1 | 0 | 0 |
| −314.5 | −31.45° | 0 | 1 | 1 | 0 | 0 | 1 | 0 | 0 |
| −313.5 | −31.35° | 0 | 1 | 1 | 0 | 0 | 1 | 1 | 0 |
| −312.5 | −31.25° | 0 | 0 | 1 | 1 | 0 | 0 | 1 | 0 |
| −311.5 | −31.15° | 0 | 0 | 1 | 1 | 0 | 0 | 1 | 1 |
| −310.5 | −31.05° | 1 | 0 | 0 | 1 | 1 | 0 | 0 | 1 |
| −309.5 | −30.95° | 1 | 0 | 0 | 1 | 1 | 0 | 0 | 1 |
| −308.5 | −30.85° | 1 | 1 | 0 | 0 | 1 | 1 | 0 | 0 |
| −307.5 | −30.75° | 1 | 1 | 0 | 0 | 1 | 1 | 0 | 0 |
| −306.5 | −30.65° | 0 | 1 | 1 | 0 | 0 | 1 | 1 | 0 |
| −305.5 | −30.55° | 0 | 1 | 1 | 0 | 0 | 1 | 1 | 0 |
| −304.5 | −30.45° | 0 | 0 | 1 | 1 | 0 | 0 | 1 | 1 |
| −303.5 | −30.35° | 0 | 0 | 1 | 1 | 0 | 0 | 1 | 1 |
| −302.5 | −30.25° | 1 | 0 | 0 | 1 | 1 | 0 | 0 | 1 |
| −301.5 | −30.15° | 1 | 0 | 0 | 1 | 1 | 0 | 0 | 1 |
| −300.5 | −30.05° | 1 | 1 | 0 | 0 | 1 | 1 | 0 | 0 |
| −299.5 | −29.95° | 1 | 1 | 0 | 0 | 1 | 1 | 0 | 0 |
| −298.5 | −29.85° | 0 | 1 | 1 | 0 | 0 | 1 | 1 | 0 |
| −297.5 | −29.75° | 0 | 1 | 1 | 0 | 0 | 1 | 1 | 0 |
| −296.5 | −29.65° | 0 | 0 | 1 | 1 | 0 | 0 | 1 | 1 |
| −295.5 | −29.55° | 0 | 0 | 1 | 1 | 0 | 0 | 1 | 1 |
| −294.5 | −29.45° | 1 | 0 | 0 | 1 | 1 | 0 | 0 | 1 |
| −293.5 | −29.35° | 1 | 0 | 0 | 1 | 1 | 0 | 0 | 1 |
| −292.5 | −29.25° | 1 | 1 | 0 | 0 | 1 | 1 | 0 | 0 |
| −291.5 | −29.15° | 1 | 1 | 0 | 0 | 1 | 1 | 0 | 0 |
| −290.5 | −29.05° | 0 | 1 | 1 | 0 | 0 | 1 | 1 | 0 |
| −289.5 | −28.95° | 0 | 1 | 1 | 0 | 0 | 1 | 1 | 0 |
| −288.5 | −28.85° | 0 | 0 | 1 | 1 | 0 | 0 | 1 | 1 |
| −287.5 | −28.75° | 0 | 0 | 1 | 1 | 0 | 0 | 1 | 1 |
| −286.5 | −28.65° | 1 | 0 | 0 | 1 | 1 | 0 | 0 | 1 |
| −285.5 | −28.55° | 1 | 0 | 0 | 1 | 1 | 0 | 0 | 0 |
| −284.5 | −28.45° | 1 | 1 | 0 | 0 | 1 | 1 | 0 | 0 |
| −283.5 | −28.35° | 1 | 1 | 0 | 0 | 1 | 1 | 1 | 0 |
| −282.5 | −28.25° | 0 | 1 | 1 | 0 | 0 | 1 | 1 | 0 |
| −281.5 | −28.15° | 0 | 1 | 1 | 0 | 0 | 0 | 1 | 1 |
| −280.5 | −28.05° | 0 | 0 | 1 | 1 | 0 | 0 | 1 | 1 |
| −279.5 | −27.95° | 0 | 0 | 1 | 1 | 1 | 0 | 0 | 1 |
| −278.5 | −27.85° | 1 | 0 | 0 | 1 | 1 | 0 | 0 | 1 |
| −277.5 | −27.75° | 1 | 0 | 0 | 1 | 1 | 1 | 0 | 0 |
| −276.5 | −27.65° | 1 | 1 | 0 | 0 | 1 | 1 | 0 | 0 |
| −275.5 | −27.55° | 1 | 1 | 0 | 0 | 0 | 1 | 1 | 0 |
| −274.5 | −27.45° | 0 | 1 | 1 | 0 | 0 | 1 | 1 | 0 |
| −273.5 | −27.35° | 0 | 1 | 1 | 1 | 0 | 0 | 1 | 1 |
| −272.5 | −27.25° | 0 | 0 | 1 | 1 | 0 | 0 | 1 | 1 |
| −271.5 | −27.15° | 0 | 0 | 1 | 1 | 1 | 0 | 0 | 1 |
| −270.5 | −27.05° | 1 | 0 | 0 | 1 | 1 | 0 | 0 | 1 |
| −269.5 | −26.95° | 1 | 0 | 0 | 0 | 1 | 1 | 0 | 0 |
| −268.5 | −26.85° | 1 | 1 | 0 | 0 | 1 | 1 | 0 | 0 |
| −267.5 | −26.75° | 1 | 1 | 0 | 0 | 0 | 1 | 1 | 0 |
| −266.5 | −26.65° | 0 | 1 | 1 | 0 | 0 | 1 | 1 | 1 |
| −265.5 | −26.55° | 0 | 1 | 1 | 1 | 0 | 0 | 1 | 1 |
| −264.5 | −26.45° | 0 | 0 | 1 | 1 | 0 | 0 | 1 | 1 |
| −263.5 | −26.35° | 0 | 0 | 0 | 1 | 1 | 0 | 0 | 1 |
| −262.5 | −26.25° | 1 | 0 | 0 | 1 | 1 | 0 | 0 | 0 |
| −261.5 | −26.15° | 1 | 0 | 0 | 0 | 1 | 1 | 0 | 0 |
| −260.5 | −26.05° | 1 | 1 | 0 | 0 | 1 | 1 | 1 | 0 |
| −259.5 | −25.95° | 1 | 1 | 1 | 0 | 0 | 1 | 1 | 0 |
| −258.5 | −25.85° | 0 | 1 | 1 | 0 | 0 | 1 | 1 | 1 |
| −257.5 | −25.75° | 0 | 1 | 1 | 1 | 0 | 0 | 1 | 1 |
| −256.5 | −25.65° | 0 | 0 | 1 | 1 | 0 | 0 | 0 | 1 |
| −255.5 | −25.55° | 0 | 0 | 0 | 1 | 1 | 0 | 0 | 1 |
| −254.5 | −25.45° | 1 | 0 | 0 | 1 | 1 | 1 | 0 | 0 |
| −253.5 | −25.35° | 1 | 0 | 0 | 0 | 1 | 1 | 0 | 0 |
| −252.5 | −25.25° | 1 | 1 | 0 | 0 | 1 | 1 | 1 | 0 |
| −251.5 | −25.15° | 1 | 1 | 1 | 0 | 0 | 1 | 1 | 0 |
| −250.5 | −25.05° | 0 | 1 | 1 | 0 | 0 | 0 | 1 | 1 |
| −249.5 | −24.95° | 0 | 1 | 1 | 1 | 0 | 0 | 1 | 1 |
| −248.5 | −24.85° | 0 | 0 | 1 | 1 | 0 | 0 | 0 | 1 |

-continued

| | | | | | | | | | |
|---|---|---|---|---|---|---|---|---|---|
| −247.5 | −24.75° | 0 | 0 | 0 | 1 | 1 | 0 | 0 | 1 |
| −246.5 | −24.65° | 1 | 0 | 0 | 1 | 1 | 1 | 0 | 0 |
| −245.5 | −24.55° | 1 | 1 | 0 | 0 | 1 | 1 | 0 | 0 |
| −244.5 | −24.45° | 1 | 1 | 0 | 0 | 0 | 1 | 1 | 0 |
| −243.5 | −24.35° | 1 | 1 | 1 | 0 | 0 | 1 | 1 | 1 |
| −242.5 | −24.25° | 0 | 1 | 1 | 0 | 0 | 0 | 1 | 1 |
| −241.5 | −24.15° | 0 | 0 | 1 | 1 | 0 | 0 | 1 | 1 |
| −240.5 | −24.05° | 0 | 0 | 1 | 1 | 1 | 0 | 0 | 1 |
| −239.5 | −23.95° | 0 | 0 | 0 | 1 | 1 | 0 | 0 | 0 |
| −238.5 | −23.85° | 1 | 0 | 0 | 1 | 1 | 1 | 0 | 0 |
| −237.5 | −23.75° | 1 | 1 | 0 | 0 | 1 | 1 | 1 | 0 |
| −236.5 | −23.65° | 1 | 1 | 0 | 0 | 0 | 1 | 1 | 0 |
| −235.5 | −23.55° | 1 | 1 | 1 | 0 | 0 | 1 | 1 | 1 |
| −234.5 | −23.45° | 0 | 1 | 1 | 0 | 0 | 0 | 1 | 1 |
| −233.5 | −23.35° | 0 | 0 | 1 | 1 | 0 | 0 | 0 | 1 |
| −232.5 | −23.25° | 0 | 0 | 1 | 1 | 1 | 0 | 0 | 1 |
| −231.5 | −23.15° | 0 | 0 | 0 | 1 | 1 | 0 | 0 | 0 |
| −230.5 | −23.05° | 1 | 0 | 0 | 0 | 1 | 1 | 0 | 0 |
| −229.5 | −22.95° | 1 | 1 | 0 | 0 | 1 | 1 | 1 | 0 |
| −228.5 | −22.85° | 1 | 1 | 0 | 0 | 0 | 1 | 1 | 0 |
| −227.5 | −22.75° | 1 | 1 | 1 | 0 | 0 | 1 | 1 | 1 |
| −226.5 | −22.65° | 0 | 1 | 1 | 1 | 0 | 0 | 1 | 1 |
| −225.5 | −22.55° | 0 | 0 | 1 | 1 | 0 | 0 | 0 | 1 |
| −224.5 | −22.45° | 0 | 0 | 1 | 1 | 1 | 0 | 0 | 0 |
| −223.5 | −22.35° | 0 | 0 | 0 | 1 | 1 | 1 | 0 | 0 |
| −222.5 | −22.25° | 1 | 0 | 0 | 0 | 1 | 1 | 0 | 0 |
| −221.5 | −22.15° | 1 | 1 | 0 | 0 | 1 | 1 | 1 | 0 |
| −220.5 | −22.05° | 1 | 1 | 0 | 0 | 0 | 1 | 1 | 1 |
| −219.5 | −21.95° | 1 | 1 | 1 | 0 | 0 | 0 | 1 | 1 |
| −218.5 | −21.85° | 0 | 1 | 1 | 1 | 0 | 0 | 1 | 1 |
| −217.5 | −21.75° | 0 | 0 | 1 | 1 | 0 | 0 | 0 | 1 |
| −216.5 | −21.65° | 0 | 0 | 1 | 1 | 1 | 0 | 0 | 0 |
| −215.5 | −21.55° | 0 | 0 | 0 | 1 | 1 | 1 | 0 | 0 |
| −214.5 | −21.45° | 1 | 0 | 0 | 0 | 1 | 1 | 0 | 0 |
| −213.5 | −21.35° | 1 | 1 | 0 | 0 | 1 | 1 | 1 | 0 |
| −212.5 | −21.25° | 1 | 1 | 0 | 0 | 0 | 1 | 1 | 1 |
| −211.5 | −21.15° | 1 | 1 | 1 | 0 | 0 | 0 | 1 | 1 |
| −210.5 | −21.05° | 0 | 1 | 1 | 1 | 0 | 0 | 0 | 1 |
| −209.5 | −20.95° | 0 | 0 | 1 | 1 | 1 | 0 | 0 | 1 |
| −208.5 | −20.85° | 0 | 0 | 1 | 1 | 1 | 0 | 0 | 0 |
| −207.5 | −20.75° | 0 | 0 | 0 | 1 | 1 | 1 | 0 | 0 |
| −206.5 | −20.65° | 1 | 0 | 0 | 0 | 1 | 1 | 1 | 0 |
| −205.5 | −20.55° | 1 | 1 | 0 | 0 | 0 | 1 | 1 | 0 |
| −204.5 | −20.45° | 1 | 1 | 1 | 0 | 0 | 1 | 1 | 1 |
| −203.5 | −20.35° | 1 | 1 | 1 | 0 | 0 | 0 | 1 | 1 |
| −202.5 | −20.25° | 0 | 1 | 1 | 1 | 0 | 0 | 0 | 1 |
| −201.5 | −20.15° | 0 | 0 | 1 | 1 | 1 | 0 | 0 | 0 |
| −200.5 | −20.05° | 0 | 0 | 0 | 1 | 1 | 0 | 0 | 0 |
| −199.5 | −19.95° | 0 | 0 | 0 | 1 | 1 | 1 | 0 | 0 |
| −198.5 | −19.85° | 1 | 0 | 0 | 0 | 1 | 1 | 1 | 0 |
| −197.5 | −19.75° | 1 | 1 | 0 | 0 | 0 | 1 | 1 | 1 |
| −196.5 | −19.65° | 1 | 1 | 1 | 0 | 0 | 0 | 1 | 1 |
| −195.5 | −19.55° | 1 | 1 | 1 | 0 | 0 | 0 | 1 | 1 |
| −194.5 | −19.45° | 0 | 1 | 1 | 1 | 0 | 0 | 0 | 1 |
| −193.5 | −19.35° | 0 | 0 | 1 | 1 | 1 | 0 | 0 | 0 |
| −192.5 | −19.25° | 0 | 0 | 0 | 1 | 1 | 1 | 0 | 0 |
| −191.5 | −19.15° | 0 | 0 | 0 | 1 | 1 | 1 | 0 | 0 |
| −190.5 | −19.05° | 1 | 0 | 0 | 0 | 1 | 1 | 1 | 0 |
| −189.5 | −18.95° | 1 | 1 | 0 | 0 | 0 | 1 | 1 | 1 |
| −188.5 | −18.85° | 1 | 1 | 1 | 0 | 0 | 0 | 1 | 1 |
| −187.5 | −18.75° | 1 | 1 | 1 | 0 | 0 | 0 | 0 | 1 |
| −186.5 | −18.65° | 0 | 1 | 1 | 1 | 0 | 0 | 0 | 1 |
| −185.5 | −18.55° | 0 | 0 | 1 | 1 | 1 | 0 | 0 | 0 |
| −184.5 | −18.45° | 0 | 0 | 0 | 1 | 1 | 1 | 0 | 0 |
| −183.5 | −18.35° | 0 | 0 | 0 | 0 | 1 | 1 | 1 | 0 |
| −182.5 | −18.25° | 1 | 0 | 0 | 0 | 1 | 1 | 1 | 1 |
| −181.5 | −18.15° | 1 | 1 | 0 | 0 | 0 | 1 | 1 | 1 |
| −180.5 | −18.05° | 1 | 1 | 1 | 0 | 0 | 0 | 1 | 1 |
| −179.5 | −17.95° | 1 | 1 | 1 | 1 | 0 | 0 | 0 | 1 |
| −178.5 | −17.85° | 0 | 1 | 1 | 1 | 0 | 0 | 0 | 0 |
| −177.5 | −17.75° | 0 | 0 | 1 | 1 | 1 | 0 | 0 | 0 |
| −176.5 | −17.65° | 0 | 0 | 0 | 1 | 1 | 1 | 0 | 0 |
| −175.5 | −17.55° | 0 | 0 | 0 | 0 | 1 | 1 | 1 | 0 |
| −174.5 | −17.45° | 1 | 0 | 0 | 0 | 0 | 1 | 1 | 1 |
| −173.5 | −17.35° | 1 | 1 | 0 | 0 | 0 | 0 | 1 | 1 |
| −172.5 | −17.25° | 1 | 1 | 1 | 0 | 0 | 0 | 1 | 1 |
| −171.5 | −17.15° | 1 | 1 | 1 | 1 | 0 | 0 | 0 | 1 |
| −170.5 | −17.05° | 0 | 1 | 1 | 1 | 1 | 0 | 0 | 0 |
| −169.5 | −16.95° | 0 | 0 | 1 | 1 | 1 | 1 | 0 | 0 |

-continued

| | | | | | | | | | |
|---|---|---|---|---|---|---|---|---|---|
| −168.5 | −16.85° | 0 | 0 | 0 | 1 | 1 | 1 | 0 | 0 |
| −167.5 | −16.75° | 0 | 0 | 0 | 0 | 1 | 1 | 1 | 0 |
| −166.5 | −16.65° | 1 | 0 | 0 | 0 | 0 | 1 | 1 | 1 |
| −165.5 | −16.55° | 1 | 1 | 0 | 0 | 0 | 0 | 1 | 1 |
| −164.5 | −16.45° | 1 | 1 | 1 | 0 | 0 | 0 | 0 | 1 |
| −163.5 | −16.35° | 1 | 1 | 1 | 1 | 0 | 0 | 0 | 0 |
| −162.5 | −16.25° | 0 | 1 | 1 | 1 | 1 | 0 | 0 | 0 |
| −161.5 | −16.15° | 0 | 0 | 1 | 1 | 1 | 1 | 0 | 0 |
| −160.5 | −16.05° | 0 | 0 | 0 | 1 | 1 | 1 | 1 | 0 |
| −159.5 | −15.95° | 0 | 0 | 0 | 0 | 1 | 1 | 1 | 1 |
| −158.5 | −15.85° | 1 | 0 | 0 | 0 | 0 | 1 | 1 | 1 |
| −157.5 | −15.75° | 1 | 1 | 0 | 0 | 0 | 0 | 1 | 1 |
| −156.5 | −15.65° | 1 | 1 | 1 | 0 | 0 | 0 | 0 | 1 |
| −155.5 | −15.55° | 1 | 1 | 1 | 1 | 0 | 0 | 0 | 0 |
| −154.5 | −15.45° | 0 | 1 | 1 | 1 | 1 | 0 | 0 | 0 |
| −153.5 | −15.35° | 0 | 0 | 1 | 1 | 1 | 1 | 0 | 0 |
| −152.5 | −15.25° | 0 | 0 | 0 | 1 | 1 | 1 | 1 | 0 |
| −151.5 | −15.15° | 0 | 0 | 0 | 0 | 1 | 1 | 1 | 1 |
| −150.5 | −15.05° | 1 | 0 | 0 | 0 | 0 | 1 | 1 | 1 |
| −149.5 | −14.95° | 1 | 1 | 0 | 0 | 0 | 0 | 1 | 1 |
| −148.5 | −14.85° | 1 | 1 | 1 | 0 | 0 | 0 | 0 | 1 |
| −147.5 | −14.75° | 1 | 1 | 1 | 1 | 0 | 0 | 0 | 0 |
| −146.5 | −14.65° | 0 | 1 | 1 | 1 | 1 | 0 | 0 | 0 |
| −145.5 | −14.55° | 0 | 0 | 1 | 1 | 1 | 1 | 0 | 0 |
| −144.5 | −14.45° | 0 | 0 | 0 | 0 | 1 | 1 | 1 | 1 |
| −143.5 | −14.35° | 1 | 0 | 0 | 0 | 0 | 1 | 1 | 1 |
| −142.5 | −14.25° | 1 | 1 | 0 | 0 | 0 | 0 | 1 | 1 |
| −141.5 | −14.15° | 1 | 1 | 1 | 0 | 0 | 0 | 0 | 1 |
| −140.5 | −14.05° | 1 | 1 | 1 | 1 | 0 | 0 | 0 | 0 |
| −139.5 | −13.95° | 0 | 1 | 1 | 1 | 1 | 0 | 0 | 0 |
| −138.5 | −13.85° | 0 | 0 | 1 | 1 | 1 | 1 | 0 | 0 |
| −137.5 | −13.75° | 0 | 0 | 0 | 1 | 1 | 1 | 1 | 0 |
| −136.5 | −13.65° | 0 | 0 | 0 | 0 | 1 | 1 | 1 | 1 |
| −135.5 | −13.55° | 1 | 0 | 0 | 0 | 0 | 1 | 1 | 1 |
| −134.5 | −13.45° | 1 | 1 | 0 | 0 | 0 | 0 | 1 | 1 |
| −133.5 | −13.35° | 1 | 1 | 1 | 0 | 0 | 0 | 0 | 1 |
| −132.5 | −13.25° | 1 | 1 | 1 | 1 | 0 | 0 | 0 | 0 |
| −131.5 | −13.15° | 0 | 1 | 1 | 1 | 1 | 0 | 0 | 0 |
| −130.5 | −13.05° | 0 | 0 | 1 | 1 | 1 | 1 | 0 | 0 |
| −129.5 | −12.95° | 0 | 0 | 0 | 1 | 1 | 1 | 1 | 0 |
| −128.5 | −12.85° | 0 | 0 | 0 | 0 | 1 | 1 | 1 | 1 |
| −127.5 | −12.75° | 1 | 0 | 0 | 0 | 0 | 1 | 1 | 1 |
| −126.5 | −12.65° | 1 | 1 | 0 | 0 | 0 | 0 | 1 | 1 |
| −125.5 | −12.55° | 1 | 1 | 1 | 0 | 0 | 0 | 0 | 1 |
| −124.5 | −12.45° | 1 | 1 | 1 | 1 | 0 | 0 | 0 | 0 |
| −123.5 | −12.35° | 0 | 1 | 1 | 1 | 1 | 0 | 0 | 0 |
| −122.5 | −12.25° | 0 | 0 | 1 | 1 | 1 | 1 | 0 | 0 |
| −121.5 | −12.15° | 0 | 0 | 0 | 1 | 1 | 1 | 1 | 1 |
| −120.5 | −12.05° | 0 | 0 | 0 | 0 | 1 | 1 | 1 | 1 |
| −119.5 | −11.95° | 1 | 0 | 0 | 0 | 0 | 1 | 1 | 1 |
| −118.5 | −11.85° | 1 | 1 | 0 | 0 | 0 | 0 | 0 | 1 |
| −117.5 | −11.75° | 1 | 1 | 1 | 0 | 0 | 0 | 0 | 0 |
| −116.5 | −11.65° | 1 | 1 | 1 | 1 | 0 | 0 | 0 | 0 |
| −115.5 | −11.55° | 0 | 1 | 1 | 1 | 1 | 0 | 0 | 0 |
| −114.5 | −11.45° | 0 | 0 | 1 | 1 | 1 | 1 | 1 | 0 |
| −113.5 | −11.35° | 0 | 0 | 0 | 1 | 1 | 1 | 1 | 1 |
| −112.5 | −11.25° | 0 | 0 | 0 | 0 | 1 | 1 | 1 | 1 |
| −111.5 | −11.15° | 1 | 0 | 0 | 0 | 0 | 0 | 1 | 1 |
| −110.5 | −11.05° | 1 | 1 | 0 | 0 | 0 | 0 | 0 | 1 |
| −109.5 | −10.95° | 1 | 1 | 1 | 0 | 0 | 0 | 0 | 0 |
| −108.5 | −10.85° | 1 | 1 | 1 | 1 | 0 | 0 | 0 | 0 |
| −107.5 | −10.75° | 0 | 1 | 1 | 1 | 1 | 0 | 0 | 0 |
| −106.5 | −10.65° | 0 | 0 | 1 | 1 | 1 | 1 | 1 | 0 |
| −105.5 | −10.55° | 0 | 0 | 0 | 1 | 1 | 1 | 1 | 1 |
| −104.5 | −10.45° | 0 | 0 | 0 | 0 | 0 | 1 | 1 | 1 |
| −103.5 | −10.35° | 1 | 0 | 0 | 0 | 0 | 0 | 1 | 1 |
| −102.5 | −10.25° | 1 | 1 | 0 | 0 | 0 | 0 | 0 | 0 |
| −101.5 | −10.15° | 1 | 1 | 1 | 0 | 0 | 0 | 0 | 0 |
| −100.5 | −10.05° | 1 | 1 | 1 | 1 | 0 | 0 | 0 | 0 |
| −99.5 | −99.50° | 0 | 1 | 1 | 1 | 1 | 1 | 1 | 0 |
| −98.5 | −9.85° | 0 | 0 | 1 | 1 | 1 | 1 | 1 | 1 |
| −97.5 | −9.75° | 0 | 0 | 0 | 0 | 1 | 1 | 1 | 1 |
| −96.5 | −9.65° | 0 | 0 | 0 | 0 | 0 | 1 | 1 | 1 |
| −95.5 | −9.55° | 1 | 0 | 0 | 0 | 0 | 0 | 0 | 1 |
| −94.5 | −9.45° | 1 | 1 | 0 | 0 | 0 | 0 | 0 | 0 |
| −93.5 | −9.35° | 1 | 1 | 1 | 1 | 0 | 0 | 0 | 0 |
| −92.5 | −9.25° | 1 | 1 | 1 | 1 | 1 | 0 | 0 | 0 |
| −91.5 | −9.15° | 0 | 1 | 1 | 1 | 1 | 1 | 1 | 0 |
| −90.5 | −9.05° | 0 | 0 | 1 | 1 | 1 | 1 | 1 | 1 |

-continued

|       |         |   |   |   |   |   |   |   |   |
|-------|---------|---|---|---|---|---|---|---|---|
| −89.5 | −8.95°  | 0 | 0 | 0 | 0 | 1 | 1 | 1 | 1 |
| −88.5 | −8.85°  | 0 | 0 | 0 | 0 | 0 | 0 | 1 | 1 |
| −87.5 | −8.75°  | 1 | 0 | 0 | 0 | 0 | 0 | 0 | 1 |
| −86.5 | −8.65°  | 1 | 1 | 0 | 0 | 0 | 0 | 0 | 0 |
| −85.5 | −8.55°  | 1 | 1 | 1 | 1 | 0 | 0 | 0 | 0 |
| −84.5 | −8.45°  | 1 | 1 | 1 | 1 | 1 | 1 | 0 | 0 |
| −83.5 | −8.35°  | 0 | 1 | 1 | 1 | 1 | 1 | 1 | 1 |
| −82.5 | −8.25°  | 0 | 0 | 0 | 1 | 1 | 1 | 1 | 1 |
| −81.5 | −8.15°  | 0 | 0 | 0 | 0 | 1 | 1 | 1 | 1 |
| −80.5 | −8.05°  | 0 | 0 | 0 | 0 | 0 | 0 | 1 | 1 |
| −79.5 | −7.95°  | 1 | 0 | 0 | 0 | 0 | 0 | 0 | 0 |
| −78.5 | −7.85°  | 1 | 1 | 1 | 0 | 0 | 0 | 0 | 0 |
| −77.5 | −7.75°  | 1 | 1 | 1 | 1 | 1 | 0 | 0 | 0 |
| −76.5 | −7.65°  | 1 | 1 | 1 | 1 | 1 | 1 | 1 | 0 |
| −75.5 | −7.55°  | 0 | 1 | 1 | 1 | 1 | 1 | 1 | 1 |
| −74.5 | −7.45°  | 0 | 0 | 0 | 1 | 1 | 1 | 1 | 1 |
| −73.5 | −7.35°  | 0 | 0 | 0 | 0 | 0 | 1 | 1 | 1 |
| −72.5 | −7.25°  | 0 | 0 | 0 | 0 | 0 | 0 | 0 | 1 |
| −71.5 | −7.15°  | 1 | 0 | 0 | 0 | 0 | 0 | 0 | 0 |
| −70.5 | −7.05°  | 1 | 1 | 1 | 0 | 0 | 0 | 0 | 0 |
| −69.5 | −6.95°  | 1 | 1 | 1 | 1 | 1 | 0 | 0 | 0 |
| −68.5 | −6.85°  | 1 | 1 | 1 | 1 | 1 | 1 | 1 | 0 |
| −67.5 | −6.75°  | 0 | 1 | 1 | 1 | 1 | 1 | 1 | 1 |
| −66.5 | −6.65°  | 0 | 0 | 0 | 1 | 1 | 1 | 1 | 1 |
| −65.5 | −6.55°  | 0 | 0 | 0 | 0 | 0 | 1 | 1 | 1 |
| −64.5 | −6.45°  | 0 | 0 | 0 | 0 | 0 | 0 | 0 | 0 |
| −63.5 | −6.35°  | 1 | 0 | 0 | 0 | 0 | 0 | 0 | 0 |
| −62.5 | −6.25°  | 1 | 1 | 1 | 0 | 0 | 0 | 0 | 0 |
| −61.5 | −6.15°  | 1 | 1 | 1 | 1 | 1 | 1 | 0 | 0 |
| −60.5 | −6.05°  | 1 | 1 | 1 | 1 | 1 | 1 | 1 | 1 |
| −59.5 | −5.95°  | 0 | 1 | 1 | 1 | 1 | 1 | 1 | 1 |
| −58.5 | −5.85°  | 0 | 0 | 0 | 0 | 1 | 1 | 1 | 1 |
| −57.5 | −5.75°  | 0 | 0 | 0 | 0 | 0 | 0 | 1 | 1 |
| −56.5 | −5.65°  | 0 | 0 | 0 | 0 | 0 | 0 | 0 | 0 |
| −55.5 | −5.55°  | 1 | 0 | 0 | 0 | 0 | 0 | 0 | 0 |
| −54.5 | −5.45°  | 1 | 1 | 1 | 1 | 0 | 0 | 0 | 0 |
| −53.5 | −5.35°  | 1 | 1 | 1 | 1 | 1 | 1 | 1 | 0 |
| −52.5 | −5.25°  | 1 | 1 | 1 | 1 | 1 | 1 | 1 | 1 |
| −51.5 | −5.15°  | 0 | 1 | 1 | 1 | 1 | 1 | 1 | 1 |
| −50.5 | −5.05°  | 0 | 0 | 0 | 0 | 1 | 1 | 1 | 1 |
| −49.5 | −4.95°  | 0 | 0 | 0 | 0 | 0 | 0 | 0 | 1 |
| −48.5 | −4.85°  | 0 | 0 | 0 | 0 | 0 | 0 | 0 | 0 |
| −47.5 | −4.75°  | 1 | 1 | 0 | 0 | 0 | 0 | 0 | 0 |
| −46.5 | −4.65°  | 1 | 1 | 1 | 1 | 1 | 0 | 0 | 0 |
| −45.5 | −4.55°  | 1 | 1 | 1 | 1 | 1 | 1 | 1 | 0 |
| −44.5 | −4.45°  | 1 | 1 | 1 | 1 | 1 | 1 | 1 | 1 |
| −43.5 | −4.35°  | 0 | 0 | 1 | 1 | 1 | 1 | 1 | 1 |
| −42.5 | −4.25°  | 0 | 0 | 0 | 0 | 0 | 1 | 1 | 1 |
| −41.5 | −4.15°  | 0 | 0 | 0 | 0 | 0 | 0 | 0 | 0 |
| −40.5 | −4.05°  | 0 | 0 | 0 | 0 | 0 | 0 | 0 | 0 |
| −39.5 | −3.95°  | 1 | 1 | 0 | 0 | 0 | 0 | 0 | 0 |
| −38.5 | −3.85°  | 1 | 1 | 1 | 1 | 1 | 1 | 0 | 0 |
| −37.5 | −3.75°  | 1 | 1 | 1 | 1 | 1 | 1 | 1 | 1 |
| −36.5 | −3.65°  | 1 | 1 | 1 | 1 | 1 | 1 | 1 | 1 |
| −35.5 | −3.55°  | 0 | 0 | 1 | 1 | 1 | 1 | 1 | 1 |
| −34.5 | −3.45°  | 0 | 0 | 0 | 0 | 0 | 0 | 1 | 1 |
| −33.5 | −3.35°  | 0 | 0 | 0 | 0 | 0 | 0 | 0 | 0 |
| −32.5 | −3.25°  | 0 | 0 | 0 | 0 | 0 | 0 | 0 | 0 |
| −31.5 | −3.15°  | 1 | 1 | 0 | 0 | 0 | 0 | 0 | 0 |
| −30.5 | −3.05°  | 1 | 1 | 1 | 1 | 1 | 1 | 1 | 0 |
| −29.5 | −2.95°  | 1 | 1 | 1 | 1 | 1 | 1 | 1 | 1 |
| −28.5 | −2.85°  | 1 | 1 | 1 | 1 | 1 | 1 | 1 | 1 |
| −27.5 | −2.75°  | 0 | 0 | 0 | 1 | 1 | 1 | 1 | 1 |
| −26.5 | −2.65°  | 0 | 0 | 0 | 0 | 0 | 0 | 0 | 0 |
| −25.5 | −2.55°  | 0 | 0 | 0 | 0 | 0 | 0 | 0 | 0 |
| −24.5 | −2.45°  | 0 | 0 | 0 | 0 | 0 | 0 | 0 | 0 |
| −23.5 | −2.35°  | 1 | 1 | 1 | 0 | 0 | 0 | 0 | 0 |
| −22.5 | −2.25°  | 1 | 1 | 1 | 1 | 1 | 1 | 1 | 1 |
| −21.5 | −2.15°  | 1 | 1 | 1 | 1 | 1 | 1 | 1 | 1 |
| −20.5 | −2.05°  | 1 | 1 | 1 | 1 | 1 | 1 | 1 | 1 |
| −19.5 | −1.95°  | 0 | 0 | 0 | 0 | 1 | 1 | 1 | 1 |
| −18.5 | −1.85°  | 0 | 0 | 0 | 0 | 0 | 0 | 0 | 0 |
| −17.5 | −1.75°  | 0 | 0 | 0 | 0 | 0 | 0 | 0 | 0 |
| −16.5 | −1.65°  | 0 | 0 | 0 | 0 | 0 | 0 | 0 | 0 |
| −15.5 | −1.55°  | 1 | 1 | 1 | 1 | 1 | 0 | 0 | 0 |
| −14.5 | −1.45°  | 1 | 1 | 1 | 1 | 1 | 1 | 1 | 1 |
| −13.5 | −1.35°  | 1 | 1 | 1 | 1 | 1 | 1 | 1 | 1 |
| −12.5 | −1.25°  | 1 | 1 | 1 | 1 | 1 | 1 | 1 | 1 |
| −11.5 | −1.15°  | 0 | 0 | 0 | 0 | 0 | 0 | 1 | 1 |

-continued

| | | | | | | | | | |
|---|---|---|---|---|---|---|---|---|---|
| −10.5 | −1.05° | 0 | 0 | 0 | 0 | 0 | 0 | 0 | 0 |
| −9.5 | −0.95° | 0 | 0 | 0 | 0 | 0 | 0 | 0 | 0 |
| −8.5 | −0.85° | 0 | 0 | 0 | 0 | 0 | 0 | 0 | 0 |
| −7.5 | −0.75° | 1 | 1 | 1 | 1 | 1 | 1 | 1 | 1 |
| −6.5 | −0.65° | 1 | 1 | 1 | 1 | 1 | 1 | 1 | 1 |
| −5.5 | −0.55° | 1 | 1 | 1 | 1 | 1 | 1 | 1 | 1 |
| −4.5 | −0.45° | 1 | 1 | 1 | 1 | 1 | 1 | 1 | 1 |
| −3.5 | −0.35° | 0 | 0 | 0 | 0 | 0 | 0 | 0 | 0 |
| −2.5 | −0.25° | 0 | 0 | 0 | 0 | 0 | 0 | 0 | 0 |
| −1.5 | −0.15° | 0 | 0 | 0 | 0 | 0 | 0 | 0 | 0 |
| −0.5 | −0.05° | 0 | 0 | 0 | 0 | 0 | 0 | 0 | 0 |
| +0.5 | +0.05° | 1 | 1 | 1 | 1 | 1 | 1 | 1 | 1 |
| +1.5 | +0.15° | 1 | 1 | 1 | 1 | 1 | 1 | 1 | 1 |
| +2.5 | +0.25° | 1 | 1 | 1 | 1 | 1 | 1 | 1 | 1 |
| +3.5 | +0.35° | 1 | 1 | 1 | 1 | 1 | 1 | 1 | 1 |
| +4.5 | +0.45° | 0 | 0 | 0 | 0 | 0 | 0 | 0 | 0 |
| +5.5 | +0.55° | 0 | 0 | 0 | 0 | 0 | 0 | 0 | 0 |
| +6.5 | +0.65° | 0 | 0 | 0 | 0 | 0 | 0 | 0 | 0 |
| +7.5 | +0.75° | 0 | 0 | 0 | 0 | 0 | 0 | 0 | 0 |
| +8.5 | +0.85° | 1 | 1 | 1 | 1 | 1 | 1 | 1 | 1 |
| +9.5 | +0.95° | 1 | 1 | 1 | 1 | 1 | 1 | 1 | 1 |
| +10.5 | +1.05° | 1 | 1 | 1 | 1 | 1 | 1 | 1 | 1 |
| +11.5 | +1.15° | 1 | 1 | 1 | 1 | 1 | 1 | 0 | 0 |
| +12.5 | +1.25° | 0 | 0 | 0 | 0 | 0 | 0 | 0 | 0 |
| +13.5 | +1.35° | 0 | 0 | 0 | 0 | 0 | 0 | 0 | 0 |
| +14.5 | +1.45° | 0 | 0 | 0 | 0 | 0 | 0 | 0 | 0 |
| +15.5 | +1.55° | 0 | 0 | 0 | 0 | 0 | 1 | 1 | 1 |
| +16.5 | +1.65° | 1 | 1 | 1 | 1 | 1 | 1 | 1 | 1 |
| +17.5 | +1.75° | 1 | 1 | 1 | 1 | 1 | 1 | 1 | 1 |
| +18.5 | +1.85° | 1 | 1 | 1 | 1 | 1 | 1 | 1 | 1 |
| +19.5 | +1.95° | 1 | 1 | 1 | 1 | 0 | 0 | 0 | 0 |
| +20.5 | +2.05° | 0 | 0 | 0 | 0 | 0 | 0 | 0 | 0 |
| +21.5 | +2.15° | 0 | 0 | 0 | 0 | 0 | 0 | 0 | 0 |
| +22.5 | +2.25° | 0 | 0 | 0 | 0 | 0 | 0 | 0 | 0 |
| +23.5 | +2.35° | 0 | 0 | 0 | 1 | 1 | 1 | 1 | 1 |
| +24.5 | +2.45° | 1 | 1 | 1 | 1 | 1 | 1 | 1 | 1 |
| +25.5 | +2.55° | 1 | 1 | 1 | 1 | 1 | 1 | 1 | 1 |
| +26.5 | +2.65° | 1 | 1 | 1 | 1 | 1 | 1 | 1 | 1 |
| +27.5 | +2.75° | 1 | 1 | 1 | 0 | 0 | 0 | 0 | 0 |
| +28.5 | +2.85° | 0 | 0 | 0 | 0 | 0 | 0 | 0 | 0 |
| +29.5 | +2.95° | 0 | 0 | 0 | 0 | 0 | 0 | 0 | 0 |
| +30.5 | +3.05° | 0 | 0 | 0 | 0 | 0 | 0 | 0 | 1 |
| +31.5 | +3.15° | 0 | 0 | 1 | 1 | 1 | 1 | 1 | 1 |
| +32.5 | +3.25° | 1 | 1 | 1 | 1 | 1 | 1 | 1 | 1 |
| +33.5 | +3.35° | 1 | 1 | 1 | 1 | 1 | 1 | 1 | 1 |
| +34.5 | +3.45° | 1 | 1 | 1 | 1 | 1 | 1 | 0 | 0 |
| +35.5 | +3.55° | 1 | 1 | 0 | 0 | 0 | 0 | 0 | 0 |
| +36.5 | +3.65° | 0 | 0 | 0 | 0 | 0 | 0 | 0 | 0 |
| +37.5 | +3.75° | 0 | 0 | 0 | 0 | 0 | 0 | 0 | 0 |
| +38.5 | +3.85° | 0 | 0 | 0 | 0 | 0 | 0 | 1 | 1 |
| +39.5 | +3.95° | 0 | 0 | 1 | 1 | 1 | 1 | 1 | 1 |
| +40.5 | +4.05° | 1 | 1 | 1 | 1 | 1 | 1 | 1 | 1 |
| +41.5 | +4.15° | 1 | 1 | 1 | 1 | 1 | 1 | 1 | 1 |
| +42.5 | +4.25° | 1 | 1 | 1 | 1 | 1 | 0 | 0 | 0 |
| +43.5 | +4.35° | 1 | 1 | 0 | 0 | 0 | 0 | 0 | 0 |
| +44.5 | +4.45° | 0 | 0 | 0 | 0 | 0 | 0 | 0 | 0 |
| +45.5 | +4.55° | 0 | 0 | 0 | 0 | 0 | 0 | 0 | 0 |
| +46.5 | +4.65° | 0 | 0 | 0 | 0 | 0 | 1 | 1 | 1 |
| +47.5 | +4.75° | 0 | 0 | 1 | 1 | 1 | 1 | 1 | 1 |
| +48.5 | +4.85° | 1 | 1 | 1 | 1 | 1 | 1 | 1 | 1 |
| +49.5 | +4.95° | 1 | 1 | 1 | 1 | 1 | 1 | 1 | 0 |
| +50.5 | +5.05° | 1 | 1 | 1 | 1 | 0 | 0 | 0 | 0 |
| +51.5 | +5.15° | 1 | 0 | 0 | 0 | 0 | 0 | 0 | 0 |
| +52.5 | +5.25° | 0 | 0 | 0 | 0 | 0 | 0 | 0 | 0 |
| +53.5 | +5.35° | 0 | 0 | 0 | 0 | 0 | 0 | 0 | 1 |
| +54.5 | +5.45° | 0 | 0 | 0 | 0 | 1 | 1 | 1 | 1 |
| +55.5 | +5.55° | 0 | 1 | 1 | 1 | 1 | 1 | 1 | 1 |
| +56.5 | +5.65° | 1 | 1 | 1 | 1 | 1 | 1 | 1 | 1 |
| +57.5 | +5.75° | 1 | 1 | 1 | 1 | 1 | 1 | 0 | 0 |
| +58.5 | +5.85° | 1 | 1 | 1 | 1 | 0 | 0 | 0 | 0 |
| +59.5 | +5.95° | 1 | 0 | 0 | 0 | 0 | 0 | 0 | 0 |
| +60.5 | +6.05° | 0 | 0 | 0 | 0 | 0 | 0 | 0 | 0 |
| +61.5 | +6.15° | 0 | 0 | 0 | 0 | 0 | 0 | 1 | 1 |
| +62.5 | +6.25° | 0 | 0 | 0 | 1 | 1 | 1 | 1 | 1 |
| +63.5 | +6.35° | 0 | 1 | 1 | 1 | 1 | 1 | 1 | 1 |
| +64.5 | +6.45° | 1 | 1 | 1 | 1 | 1 | 1 | 1 | 1 |
| +65.5 | +6.55° | 1 | 1 | 1 | 1 | 1 | 0 | 0 | 0 |
| +66.5 | +6.65° | 1 | 1 | 1 | 0 | 0 | 0 | 0 | 0 |
| +67.5 | +6.75° | 1 | 0 | 0 | 0 | 0 | 0 | 0 | 0 |

-continued

| | | | | | | | | | |
|---|---|---|---|---|---|---|---|---|---|
| +68.5 | +6.85° | 0 | 0 | 0 | 0 | 0 | 0 | 0 | 1 |
| +69.5 | +6.95° | 0 | 0 | 0 | 0 | 0 | 1 | 1 | 1 |
| +70.5 | +7.05° | 0 | 0 | 0 | 1 | 1 | 1 | 1 | 1 |
| +71.5 | +7.15° | 0 | 1 | 1 | 1 | 1 | 1 | 1 | 1 |
| +72.5 | +7.25° | 1 | 1 | 1 | 1 | 1 | 1 | 1 | 0 |
| +73.5 | +7.35° | 1 | 1 | 1 | 1 | 1 | 0 | 0 | 0 |
| +74.5 | +7.45° | 1 | 1 | 1 | 0 | 0 | 0 | 0 | 0 |
| +75.5 | +7.55° | 1 | 0 | 0 | 0 | 0 | 0 | 0 | 0 |
| +76.5 | +7.65° | 0 | 0 | 0 | 0 | 0 | 0 | 0 | 1 |
| +77.5 | +7.75° | 0 | 0 | 0 | 0 | 0 | 1 | 1 | 1 |
| +78.5 | +7.85° | 0 | 0 | 0 | 1 | 1 | 1 | 1 | 1 |
| +79.5 | +7.95° | 0 | 1 | 1 | 1 | 1 | 1 | 1 | 1 |
| +80.5 | +8.05° | 1 | 1 | 1 | 1 | 1 | 1 | 0 | 0 |
| +81.5 | +8.15° | 1 | 1 | 1 | 1 | 0 | 0 | 0 | 0 |
| +82.5 | +8.25° | 1 | 1 | 1 | 0 | 0 | 0 | 0 | 0 |
| +83.5 | +8.35° | 1 | 0 | 0 | 0 | 0 | 0 | 0 | 0 |
| +84.5 | +8.45° | 0 | 0 | 0 | 0 | 0 | 0 | 1 | 1 |
| +85.5 | +8.55° | 0 | 0 | 0 | 0 | 1 | 1 | 1 | 1 |
| +86.5 | +8.65° | 0 | 0 | 1 | 1 | 1 | 1 | 1 | 1 |
| +87.5 | +8.75° | 0 | 1 | 1 | 1 | 1 | 1 | 1 | 0 |
| +88.5 | +8.85° | 1 | 1 | 1 | 1 | 1 | 1 | 0 | 0 |
| +89.5 | +8.95° | 1 | 1 | 1 | 1 | 0 | 0 | 0 | 0 |
| +90.5 | +9.05° | 1 | 1 | 0 | 0 | 0 | 0 | 0 | 0 |
| +91.5 | +9.15° | 1 | 0 | 0 | 0 | 0 | 0 | 0 | 1 |
| +92.5 | +9.25° | 0 | 0 | 0 | 0 | 0 | 1 | 1 | 1 |
| +93.5 | +9.35° | 0 | 0 | 0 | 0 | 1 | 1 | 1 | 1 |
| +94.5 | +9.45° | 0 | 0 | 1 | 1 | 1 | 1 | 1 | 1 |
| +95.5 | +9.55° | 0 | 1 | 1 | 1 | 1 | 1 | 1 | 0 |
| +96.5 | +9.65° | 1 | 1 | 1 | 1 | 1 | 0 | 0 | 0 |
| +97.5 | +9.75° | 1 | 1 | 1 | 1 | 0 | 0 | 0 | 0 |
| +98.5 | +9.85° | 1 | 1 | 0 | 0 | 0 | 0 | 0 | 0 |
| +99.5 | +9.95° | 1 | 0 | 0 | 0 | 0 | 0 | 0 | 1 |
| +100.5 | +10.05° | 0 | 0 | 0 | 0 | 0 | 1 | 1 | 1 |
| +101.5 | +10.15° | 0 | 0 | 0 | 0 | 1 | 1 | 1 | 1 |
| +102.5 | +10.25° | 0 | 0 | 1 | 1 | 1 | 1 | 1 | 1 |
| +103.5 | +10.35° | 0 | 1 | 1 | 1 | 1 | 1 | 0 | 0 |
| +104.5 | +10.45° | 1 | 1 | 1 | 1 | 1 | 0 | 0 | 0 |
| +105.5 | +10.55° | 1 | 1 | 1 | 0 | 0 | 0 | 0 | 0 |
| +106.5 | +10.65° | 1 | 1 | 0 | 0 | 0 | 0 | 0 | 1 |
| +107.5 | +10.75° | 1 | 0 | 0 | 0 | 0 | 0 | 1 | 1 |
| +108.5 | +10.85° | 0 | 0 | 0 | 0 | 0 | 1 | 1 | 1 |
| +109.5 | +10.95° | 0 | 0 | 0 | 1 | 1 | 1 | 1 | 1 |
| +110.5 | +11.05° | 0 | 0 | 1 | 1 | 1 | 1 | 1 | 0 |
| +111.5 | +11.15° | 0 | 1 | 1 | 1 | 1 | 1 | 0 | 0 |
| +112.5 | +11.25° | 1 | 1 | 1 | 1 | 0 | 0 | 0 | 0 |
| +113.5 | +11.35° | 1 | 1 | 1 | 0 | 0 | 0 | 0 | 0 |
| +114.5 | +11.45° | 1 | 1 | 0 | 0 | 0 | 0 | 0 | 1 |
| +115.5 | +11.55° | 1 | 0 | 0 | 0 | 0 | 0 | 1 | 1 |
| +116.5 | +11.65° | 0 | 0 | 0 | 0 | 1 | 1 | 1 | 1 |
| +117.5 | +11.75° | 0 | 0 | 0 | 1 | 1 | 1 | 1 | 1 |
| +118.5 | +11.85° | 0 | 0 | 1 | 1 | 1 | 1 | 1 | 0 |
| +119.5 | +11.95° | 0 | 1 | 1 | 1 | 1 | 0 | 0 | 0 |
| +120.5 | +12.05° | 1 | 1 | 1 | 1 | 0 | 0 | 0 | 0 |
| +121.5 | +12.15° | 1 | 1 | 1 | 0 | 0 | 0 | 0 | 0 |
| +122.5 | +12.25° | 1 | 1 | 0 | 0 | 0 | 0 | 1 | 1 |
| +123.5 | +12.35° | 1 | 0 | 0 | 0 | 0 | 1 | 1 | 1 |
| +124.5 | +12.45° | 0 | 0 | 0 | 0 | 1 | 1 | 1 | 1 |
| +125.5 | +12.55° | 0 | 0 | 0 | 1 | 1 | 1 | 1 | 0 |
| +126.5 | +12.65° | 0 | 0 | 1 | 1 | 1 | 1 | 0 | 0 |
| +127.5 | +12.75° | 0 | 1 | 1 | 1 | 1 | 0 | 0 | 0 |
| +128.5 | +12.85° | 1 | 1 | 1 | 1 | 0 | 0 | 0 | 0 |
| +129.5 | +12.95° | 1 | 1 | 1 | 0 | 0 | 0 | 0 | 1 |
| +130.5 | +13.05° | 1 | 1 | 0 | 0 | 0 | 0 | 1 | 1 |
| +131.5 | +13.15° | 1 | 0 | 0 | 0 | 0 | 1 | 1 | 1 |
| +132.5 | +13.25° | 0 | 0 | 0 | 0 | 1 | 1 | 1 | 1 |
| +133.5 | +13.35° | 0 | 0 | 0 | 1 | 1 | 1 | 1 | 0 |
| +134.5 | +13.45° | 0 | 0 | 1 | 1 | 1 | 1 | 0 | 0 |
| +135.5 | +13.55° | 0 | 1 | 1 | 1 | 1 | 0 | 0 | 0 |
| +136.5 | +13.65° | 1 | 1 | 1 | 1 | 0 | 0 | 0 | 0 |
| +137.5 | +13.75° | 1 | 1 | 1 | 0 | 0 | 0 | 0 | 1 |
| +138.5 | +13.85° | 1 | 1 | 0 | 0 | 0 | 0 | 1 | 1 |
| +139.5 | +13.95° | 1 | 0 | 0 | 0 | 0 | 1 | 1 | 1 |
| +140.5 | +14.05° | 0 | 0 | 0 | 0 | 1 | 1 | 1 | 1 |
| +141.5 | +14.15° | 0 | 0 | 0 | 1 | 1 | 1 | 1 | 0 |
| +142.5 | +14.25° | 0 | 0 | 1 | 1 | 1 | 1 | 0 | 0 |
| +143.5 | +14.35° | 0 | 1 | 1 | 1 | 1 | 0 | 0 | 0 |
| +144.5 | +14.45° | 1 | 1 | 1 | 1 | 0 | 0 | 0 | 0 |
| +145.5 | +14.55° | 1 | 1 | 0 | 0 | 0 | 0 | 1 | 1 |
| +146.5 | +14.65° | 1 | 0 | 0 | 0 | 0 | 1 | 1 | 1 |

-continued

| | | | | | | | | | |
|---|---|---|---|---|---|---|---|---|---|
| +147.5 | +14.75° | 0 | 0 | 0 | 0 | 1 | 1 | 1 | 1 |
| +148.5 | +14.85° | 0 | 0 | 0 | 1 | 1 | 1 | 1 | 0 |
| +149.5 | +14.95° | 0 | 0 | 1 | 1 | 1 | 1 | 0 | 0 |
| +150.5 | +15.05° | 0 | 1 | 1 | 1 | 1 | 0 | 0 | 0 |
| +151.5 | +15.15° | 1 | 1 | 1 | 1 | 0 | 0 | 0 | 0 |
| +152.5 | +15.25° | 1 | 1 | 1 | 0 | 0 | 0 | 0 | 1 |
| +153.5 | +15.35° | 1 | 1 | 0 | 0 | 0 | 0 | 1 | 1 |
| +154.5 | +15.45° | 1 | 0 | 0 | 0 | 0 | 1 | 1 | 1 |
| +155.5 | +15.55° | 0 | 0 | 0 | 0 | 1 | 1 | 1 | 1 |
| +156.5 | +15.65° | 0 | 0 | 0 | 1 | 1 | 1 | 1 | 0 |
| +157.5 | +15.75° | 0 | 0 | 1 | 1 | 1 | 1 | 0 | 0 |
| +158.5 | +15.85° | 0 | 1 | 1 | 1 | 1 | 0 | 0 | 0 |
| +159.5 | +15.95° | 1 | 1 | 1 | 1 | 0 | 0 | 0 | 0 |
| +160.5 | +16.05° | 1 | 1 | 1 | 0 | 0 | 0 | 0 | 1 |
| +161.5 | +16.15° | 1 | 1 | 0 | 0 | 0 | 0 | 1 | 1 |
| +162.5 | +16.25° | 1 | 0 | 0 | 0 | 0 | 1 | 1 | 1 |
| +163.5 | +16.35° | 0 | 0 | 0 | 0 | 1 | 1 | 1 | 1 |
| +164.5 | +16.45° | 0 | 0 | 0 | 1 | 1 | 1 | 1 | 0 |
| +165.5 | +16.55° | 0 | 0 | 1 | 1 | 1 | 1 | 0 | 0 |
| +166.5 | +16.65° | 0 | 1 | 1 | 1 | 1 | 0 | 0 | 0 |
| +167.5 | +16.75° | 1 | 1 | 1 | 1 | 0 | 0 | 0 | 1 |
| +168.5 | +16.85° | 1 | 1 | 1 | 0 | 0 | 0 | 1 | 1 |
| +169.5 | +16.95° | 1 | 1 | 0 | 0 | 0 | 0 | 1 | 1 |
| +170.5 | +17.05° | 1 | 0 | 0 | 0 | 0 | 1 | 1 | 1 |
| +171.5 | +17.15° | 0 | 0 | 0 | 0 | 1 | 1 | 1 | 0 |
| +172.5 | +17.25° | 0 | 0 | 0 | 1 | 1 | 1 | 0 | 0 |
| +173.5 | +17.35° | 0 | 0 | 1 | 1 | 1 | 0 | 0 | 0 |
| +174.5 | +17.45° | 0 | 1 | 1 | 1 | 1 | 0 | 0 | 0 |
| +175.5 | +17.55° | 1 | 1 | 1 | 1 | 0 | 0 | 0 | 1 |
| +176.5 | +17.65° | 1 | 1 | 1 | 0 | 0 | 0 | 1 | 1 |
| +177.5 | +17.75° | 1 | 1 | 0 | 0 | 0 | 1 | 1 | 1 |
| +178.5 | +17.85° | 1 | 0 | 0 | 0 | 1 | 1 | 1 | 1 |
| +179.5 | +17.95° | 0 | 0 | 0 | 0 | 1 | 1 | 1 | 0 |
| +180.5 | +18.05° | 0 | 0 | 0 | 1 | 1 | 1 | 0 | 0 |
| +181.5 | +18.15° | 0 | 0 | 1 | 1 | 1 | 0 | 0 | 0 |
| +182.5 | +18.25° | 0 | 1 | 1 | 1 | 0 | 0 | 0 | 0 |
| +183.5 | +18.35° | 1 | 1 | 1 | 1 | 0 | 0 | 0 | 1 |
| +184.5 | +18.45° | 1 | 1 | 1 | 0 | 0 | 0 | 1 | 1 |
| +185.5 | +18.55° | 1 | 1 | 0 | 0 | 0 | 1 | 1 | 1 |
| +186.5 | +18.65° | 1 | 0 | 0 | 0 | 1 | 1 | 1 | 0 |
| +187.5 | +18.75° | 0 | 0 | 0 | 1 | 1 | 1 | 1 | 0 |
| +188.5 | +18.85° | 0 | 0 | 0 | 1 | 1 | 1 | 0 | 0 |
| +189.5 | +18.95° | 0 | 0 | 1 | 1 | 1 | 0 | 0 | 0 |
| +190.5 | +19.05° | 0 | 1 | 1 | 1 | 0 | 0 | 0 | 1 |
| +191.5 | +19.15° | 1 | 1 | 1 | 0 | 0 | 0 | 1 | 1 |
| +192.5 | +19.25° | 1 | 1 | 1 | 0 | 0 | 0 | 1 | 1 |
| +193.5 | +19.35° | 1 | 1 | 0 | 0 | 0 | 1 | 1 | 1 |
| +194.5 | +19.45° | 1 | 0 | 0 | 0 | 1 | 1 | 1 | 0 |
| +195.5 | +19.55° | 0 | 0 | 0 | 1 | 1 | 1 | 0 | 0 |
| +196.5 | +19.65° | 0 | 0 | 0 | 1 | 1 | 1 | 0 | 0 |
| +197.5 | +19.75° | 0 | 0 | 1 | 1 | 1 | 0 | 0 | 0 |
| +198.5 | +19.85° | 0 | 1 | 1 | 1 | 0 | 0 | 0 | 1 |
| +199.5 | +19.95° | 1 | 1 | 1 | 0 | 0 | 0 | 1 | 1 |
| +200.5 | +20.05° | 1 | 1 | 1 | 0 | 0 | 1 | 1 | 1 |
| +201.5 | +20.15° | 1 | 1 | 0 | 0 | 0 | 1 | 1 | 1 |
| +202.5 | +20.25° | 1 | 0 | 0 | 0 | 1 | 1 | 1 | 0 |
| +203.5 | +20.35° | 0 | 0 | 0 | 1 | 1 | 1 | 0 | 0 |
| +204.5 | +20.45° | 0 | 0 | 0 | 1 | 1 | 1 | 0 | 0 |
| +205.5 | +20.55° | 0 | 0 | 1 | 1 | 1 | 0 | 0 | 1 |
| +206.5 | +20.65° | 0 | 1 | 1 | 1 | 0 | 0 | 0 | 1 |
| +207.5 | +20.75° | 1 | 1 | 1 | 0 | 0 | 0 | 1 | 1 |
| +208.5 | +20.85° | 1 | 1 | 0 | 0 | 0 | 1 | 1 | 1 |
| +209.5 | +20.95° | 1 | 1 | 0 | 0 | 0 | 1 | 1 | 0 |
| +210.5 | +21.05° | 1 | 0 | 0 | 0 | 1 | 1 | 1 | 0 |
| +211.5 | +21.15° | 0 | 0 | 0 | 1 | 1 | 1 | 0 | 0 |
| +212.5 | +21.25° | 0 | 0 | 1 | 1 | 1 | 0 | 0 | 0 |
| +213.5 | +21.35° | 0 | 0 | 1 | 1 | 0 | 0 | 0 | 1 |
| +214.5 | +21.45° | 0 | 1 | 1 | 1 | 0 | 0 | 1 | 1 |
| +215.5 | +21.55° | 1 | 1 | 1 | 0 | 0 | 0 | 1 | 1 |
| +216.5 | +21.65° | 1 | 1 | 0 | 0 | 0 | 1 | 1 | 1 |
| +217.5 | +21.75° | 1 | 1 | 0 | 0 | 1 | 1 | 1 | 0 |
| +218.5 | +21.85° | 1 | 0 | 0 | 0 | 1 | 1 | 0 | 0 |
| +219.5 | +21.95° | 0 | 0 | 0 | 1 | 1 | 1 | 0 | 0 |
| +220.5 | +22.05° | 0 | 0 | 1 | 1 | 1 | 0 | 0 | 0 |
| +221.5 | +22.15° | 0 | 0 | 1 | 1 | 0 | 0 | 0 | 1 |
| +222.5 | +22.25° | 0 | 1 | 1 | 1 | 0 | 0 | 1 | 1 |
| +223.5 | +22.35° | 1 | 1 | 1 | 0 | 0 | 0 | 1 | 1 |
| +224.5 | +22.45° | 1 | 1 | 0 | 0 | 0 | 1 | 1 | 1 |
| +225.5 | +22.55° | 1 | 1 | 0 | 0 | 1 | 1 | 1 | 0 |

-continued

| | | | | | | | | | |
|---|---|---|---|---|---|---|---|---|---|
| +226.5 | +22.65° | 1 | 0 | 0 | 0 | 1 | 1 | 0 | 0 |
| +227.5 | +22.75° | 0 | 0 | 0 | 1 | 1 | 0 | 0 | 0 |
| +228.5 | +22.85° | 0 | 0 | 1 | 1 | 1 | 0 | 0 | 1 |
| +229.5 | +22.95° | 0 | 0 | 1 | 1 | 0 | 0 | 0 | 1 |
| +230.5 | +23.05° | 0 | 1 | 1 | 1 | 0 | 0 | 1 | 1 |
| +231.5 | +23.15° | 1 | 1 | 1 | 0 | 0 | 1 | 1 | 1 |
| +232.5 | +23.25° | 1 | 1 | 0 | 0 | 0 | 1 | 1 | 0 |
| +233.5 | +23.35° | 1 | 1 | 0 | 0 | 1 | 1 | 1 | 0 |
| +234.5 | +23.45° | 1 | 0 | 0 | 1 | 1 | 1 | 0 | 0 |
| +235.5 | +23.55° | 0 | 0 | 0 | 1 | 1 | 0 | 0 | 0 |
| +236.5 | +23.65° | 0 | 0 | 1 | 1 | 1 | 0 | 0 | 1 |
| +237.5 | +23.75° | 0 | 0 | 1 | 1 | 0 | 0 | 0 | 1 |
| +238.5 | +23.85° | 0 | 1 | 1 | 0 | 0 | 0 | 1 | 1 |
| +239.5 | +23.95° | 1 | 1 | 1 | 0 | 0 | 1 | 1 | 1 |
| +240.5 | +24.05° | 1 | 1 | 0 | 0 | 0 | 1 | 1 | 0 |
| +241.5 | +24.15° | 1 | 1 | 0 | 0 | 1 | 1 | 0 | 0 |
| +242.5 | +24.25° | 1 | 0 | 0 | 1 | 1 | 1 | 0 | 0 |
| +243.5 | +24.35° | 0 | 0 | 0 | 1 | 1 | 0 | 0 | 0 |
| +244.5 | +24.45° | 0 | 0 | 1 | 1 | 1 | 0 | 0 | 1 |
| +245.5 | +24.55° | 0 | 0 | 1 | 1 | 0 | 0 | 1 | 1 |
| +246.5 | +24.65° | 0 | 1 | 1 | 0 | 0 | 0 | 1 | 1 |
| +247.5 | +24.75° | 1 | 1 | 1 | 0 | 0 | 1 | 1 | 0 |
| +248.5 | +24.85° | 1 | 1 | 0 | 0 | 1 | 1 | 1 | 0 |
| +249.5 | +24.95° | 1 | 0 | 0 | 0 | 1 | 1 | 0 | 0 |
| +250.5 | +25.05° | 1 | 0 | 0 | 1 | 1 | 1 | 0 | 0 |
| +251.5 | +25.15° | 0 | 0 | 0 | 1 | 1 | 0 | 0 | 1 |
| +252.5 | +25.25° | 0 | 0 | 1 | 1 | 0 | 0 | 0 | 1 |
| +253.5 | +25.35° | 0 | 1 | 1 | 1 | 0 | 0 | 1 | 1 |
| +254.5 | +25.45° | 0 | 1 | 1 | 0 | 0 | 0 | 1 | 1 |
| +255.5 | +25.55° | 1 | 1 | 1 | 0 | 0 | 1 | 1 | 0 |
| +256.5 | +25.65° | 1 | 1 | 0 | 0 | 1 | 1 | 1 | 0 |
| +257.5 | +25.75° | 1 | 0 | 0 | 0 | 1 | 1 | 0 | 0 |
| +258.5 | +25.85° | 1 | 0 | 0 | 1 | 1 | 0 | 0 | 0 |
| +259.5 | +25.95° | 0 | 0 | 0 | 1 | 1 | 0 | 0 | 1 |
| +260.5 | +26.05° | 0 | 0 | 1 | 1 | 0 | 0 | 0 | 1 |
| +261.5 | +26.15° | 0 | 1 | 1 | 1 | 0 | 0 | 1 | 1 |
| +262.5 | +26.25° | 0 | 1 | 1 | 0 | 0 | 1 | 1 | 1 |
| +263.5 | +26.35° | 1 | 1 | 1 | 0 | 0 | 1 | 1 | 0 |
| +264.5 | +26.45° | 1 | 1 | 0 | 0 | 1 | 1 | 0 | 0 |
| +265.5 | +26.55° | 1 | 0 | 0 | 0 | 1 | 1 | 0 | 0 |
| +266.5 | +26.65° | 1 | 0 | 0 | 1 | 1 | 0 | 0 | 0 |
| +267.5 | +26.75° | 0 | 0 | 1 | 1 | 1 | 0 | 0 | 1 |
| +268.5 | +26.85° | 0 | 0 | 1 | 1 | 0 | 0 | 1 | 1 |
| +269.5 | +26.95° | 0 | 1 | 1 | 1 | 0 | 0 | 1 | 1 |
| +270.5 | +27.05° | 0 | 1 | 1 | 0 | 0 | 1 | 1 | 0 |
| +271.5 | +27.15° | 1 | 0 | 0 | 0 | 0 | 1 | 1 | 0 |
| +272.5 | +27.25° | 1 | 1 | 0 | 0 | 1 | 1 | 0 | 0 |
| +273.5 | +27.35° | 1 | 0 | 0 | 0 | 1 | 1 | 0 | 0 |
| +274.5 | +27.45° | 1 | 0 | 0 | 1 | 1 | 0 | 0 | 1 |
| +275.5 | +27.55° | 0 | 0 | 1 | 1 | 1 | 0 | 0 | 1 |
| +276.5 | +27.65° | 0 | 0 | 1 | 1 | 0 | 0 | 1 | 1 |
| +277.5 | +27.75° | 0 | 1 | 1 | 0 | 0 | 0 | 1 | 1 |
| +278.5 | +27.85° | 0 | 1 | 1 | 0 | 0 | 1 | 1 | 0 |
| +279.5 | +27.95° | 1 | 1 | 0 | 0 | 0 | 1 | 1 | 0 |
| +280.5 | +28.05° | 1 | 1 | 0 | 0 | 1 | 1 | 0 | 0 |
| +281.5 | +28.15° | 1 | 0 | 0 | 1 | 1 | 1 | 0 | 0 |
| +282.5 | +28.25° | 1 | 0 | 0 | 1 | 1 | 0 | 0 | 1 |
| +283.5 | +28.35° | 0 | 0 | 1 | 1 | 0 | 0 | 0 | 1 |
| +284.5 | +28.45° | 0 | 0 | 1 | 1 | 0 | 0 | 1 | 1 |
| +285.5 | +28.55° | 0 | 1 | 1 | 0 | 0 | 1 | 1 | 1 |
| +286.5 | +28.65° | 0 | 1 | 1 | 0 | 0 | 1 | 1 | 0 |
| +287.5 | +28.75° | 1 | 1 | 0 | 0 | 1 | 1 | 0 | 0 |
| +288.5 | +28.85° | 1 | 1 | 0 | 0 | 1 | 1 | 0 | 0 |
| +289.5 | +28.95° | 1 | 0 | 0 | 1 | 1 | 0 | 0 | 1 |
| +290.5 | +29.05° | 1 | 0 | 0 | 1 | 1 | 0 | 0 | 1 |
| +291.5 | +29.15° | 0 | 0 | 1 | 1 | 0 | 0 | 1 | 1 |
| +292.5 | +29.25° | 0 | 0 | 1 | 1 | 0 | 0 | 1 | 1 |
| +293.5 | +29.35° | 0 | 1 | 1 | 0 | 0 | 1 | 1 | 0 |
| +294.5 | +29.45° | 0 | 1 | 1 | 0 | 0 | 1 | 1 | 0 |
| +295.5 | +29.55° | 1 | 1 | 0 | 0 | 1 | 1 | 0 | 0 |
| +296.5 | +29.65° | 1 | 1 | 0 | 0 | 1 | 1 | 0 | 0 |
| +297.5 | +29.75° | 1 | 0 | 0 | 1 | 1 | 0 | 0 | 1 |
| +298.5 | +29.85° | 1 | 0 | 0 | 1 | 1 | 0 | 0 | 1 |
| +299.5 | +29.95° | 0 | 0 | 1 | 1 | 0 | 0 | 1 | 1 |
| +300.5 | +30.05° | 0 | 0 | 1 | 1 | 0 | 0 | 1 | 1 |
| +301.5 | +30.15° | 0 | 1 | 1 | 0 | 0 | 1 | 1 | 0 |
| +302.5 | +30.25° | 0 | 1 | 1 | 0 | 0 | 1 | 1 | 0 |
| +303.5 | +30.35° | 1 | 1 | 0 | 0 | 1 | 1 | 0 | 0 |
| +304.5 | +30.45° | 1 | 1 | 0 | 0 | 1 | 1 | 0 | 0 |

-continued

| | | | | | | | | | |
|---|---|---|---|---|---|---|---|---|---|
| +305.5 | +30.55° | 1 | 0 | 0 | 1 | 1 | 0 | 0 | 1 |
| +306.5 | +30.65° | 1 | 0 | 0 | 1 | 1 | 0 | 0 | 1 |
| +307.5 | +30.75° | 0 | 0 | 1 | 1 | 0 | 0 | 1 | 1 |
| +308.5 | +30.85° | 0 | 0 | 1 | 1 | 0 | 0 | 1 | 1 |
| +309.5 | +30.95° | 0 | 1 | 1 | 0 | 0 | 1 | 1 | 0 |
| +310.5 | +31.05° | 0 | 1 | 1 | 0 | 0 | 1 | 1 | 0 |
| +311.5 | +31.15° | 1 | 1 | 0 | 0 | 1 | 1 | 0 | 0 |
| +312.5 | +31.25° | 1 | 1 | 0 | 0 | 1 | 1 | 0 | 1 |
| +313.5 | +31.35° | 1 | 0 | 0 | 1 | 1 | 0 | 0 | 1 |
| +314.5 | +31.45° | 1 | 0 | 0 | 1 | 1 | 0 | 1 | 1 |
| +315.5 | +31.55° | 0 | 0 | 1 | 1 | 0 | 0 | 1 | 1 |
| +316.5 | +31.65° | 0 | 0 | 1 | 1 | 0 | 1 | 1 | 0 |
| +317.5 | +31.75° | 0 | 1 | 1 | 0 | 0 | 1 | 1 | 0 |
| +318.5 | +31.85° | 0 | 1 | 1 | 0 | 0 | 1 | 0 | 0 |
| +319.5 | +31.95° | 1 | 1 | 0 | 0 | 1 | 1 | 0 | 0 |
| +320.5 | +32.05° | 1 | 1 | 0 | 0 | 1 | 0 | 0 | 1 |
| +321.5 | +32.15° | 1 | 0 | 0 | 1 | 1 | 0 | 0 | 1 |
| +322.5 | +32.25° | 1 | 0 | 0 | 1 | 0 | 0 | 1 | 1 |
| +323.5 | +32.35° | 0 | 0 | 1 | 1 | 0 | 0 | 1 | 1 |
| +324.5 | +32.45° | 0 | 0 | 1 | 0 | 0 | 1 | 1 | 0 |
| +325.5 | +32.55° | 0 | 1 | 1 | 0 | 0 | 1 | 1 | 0 |
| +326.5 | +32.65° | 0 | 1 | 1 | 0 | 1 | 1 | 0 | 0 |
| +327.5 | +32.75° | 1 | 1 | 0 | 0 | 1 | 1 | 0 | 0 |
| +328.5 | +32.85° | 1 | 1 | 0 | 1 | 1 | 0 | 0 | 1 |
| +329.5 | +32.95° | 1 | 0 | 0 | 1 | 1 | 0 | 0 | 1 |
| +330.5 | +33.05° | 1 | 0 | 0 | 1 | 0 | 0 | 1 | 1 |
| +331.5 | +33.15° | 0 | 0 | 1 | 1 | 0 | 0 | 1 | 1 |
| +332.5 | +33.25° | 0 | 0 | 1 | 0 | 0 | 1 | 1 | 0 |
| +333.5 | +33.35° | 0 | 1 | 1 | 0 | 0 | 1 | 1 | 0 |
| +334.5 | +33.45° | 0 | 1 | 0 | 0 | 1 | 1 | 0 | 0 |
| +335.5 | +33.55° | 1 | 1 | 0 | 0 | 1 | 1 | 0 | 1 |
| +336.5 | +33.65° | 1 | 1 | 0 | 1 | 1 | 0 | 0 | 1 |
| +337.5 | +33.75° | 1 | 0 | 0 | 1 | 1 | 0 | 0 | 1 |
| +338.5 | +33.85° | 1 | 0 | 1 | 1 | 0 | 0 | 1 | 1 |
| +339.5 | +33.95° | 0 | 0 | 1 | 1 | 0 | 0 | 1 | 0 |
| +340.5 | +34.05° | 0 | 0 | 1 | 0 | 0 | 1 | 1 | 0 |
| +341.5 | +34.15° | 0 | 1 | 1 | 0 | 0 | 1 | 0 | 0 |
| +342.5 | +34.25° | 0 | 1 | 0 | 0 | 1 | 1 | 0 | 0 |
| +343.5 | +34.35° | 1 | 1 | 0 | 0 | 1 | 1 | 0 | 1 |
| +344.5 | +34.45° | 1 | 1 | 0 | 1 | 1 | 0 | 0 | 1 |
| +345.5 | +34.55° | 1 | 0 | 0 | 1 | 1 | 0 | 1 | 1 |
| +346.5 | +34.65° | 1 | 0 | 1 | 1 | 0 | 0 | 1 | 1 |
| +347.5 | +34.75° | 0 | 0 | 1 | 1 | 0 | 1 | 1 | 0 |
| +348.5 | +34.85° | 0 | 0 | 1 | 0 | 0 | 1 | 1 | 0 |
| +349.5 | +34.95° | 0 | 1 | 1 | 0 | 0 | 1 | 0 | 0 |
| +350.5 | +35.05° | 0 | 1 | 0 | 0 | 1 | 1 | 0 | 0 |
| +351.5 | +35.15° | 1 | 1 | 0 | 0 | 1 | 0 | 0 | 1 |
| +352.5 | +35.25° | 1 | 1 | 0 | 1 | 1 | 0 | 0 | 1 |
| +353.5 | +35.35° | 1 | 0 | 0 | 1 | 1 | 0 | 1 | 1 |
| +354.5 | +35.45° | 1 | 0 | 1 | 1 | 0 | 0 | 1 | 1 |
| +355.5 | +35.55° | 0 | 0 | 1 | 1 | 0 | 1 | 1 | 0 |
| +356.5 | +35.65° | 0 | 0 | 1 | 0 | 0 | 1 | 1 | 0 |
| +357.5 | +35.75° | 0 | 1 | 1 | 0 | 1 | 1 | 0 | 0 |
| +358.5 | +35.85° | 0 | 1 | 0 | 0 | 1 | 1 | 0 | 1 |
| +359.5 | +35.95° | 1 | 1 | 0 | 0 | 1 | 0 | 0 | 1 |
| +360.5 | +36.05° | 1 | 0 | 0 | 1 | 1 | 0 | 0 | 1 |
| +361.5 | +36.15° | 1 | 0 | 0 | 1 | 0 | 0 | 1 | 1 |
| +362.5 | +36.25° | 1 | 0 | 1 | 1 | 0 | 0 | 1 | 0 |
| +363.5 | +36.35° | 0 | 0 | 1 | 1 | 0 | 1 | 1 | 0 |
| +364.5 | +36.45° | 0 | 1 | 1 | 0 | 0 | 1 | 1 | 0 |
| +365.5 | +36.55° | 0 | 1 | 1 | 0 | 1 | 1 | 0 | 0 |
| +366.5 | +36.65° | 0 | 1 | 0 | 0 | 1 | 1 | 0 | 1 |
| +367.5 | +36.75° | 1 | 1 | 0 | 0 | 1 | 0 | 0 | 1 |
| +368.5 | +36.85° | 1 | 0 | 0 | 1 | 1 | 0 | 1 | 1 |
| +369.5 | +36.95° | 1 | 0 | 0 | 1 | 0 | 0 | 1 | 1 |
| +370.5 | +37.05° | 1 | 0 | 1 | 1 | 0 | 0 | 1 | 0 |
| +371.5 | +37.15° | 0 | 0 | 1 | 1 | 0 | 1 | 1 | 0 |
| +372.5 | +37.25° | 0 | 1 | 1 | 0 | 0 | 1 | 0 | 0 |
| +373.5 | +37.35° | 0 | 1 | 1 | 0 | 1 | 1 | 0 | 0 |
| +374.5 | +37.45° | 0 | 1 | 0 | 0 | 1 | 1 | 0 | 1 |
| +375.5 | +37.55° | 1 | 1 | 0 | 1 | 1 | 0 | 0 | 1 |
| +376.5 | +37.65° | 1 | 0 | 0 | 1 | 1 | 0 | 1 | 1 |
| +377.5 | +37.75° | 1 | 0 | 0 | 1 | 0 | 0 | 1 | 1 |
| +378.5 | +37.85° | 1 | 0 | 1 | 1 | 0 | 0 | 1 | 0 |
| +379.5 | +37.95° | 0 | 0 | 1 | 0 | 0 | 1 | 0 | 0 |
| +380.5 | +38.05° | 0 | 1 | 1 | 0 | 0 | 1 | 0 | 0 |
| +381.5 | +38.15° | 0 | 1 | 1 | 0 | 1 | 1 | 0 | 1 |
| +382.5 | +38.25° | 0 | 1 | 0 | 0 | 1 | 0 | 0 | 1 |
| +383.5 | +38.35° | 1 | 1 | 0 | 1 | 1 | 0 | 0 | 1 |

-continued

| | | | | | | | | | |
|---|---|---|---|---|---|---|---|---|---|
| +384.5 | +38.45° | 1 | 0 | 0 | 1 | 1 | 0 | 1 | 1 |
| +385.5 | +38.55° | 1 | 0 | 0 | 1 | 0 | 0 | 1 | 0 |
| +386.5 | +38.65° | 1 | 0 | 1 | 1 | 0 | 1 | 1 | 0 |
| +387.5 | +38.75° | 0 | 0 | 1 | 0 | 0 | 1 | 1 | 0 |
| +388.5 | +38.85° | 0 | 1 | 1 | 0 | 0 | 1 | 0 | 0 |
| +389.5 | +38.95° | 0 | 1 | 1 | 0 | 1 | 1 | 0 | 1 |
| +390.5 | +39.05° | 0 | 1 | 0 | 0 | 1 | 0 | 0 | 1 |
| +391.5 | +39.15° | 1 | 1 | 0 | 1 | 1 | 0 | 0 | 1 |
| +392.5 | +39.25° | 1 | 0 | 0 | 1 | 1 | 0 | 1 | 1 |
| +393.5 | +39.35° | 1 | 0 | 0 | 1 | 0 | 0 | 1 | 0 |
| +394.5 | +39.45° | 1 | 0 | 1 | 1 | 0 | 1 | 1 | 0 |
| +395.5 | +39.55° | 0 | 0 | 1 | 0 | 0 | 1 | 0 | 0 |
| +396.5 | +39.65° | 0 | 1 | 1 | 0 | 0 | 1 | 0 | 0 |
| +397.5 | +39.75° | 0 | 1 | 1 | 0 | 1 | 1 | 0 | 1 |
| +398.5 | +39.85° | 0 | 1 | 0 | 0 | 1 | 0 | 0 | 1 |
| +399.5 | +39.95° | 1 | 1 | 0 | 1 | 1 | 0 | 1 | 1 |
| +400.5 | +40.05° | 1 | 0 | 0 | 1 | 0 | 0 | 1 | 1 |
| +401.5 | +40.15° | 1 | 0 | 0 | 1 | 0 | 0 | 1 | 0 |
| +402.5 | +40.25° | 1 | 0 | 1 | 1 | 0 | 1 | 1 | 0 |
| +403.5 | +40.35° | 0 | 0 | 1 | 0 | 0 | 1 | 0 | 0 |
| +404.5 | +40.45° | 0 | 1 | 1 | 0 | 1 | 1 | 0 | 0 |
| +405.5 | +40.55° | 0 | 1 | 0 | 0 | 1 | 1 | 0 | 1 |
| +406.5 | +40.65° | 0 | 1 | 0 | 0 | 1 | 0 | 0 | 1 |
| +407.5 | +40.75° | 1 | 1 | 0 | 1 | 1 | 0 | 1 | 1 |
| +408.5 | +40.85° | 1 | 0 | 0 | 1 | 0 | 0 | 1 | 0 |
| +409.5 | +40.95° | 1 | 0 | 1 | 1 | 0 | 0 | 1 | 0 |
| +410.5 | +41.05° | 1 | 0 | 1 | 1 | 0 | 1 | 1 | 0 |
| +411.5 | +41.15° | 0 | 0 | 1 | 0 | 0 | 1 | 0 | 0 |
| +412.5 | +41.25° | 0 | 1 | 1 | 0 | 1 | 1 | 0 | 1 |
| +413.5 | +41.35° | 0 | 1 | 0 | 0 | 1 | 0 | 0 | 1 |
| +414.5 | +41.45° | 0 | 1 | 0 | 0 | 1 | 0 | 0 | 1 |
| +415.5 | +41.55° | 1 | 1 | 0 | 1 | 1 | 0 | 1 | 1 |
| +416.5 | +41.65° | 1 | 0 | 0 | 1 | 0 | 0 | 1 | 0 |
| +417.5 | +41.75° | 1 | 0 | 1 | 1 | 0 | 1 | 1 | 0 |
| +418.5 | +41.85° | 1 | 0 | 1 | 1 | 0 | 1 | 1 | 0 |
| +419.5 | +41.95° | 0 | 0 | 1 | 0 | 0 | 1 | 0 | 0 |
| +420.5 | +42.05° | 0 | 1 | 1 | 0 | 1 | 1 | 0 | 1 |
| +421.5 | +42.15° | 0 | 1 | 0 | 0 | 1 | 0 | 0 | 1 |
| +422.5 | +42.25° | 0 | 1 | 0 | 0 | 1 | 0 | 0 | 1 |
| +423.5 | +42.35° | 1 | 1 | 0 | 1 | 1 | 0 | 1 | 1 |
| +424.5 | +42.45° | 1 | 0 | 0 | 1 | 0 | 0 | 1 | 0 |
| +425.5 | +42.55° | 1 | 0 | 1 | 1 | 0 | 1 | 1 | 0 |
| +426.5 | +42.65° | 1 | 0 | 1 | 1 | 0 | 1 | 0 | 0 |
| +427.5 | +42.75° | 0 | 0 | 1 | 0 | 0 | 1 | 0 | 0 |
| +428.5 | +42.85° | 0 | 1 | 1 | 0 | 1 | 1 | 0 | 1 |
| +429.5 | +42.95° | 0 | 1 | 0 | 0 | 1 | 0 | 0 | 1 |
| +430.5 | +43.05° | 0 | 1 | 0 | 1 | 1 | 0 | 1 | 1 |
| +431.5 | +43.15° | 1 | 1 | 0 | 1 | 1 | 0 | 1 | 0 |
| +432.5 | +43.25° | 1 | 0 | 0 | 1 | 0 | 0 | 1 | 0 |
| +433.5 | +43.35° | 1 | 0 | 1 | 1 | 0 | 1 | 1 | 0 |
| +434.5 | +43.45° | 1 | 0 | 1 | 0 | 0 | 1 | 0 | 0 |
| +435.5 | +43.55° | 0 | 0 | 1 | 0 | 0 | 1 | 0 | 1 |
| +436.5 | +43.65° | 0 | 1 | 1 | 0 | 1 | 1 | 0 | 1 |
| +437.5 | +43.75° | 0 | 1 | 0 | 0 | 1 | 0 | 0 | 1 |
| +438.5 | +43.85° | 0 | 1 | 0 | 1 | 1 | 0 | 1 | 1 |
| +439.5 | +43.95° | 1 | 1 | 0 | 1 | 1 | 0 | 1 | 0 |
| +440.5 | +44.05° | 1 | 0 | 0 | 1 | 0 | 0 | 1 | 0 |
| +441.5 | +44.15° | 1 | 0 | 1 | 1 | 0 | 1 | 1 | 0 |
| +442.5 | +44.25° | 1 | 0 | 1 | 0 | 0 | 1 | 0 | 0 |
| +443.5 | +44.35° | 0 | 0 | 1 | 0 | 1 | 1 | 0 | 1 |
| +444.5 | +44.45° | 0 | 1 | 1 | 0 | 1 | 1 | 0 | 1 |
| +445.5 | +44.55° | 0 | 1 | 0 | 0 | 1 | 0 | 0 | 1 |
| +446.5 | +44.65° | 0 | 1 | 0 | 1 | 1 | 0 | 1 | 1 |
| +447.5 | +44.75° | 1 | 1 | 0 | 1 | 0 | 0 | 1 | 0 |
| +448.5 | +44.85° | 1 | 0 | 0 | 1 | 0 | 1 | 1 | 0 |
| +449.5 | +44.95° | 1 | 0 | 1 | 1 | 0 | 1 | 1 | 0 |
| +450.5 | +45.05° | 1 | 0 | 1 | 0 | 0 | 1 | 0 | 0 |
| +451.5 | +45.15° | 0 | 0 | 1 | 0 | 1 | 1 | 0 | 1 |
| +452.5 | +45.25° | 0 | 1 | 1 | 0 | 1 | 0 | 0 | 1 |
| +453.5 | +45.35° | 0 | 1 | 0 | 0 | 1 | 0 | 0 | 1 |
| +454.5 | +45.45° | 0 | 1 | 0 | 1 | 1 | 0 | 1 | 1 |
| +455.5 | +45.55° | 1 | 1 | 0 | 1 | 0 | 0 | 1 | 0 |
| +456.5 | +45.65° | 1 | 0 | 0 | 1 | 0 | 1 | 1 | 0 |
| +457.5 | +45.75° | 1 | 0 | 1 | 1 | 0 | 1 | 0 | 0 |
| +458.5 | +45.85° | 1 | 0 | 1 | 0 | 0 | 1 | 0 | 1 |
| +459.5 | +45.95° | 0 | 0 | 1 | 0 | 1 | 1 | 0 | 1 |
| +460.5 | +46.05° | 0 | 1 | 1 | 0 | 1 | 0 | 0 | 1 |
| +461.5 | +46.15° | 0 | 1 | 0 | 0 | 1 | 0 | 1 | 1 |
| +462.5 | +46.25° | 0 | 1 | 0 | 1 | 1 | 0 | 1 | 0 |

-continued

| | | | | | | | | | |
|---|---|---|---|---|---|---|---|---|---|
| +463.5 | +46.35° | 1 | 1 | 0 | 1 | 0 | 0 | 1 | 0 |
| +464.5 | +46.45° | 1 | 0 | 0 | 1 | 0 | 1 | 1 | 0 |
| +465.5 | +46.55° | 1 | 0 | 1 | 1 | 0 | 1 | 0 | 0 |
| +466.5 | +46.65° | 1 | 0 | 1 | 0 | 0 | 1 | 0 | 1 |
| +467.5 | +46.75° | 0 | 0 | 1 | 0 | 1 | 1 | 0 | 1 |
| +468.5 | +46.85° | 0 | 1 | 1 | 0 | 1 | 0 | 0 | 1 |
| +469.5 | +46.95° | 0 | 1 | 0 | 0 | 1 | 0 | 1 | 1 |
| +470.5 | +47.05° | 0 | 1 | 0 | 1 | 1 | 0 | 1 | 0 |
| +471.5 | +47.15° | 1 | 1 | 0 | 1 | 0 | 0 | 1 | 0 |
| +472.5 | +47.25° | 1 | 0 | 0 | 1 | 0 | 1 | 1 | 0 |
| +473.5 | +47.35° | 1 | 0 | 1 | 1 | 0 | 1 | 0 | 0 |
| +474.5 | +47.45° | 1 | 0 | 1 | 0 | 0 | 1 | 0 | 1 |
| +475.5 | +47.55° | 0 | 0 | 1 | 0 | 1 | 1 | 0 | 1 |
| +476.5 | +47.65° | 0 | 1 | 1 | 0 | 1 | 0 | 0 | 1 |
| +477.5 | +47.75° | 0 | 1 | 0 | 0 | 1 | 0 | 1 | 1 |
| +478.5 | +47.85° | 0 | 1 | 0 | 1 | 1 | 0 | 1 | 0 |
| +479.5 | +47.95° | 1 | 1 | 0 | 1 | 0 | 0 | 1 | 0 |
| +480.5 | +48.05° | 1 | 0 | 0 | 1 | 0 | 1 | 1 | 0 |
| +481.5 | +48.15° | 1 | 0 | 1 | 1 | 0 | 1 | 0 | 0 |
| +482.5 | +48.25° | 1 | 0 | 1 | 0 | 0 | 1 | 0 | 1 |
| +483.5 | +48.35° | 0 | 0 | 1 | 0 | 1 | 1 | 0 | 1 |
| +484.5 | +48.45° | 0 | 1 | 1 | 0 | 1 | 0 | 0 | 1 |
| +485.5 | +48.55° | 0 | 1 | 0 | 0 | 1 | 0 | 1 | 1 |
| +486.5 | +48.65° | 1 | 1 | 0 | 1 | 0 | 0 | 1 | 0 |
| +487.5 | +48.75° | 1 | 0 | 0 | 1 | 0 | 1 | 1 | 0 |
| +488.5 | +48.85° | 1 | 0 | 1 | 1 | 0 | 1 | 0 | 0 |
| +489.5 | +48.95° | 1 | 0 | 1 | 0 | 0 | 1 | 0 | 1 |
| +490.5 | +49.05° | 0 | 0 | 1 | 0 | 1 | 1 | 0 | 1 |
| +491.5 | +49.15° | 0 | 1 | 1 | 0 | 1 | 0 | 0 | 1 |
| +492.5 | +49.25° | 0 | 1 | 0 | 0 | 1 | 0 | 1 | 1 |
| +493.5 | +49.35° | 0 | 1 | 0 | 1 | 1 | 0 | 1 | 0 |
| +494.5 | +49.45° | 1 | 1 | 0 | 1 | 0 | 0 | 1 | 0 |
| +495.5 | +49.55° | 1 | 0 | 0 | 1 | 0 | 1 | 1 | 0 |
| +496.5 | +49.65° | 1 | 0 | 1 | 1 | 0 | 1 | 0 | 0 |
| +497.5 | +49.75° | 1 | 0 | 1 | 0 | 0 | 1 | 0 | 1 |
| +498.5 | +49.85° | 0 | 0 | 1 | 0 | 1 | 1 | 0 | 1 |
| +499.5 | +49.95° | 0 | 1 | 1 | 0 | 1 | 0 | 0 | 1 |
| +500.5 | +50.05° | 0 | 1 | 0 | 0 | 1 | 0 | 1 | 1 |
| +501.5 | +50.15° | 0 | 1 | 0 | 1 | 1 | 0 | 1 | 0 |
| +502.5 | +50.25° | 1 | 1 | 0 | 1 | 0 | 0 | 1 | 0 |
| +503.5 | +50.35° | 1 | 0 | 0 | 1 | 0 | 1 | 1 | 0 |
| +504.5 | +50.45° | 1 | 0 | 1 | 1 | 0 | 1 | 0 | 0 |
| +505.5 | +50.55° | 1 | 0 | 1 | 0 | 0 | 1 | 0 | 1 |
| +506.5 | +50.65° | 0 | 0 | 1 | 0 | 1 | 1 | 0 | 1 |
| +507.5 | +50.75° | 0 | 1 | 1 | 0 | 1 | 0 | 0 | 1 |
| +508.5 | +50.85° | 0 | 1 | 0 | 0 | 1 | 0 | 1 | 1 |
| +509.5 | +50.95° | 0 | 1 | 0 | 1 | 1 | 0 | 1 | 0 |
| +510.5 | +51.05° | 1 | 1 | 0 | 1 | 0 | 0 | 1 | 0 |
| +511.5 | +51.15° | 1 | 0 | 0 | 1 | 0 | 1 | 1 | 0 |
| +512.5 | +51.25° | 1 | 0 | 1 | 1 | 0 | 1 | 0 | 0 |
| +513.5 | +51.35° | 1 | 0 | 1 | 0 | 0 | 1 | 0 | 1 |
| +514.5 | +51.45° | 0 | 0 | 1 | 0 | 1 | 1 | 0 | 1 |
| +515.5 | +51.55° | 0 | 1 | 1 | 0 | 1 | 0 | 0 | 1 |
| +516.5 | +51.65° | 0 | 1 | 0 | 0 | 1 | 0 | 1 | 0 |
| +517.5 | +51.75° | 0 | 1 | 0 | 1 | 1 | 0 | 1 | 0 |
| +518.5 | +51.85° | 1 | 1 | 0 | 1 | 0 | 0 | 1 | 0 |
| +519.5 | +51.95° | 1 | 0 | 0 | 1 | 0 | 1 | 1 | 0 |
| +520.5 | +52.05° | 1 | 0 | 1 | 1 | 0 | 1 | 0 | 1 |
| +521.5 | +52.15° | 1 | 0 | 1 | 0 | 0 | 1 | 0 | 1 |
| +522.5 | +52.25° | 0 | 0 | 1 | 0 | 1 | 1 | 0 | 1 |
| +523.5 | +52.35° | 0 | 1 | 1 | 0 | 1 | 0 | 1 | 1 |
| +524.5 | +52.45° | 0 | 1 | 0 | 0 | 1 | 0 | 1 | 0 |
| +525.5 | +52.55° | 0 | 1 | 0 | 1 | 1 | 0 | 1 | 0 |
| +526.5 | +52.65° | 1 | 1 | 0 | 1 | 0 | 0 | 1 | 0 |
| +527.5 | +52.75° | 1 | 0 | 0 | 1 | 0 | 1 | 0 | 0 |
| +528.5 | +52.85° | 1 | 0 | 1 | 1 | 0 | 1 | 0 | 1 |
| +529.5 | +52.95° | 1 | 0 | 1 | 0 | 0 | 1 | 0 | 1 |
| +530.5 | +53.05° | 0 | 0 | 1 | 0 | 1 | 0 | 0 | 1 |
| +531.5 | +53.15° | 0 | 1 | 1 | 0 | 1 | 0 | 1 | 1 |
| +532.5 | +53.25° | 0 | 1 | 0 | 0 | 1 | 0 | 1 | 0 |
| +533.5 | +53.35° | 0 | 1 | 0 | 1 | 1 | 0 | 1 | 0 |
| +534.5 | +53.45° | 1 | 1 | 0 | 1 | 0 | 1 | 1 | 0 |
| +535.5 | +53.55° | 1 | 0 | 0 | 1 | 0 | 1 | 0 | 0 |
| +536.5 | +53.65° | 1 | 0 | 1 | 1 | 0 | 1 | 0 | 1 |
| +537.5 | +53.75° | 1 | 0 | 1 | 0 | 1 | 1 | 0 | 1 |
| +538.5 | +53.85° | 0 | 0 | 1 | 0 | 1 | 0 | 0 | 1 |
| +539.5 | +53.95° | 0 | 1 | 1 | 0 | 1 | 0 | 1 | 1 |
| +540.5 | +54.05° | 0 | 1 | 0 | 0 | 1 | 0 | 1 | 0 |
| +541.5 | +54.15° | 0 | 1 | 0 | 1 | 0 | 0 | 1 | 0 |

-continued

| | | | | | | | | |
|---|---|---|---|---|---|---|---|---|
| +542.5 | +54.25° | 1 | 1 | 0 | 1 | 0 | 1 | 1 | 0 |
| +543.5 | +54.35° | 1 | 0 | 0 | 1 | 0 | 1 | 0 | 0 |
| +544.5 | +54.45° | 1 | 0 | 1 | 1 | 0 | 1 | 0 | 1 |
| +545.5 | +54.55° | 1 | 0 | 1 | 0 | 1 | 1 | 0 | 1 |
| +546.5 | +54.65° | 0 | 0 | 1 | 0 | 1 | 0 | 0 | 1 |
| +547.5 | +54.75° | 0 | 1 | 1 | 0 | 1 | 0 | 1 | 1 |
| +548.5 | +54.85° | 0 | 1 | 0 | 0 | 1 | 0 | 1 | 0 |
| +549.5 | +54.95° | 0 | 1 | 0 | 1 | 0 | 0 | 1 | 0 |
| +550.5 | +55.05° | 1 | 1 | 0 | 1 | 0 | 1 | 1 | 0 |
| +551.5 | +55.15° | 1 | 0 | 0 | 1 | 0 | 1 | 0 | 1 |
| +552.5 | +55.25° | 1 | 0 | 1 | 0 | 0 | 1 | 0 | 1 |
| +553.5 | +55.35° | 1 | 0 | 1 | 0 | 1 | 1 | 0 | 1 |
| +554.5 | +55.45° | 0 | 0 | 1 | 0 | 1 | 0 | 0 | 1 |
| +555.5 | +55.55° | 0 | 1 | 1 | 0 | 1 | 0 | 1 | 0 |
| +556.5 | +55.65° | 0 | 1 | 0 | 1 | 1 | 0 | 1 | 0 |
| +557.5 | +55.75° | 0 | 1 | 0 | 1 | 0 | 0 | 1 | 0 |
| +558.5 | +55.85° | 1 | 1 | 0 | 1 | 0 | 1 | 0 | 0 |
| +559.5 | +55.95° | 1 | 0 | 0 | 1 | 0 | 1 | 0 | 1 |
| +560.5 | +56.05° | 1 | 0 | 1 | 0 | 0 | 1 | 0 | 1 |
| +561.5 | +56.15° | 1 | 0 | 1 | 0 | 1 | 1 | 0 | 1 |
| +562.5 | +56.25° | 0 | 0 | 1 | 0 | 1 | 0 | 1 | 1 |
| +563.5 | +56.35° | 0 | 1 | 1 | 0 | 1 | 0 | 1 | 0 |
| +564.5 | +56.45° | 0 | 1 | 0 | 1 | 1 | 0 | 1 | 0 |
| +565.5 | +56.55° | 0 | 1 | 0 | 1 | 0 | 0 | 1 | 0 |
| +566.5 | +56.65° | 1 | 1 | 0 | 1 | 0 | 1 | 0 | 0 |
| +567.5 | +56.75° | 1 | 0 | 0 | 1 | 0 | 1 | 0 | 1 |
| +568.5 | +56.85° | 1 | 0 | 1 | 0 | 0 | 1 | 0 | 1 |
| +569.5 | +56.95° | 1 | 0 | 1 | 0 | 1 | 1 | 0 | 1 |
| +570.5 | +57.05° | 0 | 0 | 1 | 0 | 1 | 0 | 1 | 1 |
| +571.5 | +57.15° | 0 | 1 | 1 | 0 | 1 | 0 | 1 | 0 |
| +572.5 | +57.25° | 0 | 1 | 0 | 1 | 1 | 0 | 1 | 0 |
| +573.5 | +57.35° | 0 | 1 | 0 | 1 | 0 | 1 | 1 | 0 |
| +574.5 | +57.45° | 1 | 1 | 0 | 1 | 0 | 1 | 0 | 0 |
| +575.5 | +57.55° | 1 | 0 | 0 | 1 | 0 | 1 | 0 | 1 |
| +576.5 | +57.65° | 1 | 0 | 1 | 0 | 0 | 1 | 0 | 1 |
| +577.5 | +57.75° | 1 | 0 | 1 | 0 | 1 | 0 | 0 | 1 |
| +578.5 | +57.85° | 0 | 0 | 1 | 0 | 1 | 0 | 1 | 1 |
| +579.5 | +57.95° | 0 | 1 | 1 | 0 | 1 | 0 | 1 | 0 |
| +580.5 | +58.05° | 0 | 1 | 0 | 1 | 1 | 0 | 1 | 0 |
| +581.5 | +58.15° | 0 | 1 | 0 | 1 | 0 | 1 | 1 | 0 |
| +582.5 | +58.25° | 1 | 1 | 0 | 1 | 0 | 1 | 0 | 1 |
| +583.5 | +58.35° | 1 | 0 | 1 | 1 | 0 | 1 | 0 | 1 |
| +584.5 | +58.45° | 1 | 0 | 1 | 0 | 0 | 1 | 0 | 1 |
| +585.5 | +58.55° | 1 | 0 | 1 | 0 | 1 | 0 | 0 | 1 |
| +586.5 | +58.65° | 0 | 0 | 1 | 0 | 1 | 0 | 1 | 0 |
| +587.5 | +58.75° | 0 | 1 | 0 | 0 | 1 | 0 | 1 | 0 |
| +588.5 | +58.85° | 0 | 1 | 0 | 1 | 1 | 0 | 1 | 0 |
| +589.5 | +58.95° | 0 | 1 | 0 | 1 | 0 | 1 | 1 | 0 |
| +590.5 | +59.05° | 1 | 1 | 0 | 1 | 0 | 1 | 0 | 1 |
| +591.5 | +59.15° | 1 | 0 | 1 | 1 | 0 | 1 | 0 | 1 |
| +592.5 | +59.25° | 1 | 0 | 1 | 0 | 0 | 1 | 0 | 1 |
| +593.5 | +59.35° | 1 | 0 | 1 | 0 | 1 | 0 | 0 | 1 |
| +594.5 | +59.45° | 0 | 0 | 1 | 0 | 1 | 0 | 1 | 0 |
| +595.5 | +59.55° | 0 | 1 | 0 | 0 | 1 | 0 | 1 | 0 |
| +596.5 | +59.65° | 0 | 1 | 0 | 1 | 0 | 0 | 1 | 0 |
| +597.5 | +59.75° | 0 | 1 | 0 | 1 | 0 | 1 | 1 | 0 |
| +598.5 | +59.85° | 1 | 1 | 0 | 1 | 0 | 1 | 0 | 1 |
| +599.5 | +59.95° | 1 | 0 | 1 | 1 | 0 | 1 | 0 | 1 |

I claim:

1. A method for steering a directional beam produced by an array of transducer devices, the method comprising:
   receiving at least one reference frequency;
   generating oscillator signals based on use of the at least one reference frequency, wherein generating the oscillator signals includes modulating corresponding frequencies of the oscillator signals via phase adjustments applied to the oscillator signals; and
   applying the oscillator signals to multiplier devices associated with the array of transducer devices to continuously sweep the directional beam through different angles in a scanned region.

2. A method as in claim 1, wherein generating the oscillator signals includes producing a set of spaced, simulated frequencies that cannot be precisely generated by the at least one reference frequency; and
   wherein applying the oscillator signals includes applying successively higher frequencies of the set of spaced, simulated frequencies to corresponding multiplier devices associated with respective successive transducers in the array.

3. A method as in claim 1 further comprising:
   transmitting a pulse in the scanned region; and
   repeatedly sweeping the directional beam through two dimensions of angular ranges in the scanned region to detect a location of objects in a three-dimensional volume in the scanned region.

4. A method as in claim 1 further comprising:
utilizing undersampling techniques to determine the phase adjustments to continuously steer the directional beam and identify a presence of objects in the scanned region.

5. A method as in claim 1, wherein applying the oscillator signals to corresponding multiplier devices causes repeated sweeping of the directional beam in the scanned region at a rate fast enough to enable collection of echo data associated with reflections from objects at any location in the scanned region.

6. A method as in claim 1, wherein steering the directional beam includes at least one of:
   i) hopping the directional beam amongst different angles in the scanned region;
   ii) continuous sweeping of the directional beam at a linear rate through different angles in the scanned region; and
   iii) continuous sweeping of the directional beam at non-linear rate through different angles in the scanned region.

7. A method as in claim 1, wherein steering the directional beam includes:
receiving sonar-based echo signals traveling through a medium associated with the scanned region through which the directional beam sweeps, the directional beam sweeping at a fast enough rate for the array of transducers to collect echo data for objects located on an arc at a substantially fixed radius with respect to a center of the array of transducers.

8. A method as in claim 1 further comprising:
generating a sonar-based pulse in the scanned region; and
wherein steering the directional beam includes receiving echo signals produced as a result of at least a portion of the sonar-based pulse reflecting off objects in the scanned region back to the array of transducers.

9. A method as in claim 8, wherein the pulse is a multi-directional pulse transmitted in the scanned region and the directional beam continuously sweeps through angles of the scanned region with respect to the array of transducers to identify objects in the scanned region.

10. A method as in claim 9 further comprising:
processing the echo signals to: i) identify an angular position of objects in the scanned region producing the echo signals, ii) identify a relative distance of the objects in the scanned region with respect to the array of transducers, and iii) display a representation of the objects and their corresponding angular position and relative distance on a display screen to a viewer.

11. A system for producing a sweeping directional beam to monitor a presence of echo signals in a scanned region, the system comprising:
an array of transducers that detects the echo signals and produces respective electronic signals based on the echo signals;
an array of multiplier devices coupled to receive the respective electronic signals from the array of transducers;
a generator device that generates multiple oscillator signals to drive the array of multiplier devices and steer a directional beam formed by the array of transducers, at least one oscillator signal of the multiple oscillator signals having associated phase adjustments to support sweeping of the directional beam through the scanned region; and
wherein the generator device adjusts a timing of transitions in at least two of the multiple oscillator signals to simulate different non-harmonics of a reference frequency used to generate the multiple oscillator signals.

12. A system as in claim 11, wherein the generator device at least occasionally adjusts phases of the multiple oscillator signals to modulate corresponding frequencies of the multiple oscillator signals.

13. A system as in claim 11, wherein the echo signals are sonar-based echo signals traveling through a medium of the scanned region and the directional beam repeatedly sweeps the scanned region at a faster rate than a transmit pulse is able to substantially propagate in the scanned region during a sweep cycle in which the directional beam sweeps through a full angular range of the scanned region.

14. A system as in claim 11 further comprising:
a transmitter that generates a pulse in the scanned region, the echo signals being produced as a result of at least a portion of the pulse reflecting off objects in the scanned region back to the array of transducers.

15. A system as in claim 14, wherein the pulse is a multi-directional pulse transmitted in the scanned region and the generator device phase modulates the multiple oscillator signals to continuously sweep the directional beam formed by the array of transducers in the scanned region.

16. A system as in claim 14 further comprising:
at least one processor device to process the echo signals to: i) identify an angular position of objects in the scanned region producing the echo signals, and ii) display a representation of the objects on a display screen to a viewer.

17. A system as in claim 11 further comprising:
a table including information identifying a timing of phase transitions associated with the multiple oscillator signals, the table utilized by the generator device to simulate non-harmonic frequency values of a reference frequency used to generate the multiple oscillator signals and sweep the directional beam at a linear rate through the scanned region.

18. A system as in claim 11, wherein the multiple oscillator signals is a set of spaced, simulated frequencies that cannot be accurately generated based on a relatively low reference frequency used by the generator device to generate the multiple oscillator signals; and
wherein the generator device applies successively higher frequencies of the set of spaced, simulated frequencies to corresponding multiplier devices associated with respective successive transducers in the array.

19. A system for producing a sweeping directional beam, the system comprising:
an array of transducers;
an array of multiplier devices coupled to the array of transducers;
a generator device that generates multiple oscillator signals to drive the array of multipliers and sweep a directional beam formed by the array of transducers, at least one oscillator signal of the multiple oscillator signals having phase adjustments to simulate a higher frequency spectral component than can be provided by a relatively low frequency clock utilized by the generator device to generate the at least one oscillator signal; and
a table including information identifying a timing of phase transitions associated with the multiple oscillator signals, the table utilized by the generator device to simulate the higher frequency spectral component and continuously sweep the directional beam at a linear rate through a scanned region.

20. A method for steering a directional beam produced by an array of transducer devices, the method comprising:
receiving a reference frequency;
generating oscillator signals based on use of the reference frequency, the oscillator signals including phase adjustments to continuously sweep the directional beam through different angles in a scanned region;

wherein generating the oscillator signals includes adjusting phases of the oscillator signals to modulate corresponding frequencies of the oscillator signals, the method further comprising:

sampling echo signals received on the directional beam for a single transmit ping producing reflections off objects in the scanned region.

21. A method as in claim 19, wherein generating the oscillator signals includes adjusting phases of the oscillator signals to modulate corresponding frequencies of the oscillator signals, the method further comprising:

sampling echo signals received on the directional beam for a single transmit ping producing reflections off objects in the scanned region.

22. A method as in claim 19 further comprising:

utilizing undersampling techniques to determine the phase adjustments to continuously sweep the directional beam through the different angles in the scanned region.

23. A method as in claim 20 further comprising:

scanning the directional beam at a linear angular rate over time.

24. A method as in claim 1, wherein generating oscillator signals includes:

implementing the phase adjustments to create the oscillator signals and simulate a clock frequency that is higher than the at least one reference frequency.

25. A method as in claim 1, wherein generating the oscillator signals includes:

adjusting timing of a transitional edge of the at least one reference frequency to produce a given oscillator signal having a different frequency than that of the at least one reference frequency; and applying the given oscillator signal to one of the multiplier devices.

26. A method as in claim 25, wherein adjusting the timing of the transitional edge results in simulation of a non-harmonic frequency of the at least one reference frequency.

27. A method as in claim 1, wherein generating the oscillator signals includes:

adjusting timing of a first set of transitional edges of the at least one reference frequency to produce a first oscillator signal of the multiple oscillator signals; and adjusting timing of a second set of transitional edges of the at least one reference frequency to produce a second oscillator signal of the multiple oscillator signals.

28. A method as in claim 1, wherein generating the oscillator signals includes:

adjusting timing of a first transitional edge of the at least one reference frequency to produce a first oscillator signal having a different frequency than that of the at least one reference frequency;

adjusting timing of a second transitional edge of the at least one reference frequency to produce a second oscillator signal having a different frequency than that of the at least one reference frequency;

wherein applying the oscillator signals to multiplier devices includes:

applying the first oscillator signal to a first multiplier device of the multiplier devices; and applying the second oscillator signal to a second multiplier device of the multiplier devices.

29. A method as in claim 1 further comprising:

advancing and retarding transitional edges of the oscillator signals to modulate the corresponding frequencies of the oscillator signals over time.

* * * * *